(12) United States Patent
Kust et al.

(10) Patent No.: US 12,462,941 B2
(45) Date of Patent: Nov. 4, 2025

(54) PAN-CANCER TUMOR MICROENVIRONMENT CLASSIFICATION BASED ON IMMUNE ESCAPE MECHANISMS AND IMMUNE INFILTRATION

(71) Applicant: BostonGene Corporation, Waltham, MA (US)

(72) Inventors: Sofya Kust, Yerevan (AM); Anastasia Zotova, Moscow (RU); Elena Ocheredko, Yerevan (AM); Alexander Bagaev, Waltham, MA (US); Maria Savchenko, Yerevan (AM); Nadezhda Lukashevich, Yerevan (AM); Siune Ambarian, Yerevan (AM); Michael F. Goldberg, Brookline, MA (US)

(73) Assignee: BostonGene Corporation, Waltham, MA (US)

( * ) Notice: Subject to any disclaimer, the term of this patent is extended or adjusted under 35 U.S.C. 154(b) by 0 days.

(21) Appl. No.: 18/634,443

(22) Filed: Apr. 12, 2024

(65) Prior Publication Data
US 2024/0347211 A1   Oct. 17, 2024

Related U.S. Application Data

(60) Provisional application No. 63/627,483, filed on Jan. 31, 2024, provisional application No. 63/465,991, filed on May 12, 2023, provisional application No. 63/459,232, filed on Apr. 13, 2023.

(51) Int. Cl.
*G16H 50/50* (2018.01)
*G16B 25/10* (2019.01)
*G16H 20/10* (2018.01)

(52) U.S. Cl.
CPC .............. *G16H 50/50* (2018.01); *G16B 25/10* (2019.02); *G16H 20/10* (2018.01)

(58) Field of Classification Search
CPC ......... G16H 50/50; G16H 20/10; G16B 25/10
See application file for complete search history.

(56) References Cited

U.S. PATENT DOCUMENTS

| | | | |
|---|---|---|---|
| 11,302,420 B2 | 4/2022 | Bagaev et al. | |
| 11,315,658 B2 | 4/2022 | Zaitsev et al. | |
| 11,587,642 B2 | 2/2023 | Zaitsev et al. | |
| 2005/0048463 A1 | 3/2005 | Deng et al. | |
| 2014/0066323 A1* | 3/2014 | Buerki .................. | C12Q 1/6886 435/6.12 |
| 2018/0357374 A1* | 12/2018 | Bagaev .................. | G16B 25/10 |
| 2019/0233898 A1 | 8/2019 | Newman et al. | |
| 2019/0324038 A1* | 10/2019 | Ginhoux ............ | C07K 16/2878 |
| 2020/0210852 A1 | 7/2020 | Igartua et al. | |
| 2020/0340909 A1 | 10/2020 | Ohsaka et al. | |
| 2021/0118526 A1 | 4/2021 | Barber | |
| 2021/0151128 A1 | 5/2021 | Abe et al. | |
| 2021/0287759 A1 | 9/2021 | Zaitsev et al. | |
| 2021/0388418 A1 | 12/2021 | Skanderup et al. | |
| 2022/0186318 A1 | 6/2022 | Meerson et al. | |
| 2022/0230707 A1 | 7/2022 | Zaitsev et al. | |
| 2022/0319638 A1* | 10/2022 | Hsieh .................. | C12Q 1/6886 |
| 2022/0372580 A1 | 11/2022 | Zaitsev et al. | |
| 2022/0389512 A1 | 12/2022 | Bagaev et al. | |
| 2023/0178178 A1 | 6/2023 | Zaitsev et al. | |
| 2023/0245479 A1 | 8/2023 | Ataullakhanov et al. | |
| 2024/0167933 A1 | 5/2024 | Goldberg | |
| 2024/0170096 A1 | 5/2024 | Goldberg et al. | |
| 2024/0177803 A1 | 5/2024 | Goldberg et al. | |

FOREIGN PATENT DOCUMENTS

| | | |
|---|---|---|
| EP | 3 349 006 A1 | 7/2018 |
| WO | WO 2019/018684 A | 1/2019 |
| WO | WO 2020/081582 A1 | 4/2020 |
| WO | WO 2021/092071 A1 | 5/2021 |
| WO | WO 2021/183917 A1 | 9/2021 |
| WO | WO 2021/247868 A1 | 12/2021 |
| WO | WO 2022/133131 A1 | 6/2022 |
| WO | WO 2022/192393 A1 | 9/2022 |
| WO | WO 2022/232615 A1 | 11/2022 |

OTHER PUBLICATIONS

Cheng WC et al. (2019) Uncoupling protein 2 reprograms the tumor microenvironment to support the anti-tumor immune cycle. Nat Immunol 20: 206-217. (Year: 2019).*
International Search Report and Written Opinion for International Application No. PCT/US2024/024323 mailed Jul. 25, 2024.
[No Author Listed], Artyomov Lab Systems Immunology. Maxim N. Artyomov. 2013. https://artyomovlab.wustl.edu/site/index.html [last accessed Jun. 7, 2021]. 3 pages.
[No Author Listed], Deconvolution of ABsolute Immune Signal. shinyapps.io. 2021. https://giannimonaco.shinyapps.io/ABIS/ [last accessed Jun. 7, 2021]. 1 page.
[No Author Listed], MCP-counter. CIT. 2021. https://cit.ligue-cancer.net/mcp-counter/ [last accessed Jun. 7, 2021]. 2 pages.
[No Author Listed], Using EPIC to estimate the proportion of various cell types in bulk samples. EPIC. 2021. http://epic.gfellerlab.org/ [last accessed Jun. 7, 2021]. 1 page.
[No Author Listed], Wikipedia Gradient Boosting. 2022. 10 pages. https://en.wikipedia.org/wiki/Gradient_boosting [Last accessed May 25, 2022].
[No Author Listed], Wikipedia Nonlinear Regression. 2021. 4 pages. https://en.wikipedia.org/wiki/Nonlinear_regression [Last accessed Aug. 29, 2022].

(Continued)

*Primary Examiner* — Mary K Zeman
*Assistant Examiner* — Vy Rossi
(74) *Attorney, Agent, or Firm* — Wolf, Greenfield & Sacks, P.C.

(57) ABSTRACT

Aspects of the disclosure relate to methods, systems, and computer-readable storage media that are useful for characterizing subjects having certain cancers, for example cancers typified by solid tumors. The disclosure is based, in part, on methods for determining a tumor microenvironment (TME) type of a cancer subject and determining the subject's prognosis and/or likelihood of responding to one or more therapies based upon the TME type determination.

19 Claims, 106 Drawing Sheets

(56) References Cited

OTHER PUBLICATIONS

Abbas et al., Immune response in silico (IRIS): immune-specific genes identified from a compendium of microarray expression data. Genes & Immunity. Jun. 2005;6(4):319-31.

Altman et al., Transcriptome networks identify mechanisms of viral and nonviral asthma exacerbations in children. Nature immunology. May 2019;20(5):637-51.

Aran et al., Systematic pan-cancer analysis of tumour purity. Nature communications. Dec. 4, 2015;6(1):1-11.

Aran et al., xCell. UCSF Institute for Computational Health Sciences. 2017. https://xcell.ucsf.edu/ [last accessed Jun. 7, 2021]. 2 pages.

Aran et al., xCell: digitally portraying the tissue cellular heterogeneity landscape. Genome biology. Dec. 2017;18(1):1-14.

11 pages, Araujo B. De Lima et al., Immune Cell Profiling of Peripheral Blood as Signature for Response During Checkpoint Inhibition Across Cancer Types. Front Oncol. Mar. 25, 2021;11:558248. doi: 10.3389/fonc.2021.558248. PMID: 33842304.

Bagaev et al., Conserved pan-cancer microenvironment subtypes predict response to immunotherapy. Cancer Cell. Jun. 14, 2021;39(6):845-865.e7. doi: 10.1016/j.ccell.2021.04.014. Epub May 20, 2021. PMID: 34019806.

12 pages, Bai et al., Mechanisms of Cancer Resistance to Immunotherapy. Front Oncol. Aug. 6, 2020;10:1290. doi: 10.3389/fonc.2020.01290. PMID: 32850400; PMCID: PMC7425302.

Barbie et al., Systematic RNA interference reveals that oncogenic KRAS-driven cancers require TBK1. Nature. Nov. 5, 2009;462(7269):108-12.

Becht et al., Estimating the population abundance of tissue-infiltrating immune and stromal cell populations using gene expression. Genome biology. Dec. 2016;17(1):1-20.

Bell et al., Developing an immunotherapy strategy for the effective treatment of oral, head and neck squamous cell carcinoma. Journal of Oral and Maxillofacial Surgery. Dec. 1, 2015;73(12):S107-15.

Ben-Moshe et al., mRNA-seq whole transcriptome profiling of fresh frozen versus archived fixed tissues. BMC genomics. Dec. 2018;19(1):11 pages.

Bray et al., Near-optimal probabilistic RNA-seq quantification. Nat Biotechnol. May 2016;34(5):525-7. doi: 10.1038/nbt.3519. PMID: 27043002.

Butler et al., Integrating single-cell transcriptomic data across different conditions, technologies, and species. Nature biotechnology. May 2018;36(5):411-20.

Camus et al., Coordination of intratumoral immune reaction and human colorectal cancer recurrence. Cancer research. Mar. 15, 2009;69(6):2685-93.

15 pages, Chen et al., Pan-cancer molecular subtypes revealed by mass-spectrometry-based proteomic characterization of more than 500 human cancers. Nat Commun. Dec. 12, 2019;10(1):5679. doi: 10.1038/s41467-019-13528-0. PMID: 31831737; PMCID: PMC6908580.

Chen et al., Profiling tumor infiltrating immune cells with Cibersort. Cancer systems biology. 2018:243-259.

Chen et al., Elements of cancer immunity and the cancer-immune set point. Nature 541, 321-330 (2017). https://doi.org/10.1038/nature21349.

Cieslik et al., The use of exome capture RNA-seq for highly degraded RNA with application to clinical cancer sequencing. Genome research. Sep. 1, 2015;25(9):1372-81.

Czystowska et al., The immune signature of CD8+ CCR7+ T cells in the peripheral circulation associates with disease recurrence in patients with HNSCC. Clinical Cancer Research. Feb. 15, 2013;19(4):889-99.

Duraiswamy et al., Phenotype, function, and gene expression profiles of programmed death-1(hi) CD8 T cells in healthy human adults. J Immunol. Apr. 1, 2011;186(7):4200-12. doi: 10.4049/jimmunol.1001783. PMID: 21383243.

Dyikanov et al., Comprehensive immunoprofiling of peripheral blood reveals five conserved immunotypes with implications for immunotherapy in cancer patients. Cancer Research. Apr. 4, 2023;83(7_Supplement):6664.

Eisenberg et al., Human housekeeping genes, revisited. Trends in Genetics. Oct. 1, 2013;29(10):569-74.

p. 778-789, Ferlay et al., Cancer statistics for the year 2020: An overview. Int J Cancer. Apr. 5, 2021. doi: 10.1002/ijc.33588. Epub ahead of print. PMID: 33818764.

Finotello et al., Molecular and pharmacological modulators of the tumor immune contexture revealed by deconvolution of RNA-seq data. Genome medicine. Dec. 2019; 11(1):1-20.

Finotello et al., quanTIseq documentation. quanTIseq. Feb. 25, 2019. https://icbi.i-med.ac.at/software/quantiseq/doc/ [last accessed Jun. 7, 2021]. 9 pages.

Frankish et al., Gencode reference annotation for the human and mouse genomes. Nucleic acids research. Jan. 8, 2019;47(D1):D766-73.

Galon et al., Approaches to treat immune hot, altered and cold tumors with combination immunotherapies. Nat Rev Drug Discov. Mar. 2019;18(3):197-218. doi: 10.1038/s41573-018-0007-y. PMID: 30610226.

Galon et al., Type, density, and location of immune cells within human colorectal tumors predict clinical outcome. Science. Sep. 29, 2006;313(5795):1960-4.

Gautier et al., affy-analysis of Affymetrix GeneChip data at the probe level. Bioinformatics. Feb. 12, 2004;20(3):307-15.

Geissler et al., Immune signature of tumor infiltrating immune cells in renal cancer. Oncoimmunology. Jan. 2, 2015;4(1):e985082. 10 pages. DOI:10.4161/2162402X.2014.985082.

George et al., Hemophilia B gene therapy with a high-specific-activity factor IX variant. New England Journal of Medicine. Dec. 7, 2017;377(23):2215-27.

Gerritse et al., High-dose administration of tyrosine kinase inhibitors to improve clinical benefit: A systematic review. Cancer Treatment Reviews. Jun. 1, 2021;97:102171.

Griffiths et al., Detection and removal of barcode swapping in single-cell RNA-seq data. Nature communications. Jul. 10, 2018;9(1):1-6.

Hanahan, Hallmarks of Cancer: New Dimensions. Cancer Discov. Jan. 2022;12(1):31-46. doi: 10.1158/2159-8290.CD-21-1059. PMID: 35022204.

Hao et al., Fast and robust deconvolution of tumor infiltrating lymphocyte from expression profiles using least trimmed squares. PLoS computational biology. May 6, 2019;15(5):e1006976. 21 pages.

Vaught et al., Biological sample collection, processing, storage and information management. IARC Sci Publ. Jan. 1, 2011;163(163):23-42.

Hirata et al., Tumor microenvironment and differential responses to therapy. Cold Spring Harbor perspectives in medicine. Jul. 1, 2017;7(7):a026781. 14 pages.

Hoek et al., A cell-based systems biology assessment of human blood to monitor immune responses after influenza vaccination. PLoS one. Feb. 23, 2015;10(2):e0118528. 24 pages.

Holik et al., RNA-seq mixology: designing realistic control experiments to compare protocols and analysis methods. Nucleic acids research. Mar. 17, 2017;45(5):e30. 18 pages.

Izar et al., A Single-Cell Landscape of High-Grade Serous Ovarian Cancer. Nature medicine. 2020;26:1271-1279. 23 pages.

Ke et al., Lightgbm: A highly efficient gradient boosting decision tree. Advances in neural information processing systems (NIPS). 2017;30:3146-54.

Kim et al., The Evasion Mechanisms of Cancer Immunity and Drug Intervention in the Tumor Microenvironment. Front Pharmacol. May 24, 2022;13:868695. 16 pages. doi: 10.3389/fphar.2022.868695. PMID: 35685630; PMCID: PMC9171538.

Kitano et al., Computational algorithm-driven evaluation of monocytic myeloid-derived suppressor cell frequency for prediction of clinical outcomes. Cancer Immunol Res. Aug. 2014;2(8):812-21. doi: 10.1158/2326-6066.CIR-14-0013. PMID: 24844912.

Lambrechts et al., Phenotype molding of stromal cells in the lung tumor microenvironment. Nature medicine. Aug. 2018;24(8):1277-89. 19 pages.

(56) References Cited

OTHER PUBLICATIONS

Levine et al., Data-driven phenotypic dissection of AML reveals progenitor-like cells that correlate with prognosis. Cell. Jul. 2, 2015;162(1):184-97. 31 pages.

Linsley et al., Copy number loss of the interferon gene cluster in melanomas is linked to reduced T cell infiltrate and poor patient prognosis. PloS one. Oct. 14, 2014;9(10):e109760. 9 pages.

Le Louedec et al., Cancer immunotherapy dosing: a pharmacokinetic/pharmacodynamic perspective. Vaccines. Oct. 31, 2020;8(4):632.

Luca et al., Atlas of clinically distinct cell states and ecosystems across human solid tumors. Cell. Oct. 14, 2021;184(21):5482-5496.e28. doi: 10.1016/j.cell.2021.09.014. Epub Sep. 30, 2021. PMID: 34597583; PMCID: PMC8526411.

Lun et al., EmptyDrops: distinguishing cells from empty droplets in droplet-based single-cell RNA sequencing data. Genome biology. Dec. 2019;20(1):1-9.

Ma et al., PD1 Hi CD8+ T cells correlate with exhausted signature and poor clinical outcome in hepatocellular carcinoma. Journal for immunotherapy of cancer. Dec. 2019;7(1):331. 15 pages.

Macosko et al., Highly parallel genome-wide expression profiling of individual cells using nanoliter droplets. Cell. May 21, 2015;161(5):1202-14. 25 pages.

Marioni et al., RNA-seq: an assessment of technical reproducibility and comparison with gene expression arrays. Genome research. Sep. 1, 2008;18(9):1509-17.

Martens et al., Baseline Peripheral Blood Biomarkers Associated with Clinical Outcome of Advanced Melanoma Patients Treated with Ipilimumab. Clin Cancer Res. Jun. 15, 2016;22(12):2908-18. doi: 10.1158/1078-0432.CCR-15-2412. PMID: 26787752.

Melsted et al., Modular and efficient pre-processing of single-cell RNA-seq. BioRxiv. Jun. 17, 2019:673285. 16 pages.

Meyer et al., Frequencies of circulating MDSC correlate with clinical outcome of melanoma patients treated with ipilimumab. Cancer Immunol Immunother. Mar. 2014;63(3):247-57. doi: 10.1007/s00262-013-1508-5. PMID: 24357148.

Möller et al., Blood Immune Cell Biomarkers in Patient with Lung Cancer Undergoing Treatment With Checkpoint Blockade. J Immunother. Feb./Mar. 2020;43(2):57-66. doi: 10.1097/CJI.0000000000000297. PMID: 31592989.

Monaco et al., RNA-Seq signatures normalized by mRNA abundance allow absolute deconvolution of human immune cell types. Cell reports. Feb. 5, 2019;26(6):1627-40.e7.

Nassar et al., Label-free identification of white blood cells using machine learning. Cytometry Part A. Aug. 2019;95(8):836-42.

Neftel et al., An integrative model of cellular states, plasticity, and genetics for glioblastoma. Cell. Aug. 8, 2019;178(4):835-49.e29. 37 pages.

Newman et al., Cibersort. Stanford University. 2021. https://cibersort.stanford.edu/ [last accessed Jun. 7, 2021]. 1 page.

Newman et al., Cibersortx. Stanford University. 2021. https://cibersortx.stanford.edu/ [last accessed Jun. 7, 2021]. 1 page.

Newman et al., Determining cell type abundance and expression from bulk tissues with digital cytometry. Nature biotechnology. Jul. 2019;37(7):773-82 and supplementary information. 16 pages.

Newman et al., Determining cell type abundance and expression from bulk tissues with digital cytometry. Nature biotechnology. Jul. 2019;37(7):773-82.

Newman et al., Robust enumeration of cell subsets from tissue expression profiles. Nature methods. May 2015;12(5):453-7. 20 pages.

Norton et al., Pancreatic cancer associated fibroblasts (CAF): underexplored target for pancreatic cancer treatment. Cancers. May 2020;12(5):1347. 18 pages.

Ottonello et al., Association Between Response to Nivolumab Treatment and Peripheral Blood Lymphocyte Subsets in Patients with Non-small Cell Lung Cancer. Front Immunol. Feb. 7, 2020;11:125. doi: 10.3389/fimmu.2020.00125. PMID: 32117275.

Parish et al., The molecular signature of CD8+ T cells undergoing deletional tolerance. Blood. May 7, 2009;113(19):4575-85. doi: 10.1182/blood-2008-10-185223. PMID: 19204323.

Pico De Coaña et al. PD-1 checkpoint blockade in advanced melanoma patients: NK cells, monocytic subsets and host PD-L1 expression as predictive biomarker candidates. Oncoimmunology. Aug. 28, 2020;9(1):1786888. doi: 10.1080/2162402X.2020.1786888. PMID: 32939320.

Puram et al., Single-cell transcriptomic analysis of primary and metastatic tumor ecosystems in head and neck cancer. Cell. Dec. 14, 2017;171(7):1611-24.e24. 40 pages.

Racle et al., EPIC: a tool to estimate the proportions of different cell types from bulk gene expression data. Bioinformatics for Cancer Immunotherapy. 2020:233-248.

Racle et al., Simultaneous enumeration of cancer and immune cell types from bulk tumor gene expression data. elife. Nov. 13, 2017;6:e26476. 25 pages.

Rakaee et al.,Prognostic value of macrophage phenotypes in resectable non-small cell lung cancer assessed by multiplex immunohistochemistry. Neoplasia. Mar. 1, 2019;21(3):282-93.

13 pages, Rassy et al., Tyrosine kinase inhibitors and immunotherapy combinations in renal cell carcinoma. Therapeutic advances in medical oncology. Mar. 2020; 12:1758835920907504.

11 pages, Ren et al., Immunological Classification of Tumor Types and Advances in Precision Combination Immunotherapy. Front Immunol. Feb. 28, 2022;13:790113. doi: 10.3389/fimmu.2022.790113. PMID: 35296094; PMCID: PMC8918549.

Ritchie et al., limma powers differential expression analyses for RNA-sequencing and microarray studies. Nucleic Acids Res. Apr. 20, 2015;43(7):e47. 20. doi.org/10.1093/nar/gkv007PMID: 25605792, PMCID: PMC4402510.

Roider et al., Dissecting intratumour heterogeneity of nodal B-cell lymphomas at the transcriptional, genetic and drug-response levels. Nature Cell Biology. Jul. 2020;22(7):896-906. 27 pages.

Saltz et al., Spatial organization and molecular correlation of tumor-infiltrating lymphocytes using deep learning on pathology images. Cell reports. Apr. 3, 2018;23(1):181-93.e7. 21 pages.

12 pages, Schelker et al., Estimation of immune cell content in tumour tissue using single-cell RNA-seq data. Nature communications. Dec. 11, 2017;8(1):2032.

11 pages, Schubert et al., Perturbation-response genes reveal signaling footprints in cancer gene expression. Nat Commun. Jan. 2, 2018;9(1):20. doi: 10.1038/s41467-017-02391-6. PMID: 29295995; PMCID: PMC5750219.

Shin et al., Variation in RNA-Seq transcriptome profiles of peripheral whole blood from healthy individuals with and without globin depletion. PloS one. Mar. 7, 2014;9(3):e91041. 11 pages.

Stuart et al., Comprehensive integration of single-cell data. Cell. Jun. 13, 2019;177(7):1888-902.e21. 52 pages.

Sturm et al., Comprehensive evaluation of transcriptome-based cell-type quantification methods for immuno-oncology. Bioinformatics. Jul. 15, 2019;35(14):i436-45.

Tamborero et al., A Pan-cancer Landscape of Interactions between Solid Tumors and Infiltrating Immune Cell Populations. Clin Cancer Res. Aug. 1, 2018;24(15):3717-3728. doi: 10.1158/1078-0432.CCR-17-3509. Epub Apr. 17, 2018. PMID: 29666300.

Thorsson et al., The Immune Landscape of Cancer. Immunity. Apr. 17, 2018;48(4):812-830.e14. doi: 10.1016/j.immuni.2018.03.023.

Tirosh et al., Dissecting the multicellular ecosystem of metastatic melanoma by single-cell RNA-seq. Science. Apr. 8, 2016;352(6282):189-96.

Torre et al., Global cancer statistics, 2012. CA Cancer J Clin. Mar. 2015;65(2):87-108. doi: 10.3322/caac.21262. PMID: 25651787.

Van Gassen et al., FlowSOM: Using self-organizing maps for visualization and interpretation of cytometry data. Cytometry Part A. Jul. 2015;87(7):636-45.

Vaught et al., Biospecimens and biorepositories: from afterthought to science. Cancer Epidemiology, Biomarkers & Prevention. Feb. 1, 2012;21(2):253-5.

Vivian et al., Toil enables reproducible, open source, big biomedical data analyses. Nat Biotechnol. Apr. 11, 2017;35(4):314-16. doi: 10.1038/nbt.3772. PMID: 28398314.

Wagner et al., Measurement of mRNA abundance using RNA-seq data: RPKM measure is inconsistent among samples. Theory in biosciences. Dec. 1, 2012;131(4):281-5.

(56) References Cited

OTHER PUBLICATIONS

Wang et al., Clinical applications of monitoring immune status with 90 immune cell subsets in human whole blood by 10-color flow cytometry. International Journal of Laboratory Hematology. Oct. 2021;43(5):1132-44.

Ward, Hierarchical grouping to optimize an objective function. Journal of the American statistical association. 1963;58(301):236-244.

Weber et al., Phase I/II Study of Metastatic Melanoma Patients Treated with Nivolumab Who Had Progressed after Ipilimumab. Cancer Immunol Res. Apr. 2016;4(4):345-53. doi: 10.1158/2326-6066.CIR-15-0193. PMID: 26873574.

Wistuba-Hamprecht et al., Proportions of blood-borne Vδ1+ and Vδ2+ T-cells are associated with overall survival of melanoma patients treated with ipilimumab. Eur J Cancer. Sep. 2016;64:116-26. doi: 10.1016/j.ejca.2016.06.001. PMID: 27400322.

Wu et al., Stromal PD-L1-positive regulatory T cells and PD-1-positive CD8-positive T cells define the response of different subsets of non-small cell lung cancer to PD-1/PD-L1 blockade immunotherapy. Journal of Thoracic Oncology. Apr. 1, 2018;13(4):521-32.

Wu et al., germa: Background Adjustment Using Sequence Information. R package version 2.66.0. 2022. 14 pages.

Xu et al., Mapping of γ/δ T cells reveals Vδ2+ T cells resistance to senescence. EBioMedicine. Jan. 1, 2019;39:44-58.

Zaitsev et al., Complete deconvolution of cellular mixtures based on linearity of transcriptional signatures. Nature communications. May 17, 2019;10(1):2209. 16 pages.

Zaitsev et al., Precise reconstruction of the TME using bulk RNA-seq and a machine learning algorithm trained on artificial transcriptomes. Cancer Cell. Aug. 8, 2022;40(8):879-894.e16. doi:10.1016/j.ccell.2022.07.006. PMID: 35944503.

Zhang et al., Spectral clustering of single-cell multi-omics data on multilayer graphs. Bioinformatics. Jul. 11, 2022;38(14):3600-8. doi: 10.1093/bioinformatics/btac378. PMID: 35652725.

Zheng et al., Massively parallel digital transcriptional profiling of single cells. Nature communications. Jan. 16, 2017;8(1):1-12.

Zhou et al., Development and evaluation of a leukemia diagnosis system using deep learning in real clinical scenarios. Frontiers in Pediatrics. Jun. 24, 2021;9:693676. 10 pages.

Zimmermann et al., System-wide associations between DNA-methylation, gene expression, and humoral immune response to influenza vaccination. PloS one. Mar. 31, 2016;11(3):e0152034. 21 pages.

International Search Report and Written Opinion for International Application No. PCT/US2021/022155 dated Jul. 5, 2021.

International Search Report and Written Opinion for International Application No. PCT/US2022/027088 dated Aug. 16, 2022.

International Preliminary Report on Patentability for International Application No. PCT/US2021/022155 dated Sep. 22, 2022.

Communication pursuant to Article 94(3) EPC for European Application No. 21716903.6 dated Jul. 31, 2023.

International Preliminary Report on Patentability for International Application No. PCT/US2022/027088 dated Nov. 9, 2023.

International Search Report and Written Opinion for International Application No. PCT/US2023/012003 mailed May 12, 2023.

International Search Report and Written Opinion for International Application No. PCT/US2023/080339 mailed Jun. 5, 2024.

Shishkova et al., Deep immune profiling by mass cytometry revealed an association between the state of immune system before treatment and response to checkpoint inhibitor therapy in clear cell renal cell carcinoma. Cancer Research. Jun. 15, 2022;82(12_Supplement):2061.5 pages.

Simon et al., PD-1 and TIGIT coexpression identifies a circulating CD8 T cell subset predictive of response to anti-PD-1 therapy. J Immunother Cancer. Nov. 2020;8(2):e001631.doi: 10.1136/jitc-2020-001631. PMID: 33188038. 18 pages.

Sun et al., An efficient and flexible method for deconvoluting bulk RNA-seq data with single-cell RNA-seq data. Cells. Oct. 2019;8(10):1161. 18 pages.

Wang et al., Therapeutic targets and biomarkers of tumor immunotherapy: response versus non-response. Signal transduction and targeted therapy. Sep. 19, 2022;7(1):331. 27 pages.

\* cited by examiner

| | Therapy options | |
|---|---|---|
| | Targeted | Systemic |
| Inflammation | IL-6 inhibitors COX-2 inhibitors | Anti-inflammatory drugs |
| Macrophages M2 Myeloid-derived suppression | IDO1, IL-10, LILRBs, CSF1R, FcgRIIB, CD47 inhibitors | |
| Lymphoid cells, TLS, CTL inactivation mechanisms | SIGLECs, KLRC1, LAIRs inhibitors CCR8, IL2RA, FOXP3 inhibitors | Cytokine therapy |
| B-cell-associated checkpoints | PVRIG, BTLA inhibitors, CD28, CD40LG activators | |

FROM FIG. 18C

FROM FIG. 18D

| Lymphoid-cell-associated checkpoints | PD-1, LAG3, CTLA4, TIGIT, CD96 inhibitors ICOS, 4-1BB activators | |
| Myeloid-cell-associated and stroma-associated checkpoints | PD-L1/2, TIM3, VISTA, SIRPA, CD276, CD36 inhibitors | |
| Hypoxia, Glycolysis Acidosis | HIF2a inhibitors LDHA inhibitors | |
| Tumor proliferation | | Chemo, radiation |
| Fibrosis, Angiogenesis, Senescence EMT, Metastasis | VEGFA/VEGFR, PDGFR, EDRNB inhibitors TGFb, AXL, CD73, MMPs inhibitors | Pan-TK inhibitors Suramin, Pirfenidone |

FROM FIG. 18G

FIG. 18H

PAN-CANCER TUMOR MICROENVIRONMENT CLASSIFICATION BASED ON IMMUNE ESCAPE MECHANISMS AND IMMUNE INFILTRATION

CROSS REFERENCE TO RELATED APPLICATIONS

This application claims the benefit under 35 U.S.C. § 119 (e) to U.S. Provisional Application No. 63/459,232, filed Apr. 13, 2023, and titled "PAN-CANCER TUMOR MICROENVIRONMENT CLASSIFICATION BASED ON IMMUNE ESCAPE MECHANISMS AND IMMUNE INFILTRATION," U.S. Provisional Application No. 63/465,991, filed May 12, 2023, and titled CELLULAR AND MOLECULAR FEATURES OF THE TME UNDERLYING IMMUNE ESCAPE AND IO FAILURE," and U.S. Provisional Application No. 63/627,483, filed Jan. 31, 2024, and titled "PAN-CANCER TUMOR MICROENVIRONMENT CLASSIFICATION BASED ON IMMUNE ESCAPE MECHANISMS AND IMMUNE INFILTRATION," each of which is incorporated herein by reference in its entirety.

BACKGROUND

Tumor immune escape (IE) processes represent a major cause of cancer therapy resistance. Tumor IE mechanisms include, for example, tumor microenvironmental factors such as antigen presentation machinery loss, tumor infiltrating immune cells, and cytotoxic cell exclusion.

SUMMARY

Aspects of the disclosure relate to methods, systems, and computer-readable storage media that are useful for characterizing subjects having cancers typified by solid tumors. The disclosure is based, in part, on methods for determining a tumor microenvironment (TME) type of a subject having a cancer by using gene expression data obtained from the subject to produce a TME signature that, when processed by methods disclosed herein, allows for assignment of a TME type to the subject. In some embodiments, the TME type of a subject is indicative of one or more characteristics of the subject or the subject's cancer; for example, the TME type is indicative of a likelihood that the subject will have a certain prognosis and/or respond to one or more therapies.

Accordingly, in some aspects, the disclosure provides a method for determining a tumor microenvironment (TME) type of a subject, the method comprising: using at least one computer hardware processor to perform: obtaining RNA expression data for the subject, the RNA expression data indicating RNA expression levels for at least three genes in each of at least a subset of gene groups listed in Table 1; generating a TME signature for the subject by determining, using the RNA expression data, a gene group score for each gene group in at least the subset of gene groups; and identifying, using the TME signature and from among a plurality of TME types, a TME type for the subject.

In some embodiments, obtaining the RNA expression data comprises obtaining RNA expression data indicating RNA expression levels for at least four genes in each of at least the subset of the gene groups listed in Table 1.

In some embodiments, obtaining the RNA expression data comprises obtaining RNA expression data indicated RNA expression levels in a range from three genes to ten genes in each of at least the subset of the gene groups listed in Table 1.

In some embodiments, obtaining the RNA expression data comprises obtaining RNA expression data indicating RNA expression levels for each gene in each of at least the subset of the gene groups listed in Table 1.

In some embodiments, obtaining the RNA expression data comprises obtaining RNA expression data indicating RNA expression levels for each gene listed in Table 1.

In some embodiments, obtaining the RNA expression data further comprises obtaining RNA expression data indicating RNA expression levels for at least three genes in each of one or more gene groups listed in Table 2.

In some embodiments, obtaining the RNA expression data comprises obtaining RNA expression data indicating RNA expression levels for at least four genes in each of one or more of the gene groups listed in Table 2.

In some embodiments, obtaining the RNA expression data comprises obtaining RNA expression data indicated RNA expression levels in a range from three genes to ten genes in each of one or more of the gene groups listed in Table 2.

In some embodiments, obtaining the RNA expression data comprises obtaining RNA expression data indicating RNA expression levels for each gene in each of one or more of the gene groups listed in Table 2.

In some embodiments, obtaining the RNA expression data comprises obtaining RNA expression data indicating RNA expression levels for each gene listed in Table 2.

In some embodiments, generating the TME signature further comprises generating, for at least a subset of signaling pathways listed in Table 3, one or more PROGENy signatures using the RNA expression levels.

In some embodiments, obtaining the RNA expression data for the subject comprises obtaining sequencing data previously obtained by sequencing a biological sample obtained from the subject.

In some embodiments, the sequencing data comprises at least 1 million reads, at least 5 million reads, at least 10 million reads, at least 20 million reads, at least 50 million reads, and/or at least 100 million reads.

In some embodiments, sequencing (TES) data, whole exome sequencing (WES) data, bulk RNA sequencing (RNA-seq) data, single cell RNA sequencing (scRNA-seq) data, and/or next generation sequencing (NGS) data.

In some embodiments, the sequencing data comprises microarray data.

In some embodiments, the method further comprises obtaining the RNA expression levels by normalizing the RNA expression data to transcripts per million (TPM) units prior to generating the TME signature.

In some embodiments, wherein the RNA expression data for the subject comprises data obtained by sequencing a biological sample obtained from the subject.

In some embodiments, the biological sample comprises tumor tissue of the subject. In some embodiments, the RNA expression levels comprise RNA expression levels for at least three genes from each of at least two of the following gene groups:
  (a) cDC1 group: CLEC9A, C1orf54, BATF3, WDFY4, HLA-DOB, and XCR1;
  (b) cDC2 group: ITGAX, HLA-DRA, HLA-DRB1, CD1C, FCER1A, CLEC10A, and AMICA1;
  (c) pDC group: IL3RA, CLEC4C, CCR2, CXCR3, GZMB, DERL3, LILRA4, and SCT;

(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(e) T cells group: ITK, CD3G, CD3D, TRBC1, CD3E, TRAT1, TRAC, TRBC2, CD28, CD5, and TBX21;
(f) M1 cytokines group: CXCL10, IL23A, IL1B, IL12B, TNF, and CXCL9;
(g) Panmacrophage signature group: C1QC, CSF1R, CD163, SIGLEC1, C1QA, VSIG4, MSR1, and CD68;
(h) TLS group: CXCL10, SELL, LAMP3, FDCSP, CD86, CXCL13, PTPRCAP, CCR7, LTA, CXCR3, CCL21, CCL19, JCHAIN, CXCL9, and TNERSF17;
(i) Proinflammatory cytokines group: IL23A, IFNB1, IL1A, IL1B, TNF, CXCL2, IL6, IL26, CCL2, CCL4, LIF, and CCL3;
(j) Anti-tumor chemokines group: CXCL10, CXCL9, CXCL13, XCL1, CCL5, CCL21, CCL19, and XCL2;
(k) Pro-tumor chemokines group: CCL26, CXCL6, CCL20, CXCL8, CXCL1, CCL18, CCL17, and CCL22;
(l) Myeloid checkpoints group: PDCD1LG2, HAVCR2, CD274, and C10orf54;
(m) Lymphoid checkpoints group: BTLA, TIGIT, LAG3, PVRIG, PDCD1, and CTLA4;
(n) Cytotoxic cell inactivation group: PIM2, SERPINB9, LGALS9, CD5, KLRB1, FASLG, KLRD1, LAIR1, LAIR2, and SIGLEC7;
(o) Treg cells group: CCR8, TNFRSF18, FOXP3, IKZF2, CTLA4, IKZF4, and IL2RA;
(p) Breg group: ZBTB32, NFKBID, SOX5, EBI3, and ZBTB20;
(q) Myeloid suppression group: IL10, FGL2, EBI3, CYBB, IL4I1, TGFBI, IDO1, PTGS2, and MSR1;
(r) Phagocytosis inhibition group: LILRB3, LILRB1, FCGR2B, LILRB4, SIRPA, SIGLEC10, LILRB2, PECAM1, CD300A, CD300LF, and CD33;
(s) Stromal suppression group: IL11, TGFB2, TDO2, TSLP, IL6, TGFB3, and TGFBI;
(t) Exclusion group: GAS6, VEGFA, PDGFC, FGF2, EDNRB, TNFAIP6, and CXCL12;
(u) Matrix group: VIN, ELN, COL11A1, COL4A1, TNC, COL1A1, COL1A2, COL3A1, LAMA3, LGALS9, FN1, COL5A1, LAMB3, LGALS7, and LAMC2;
(v) Endothelium group: ECSCR, NOS3, MMRN1, VWF, CLEC14A, FLT1, KDR, ROBO4, ENG, CDH5, and MMRN2;
(w) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAPS, LRP1, COL11A1, COL6A3, COL6A2, LGALS1, and ACTA2;
(x) Matrix remodeling group: LOX, MMP12, MMP9, PLOD2, ADAMTS5, MMP3, ADAMTS4, MMP11, MMP1, CA9, MMP2, and MMP7;
(y) Angiogenesis group: VEGFA, TEK, PDGFC, VWF, CXCR2, ANGPT1, FLT1, KDR, ANGPT2, VEGFB, VEGFC, PGF, and CDH5;
(z) EMT signature group: RUNX2, FOXM1, SNAI1, TWIST1, and SNAI2;
(aa) Adipocytes group: GPD1, LBP, PTGER3, DLAT, FABP4, LEP, PLIN1, ADIPOQ, PPP1R1A, ADH1B, LIPE, and COL4A4;
(ab) Metastasis signature group: MMP9, HPSE, PARP1, CDH2, RCC2, and SERPINH1;
(ac) Metabolic suppression of CTL group: SPHK1, MSR1, ADORA2A, and ENTPD1;
(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ae) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(af) Acidosis group: SLC16A1, SLC16A4, MAPK14, and SLC9A1;
(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;
(ai) Glycolysis group: ALDOA, TPI1, GPD2, PGK1, LDHA, PFKP, BPGM, ENO1, GPI, and SLC16A3;
(aj) MHC II group: HLA-DRB1, HLA-DMA, HLA-DRA, HLA-DQB1, CIITA, HLA-DPB1, HLA-DMB, HLA-DQA1, and HLA-DPA1;
(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(al) B cells group: PAX5, MS4A1, CD19, CR2, TNFRSF13B, TNFRSF13C, TNFRSF17, CD79B, BLK, CD22, CD79A, STAP1, and FCRL5; and
(am) CD8 T cells group: KLRK1, CD8B, CD8A, PRF1, EOMES, TRAT1, GZMB, GZMA, GZMK, ZAP70, NKG7, and TBX21.

In some embodiments, the RNA expression levels comprise RNA expression levels for at least three genes from each of the following gene groups:
(a) cDC1 group: CLEC9A, C1orf54, BATF3, WDFY4, HLA-DOB, and XCR1;
(b) cDC2 group: ITGAX, HLA-DRA, HLA-DRB1, CD1C, FCER1A, CLEC10A, and AMICA1;
(c) pDC group: IL3RA, CLEC4C, CCR2, CXCR3, GZMB, DERL3, LILRA4, and SCT;
(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(e) T cells group: ITK, CD3G, CD3D, TRBC1, CD3E, TRAT1, TRAC, TRBC2, CD28, CD5, and TBX21;
(f) M1 cytokines group: CXCL10, IL23A, IL1B, IL12B, TNF, and CXCL9;
(g) Panmacrophage signature group: C1QC, CSF1R, CD163, SIGLEC1, C1QA, VSIG4, MSR1, and CD68;
(h) TLS group: CXCL10, SELL, LAMP3, FDCSP, CD86, CXCL13, PTPRCAP, CCR7, LTA, CXCR3, CCL21, CCL19, JCHAIN, CXCL9, and TNERSF17;
(i) Proinflammatory cytokines group: IL23A, IFNB1, IL1A, IL1B, TNF, CXCL2, IL6, IL26, CCL2, CCL4, LIF, and CCL3;
(j) Anti-tumor chemokines group: CXCL10, CXCL9, CXCL13, XCL1, CCL5, CCL21, CCL19, and XCL2;
(k) Pro-tumor chemokines group: CCL26, CXCL6, CCL20, CXCL8, CXCL1, CCL18, CCL17, and CCL22;
(l) Myeloid checkpoints group: PDCD1LG2, HAVCR2, CD274, and C10orf54;
(m) Lymphoid checkpoints group: BTLA, TIGIT, LAG3, PVRIG, PDCD1, and CTLA4;

(n) Cytotoxic cell inactivation group: PIM2, SERPINB9, LGALS9, CD5, KLRB1, FASLG, KLRD1, LAIR1, LAIR2, and SIGLEC7;
(o) Treg cells group: CCR8, TNFRSF18, FOXP3, IKZF2, CTLA4, IKZF4, and IL2RA;
(p) Breg group: ZBTB32, NFKBID, SOX5, EBI3, and ZBTB20;
(q) Myeloid suppression group: IL10, FGL2, EBI3, CYBB, IL4I1, TGFBI, IDO1, PTGS2, and MSR1;
(r) Phagocytosis inhibition group: LILRB3, LILRB1, FCGR2B, LILRB4, SIRPA, SIGLEC10, LILRB2, PECAM1, CD300A, CD300LF, and CD33;
(s) Stromal suppression group: IL11, TGFB2, TDO2, TSLP, IL6, TGFB3, and TGFBI;
(t) Exclusion group: GAS6, VEGFA, PDGFC, FGF2, EDNRB, TNFAIP6, and CXCL12;
(u) Matrix group: VTN, ELN, COL11A1, COL4A1, TNC, COL1A1, COL1A2, COL3A1, LAMA3, LGALS9, FN1, COL5A1, LAMB3, LGALS7, and LAMC2;
(v) Endothelium group: ECSCR, NOS3, MMRN1, VWF, CLEC14A, FLT1, KDR, ROBO4, ENG, CDH5, and MMRN2;
(w) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
(x) Matrix remodeling group: LOX, MMP12, MMP9, PLOD2, ADAMTS5, MMP3, ADAMTS4, MMP11, MMP1, CA9, MMP2, and MMP7;
(y) Angiogenesis group: VEGFA, TEK, PDGFC, VWF, CXCR2, ANGPT1, FLT1, KDR, ANGPT2, VEGFB, VEGFC, PGF, and CDH5;
(z) EMT signature group: RUNX2, FOXM1, SNAI1, TWIST1, and SNAI2;
(aa) Adipocytes group: GPD1, LBP, PTGER3, DLAT, FABP4, LEP, PLIN1, ADIPOQ, PPP1R1A, ADH1B, LIPE, and COL4A4;
(ab) Metastasis signature group: MMP9, HPSE, PARP1, CDH2, RCC2, and SERPINH1;
(ac) Metabolic suppression of CTL group: SPHK1, MSR1, ADORA2A, and ENTPD1;
(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ae) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(af) Acidosis group: SLC16A1, SLC16A4, MAPK14, and SLC9A1;
(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;
(ai) Glycolysis group: ALDOA, TPI1, GPD2, PGK1, LDHA, PFKP, BPGM, ENO1, GPI, and SLC16A3;
(aj) MHC II group: HLA-DRB1, HLA-DMA, HLA-DRA, HLA-DQB1, CIITA, HLA-DPB1, HLA-DMB, HLA-DQA1, and HLA-DPA1;
(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(al) B cells group: PAX5, MS4A1, CD19, CR2, TNFRSF13B, TNFRSF13C, TNFRSF17, CD79B, BLK, CD22, CD79A, STAP1, and FCRL5; and
(am) CD8 T cells group: KLRK1, CD8B, CD8A, PRF1, EOMES, TRAT1, GZMB, GZMA, GZMK, ZAP70, NKG7, and TBX21.

In some embodiments, the RNA expression levels comprise RNA expression levels for each of the genes from each of the following gene groups:
(a) cDC1 group: CLEC9A, C1orf54, BATF3, WDFY4, HLA-DOB, and XCR1;
(b) cDC2 group: ITGAX, HLA-DRA, HLA-DRB1, CD1C, FCER1A, CLEC10A, and AMICA1;
(c) pDC group: IL3RA, CLEC4C, CCR2, CXCR3, GZMB, DERL3, LILRA4, and SCT;
(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(e) T cells group: ITK, CD3G, CD3D, TRBC1, CD3E, TRAT1, TRAC, TRBC2, CD28, CD5, and TBX21;
(f) M1 cytokines group: CXCL10, IL23A, IL1B, IL12B, TNF, and CXCL9;
(g) Panmacrophage signature group: C1QC, CSF1R, CD163, SIGLEC1, C1QA, VSIG4, MSR1, and CD68;
(h) TLS group: CXCL10, SELL, LAMP3, FDCSP, CD86, CXCL13, PTPRCAP, CCR7, LTA, CXCR3, CCL21, CCL19, JCHAIN, CXCL9, and TNFRSF17;
(i) Proinflammatory cytokines group: IL23A, IFNB1, IL1A, IL1B, TNF, CXCL2, IL6, IL26, CCL2, CCL4, LIF, and CCL3;
(j) Anti-tumor chemokines group: CXCL10, CXCL9, CXCL13, XCL1, CCL5, CCL21, CCL19, and XCL2;
(k) Pro-tumor chemokines group: CCL26, CXCL6, CCL20, CXCL8, CXCL1, CCL18, CCL17, and CCL22;
(l) Myeloid checkpoints group: PDCD1LG2, HAVCR2, CD274, and C10orf54;
(m) Lymphoid checkpoints group: BTLA, TIGIT, LAG3, PVRIG, PDCD1, and CTLA4;
(n) Cytotoxic cell inactivation group: PIM2, SERPINB9, LGALS9, CD5, KLRB1, FASLG, KLRD1, LAIR1, LAIR2, and SIGLEC7;
(o) Treg cells group: CCR8, TNFRSF18, FOXP3, IKZF2, CTLA4, IKZF4, and IL2RA;
(p) Breg group: ZBTB32, NFKBID, SOX5, EBI3, and ZBTB20,
(q) Myeloid suppression group: IL10, FGL2, EBI3, CYBB, IL4I1, TGFBI, IDO1, PTGS2, and MSR1;
(r) Phagocytosis inhibition group: LILRB3, LILRB1, FCGR2B, LILRB4, SIRPA, SIGLEC10, LILRB2, PECAM1, CD300A, CD300LF, and CD33;
(s) Stromal suppression group: IL11, TGFB2, TDO2, TSLP, IL6, TGFB3, and TGFBI;
(t) Exclusion group: GAS6, VEGFA, PDGFC, FGF2, EDNRB, TNFAIP6, and CXCL12;
(u) Matrix group: VIN, ELN, COL11A1, COL4A1, TNC, COL1A1, COL1A2, COL3A1, LAMA3, LGALS9, FN1, COL5A1, LAMB3, LGALS7, and LAMC2;
(v) Endothelium group: ECSCR, NOS3, MMRN1, VWF, CLEC14A, FLT1, KDR, ROBO4, ENG, CDH5, and MMRN2;
(w) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;

(x) Matrix remodeling group: LOX, MMP12, MMP9, PLOD2, ADAMTS5, MMP3, ADAMTS4, MMP11, MMP1, CA9, MMP2, and MMP7;

(y) Angiogenesis group: VEGFA, TEK, PDGFC, VWF, CXCR2, ANGPT1, FLT1, KDR, ANGPT2, VEGFB, VEGFC, PGF, and CDH5;

(z) EMT signature group: RUNX2, FOXM1, SNAI1, TWIST1, and SNAI2;

(aa) Adipocytes group: GPD1, LBP, PTGER3, DLAT, FABP4, LEP, PLIN1, ADIPOQ, PPP1R1A, ADH1B, LIPE, and COL4A4;

(ab) Metastasis signature group: MMP9, HPSE, PARP1, CDH2, RCC2, and SERPINH1;

(ac) Metabolic suppression of CTL group: SPHK1, MSR1, ADORA2A, and ENTPD1;

(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;

(ac) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;

(af) Acidosis group: SLC16A1, SLC16A4, MAPK14, and SLC9A1;

(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;

(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;

(ai) Glycolysis group: ALDOA, TPI1, GPD2, PGK1, LDHA, PFKP, BPGM, ENO1, GPI, and SLC16A3;

(aj) MHC II group: HLA-DRB1, HLA-DMA, HLA-DRA, HLA-DQB1, CIITA, HLA-DPB1, HLA-DMB, HLA-DQA1, and HLA-DPA1;

(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;

(al) B cells group: PAX5, MS4A1, CD19, CR2, TNFRSF13B, TNFRSF13C, TNFRSF17, CD79B, BLK, CD22, CD79A, STAP1, and FCRL5; and (am) CD8 T cells group: KLRK1, CD8B, CD8A, PRF1, EOMES, TRAT1, GZMB, GZMA, GZMK, ZAP70, NKG7, and TBX21.

In some embodiments, determining the gene group score comprises determining a respective gene group score for each of at least two of the following gene groups, using, for a particular gene group, RNA expression levels for at least three genes in the particular gene group to determine the gene group score for the particular group, the gene groups including:

(a) cDC1 group: CLEC9A, C1orf54, BATF3, WDFY4, HLA-DOB, and XCR1;

(b) cDC2 group: ITGAX, HLA-DRA, HLA-DRB1, CD1C, FCER1A, CLEC10A, and AMICA1;

(c) pDC group: IL3RA, CLEC4C, CCR2, CXCR3, GZMB, DERL3, LILRA4, and SCT;

(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;

(e) T cells group: ITK, CD3G, CD3D, TRBC1, CD3E, TRAT1, TRAC, TRBC2, CD28, CD5, and TBX21;

(f) M1 cytokines group: CXCL10, IL23A, IL1B, IL12B, TNF, and CXCL9;

(g) Panmacrophage signature group: C1QC, CSF1R, CD163, SIGLEC1, C1QA, VSIG4, MSR1, and CD68;

(h) TLS group: CXCL10, SELL, LAMP3, FDCSP, CD86, CXCL13, PTPRCAP, CCR7, LTA, CXCR3, CCL21, CCL19, JCHAIN, CXCL9, and TNERSF17;

(i) Proinflammatory cytokines group: IL23A, IFNB1, IL1A, IL1B, TNF, CXCL2, IL6, IL26, CCL2, CCL4, LIF, and CCL3;

(j) Anti-tumor chemokines group: CXCL10, CXCL9, CXCL13, XCL1, CCL5, CCL21, CCL19, and XCL2;

(k) Pro-tumor chemokines group: CCL26, CXCL6, CCL20, CXCL8, CXCL1, CCL18, CCL17, and CCL22;

(l) Myeloid checkpoints group: PDCD1LG2, HAVCR2, CD274, and C10orf54;

(m) Lymphoid checkpoints group: BTLA, TIGIT, LAG3, PVRIG, PDCD1, and CTLA4;

(n) Cytotoxic cell inactivation group: PIM2, SERPINB9, LGALS9, CD5, KLRB1, FASLG, KLRD1, LAIR1, LAIR2, and SIGLEC7;

(o) Treg cells group: CCR8, TNFRSF18, FOXP3, IKZF2, CTLA4, IKZF4, and IL2RA;

(p) Breg group: ZBTB32, NFKBID, SOX5, EBI3, and ZBTB20;

(q) Myeloid suppression group: IL10, FGL2, EBI3, CYBB, IL4I1, TGFBI, IDO1, PTGS2, and MSR1;

(r) Phagocytosis inhibition group: LILRB3, LILRB1, FCGR2B, LILRB4, SIRPA, SIGLEC10, LILRB2, PECAM1, CD300A, CD300LF, and CD33;

(s) Stromal suppression group: IL11, TGFB2, TDO2, TSLP, IL6, TGFB3, and TGFBI;

(t) Exclusion group: GAS6, VEGFA, PDGFC, FGF2, EDNRB, TNFAIP6, and CXCL12;

(u) Matrix group: VIN, ELN, COL11A1, COL4A1, TNC, COL1A1, COL1A2, COL3A1, LAMA3, LGALS9, FN1, COL5A1, LAMB3, LGALS7, and LAMC2;

(v) Endothelium group: ECSCR, NOS3, MMRN1, VWF, CLEC14A, FLT1, KDR, ROBO4, ENG, CDH5, and MMRN2;

(w) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;

(x) Matrix remodeling group: LOX, MMP12, MMP9, PLOD2, ADAMTS5, MMP3, ADAMTS4, MMP1I, MMP1, CA9, MMP2, and MMP7;

(y) Angiogenesis group: VEGFA, TEK, PDGFC, VWF, CXCR2, ANGPT1, FLT1, KDR, ANGPT2, VEGFB, VEGFC, PGF, and CDH5;

(z) EMT signature group: RUNX2, FOXM1, SNAI1, TWIST1, and SNAI2;

(aa) Adipocytes group: GPD1, LBP, PTGER3, DLAT, FABP4, LEP, PLIN1, ADIPOQ, PPP1R1A, ADH1B, LIPE, and COL4A4;

(ab) Metastasis signature group: MMP9, HPSE, PARP1, CDH2, RCC2, and SERPINH1;

(ac) Metabolic suppression of CTL group: SPHK1, MSR1, ADORA2A, and ENTPD1;

(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;

(ae) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;

(af) Acidosis group: SLC16A1, SLC16A4, MAPK14, and SLC9A1;

(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;

(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;

(ai) Glycolysis group: ALDOA, TPI1, GPD2, PGK1, LDHA, PFKP, BPGM, ENO1, GPI, and SLC16A3;

(aj) MHC II group: HLA-DRB1, HLA-DMA, HLA-DRA, HLA-DQB1, CIITA, HLA-DPB1, HLA-DMB, HLA-DQA1, and HLA-DPA1;

(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;

(al) B cells group: PAX5, MS4A1, CD19, CR2, TNFRSF13B, TNFRSF13C, TNFRSF17, CD79B, BLK, CD22, CD79A, STAP1, and FCRL5; and (am) CD8 T cells group: KLRK1, CD8B, CD8A, PRF1, EOMES, TRAT1, GZMB, GZMA, GZMK, ZAP70, NKG7, and TBX21.

In some embodiments, determining the gene group scores comprises determining a respective gene group score for each of the following gene groups, using, for a particular gene group, RNA expression levels for at least three genes in the particular gene group to determine the gene group score for the particular group, the gene groups including:

(a) cDC1 group: CLEC9A, C1orf54, BATF3, WDFY4, HLA-DOB, and XCR1;

(b) cDC2 group: ITGAX, HLA-DRA, HLA-DRB1, CD1C, FCER1A, CLEC10A, and AMICA1;

(c) pDC group: IL3RA, CLEC4C, CCR2, CXCR3, GZMB, DERL3, LILRA4, and SCT;

(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;

(e) T cells group: ITK, CD3G, CD3D, TRBC1, CD3E, TRAT1, TRAC, TRBC2, CD28, CD5, and TBX21;

(f) M1 cytokines group: CXCL10, IL23A, IL1B, IL12B, TNF, and CXCL9, (g) Panmacrophage signature group: C1QC, CSF1R, CD163, SIGLEC1, C1QA, VSIG4, MSR1, and CD68;

(h) TLS group: CXCL10, SELL, LAMP3, FDCSP, CD86, CXCL13, PTPRCAP, CCR7, LTA, CXCR3, CCL21, CCL19, JCHAIN, CXCL9, and TNFRSF17;

(i) Proinflammatory cytokines group: IL23A, IFNB1, IL1A, IL1B, TNF, CXCL2, IL6, IL26, CCL2, CCL4, LIF, and CCL3;

(j) Anti-tumor chemokines group: CXCL10, CXCL9, CXCL13, XCL1, CCL5, CCL21, CCL19, and XCL2;

(k) Pro-tumor chemokines group: CCL26, CXCL6, CCL20, CXCL8, CXCL1, CCL18, CCL17, and CCL22;

(l) Myeloid checkpoints group: PDCD1LG2, HAVCR2, CD274, and C10orf54, (m) Lymphoid checkpoints group: BTLA, TIGIT, LAG3, PVRIG, PDCD1, and CTLA4;

(n) Cytotoxic cell inactivation group: PIM2, SERPINB9, LGALS9, CD5, KLRB1, FASLG, KLRD1, LAIR1, LAIR2, and SIGLEC7;

(o) Treg cells group: CCR8, TNFRSF18, FOXP3, IKZF2, CTLA4, IKZF4, and IL2RA;

(p) Breg group: ZBTB32, NFKBID, SOX5, EBI3, and ZBTB20;

(q) Myeloid suppression group: IL10, FGL2, EBI3, CYBB, IL4I1, TGFBI, IDO1, PTGS2, and MSR1;

(r) Phagocytosis inhibition group: LILRB3, LILRB1, FCGR2B, LILRB4, SIRPA, SIGLEC10, LILRB2, PECAM1, CD300A, CD300LF, and CD33;

(s) Stromal suppression group: IL11, TGFB2, TDO2, TSLP, IL6, TGFB3, and TGFBI;

(t) Exclusion group: GAS6, VEGFA, PDGFC, FGF2, EDNRB, TNFAIP6, and CXCL12;

(u) Matrix group: VTN, ELN, COL11A1, COL4A1, TNC, COL1A1, COL1A2, COL3A1, LAMA3, LGALS9, FN1, COL5AI, LAMB3, LGALS7, and LAMC2;

(v) Endothelium group: ECSCR, NOS3, MMRN1, VWF, CLEC14A, FLT1, KDR, ROBO4, ENG, CDH5, and MMRN2;

(w) CAF group: FBLN1, COL1A1, PDGFRB, CXCL12, COL6A1, COL5AI, FGF2, FAP, PDGFRA, MMP2, MMP3, COL1A2, CD248, FN1, LUM, MFAP5, LRP1, COL11A1, COL6A3, COL6A2, LGALS1, and ACTA2;

(x) Matrix remodeling group: LOX, MMP12, MMP9, PLOD2, ADAMTS5, MMP3, ADAMTS4, MMP11, MMP1, CA9, MMP2, and MMP7;

(y) Angiogenesis group: VEGFA, TEK, PDGFC, VWF, CXCR2, ANGPT1, FLT1, KDR, ANGPT2, VEGFB, VEGFC, PGF, and CDH5;

(z) EMT signature group: RUNX2, FOXM1, SNAI1, TWIST1, and SNAI2;

(aa) Adipocytes group: GPD1, LBP, PTGER3, DLAT, FABP4, LEP, PLIN1, ADIPOQ, PPP1R1A, ADH1B, LIPE, and COL4A4;

(ab) Metastasis signature group: MMP9, HPSE, PARP1, CDH2, RCC2, and SERPINH1;

(ac) Metabolic suppression of CTL group: SPHK1, MSR1, ADORA2A, and ENTPD1;

(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;

(ae) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;

(af) Acidosis group: SLC16A1, SLC16A4, MAPK14, and SLC9A1;

(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;

(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;

(ai) Glycolysis group: ALDOA, TPI1, GPD2, PGK1, LDHA, PFKP, BPGM, ENO1, GPI, and SLC16A3;
(aj) MHC II group: HLA-DRB1, HLA-DMA, HLA-DRA, HLA-DQB1, CHITA, HLA-DPB1, HLA-DMB, HLA-DQA1, and HLA-DPA1;
(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(al) B cells group: PAX5, MS4A1, CD19, CR2, TNFRSF13B, TNFRSF13C, TNFRSF17, CD79B, BLK, CD22, CD79A, STAP1, and FCRL5; and
(am) CD8 T cells group: KLRK1, CD8B, CD8A, PRF1, EOMES, TRAT1, GZMB, GZMA, GZMK, ZAP70, NKG7, and TBX21.

In some embodiments, determining the gene group score comprises determining a respective gene group score for at least one of the following gene groups, using, for a particular gene group, RNA expression levels for at least one of the genes listed below to determine the gene group score for the particular group, the gene groups including:

(a) cDC1 group: CLEC9A, Clorf54, BATF3, WDFY4, and HLA-DOB; cDC2 group: ITGAX, CD1C, FCER1A, CLEC10A, and AMICA1;
(b) pDC group: IL3RA, CLEC4C, DERL3, LILRA4, and SCT;
(c) Panmacrophage signature group: C1QC, C1QA, and VSIG4;
(d) TLS group: PTPRCAP, LTA, and JCHAIN;
(e) Proinflammatory cytokines group: IL1A, IL26, and LIF;
(f) Anti-tumor chemokines group: XCL2;
(g) Pro-tumor chemokines group: CXCL6, CCL20, and CCL18;
(h) Myeloid checkpoints group: C10orf54;
(i) Lymphoid checkpoints group: PVRIG;
(j) Cytotoxic cell inactivation group: PIM2, SERPINB9, KLRB1, KLRD1, LAIR1, LAIR2, and SIGLEC7;
(k) Treg cells group: FOXP3 and IL2RA;
(l) Breg group: ZBTB32, NFKBID, SOX5, EBI3, and ZBTB20;
(m) Myeloid suppression group: FGL2, EBI3, and PTGS2;
(n) Phagocytosis inhibition group: LILRB3, LILRB1, FCGR2B, LILRB4, SIRPA, SIGLEC10, LILRB2, PECAM1, CD300A, CD300LF, and CD33;
(o) Stromal suppression group: IL11, TDO2, and TSLP;
(p) Exclusion group: GAS6, PDGFC, EDNRB, and TNFAIP6;
(q) Matrix group: TNC;
(r) Endothelium group: ECSCR, ROBO4;
(s) CAF group: FGF2, CD248, and LGALS1;
(t) Matrix remodeling group: PLOD2;
(u) Angiogenesis group; DGFC;
(v) EMT signature group: RUNX2 and FOXM1;
(w) Adipocytes group: GPD1, LBP, PTGER3, DLAT, FABP4, LEP, PLIN1, ADIPOQ, PPP1R1A, ADH1B, LIPE, and COL4A4;
(x) Metastasis signature group: HPSE, PARP1, RCC2, and SERPINH1;
(y) Metabolic suppression of CTL group: SPHK1, ADORA2A, and ENTPD1;
(z) Hypoxia factors group: FUT11, PGK1, CA12, TPI1, PDK1, EPAS1, LDHA, SLC2A1, PFKFB3, P4HA1, ALDOA, HK2, and NDRG1;

(aa) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(ab) Acidosis group: SLC16A1, SLC16A4, MAPK14, and SLC9A1;
(ac) Senescence group: CDKN2A, CDKN1A, CDKN2B, GLB1, SERPINE1, DPP4, CEBPB, BCL2L1, BCL2L2, TNFRSF10D, ITGB3, IGFBP3, GDF15, IGFBP7, PLAU, STAT1, IGFBP2, and ATF3;
(ad) Apoptosis group: BCL10, BIK, CASP6, TNFRSF12A, CASP2, CASP3, CASP7, CASP8, CYLD, IER3, PMAIP1, BCL2L11, TNFRSF10A, TNFRSF10B, APAF1, XAF1, and CASP8AP2; and
(ae) Glycolysis group: ALDOA, TPI1, GPD2, PGK1, LDHA, PFKP, BPGM, ENO1, GPI, and SLC16A3.

In some embodiments, determining the gene group score comprises determining a respective gene group score for each of the following gene groups, using, for a particular gene group, RNA expression levels for at least one of the genes listed below to determine the gene group score for the particular group, the gene groups including:

(a) cDC1 group: CLEC9A, Clorf54, BATF3, WDFY4, and HLA-DOB; cDC2 group: ITGAX, CD1C, FCER1A, CLEC10A, and AMICA1;
(b) pDC group: IL3RA, CLEC4C, DERL3, LILRA4, and SCT;
(c) Panmacrophage signature group: C1QC, C1QA, and VSIG4;
(d) TLS group: PTPRCAP, LTA, and JCHAIN;
(e) Proinflammatory cytokines group: IL1A, IL26, and LIF;
(f) Anti-tumor chemokines group: XCL2;
(g) Pro-tumor chemokines group: CXCL6, CCL20, and CCL18;
(h) Myeloid checkpoints group: C10orf54;
(i) Lymphoid checkpoints group: PVRIG;
(j) Cytotoxic cell inactivation group: PIM2, SERPINB9, KLRB1, KLRD1, LAIR1, LAIR2, and SIGLEC7;
(k) Treg cells group: FOXP3 and IL2RA;
(l) Breg group: ZBTB32, NFKBID, SOX5, EBI3, and ZBTB20;
(m) Myeloid suppression group: FGL2, EBI3, and PTGS2;
(n) Phagocytosis inhibition group: LILRB3, LILRB1, FCGR2B, LILRB4, SIRPA, SIGLEC10, LILRB2, PECAM1, CD300A, CD300LF, and CD33;
(o) Stromal suppression group: IL11, TDO2, and TSLP;
(p) Exclusion group: GAS6, PDGFC, EDNRB, and TNFAIP6;
(q) Matrix group: TNC;
(r) Endothelium group: ECSCR, ROBO4;
(s) CAF group: FGF2, CD248, and LGALS1;
(t) Matrix remodeling group: PLOD2;
(u) Angiogenesis group; DGFC;
(v) EMT signature group: RUNX2 and FOXM1;
(w) Adipocytes group: GPD1, LBP, PTGER3, DLAT, FABP4, LEP, PLIN1, ADIPOQ, PPP1R1A, ADH1B, LIPE, and COL4A4;
(x) Metastasis signature group: HPSE, PARP1, RCC2, and SERPINH1;
(y) Metabolic suppression of CTL group: SPHK1, ADORA2A, and ENTPD1;
(z) Hypoxia factors group: FUT11, PGK1, CA12, TPI1, PDK1, EPAS1, LDHA, SLC2AI, PFKFB3, P4HA1, ALDOA, HK2, and NDRG1;

(aa) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(ab) Acidosis group: SLC16A1, SLC16A4, MAPK14, and SLC9A1;
(ac) Senescence group: CDKN2A, CDKN1A, CDKN2B, GLB1, SERPINE1, DPP4, CEBPB, BCL2L1, BCL2L2, TNFRSF10D, ITGB3, IGFBP3, GDF15, IGFBP7, PLAU, STAT1, IGFBP2, and ATF3;
(ad) Apoptosis group: BCL10, BIK, CASP6, TNFRSF12A, CASP2, CASP3, CASP7, CASP8, CYLD, IER3, PMAIP1, BCL2L11, TNFRSF10A, TNFRSF10B, APAF1, XAF1, and CASP8AP2; and
(ac) Glycolysis group: ALDOA, TPI1, GPD2, PGK1, LDHA, PFKP, BPGM, ENO1, GPI, and SLC16A3.

In some embodiments, determining the gene group score comprises determining a respective gene group score for each of the following gene groups, using, for a particular gene group, RNA expression levels for each of the genes listed below to determine the gene group score for the particular group, the gene groups including:
(a) cDC1 group: CLEC9A, C1orf54, BATF3, WDFY4, and HLA-DOB; cDC2 group: ITGAX, CD1C, FCER1A, CLEC10A, and AMICA1;
(b) pDC group: IL3RA, CLEC4C, DERL3, LILRA4, and SCT;
(c) Panmacrophage signature group: C1QC, C1QA, and VSIG4;
(d) TLS group: PTPRCAP, LTA, and JCHAIN;
(e) Proinflammatory cytokines group: IL1A, IL26, and LIF;
(f) Anti-tumor chemokines group: XCL2;
(g) Pro-tumor chemokines group: CXCL6, CCL20, and CCL18;
(h) Myeloid checkpoints group: C10orf54;
(i) Lymphoid checkpoints group: PVRIG;
(j) Cytotoxic cell inactivation group: PIM2, SERPINB9, KLRB1, KLRD1, LAIR1, LAIR2, and SIGLEC7;
(k) Treg cells group: FOXP3 and IL2RA;
(l) Breg group: ZBTB32, NFKBID, SOX5, EBI3, and ZBTB20;
(m) Myeloid suppression group: FGL2, EBI3, and PTGS2;
(n) Phagocytosis inhibition group: LILRB3, LILRB1, FCGR2B, LILRB4, SIRPA, SIGLEC10, LILRB2, PECAM1, CD300A, CD300LF, and CD33;
(o) Stromal suppression group: IL11, TDO2, and TSLP;
(p) Exclusion group: GAS6, PDGFC, EDNRB, and TNFAIP6;
(q) Matrix group: TNC;
(r) Endothelium group: ECSCR, ROBO4;
(s) CAF group: FGF2, CD248, and LGALS1;
(t) Matrix remodeling group: PLOD2;
(u) Angiogenesis group: DGFC;
(v) EMT signature group: RUNX2 and FOXM1;
(w) Adipocytes group: GPD1, LBP, PTGER3, DLAT, FABP4, LEP, PLIN1, ADIPOQ, PPP1R1A, ADH1B, LIPE, and COL4A4;
(x) Metastasis signature group: HPSE, PARP1, RCC2, and SERPINH1;
(y) Metabolic suppression of CTL group: SPHK1, ADORA2A, and ENTPD1;
(z) Hypoxia factors group: FUT11, PGK1, CA12, TPI1, PDK1, EPAS1, LDHA, SLC2A1, PFKFB3, P4HA1, ALDOA, HK2, and NDRG1;

(aa) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(ab) Acidosis group: SLC16AI, SLC16A4, MAPK14, and SLC9A1;
(ac) Senescence group: CDKN2A, CDKN1A, CDKN2B, GLB1, SERPINE1, DPP4, CEBPB, BCL2L1, BCL2L2, TNFRSF10D, ITGB3, IGFBP3, GDF15, IGFBP7, PLAU, STAT1, IGFBP2, and ATF3;
(ad) Apoptosis group: BCL10, BIK, CASP6, TNFRSF12A, CASP2, CASP3, CASP7, CASP8, CYLD, IER3, PMAIP1, BCL2L11, TNFRSF10A, TNFRSF10B, APAF1, XAF1, and CASP8AP2; and
(ac) Glycolysis group: ALDOA, TPI1, GPD2, PGK1, LDHA, PFKP, BPGM, ENO1, GPI, and SLC16A3.

In some embodiments, determining the gene group score comprises determining a respective gene group score for each of the following gene groups, using, for a particular gene group, RNA expression levels for each of the genes in each gene group to determine the gene group score for each particular group, the gene groups including:
(a) cDC1 group: CLEC9A, C1orf54, BATF3, WDFY4, HLA-DOB, and XCR1;
(b) cDC2 group: ITGAX, HLA-DRA, HLA-DRB1, CD1C, FCER1A, CLEC10A, and AMICA1;
(c) pDC group: IL3RA, CLEC4C, CCR2, CXCR3, GZMB, DERL3, LILRA4, and SCT;
(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(e) T cells group: ITK, CD3G, CD3D, TRBC1, CD3E, TRAT1, TRAC, TRBC2, CD28, CD5, and TBX21;
(f) M1 cytokines group: CXCL10, IL23A, IL1B, IL12B, TNF, and CXCL9;
(g) Panmacrophage signature group: C1QC, CSF1R, CD163, SIGLEC1, C1QA, VSIG4, MSR1, and CD68;
(b) TLS group: CXCL10, SELL, LAMP3, FDCSP, CD86, CXCL13, PTPRCAP, CCR7,
LTA, CXCR3, CCL21, CCL19, JCHAIN, CXCL9, and TNERSF17;
(i) Proinflammatory cytokines group: IL23A, IFNB1, IL1A, IL1B, TNF, CXCL2, IL6, IL26, CCL2, CCL4, LIF, and CCL3;
(j) Anti-tumor chemokines group: CXCL10, CXCL9, CXCL13, XCL1, CCL5, CCL21, CCL19, and XCL2;
(k) Pro-tumor chemokines group: CCL26, CXCL6, CCL20, CXCL8, CXCL1, CCL18, CCL17, and CCL22;
(l) Myeloid checkpoints group: PDCD1LG2, HAVCR2, CD274, and C10orf54;
(m) Lymphoid checkpoints group: BTLA, TIGIT, LAG3, PVRIG, PDCD1, and CTLA4;
(n) Cytotoxic cell inactivation group: PIM2, SERPINB9, LGALS9, CD5, KLRB1, FASLG,
KLRD1, LAIR1, LAIR2, and SIGLEC7;
(o) Treg cells group: CCR8, TNFRSF18, FOXP3, IKZF2, CTLA4, IKZF4, and IL2RA;
(p) Breg group: ZBTB32, NFKBID, SOX5, EBI3, and ZBTB20;
(q) Myeloid suppression group: IL10, FGL2, EBI3, CYBB, IL4I1, TGFBI, IDO1, PTGS2, and MSR1;
(r) Phagocytosis inhibition group: LILRB3, LILRB1, FCGR2B, LILRB4, SIRPA, SIGLEC10, LILRB2, PECAM1, CD300A, CD300LF, and CD33;
(s) Stromal suppression group: IL11, TGFB2, TDO2, TSLP, IL6, TGFB3, and TGFBI;

(t) Exclusion group: GAS6, VEGFA, PDGFC, FGF2, EDNRB, TNFAIP6, and CXCL12;
(u) Matrix group: VTN, ELN, COL11A1, COL4A1, TNC, COL1A1, COL1A2, COL3A1, LAMA3, LGALS9, FN1, COL5A1, LAMB3, LGALS7, and LAMC2;
(v) Endothelium group: ECSCR, NOS3, MMRN1, VWF, CLEC14A, FLT1, KDR, ROBO4, ENG, CDH5, and MMRN2;
(w) CAP group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
(x) Matrix remodeling group: LOX, MMP12, MMP9, PLOD2, ADAMTS5, MMP3, ADAMTS4, MMP11, MMP1, CA9, MMP2, and MMP7;
(y) Angiogenesis group: VEGFA, TEK, PDGFC, VWF, CXCR2, ANGPT1, FLT1, KDR, ANGPT2, VEGFB, VEGFC, PGF, and CDH5;
(z) EMT signature group: RUNX2, FOXM1, SNAI1, TWIST1, and SNAI2;
(aa) Adipocytes group: GPD1, LBP, PTGER3, DLAT, FABP4, LEP, PLIN1, ADIPOQ, PPP1R1A, ADH1B, LIPE, and COL4A4;
(ab) Metastasis signature group: MMP9, HPSE, PARP1, CDH2, RCC2, and SERPINH1;
(ac) Metabolic suppression of CTL group: SPHK1, MSR1, ADORA2A, and ENTPD1;
(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ac) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(af) Acidosis group: SLC16A1, SLC16A4, MAPK14, and SLC9A1;
(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;
(ai) Glycolysis group: ALDOA, TPI1, GPD2, PGK1, LDHA, PFKP, BPGM, ENO1, GPI, and SLC16A3;
(aj) MHC II group: HLA-DRB1, HLA-DMA, HLA-DRA, HLA-DQB1, CHITA, HLA-DPB1, HLA-DMB, HLA-DQA1, and HLA-DPA1;
(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(al) B cells group: PAX5, MS4A1, CD19, CR2, TNFRSF13B, TNFRSF13C, TNFRSF17, CD79B, BLK, CD22, CD79A, STAP1, and FCRL5; and
(am) CD8 T cells group: KLRK1, CD8B, CD8A, PRF1, EOMES, TRAT1, GZMB, GZMA, GZMK, ZAP70, NKG7, and TBX21.

In some embodiments, determining the gene group score comprises determining a first score of a first gene group using a single-sample Gene Set Enrichment Analysis (ssGSEA) technique from RNA expression levels for at least some of the genes in one or the following gene groups:

(a) cDC1 group: CLEC9A, C1orf54, BATF3, WDFY4, HLA-DOB, and XCR1;
(b) cDC2 group: ITGAX, HLA-DRA, HLA-DRB1, CD1C, FCER1A, CLEC10A, and AMICA1;
(c) pDC group: IL3RA, CLEC4C, CCR2, CXCR3, GZMB, DERL3, LILRA4, and SCT;
(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2:
(e) T cells group: ITK, CD3G, CD3D, TRBC1, CD3E, TRAT1, TRAC, TRBC2, CD28, CD5, and TBX21;
(f) M1 cytokines group: CXCL10, IL23A, IL1B, IL12B, TNF, and CXCL9;
(g) Panmacrophage signature group: C1QC, CSF1R, CD163, SIGLEC1, C1QA, VSIG4, MSR1, and CD68;
(h) TLS group: CXCL10, SELL, LAMP3, FDCSP, CD86, CXCL13, PTPRCAP, CCR7, LTA, CXCR3, CCL21, CCL19, JCHAIN, CXCL9, and TNFRSF17;
(i) Proinflammatory cytokines group: IL23A, IFNB1, IL1A, IL1B, TNF, CXCL2, IL6, IL26, CCL2, CCL4, LIF, and CCL3;
(j) Anti-tumor chemokines group: CXCL10, CXCL9, CXCL13, XCL1, CCL5, CCL21, CCL19, and XCL2;
(k) Pro-tumor chemokines group: CCL26, CXCL6, CCL20, CXCL8, CXCL1, CCL18, CCL17, and CCL22;
(l) Myeloid checkpoints group: PDCD1LG2, HAVCR2, CD274, and C10orf54;
(m) Lymphoid checkpoints group: BTLA, TIGIT, LAG3, PVRIG, PDCD1, and CTLA4;
(n) Cytotoxic cell inactivation group: PIM2, SERPINB9, LGALS9, CD5, KLRB1, FASLG, KLRD1, LAIR1, LAIR2, and SIGLEC7;
(o) Treg cells group: CCR8, TNFRSF18, FOXP3, IKZF2, CTLA4, IKZF4, and IL2RA;
(p) Breg group: ZBTB32, NFKBID, SOX5, EBI3, and ZBTB20;
(q) Myeloid suppression group: IL10, FGL2, EBI3, CYBB, IL4I1, TGFBI, IDO1, PTGS2, and MSR1;
(r) Phagocytosis inhibition group: LILRB3, LILRB1, FCGR2B, LILRB4, SIRPA, SIGLEC10, LILRB2, PECAM1, CD300A, CD300LF, and CD33;
(s) Stromal suppression group: IL11, TGFB2, TDO2, TSLP, IL6, TGFB3, and TGFBI;
(t) Exclusion group: GAS6, VEGFA, PDGFC, FGF2, EDNRB, TNFAIP6, and CXCL12;
(u) Matrix group: VTN, ELN, COL11A1, COL4A1, TNC, COL1A1, COL1A2, COL3A1, LAMA3, LGALS9, FN1, COL5A1, LAMB3, LGALS7, and LAMC2;
(v) Endothelium group: ECSCR, NOS3, MMRN1, VWF, CLEC14A, FLT1, KDR, ROBO4, ENG, CDH5, and MMRN2;
(w) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
(x) Matrix remodeling group: LOX, MMP12, MMP9, PLOD2, ADAMTS5, MMP3, ADAMTS4, MMP11, MMP1, CA9, MMP2, and MMP7;
(y) Angiogenesis group: VEGFA, TEK, PDGFC, VWF, CXCR2, ANGPT1, FLT1, KDR, ANGPT2, VEGFB, VEGFC, PGF, and CDH5;

(z) EMT signature group: RUNX2, FOXM1, SNAI1, TWIST1, and SNAI2;
(aa) Adipocytes group: GPD1, LBP, PTGER3, DLAT, FABP4, LEP, PLIN1, ADIPOQ, PPP1R1A, ADH1B, LIPE, and COL4A4;
(ab) Metastasis signature group: MMP9, HPSE, PARP1, CDH2, RCC2, and SERPINH1;
(ac) Metabolic suppression of CTL group: SPHK1, MSR1, ADORA2A, and ENTPD1;
(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ac) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(af) Acidosis group: SLC16A1, SLC16A4, MAPK14, and SLC9A1;
(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;
(ai) Glycolysis group: ALDOA, TPI1, GPD2, PGK1, LDHA, PFKP, BPGM, ENO1, GPI, and SLC16A3;
(aj) MHC II group: HLA-DRB1, HLA-DMA, HLA-DRA, HLA-DQB1, CIITA, HLA-DPB1, HLA-DMB, HLA-DQA1, and HLA-DPA1;
(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(al) B cells group: PAX5, MS4A1, CD19, CR2, TNFRSF13B, TNFRSF13C, TNFRSF17, CD79B, BLK, CD22, CD79A, STAP1, and FCRL5; and
(am) CD8 T cells group: KLRK1, CD8B, CD8A, PRF1, EOMES, TRAT1, GZMB, GZMA, GZMK, ZAP70, NKG7, and TBX21.

In some embodiments, determining the gene group score comprises using a single-sample Gene Set Enrichment Analysis (ssGSEA) technique to determine the gene group scores from RNA expression levels for each of the genes in each of the following gene groups:
(a) cDC1 group: CLEC9A, C1orf54, BATF3, WDFY4, HLA-DOB, and XCR1;
(b) cDC2 group: ITGAX, HLA-DRA, HLA-DRB1, CD1C, FCER1A, CLEC10A, and AMICA1;
(c) pDC group: IL3RA, CLEC4C, CCR2, CXCR3, GZMB, DERL3, LILRA4, and SCT;
(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(e) T cells group: ITK, CD3G, CD3D, TRBC1, CD3E, TRAT1, TRAC, TRBC2, CD28, CD5, and TBX21;
(f) M1 cytokines group: CXCL10, IL23A, IL1B, IL12B, TNF, and CXCL9;
(g) Panmacrophage signature group: C1QC, CSF1R, CD163, SIGLEC1, C1QA, VSIG4, MSR1, and CD68;
(h) TLS group: CXCL10, SELL, LAMP3, FDCSP, CD86, CXCL13, PTPRCAP, CCR7, LTA, CXCR3, CCL21, CCL19, JCHAIN, CXCL9, and TNERSF17;
(i) Proinflammatory cytokines group: IL23A, IFNB1, IL1A, IL1B, TNF, CXCL2, IL6, IL26, CCL2, CCL4, LIF, and CCL3;
(j) Anti-tumor chemokines group: CXCL10, CXCL9, CXCL13, XCL1, CCL5, CCL21, CCL19, and XCL2;
(k) Pro-tumor chemokines group: CCL26, CXCL6, CCL20, CXCL8, CXCL1, CCL18, CCL17, and CCL22;
(l) Myeloid checkpoints group: PDCD1LG2, HAVCR2, CD274, and C10orf54;
(m) Lymphoid checkpoints group: BTLA, TIGIT, LAG3, PVRIG, PDCD1, and CTLA4;
(n) Cytotoxic cell inactivation group: PIM2, SERPINB9, LGALS9, CD5, KLRB1, FASLG, KLRD1, LAIR1, LAIR2, and SIGLEC7;
(o) Treg cells group: CCR8, TNFRSF18, FOXP3, IKZF2, CTLA4, IKZF4, and IL2RA;
(p) Breg group: ZBTB32, NFKBID, SOX5, EBI3, and ZBTB20;
(q) Myeloid suppression group: IL10, FGL2, EBI3, CYBB, IL4I1, TGFBI, IDO1, PTGS2, and MSR1;
(r) Phagocytosis inhibition group: LILRB3, LILRB1, FCGR2B, LILRB4, SIRPA, SIGLEC10, LILRB2, PECAM1, CD300A, CD300LF, and CD33;
(s) Stromal suppression group: IL11, TGFB2, TDO2, TSLP, IL6, TGFB3, and TGFBI;
(t) Exclusion group: GAS6, VEGFA, PDGFC, FGF2, EDNRB, TNFAIP6, and CXCL12;
(u) Matrix group: VTN, ELN, COL11A1, COL4A1, TNC, COL1A1, COL1A2, COL3A1, LAMA3, LGALS9, FN1, COL5A1, LAMB3, LGALS7, and LAMC2;
(v) Endothelium group: ECSCR, NOS3, MMRN1, VWF, CLEC14A, FLT1, KDR, ROBO4, ENG, CDH5, and MMRN2;
(w) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
(x) Matrix remodeling group: LOX, MMP12, MMP9, PLOD2, ADAMTS5, MMP3, ADAMTS4, MMP11, MMP1, CA9, MMP2, and MMP7;
(y) Angiogenesis group: VEGFA, TEK, PDGFC, VWF, CXCR2, ANGPT1, FLT1, KDR, ANGPT2, VEGFB, VEGFC, PGF, and CDH5;
(z) EMT signature group: RUNX2, FOXM1, SNAI1, TWIST1, and SNAI2;
(aa) Adipocytes group: GPD1, LBP, PTGER3, DLAT, FABP4, LEP, PLIN1, ADIPOQ, PPP1R1A, ADH1B, LIPE, and COL4A4;
(ab) Metastasis signature group: MMP9, HPSE, PARP1, CDH2, RCC2, and SERPINH1;
(ac) Metabolic suppression of CTL group: SPHK1, MSR1, ADORA2A, and ENTPD1;
(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ae) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(af) Acidosis group: SLC16A1, SLC16A4, MAPK14, and SLC9A1;
(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;
(ai) Glycolysis group: ALDOA, TPI1, GPD2, PGK1, LDHA, PFKP, BPGM, ENO1, GPI, and SLC16A3;
(aj) MHC II group: HLA-DRB1, HLA-DMA, HLA-DRA, HLA-DQB1, CIITA, HLA-DPB1, HLA-DMB, HLA-DQA1, and HLA-DPA1;
(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(al) B cells group: PAX5, MS4A1, CD19, CR2, TNFRSF13B, TNFRSF13C, TNFRSF17, CD79B, BLK, CD22, CD79A, STAP1, and FCRL5; and
(am) CD8 T cells group: KLRK1, CD8B, CD8A, PRF1, EOMES, TRAT1, GZMB, GZMA,
GZMK, ZAP70, NKG7, and TBX21.

In some embodiments, determining the gene group score comprises determining a first score of a first gene group using a single-sample Gene Set Enrichment Analysis (ssGSEA) technique.

In some embodiments, generating the TME signature further comprises normalizing the gene group scores, wherein the normalizing comprises applying median scaling to the gene group scores.

In some embodiments, the plurality of TME types is associated with a respective plurality of TME signature clusters, and identifying, using the TME signature and from among a plurality of TME types, the TME type for the subject comprises: associating the TME signature of the subject with a particular one of the plurality of TME signature clusters; and identifying the TME type for the subject as the TME type corresponding to the particular one of the plurality of TME signature clusters to which the TME signature of the subject is associated.

In some embodiments, the method further comprises: generating the plurality of TME signature clusters, the generating comprising: obtaining multiple sets of RNA expression data, wherein the multiple sets of RNA expression data comprises sets of data obtained by sequencing biological samples from multiple respective subjects, each of the multiple sets of RNA expression data indicating RNA expression levels for the at least some genes in each of the at least some of the plurality of gene groups listed in Table 1; and generating multiple TME signatures from the multiple sets of RNA expression data, each of the multiple TME signatures comprising gene group expression scores for respective gene groups in the plurality of gene groups, the generating comprising, for each particular one of the multiple TME signatures: determining the TME signature by determining the gene group expression scores using the RNA expression levels in the particular set of RNA expression data for which the particular one TME signature is being generated; and clustering the multiple TME signatures to obtain the plurality of TME signature clusters.

In some embodiments, the plurality of TME signature clusters comprise clusters obtained by clustering multiple TME signatures obtained from multiple respective subjects.

In some embodiments, the method further comprises: updating the plurality of TME signature clusters using the TME signature of the subject, wherein the TME signature of the subject is one of a threshold number TME signatures for a threshold number of subjects, wherein when the threshold number of TME signatures is generated the TME signature clusters are updated, wherein the threshold number of TME signatures is at least 50, at least 75, at least 100, at least 200, at least 500, at least 1000, or at least 5000 TME signatures.

In some embodiments, the updating is performed using a clustering algorithm selected from the group consisting of a dense clustering algorithm, spectral clustering algorithm, k-means clustering algorithm, hierarchical clustering algorithm, and an agglomerative clustering algorithm.

In some embodiments, the method further comprises: determining a TME type of a second subject, wherein the TME type of the second subject is identified using the updated TME signature clusters, wherein the identifying comprises: determining a TME signature of the second subject from RNA expression data comprising data obtained by sequencing a biological sample obtained from the second subject, wherein the TME signature of the second subject is determined using the at least some genes in each of the at least some of the plurality of gene groups listed in Table 1; associating the TME signature of the second subject with a particular one of the plurality of the updated TME signature clusters; and identifying the TME type for the second subject as the TME type corresponding to the particular one of the plurality of updated TME signature clusters to which the TME signature of the second subject is associated.

In some embodiments, the plurality of TME types comprises: Lymphoid-Cell Enriched (IE/L) type; B-Cell Enriched, Angiogenic (IE/B/A) type; Immune-Enriched, Hypoxic (IE/H) type; Highly Immune-Enriched, Inflamed (IE/Inf) type; Immune-Enriched, Fibrotic (IE/F) type; Fibrotic, Angiogenic, Myeloid (F/A/M) type; Fibrotic, Hypoxic (F/H) type; Immune Desert (D) type; and/or Faintly Infiltrated, Angiogenic (D/A) type.

In some embodiments, the plurality of TME types comprises the Lymphoid-Cell Enriched (IE/L) type associated with lymphoid-cell-enriched, non-stroma-enriched, myeloid cell deficient, and moderate tumor proliferation rate biological samples.

In some embodiments, the plurality of TME types comprises the B-Cell Enriched, Angiogenic (IE/B/A) type associated with lymphoid-cell-enriched, myeloid-cell-enriched, adipocyte-enriched, and low tumor proliferation rate biological samples.

In some embodiments, the plurality of TME types comprises the Immune-Enriched, Hypoxic (IE/H) type associated with lymphoid-cell-enriched, myeloid-cell-enriched, hypoxic, glycolytic, EGFR and MAPK upregulated, and high tumor proliferation rate biological samples.

In some embodiments, the plurality of TME types comprises the Highly Immune-Enriched, Inflamed (IE/Inf) type associated with lymphoid-cell-enriched, myeloid-cell-enriched, inflamed, non-stroma-enriched, and low tumor proliferation rate biological samples.

In some embodiments, the plurality of TME types comprises the Immune-Enriched, Fibrotic (IE/F) type associated with myeloid-cell-enriched, stroma-enriched, angiogenic, TGF-β upregulated, and low tumor proliferation rate biological samples.

In some embodiments, the plurality of TME types comprises the Fibrotic, Angiogenic, Myeloid (F/A/M) type associated with stroma-enriched, myeloid cell deficient, TGF-β, EGFR, and MAPK upregulated, and hypoxic biological samples.

In some embodiments, the plurality of TME types comprises the Fibrotic, Hypoxic (F/H) type associated with hypoxic, tumor-cell-enriched, TGF-β, EGFR, MAPK, and PI3K upregulated, and high tumor proliferation rate biological samples.

In some embodiments, the plurality of TME types comprises the Immune Desert (D) type associated with tumor-cell-enriched, lymphoid cell deficient, mildly hypoxic, and high tumor proliferation rate biological samples.

In some embodiments, the plurality of TME types comprises the Faintly Infiltrated, Angiogenic (D/A) type associated with tumor-cell-enriched, angiogenic, TGF-β upregulated, and low tumor proliferation rate biological samples.

In some embodiments, the plurality of TME types were generated by: determining a plurality of TME signatures for a respective plurality of subjects using RNA expression data comprising data obtained from sequencing biological samples obtained from the plurality of subjects, each of the plurality of TME signatures containing a gene group expression level for at least some of the plurality of gene groups listed in Table 1; and clustering the plurality of TME signatures to obtain the TME types.

In some embodiments, the method further comprises identifying a prognosis of the subject using the TME type of the subject.

In some embodiments, identifying the TME type of the subject comprises identifying the TME type as Lymphoid-Cell Enriched (IE/L) type, B-Cell Enriched, Angiogenic (IE/B/A) type, Immune-Enriched, Hypoxic (IE/H) type, Highly Immune-Enriched, Inflamed (IE/Inf) type, and/or Faintly Infiltrated, Angiogenic (D/A) type, and wherein identifying the prognosis of the subject comprises identifying a good prognosis.

In some embodiments, identifying the TME type of the subject comprises identifying the TME type as Immune-Enriched, Fibrotic (IE/F) type, Fibrotic, Angiogenic, Myeloid (F/A/M) type, Fibrotic, Hypoxic (F/H) type, and/or Immune Desert (D) type, and identifying the prognosis of the subject comprises identifying a poor prognosis.

In some embodiments, the method further comprises identifying at least one therapeutic agent for administration to the subject using the TME type of the subject.

In some embodiments, the at least one therapeutic agent comprises an immuno-oncology (IO) agent, optionally wherein the IO agent comprises an immune checkpoint inhibitor when the subject is identified as having IE/F, IE/B/A, F/A/M, F/H, IE/F, IE/Inf, IE/L, or IE/H TME types.

In some embodiments, the immune checkpoint inhibitor comprises an anti-TGF-β antibody, an anti-PDGFR antibody, an anti-PD-1 antibody, an anti-LAG3 antibody, an anti-PD-L1 antibody, an anti-IL-6 antibody, an anti-CD276 antibody, an anti-PD-L2 antibody, an anti-SIRPa antibody, an anti-VISTA antibody, an anti-TIGIT antibody, an anti-CTLA4 antibody, or an anti-PVRIG antibody.

In some embodiments, the at least one therapeutic agent comprises an anti-VEGF therapy when the subject is identified as having IE/F, F/A/M, or F/H TME types, optionally wherein the anti-VEGF therapy comprises an anti-VEGF antibody.

In some embodiments, the at least one therapeutic agent comprises a tyrosine kinase inhibitor (TKI) when the subject is identified as having IE/F, F/A/M, or F/H TME types.

In some embodiments, identifying the at least one therapeutic agent based on the TME type of the subject comprises identifying an immune checkpoint inhibitor comprising an anti-TGF-B antibody, an anti-PDGFR antibody, or an anti-VEGF antibody as the at least one therapeutic agent when the subject is identified as having IE/F, F/A/M, or F/H type TME type.

In some embodiments, identifying the at least one therapeutic agent based on the TME type of the subject comprises identifying a TKI as the at least one therapeutic agent when the subject is identified as having IE/F, F/A/M, or F/H type TME type.

In some embodiments, identifying the at least one therapeutic agent based on the TME type of the subject comprises identifying an immune checkpoint inhibitor comprising an anti-IL-6 antibody as the at least one therapeutic agent when the subject is identified as having IE/F or IE/Inf type TME type.

In some embodiments, identifying the at least one therapeutic agent based on the TME type of the subject comprises identifying an immune checkpoint inhibitor comprising an anti-CD276 antibody as the at least one therapeutic agent when the subject is identified as having F/A/M or F/H type TME type.

In some embodiments, identifying the at least one therapeutic agent based on the TME type of the subject comprises identifying an immune checkpoint inhibitor comprising an anti-PD-L2 antibody or anti-SIRPa antibody as the at least one therapeutic agent when the subject is identified as having F/A/M or IE/F type TME type.

In some embodiments, identifying the at least one therapeutic agent based on the TME type of the subject comprises identifying an immune checkpoint inhibitor comprising an anti-PD-1 antibody as the at least one therapeutic agent when the subject is identified as having IE/B/A or IE/L type TME type.

In some embodiments, identifying the at least one therapeutic agent based on the TME type of the subject comprises identifying an immune checkpoint inhibitor comprising an anti-PDL-1 antibody as the at least one therapeutic agent when the subject is identified as having IE/H or IE/Inf type TME type.

In some embodiments, the method further comprises administering the identified at least one therapeutic agent to the subject.

Also described according to a further aspect is a system comprising at least one computer hardware processor; and at least one non-transitory computer readable medium storing processor-executable instructions that, when executed by the at least one computer hardware processor, cause the at least one computer hardware processor to perform the method of any one of the preceding embodiments.

Also described according to a further aspect is at least one non-transitory computer readable medium storing processor-executable instructions that, when executed by at least one computer hardware processor, cause the at least one computer hardware processor to perform the method of any one of the preceding embodiments.

Also described according to further aspect is a system, comprising: at least one computer hardware processor; and at least one non-transitory computer-readable storage medium storing processor-executable instructions that, when executed by the at least one computer hardware processor, cause the at least one computer hardware processor to perform: obtaining RNA expression data comprising data obtained by sequencing biological samples from a plurality of subjects; determining a respective plurality of tumor microenvironment (TME) signatures for the plurality of subjects at least in part by, for each of the plurality of subjects: determining, using the RNA expression data, a respective gene group score for each gene group in a set of gene groups, the set of gene groups comprising at least a subset of gene groups listed in Table 1; clustering the plurality of TME signatures to obtain TME signature clusters associated with respective TME types; and storing the plurality of TME types.

In some embodiments, clustering the plurality of TME signatures to obtain TME signature clusters comprises obtaining one or more of the following TME signature clusters: a first TME signature cluster of biological samples that are lymphoid-cell-enriched, non-stroma-enriched, myeloid cell deficient, and moderate tumor proliferation rate biological samples, a second TME signature cluster of biological samples that are lymphoid-cell-enriched, myeloid-cell-enriched, adipocyte-enriched, and low tumor proliferation rate biological samples, a third TME signature cluster of biological samples that are lymphoid-cell-enriched, myeloid-cell-enriched, hypoxic, glycolytic, EGFR and MAPK upregulated, and high tumor proliferation rate biological samples, a fourth TME signature cluster of biological samples that are lymphoid-cell-enriched, myeloid-cell-enriched, inflamed, non-stroma-enriched, and low tumor proliferation rate biological samples, a fifth TME signature cluster of biological samples that are myeloid-cell-enriched, stroma-enriched, angiogenic, TGF-β upregulated, and low tumor proliferation rate biological samples, a sixth TME signature cluster of biological samples that are stroma-enriched, myeloid cell deficient, TGF-β, EGFR, and MAPK upregulated, and hypoxic biological samples, a seventh TME signature cluster of biological samples that are hypoxic, tumor-cell-enriched, TGF-β, EGFR, MAPK, and PI3K upregulated, and high tumor proliferation rate biological samples, an eighth TME signature cluster of biological samples that are tumor-cell-enriched, lymphoid cell deficient, mildly hypoxic, and high tumor proliferation rate biological samples, and/or a ninth TME signature cluster of biological samples that are tumor-cell-enriched, angiogenic, TGF-β upregulated, and low tumor proliferation rate biological samples.

In some embodiments, clustering the plurality of TME signatures to obtain TME signature clusters comprises obtaining one or more TME signature clusters associated with one or more of the following TME types: a first TME type associated with lymphoid-cell-enriched, non-stroma-enriched, myeloid cell deficient, and moderate tumor proliferation rate biological samples, a second TME type associated with lymphoid-cell-enriched, myeloid-cell-enriched, adipocyte-enriched, and low tumor proliferation rate biological samples, a third TME type associated with lymphoid-cell-enriched, myeloid-cell-enriched, hypoxic, glycolytic, EGFR and MAPK upregulated, and high tumor proliferation rate biological samples, a fourth TME type associated with lymphoid-cell-enriched, myeloid-cell-enriched, inflamed, non-stroma-enriched, and low tumor proliferation rate biological samples, a fifth TME type associated with myeloid-cell-enriched, stroma-enriched, angiogenic, TGF-β upregulated, and low tumor proliferation rate biological samples, a sixth TME type associated with stroma-enriched, myeloid cell deficient, TGF-β, EGFR, and MAPK upregulated, and hypoxic biological samples, a seventh TME type associated with hypoxic, tumor-cell-enriched, TGF-β, EGFR, MAPK, and PI3K upregulated, and high tumor proliferation rate biological samples, an eighth TME type associated with tumor-cell-enriched, lymphoid cell deficient, mildly hypoxic, and high tumor proliferation rate biological samples, and/or a ninth TME type associated with tumor-cell-enriched, angiogenic, TGF-β upregulated, and low tumor proliferation rate biological samples.

In some embodiments, determining the respective gene group score for each gene group in a set of gene groups comprises determining the respective gene group scores for at least three genes in each of at least the subset of the gene groups listed in Table 1.

In some embodiments, determining the respective gene group score for each gene group in a set of gene groups comprises determining the respective gene group scores for at least four genes in each of at least the subset of the gene groups listed in Table 1.

In some embodiments, determining the respective gene group score for each gene group in a set of gene groups comprises determining the respective gene group scores for each gene in each of at least the subset of the gene groups listed in Table 1.

In some embodiments, determining the respective gene group score for each gene group in a set of gene groups comprises determining the respective gene group scores for each gene listed in Table 1.

In some embodiments, determining the respective gene group score for each gene group in a set of gene groups comprises determining the respective gene group scores for at least three genes in each of one or more of the gene groups listed in Table 2.

In some embodiments, determining the respective gene group score for each gene group in a set of gene groups comprises determining the respective gene group scores for at least four genes in each of one or more of the gene groups listed in Table 2.

In some embodiments, determining the respective gene group score for each gene group in a set of gene groups comprises determining the respective gene group scores for each gene in each of one or more of the gene groups listed in Table 2.

In some embodiments, determining the respective gene group score for each gene group in a set of gene groups comprises determining the respective gene group scores for each gene listed in Table 2.

In some embodiments, determining the respective gene group score for each gene group in a set of gene groups comprises generating, for at least a subset of signaling pathways listed in Table 3, one or more PROGENy signatures using the RNA expression data and/or whole exome sequencing data.

In some embodiments, determining the respective gene group score for each gene group in a set of gene groups comprises determining the respective gene group scores for at least three genes from each of at least two of the following gene groups:
  (a) cDC1 group: CLEC9A, C1orf54, BATF3, WDFY4, HLA-DOB, and XCR1;
  (b) cDC2 group: ITGAX, HLA-DRA, HLA-DRB1, CD1C, FCER1A, CLEC10A, and AMICA1;
  (c) pDC group: IL3RA, CLEC4C, CCR2, CXCR3, GZMB, DERL3, LILRA4, and SCT;
  (d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
  (e) T cells group: ITK, CD3G, CD3D, TRBC1, CD3E, TRAT1, TRAC, TRBC2, CD28, CD5, and TBX21;
  (f) M1 cytokines group: CXCL10, IL23A, IL1B, IL12B, TNF, and CXCL9;
  (g) Panmacrophage signature group: C1QC, CSF1R, CD163, SIGLEC1, C1QA, VSIG4, MSR1, and CD68;
  (h) TLS group: CXCL10, SELL, LAMP3, FDCSP, CD86, CXCL13, PTPRCAP, CCR7, LTA, CXCR3, CCL21, CCL19, JCHAIN, CXCL9, and TNFRSF17;

(i) Proinflammatory cytokines group: IL23A, IFNB1, IL1A, IL1B, TNF, CXCL2, IL6, IL26, CCL2, CCL4, LIF, and CCL3;
(j) Anti-tumor chemokines group: CXCL10, CXCL9, CXCL13, XCL1, CCL5, CCL21, CCL19, and XCL2;
(k) Pro-tumor chemokines group: CCL26, CXCL6, CCL20, CXCL8, CXCL1, CCL18, CCL17, and CCL22;
(l) Myeloid checkpoints group: PDCD1LG2, HAVCR2, CD274, and C10orf54;
(m) Lymphoid checkpoints group: BTLA, TIGIT, LAG3, PVRIG, PDCD1, and CTLA4;
(n) Cytotoxic cell inactivation group: PIM2, SERPINB9, LGALS9, CD5, KLRB1, FASLG, KLRD1, LAIR1, LAIR2, and SIGLEC7;
(o) Treg cells group: CCR8, TNFRSF18, FOXP3, IKZF2, CTLA4, IKZF4, and IL2RA;
(p) Breg group: ZBTB32, NFKBID, SOX5, EBI3, and ZBTB20;
(q) Myeloid suppression group: IL10, FGL2, EBI3, CYBB, IL4I1, TGFBI, IDO1, PTGS2, and MSR1;
(r) Phagocytosis inhibition group: LILRB3, LILRB1, FCGR2B, LILRB4, SIRPA, SIGLEC10, LILRB2, PECAM1, CD300A, CD300LF, and CD33;
(s) Stromal suppression group: IL11, TGFB2, TDO2, TSLP, IL6, TGFB3, and TGFBI;
(t) Exclusion group: GAS6, VEGFA, PDGFC, FGF2, EDNRB, TNFAIP6, and CXCL12;
(u) Matrix group: VIN, ELN, COL11A1, COL4A1, TNC, COL1A1, COL1A2, COL3A1, LAMA3, LGALS9, FN1, COL5A1, LAMB3, LGALS7, and LAMC2;
(v) Endothelium group: ECSCR, NOS3, MMRN1, VWF, CLEC14A, FLT1, KDR, ROBO4, ENG, CDH5, and MMRN2;
(w) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAPS, LRP1, COL11A1, COL6A3, COL6A2, LGALS1, and ACTA2;
(x) Matrix remodeling group: LOX, MMP12, MMP9, PLOD2, ADAMTS5, MMP3, ADAMTS4, MMP11, MMP1, CA9, MMP2, and MMP7;
(y) Angiogenesis group: VEGFA, TEK, PDGFC, VWF, CXCR2, ANGPT1, FLT1, KDR, ANGPT2, VEGFB, VEGFC, PGF, and CDH5;
(z) EMT signature group: RUNX2, FOXM1, SNAI1, TWIST1, and SNAI2;
(aa) Adipocytes group: GPD1, LBP, PTGER3, DLAT, FABP4, LEP, PLIN1, ADIPOQ, PPP1R1A, ADH1B, LIPE, and COL4A4;
(ab) Metastasis signature group: MMP9, HPSE, PARP1, CDH2, RCC2, and SERPINH1;
(ac) Metabolic suppression of CTL group: SPHK1, MSR1, ADORA2A, and ENTPD1;
(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ae) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(af) Acidosis group: SLC16A1, SLC16A4, MAPK14, and SLC9A1;
(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(ab) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;
(ai) Glycolysis group: ALDOA, TPI1, GPD2, PGK1, LDHA, PFKP, BPGM, ENO1, GPI, and SLC16A3;
(aj) MHC II group: HLA-DRB1, HLA-DMA, HLA-DRA, HLA-DQB1, CIITA, HLA-DPB1, HLA-DMB, HLA-DQA1, and HLA-DPA1;
(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(al) B cells group: PAX5, MS4A1, CD19, CR2, TNFRSF13B, TNFRSF13C, TNFRSF17, CD79B, BLK, CD22, CD79A, STAP1, and FCRL5; and
(am) CD8 T cells group: KLRK1, CD8B, CD8A, PRF1, EOMES, TRAT1, GZMB, GZMA, GZMK, ZAP70, NKG7, and TBX21.

In some embodiments, determining the respective gene group score for each gene group in a set of gene groups comprises determining the respective gene group scores for at least three genes from each of the following gene groups:
(a) cDC1 group: CLEC9A, C1orf54, BATF3, WDFY4, HLA-DOB, and XCR1;
(b) cDC2 group: ITGAX, HLA-DRA, HLA-DRB1, CD1C, FCER1A, CLEC10A, and AMICA1;
(c) pDC group: IL3RA, CLEC4C, CCR2, CXCR3, GZMB, DERL3, LILRA4, and SCT;
(d) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(e) T cells group: ITK, CD3G, CD3D, TRBC1, CD3E, TRAT1, TRAC, TRBC2, CD28, CD5, and TBX21;
(f) M1 cytokines group: CXCL10, IL23A, IL1B, IL12B, TNF, and CXCL9;
(g) Panmacrophage signature group: C1QC, CSF1R, CD163, SIGLEC1, C1QA, VSIG4, MSR1, and CD68;
(h) TLS group: CXCL10, SELL, LAMP3, FDCSP, CD86, CXCL13, PTPRCAP, CCR7, LTA, CXCR3, CCL21, CCL19, JCHAIN, CXCL9, and TNFRSF17;
(i) Proinflammatory cytokines group: IL23A, IFNB1, IL1A, IL1B, TNF, CXCL2, IL6, IL26, CCL2, CCL4, LIF, and CCL3;
(i) Anti-tumor chemokines group: CXCL10, CXCL9, CXCL13, XCL1, CCL5, CCL21, CCL19, and XCL2;
(k) Pro-tumor chemokines group: CCL26, CXCL6, CCL20, CXCL8, CXCL1, CCL18, CCL17, and CCL22;
(l) Myeloid checkpoints group: PDCD1LG2, HAVCR2, CD274, and C10orf54;
(m) Lymphoid checkpoints group: BTLA, TIGIT, LAG3, PVRIG, PDCD1, and CTLA4;
(n) Cytotoxic cell inactivation group: PIM2, SERPINB9, LGALS9, CD5, KLRB1, FASLG, KLRD1, LAIR1, LAIR2, and SIGLEC7;
(o) Treg cells group: CCR8, TNFRSF18, FOXP3, IKZF2, CTLA4, IKZF4, and IL2RA;
(p) Breg group: ZBTB32, NFKBID, SOX5, EBI3, and ZBTB20,
(q) Myeloid suppression group: IL10, FGL2, EBI3, CYBB, IL4I1, TGFBI, IDO1, PTGS2, and MSR1;

(r) Phagocytosis inhibition group: LILRB3, LILRB1, FCGR2B, LILRB4, SIRPA, SIGLEC10, LILRB2, PECAM1, CD300A, CD300LF, and CD33;
(s) Stromal suppression group: IL11, TGFB2, TDO2, TSLP, IL6, TGFB3, and TGFBI;
(t) Exclusion group: GAS6, VEGFA, PDGFC, FGF2, EDNRB, TNFAIP6, and CXCL12;
(u) Matrix group: VIN, ELN, COL11A1, COL4A1, TNC, COL1A1, COL1A2, COL3A1, LAMA3, LGALS9, FN1, COL5A1, LAMB3, LGALS7, and LAMC2;
(v) Endothelium group: ECSCR, NOS3, MMRN1, VWF, CLEC14A, FLT1, KDR, ROBO4, ENG, CDH5, and MMRN2;
(w) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
(x) Matrix remodeling group: LOX, MMP12, MMP9, PLOD2, ADAMTS5, MMP3, ADAMTS4, MMP11, MMP1, CA9, MMP2, and MMP7;
(y) Angiogenesis group: VEGFA, TEK, PDGFC, VWF, CXCR2, ANGPT1, FLT1, KDR, ANGPT2, VEGFB, VEGFC, PGF, and CDH5;
(z) EMT signature group: RUNX2, FOXM1, SNAI1, TWIST1, and SNAI2;
(aa) Adipocytes group: GPD1, LBP, PTGER3, DLAT, FABP4, LEP, PLIN1, ADIPOQ, PPP1R1A, ADH1B, LIPE, and COL4A4;
(ab) Metastasis signature group: MMP9, HPSE, PARP1, CDH2, RCC2, and SERPINH1;
(ac) Metabolic suppression of CTL group: SPHK1, MSR1, ADORA2A, and ENTPD1;
(ad) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ae) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(af) Acidosis group: SLC16A1, SLC16A4, MAPK14, and SLC9A1;
(ag) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(ah) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2;
(ai) Glycolysis group: ALDOA, TPI1, GPD2, PGK1, LDHA, PFKP, BPGM, ENO1, GPI, and SLC16A3;
(aj) MHC II group: HLA-DRB1, HLA-DMA, HLA-DRA, HLA-DQB1, CIITA, HLA-DPB1, HLA-DMB, HLA-DQA1, and HLA-DPA1;
(ak) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(al) B cells group: PAX5, MS4A1, CD19, CR2, TNFRSF13B, TNFRSF13C, TNFRSF17, CD79B, BLK, CD22, CD79A, STAP1, and FCRL5; and
(am) CD8 T cells group: KLRK1, CD8B, CD8A, PRF1, EOMES, TRAT1, GZMB, GZMA, GZMK, ZAP70, NKG7, and TBX21.

In some embodiments, the processor-executable instructions further comprise instructions that cause the at least one computer hardware processor to perform: obtaining RNA expression data for an additional subject, the RNA expression data indicating RNA expression levels for at least three genes in each of at least a subset of gene groups listed in Table 1; determining, using the RNA expression data for the additional subject, a TME type for the additional subject at least in part by determining a gene group score for each gene group in at least the subset of gene groups listed in Table 1; and identifying, from among the TME signature clusters, a TME signature cluster with which to associate the TME type for the additional subject.

In some embodiments, 81, wherein obtaining the RNA expression data comprises obtaining RNA expression data indicating RNA expression levels for at least four genes in each of at least the subset of the gene groups listed in Table 1.

In some embodiments, obtaining the RNA expression data comprises obtaining RNA expression data indicating RNA expression levels in a range from three genes to ten genes in each of at least the subset of the gene groups listed in Table 1.

In some embodiments, obtaining the RNA expression data comprises obtaining RNA expression data indicating RNA expression levels for each gene in each of at least the subset of the gene groups listed in Table 1.

In some embodiments, obtaining the RNA expression data comprises obtaining RNA expression data indicating RNA expression levels for each gene listed in Table 1.

In some embodiments, obtaining the RNA expression data further comprises obtaining RNA expression data indicating RNA expression levels for at least three genes in each of one or more of the gene groups listed in Table 2.

In some embodiments, obtaining the RNA expression data comprises obtaining RNA expression data indicated RNA expression levels in a range from three genes to ten genes in each of one or more of the gene groups listed in Table 2.

In some embodiments, obtaining the RNA expression data comprises obtaining RNA expression data indicating RNA expression levels for each gene in each of one or more of the gene groups listed in Table 2.

In some embodiments, obtaining the RNA expression data comprises obtaining RNA expression data indicating RNA expression levels for each gene listed in Table 2.

In some embodiments, determining the TME type for the additional subject further comprises generating, for at least a subset of signaling pathways listed in Table 3, one or more PROGENy signatures using the RNA expression data.

In some embodiments, determining the respective gene group score for each group in the set of gene groups is performed using a single sample gene set enrichment analysis (ssGSEA) technique.

In some embodiments, determining the respective gene group score for each group in the set of gene groups is performed using a mutation count technique.

In some embodiments, the clustering is performed using a community detection clustering technique.

In some embodiments, the clustering is performed using a k-means clustering technique.

BRIEF DESCRIPTION OF DRAWINGS

FIGS. 11B-11AM are boxplots showing differences in cell percentages defined by Kassandra deconvolution analysis, characteristic for the nine IE subtypes, for B cells (FIG. 11B), CD4 T cells (FIG. 11C), CD8 T cells (FIG. 11D), CD8 T cells PD1 high (FIG. 11E), CD8 T cells PD1 low (FIG. 11F), central memory T helper cells (FIG. 11G), class switched memory B cells (FIG. 11H), conventional T cells (FIG. 11I), cytotoxic NK cells (FIG. 11J), effector memory T helper cells (FIG. 11K), endothelium cells (FIG. 11L), fibroblasts (FIG. 11M), macrophages (FIG. 11N), M1 cells (FIG. 11O), M2 cells (FIG. 11P), mature B cells (FIG. 11Q), memory CD8 T cells (FIG. 11R), NK cells (FIG. 11S), naïve B cells (FIG. 11T), naïve CD8 T cells (FIG. 11U), naïve T helper cells (FIG. 11V), neutrophils (FIG. 11W), non-switched memory B cells (FIG. 11X), regulatory NK cells (FIG. 11Y), secreting B cells (FIG. 11Z), T cells (FIG. 11AA), Th17 cells (FIG. 11AB), Th1 cells (FIG. 11AC), Th2 cells (FIG. 11AD), transitional memory T helper cells (FIG. 11AE), regulatory T (Tregs) cells (FIG. 11AF), other cells (FIG. 11AG), lymphoid cells (FIG. 11AH), myeloid cells (FIG. 11AI), naïve T cells (FIG. 11AJ), stromal cells (FIG. 11AK), memory T cells (FIG. 11AL), and tumor cells (FIG. 11AM), according to some embodiments of the technology described herein.

FIGS. 12A-1 and 12A-2 are a group of boxplots showing differences in selected FGES scores for hypoxia, angiogenesis, pro-inflammatory cytokines, and tertiary lymphoid structure (TLS) counts, which are characteristic for certain IE subtypes, according to some embodiments of the technology described herein.

FIGS. 12B-12AB are boxplots showing differences in FGES scores for matrix remodeling (FIG. 12B), TGF-β (FIG. 12C), TLS counts (FIG. 12D), stromal suppression (FIG. 12E), hypoxia (FIG. 12F), senescence (FIG. 12G), exclusion (FIG. 12H), B cells (FIG. 12I), Plasmacytoid dendritic cells (pDC) (FIG. 12J), lymphoid checkpoints (FIG. 12K), myeloid suppression (FIG. 12L), type 1 conventional dendritic cells (cDC1) (FIG. 12M), MAPK (FIG. 12N), cytotoxic cell inactivation (FIG. 12O), angiogenesis (FIG. 12P), CD8 T cells (FIG. 12Q), CAF (FIG. 12R), matrix (FIG. 12S), pro-inflammatory cytokines (FIG. 12T), epithelial-mesenchymal transition (EMT) signature (FIG. 12U), MHCII (FIG. 12V), tumor proliferation rate (FIG. 12W), apoptosis (FIG. 12X), phagocytosis inhibition (FIG. 12Y), T cells (FIG. 12Z), myeloid checkpoints (FIG. 12AA), and hypoxia factors (FIG. 12AB), according to some embodiments of the technology described herein.

FIGS. 13C-13AA show overall survival (OS) rates for TCGA cohorts including the ACC cohort (FIG. 13C), the BLCA cohort (FIG. 13D), the BRCA cohort (FIG. 13E), the CESC cohort (FIG. 13F), the CHOL cohort (FIG. 13G), the COAD cohort (FIG. 13H), the ESCA cohort (FIG. 13I), the HNSC cohort (FIG. 13J), the KICH cohort (FIG. 13K), the KIRC cohort (FIG. 13L), the KIRP cohort (FIG. 13M), the LIHC cohort (FIG. 13N), the LUAD cohort (FIG. 13O), the LUSC cohort (FIG. 13P), the OV cohort (FIG. 13Q), the PAAD cohort (FIG. 13R), the PRAD cohort (FIG. 13T), the READ cohort (FIG. 13U), the SKCM cohort (FIG. 13V), the STAD cohort (FIG. 13W), the THCA cohort (FIG. 13X), the UCEC cohort (FIG. 13Y), the UCS cohort (FIG. 13Z), and the UVM cohort (FIG. 13AA), according to some embodiments of the technology described herein.

FIGS. 16A and 16B-1 through 16B-3 show IE subtypes association with other TME classifications, according to some embodiments of the technology described herein. FIG. 16A demonstrates that IE-based clustering represents a more detailed approach to TME classification compared to molecular functional portraits (MFP). FIGS. 16B-1 through 16B-3 show Sankey plots depicting the relations between MFP, Thorsson et al. (8) and Luca et al. (10) classifications.

FIGS. 17A-1 through 17G show association of the defined clusters with anti-PD1 and anti-CTLA4 therapy in melanoma, according to some embodiments of the technology described herein. FIGS. 17A-1 through 17A-9 are a heatmap depicting application of IE-based TME clustering to non-TCGA samples of melanoma, treated with immune checkpoint inhibitors. FIG. 17G shows PFS of the IE subtypes treated with CTLA4 inhibitor.

FIGS. 18A-18H show treatment options directed against major immune escape mechanisms, according to some embodiments of the technology described herein. The heatmap shows the median values of the FGES scores or single gene expressions listed on the left, which are grouped according to the main functional clusters of the IE-associated or immune-cell-associated processes described in FIGS. 8A-8D (shown in FIGS. 18A-18H with bold text). A table to the right lists therapy types, targeted and systemic, which may demonstrate high efficiency in each functional group.

DETAILED DESCRIPTION

Figure 1:
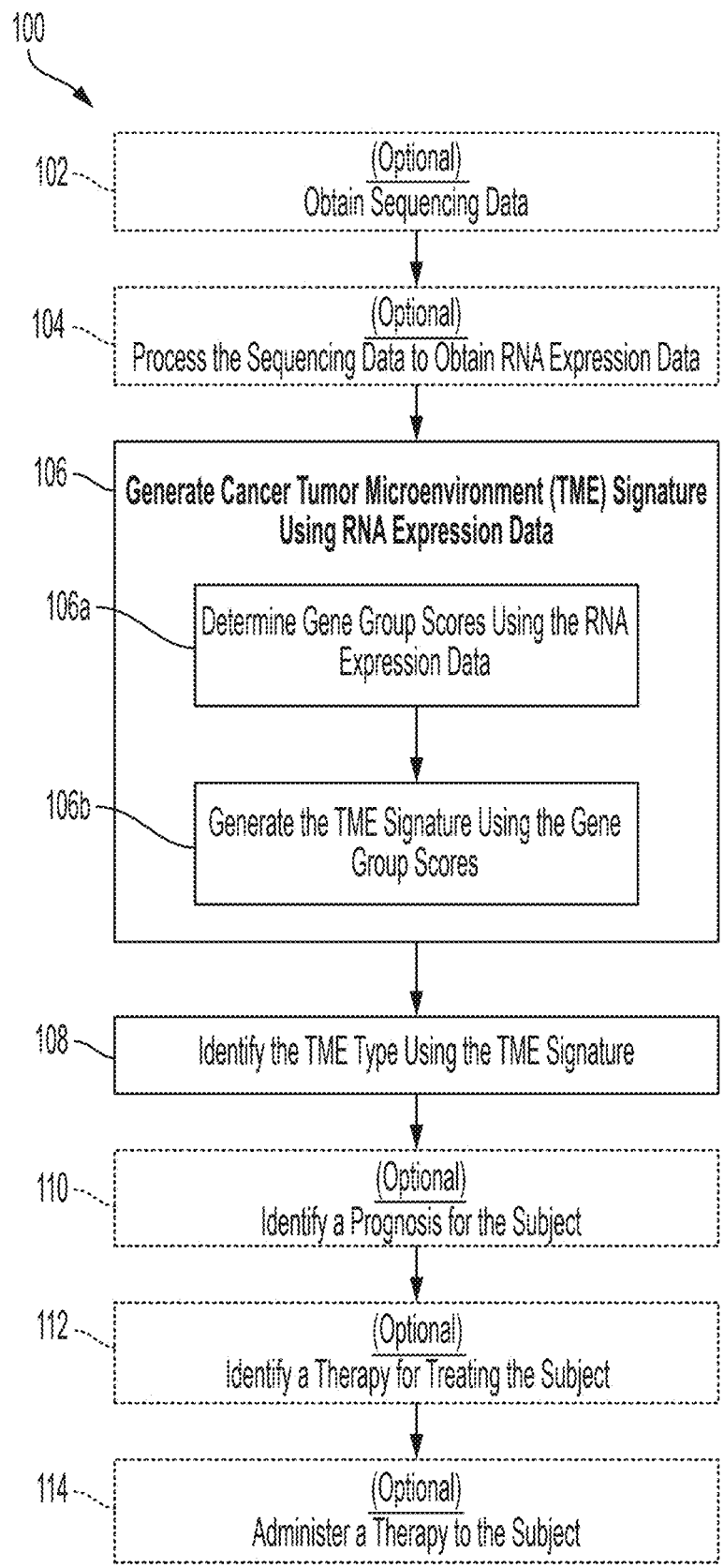
FIG. 1 is a flowchart of an illustrative process 100 for determining a tumor microenvironment (TME) type for a subject, according to some embodiments of the technology described herein.

Aspects of the disclosure relate to methods for characterizing subjects having cancer, and for determining the tumor microenvironment (TME) type of a subject's cancer. The disclosure is based, in part, on classification of TMEs into phenotypically distinct TME types. In some embodiments, the methods comprise identifying a subject as having a particular TME type based upon a TME signature computed for the subject using RNA expression data obtained from a biological sample taken from the subject. The TME type identified for the subject has various prognostic, diagnostic, and/or therapeutic applications. For example, in some embodiments, methods developed by the inventors and described herein are useful for identifying a subject's prognosis, such as a therapeutic response prognosis, based upon the TME type identified for the subject.

Cancer is a dominant cause of mortality, resulting in approximately 10 million deaths in 2020 as calculated by the World Health Organization (WHO) (1, 2). The most common types of solid tumors are breast, lung, skin, and cancers of the gastrointestinal tract. Despite originating in different tissue types, all solid tumors share common characteristics which are commonly referred to as "Hallmarks of Cancer" (3). These hallmarks are viewed as prospective and potential therapeutic targets. Tumor immune escape (IE)—the mechanisms which tumor cells and pro-tumor infiltrate use to avoid immune-cell-mediated clearance-is a core cancer hallmark and the cause of most observed cases of cancer therapy resistance. There are several ways in which tumor cells and a tumor-promoting microenvironment contribute to IE (4):

1. Decreased antigen presentation due to antigen-presenting machinery loss, low antigen formation, or antigen-presenting cell deactivation;
2. Increased expression of inhibitory molecules on immune and tumor cells, including certain immune checkpoints (PD-1, CTLA4, LAG3, TIGIT, VISTA, TIM-3, BTLA, PVRIG, etc.);
3. Induction of a suppressive microenvironment through cytokine production (IL-10, IL-35, TGF-β) or metabolic factors (IDO1, ARG1, NT5E, ENTPD1, ADORA2A, etc.);
4. Phenotypic and functional switch of immune cells (e.g., replacement of M1 cells by M2 cells, and/or replacement of type 1 conventional dendritic (cDC1) cells by type 2 conventional dendritic (cDC2) cells);
5. Recruitment and polarization of immunosuppressive cells (regulatory T cells (Tregs), regulatory B cells (Bregs), myeloid-derived suppressor cells (MDSCs), and/or cancer-associated fibroblasts (CAFs));
6. Effector cell exclusion due to matrix formation, improper endothelium function, and/or soluble factors;
7. Hypoxia, leading to glycolysis switch, acidification of the microenvironment, and/or formation of abnormal vessels;
8. Acquisition of senescent phenotype and/or apoptosis escape; and
9. Epithelial-mesenchymal transition of tumor cells, acquisition of motility, and metastasis.

It has been previously demonstrated that use of immunotherapy alone or in combination with traditional treatment may be an effective strategy for the management of solid tumors, as immunotherapy targets different IE mechanisms than traditional cancer treatments. However, it remains difficult to predict a particular patient's response to treatment modalities, including predicting the efficacy of combining different therapy approaches. Even with the most studied and already widely used immune checkpoint inhibitors, such as monoclonal antibodies against PD-1. PD-L1 or CTLA4, most patients do not benefit from treatment owing to primary or acquired therapy resistance or due to heterogeneity in the degree of response among different tumor lesions in the same patient (5,6).

Aspects of the disclosure relate to statistical techniques for analyzing expression data (e.g., RNA expression data) obtained from a biological sample obtained from a subject (e.g., a subject that has cancer, is suspected of having cancer, or is at risk of developing cancer) in order to generate a gene expression signature for the subject (also termed a "TME signature" herein) and to use this signature to identify a particular TME type that the subject may have. The TME signature is composed of a number of functional gene expression signatures (FGES) calculated for genes selected among a number of gene groups and, optionally, one or more Pathway Responsive GENes (PROGENy) scores associated with signaling categories.

The inventors have recognized that TMEs may be separated into phenotypically distinct TME types. For example, the inventors have recognized that TMEs may be characterized as being one of nine phenotypically distinct TME types. In some embodiments, a TME may be characterized as being one of the following nine phenotypically distinct types: Lymphoid-Cell Enriched (IE/L) type; B-Cell Enriched, Angiogenic (IE/B/A) type; Immune-Enriched, Hypoxic (IE/H) type; Highly Immune-Enriched, Inflamed (IE/Inf) type; Immune-Enriched, Fibrotic (IE/F) type; Fibrotic, Angiogenic, Myeloid (F/A/M) type; Fibrotic, Hypoxic (F/H) type; Immune Desert (D) type; and Faintly Infiltrated, Angiogenic (D/A) type. As described further in the Examples, each TME type was identified using a combination of gene group expression scores (e.g., FGESes) and one or more PROGENy signatures, to produce TME signatures that characterize patients' TMEs more accurately than previously developed methods. As described herein, these TME types are useful for identifying the prognosis and/or likelihood that a subject will respond to particular therapeutic interventions (e.g., immunotherapy agents, anti-VEGF agents, tyrosine kinase inhibitors (TKIs), etc.).

The use of TME signatures comprising gene group scores, or combinations of gene group scores, described by the disclosure represents an improvement over previously described molecular characterization of cancer because utilizing one or more of the specific groups of genes, or subsets of genes making up the specific groups of genes, used to produce the TME signatures described herein more accurately reflects the molecular tumor microenvironments of solid tumors because these gene groups have been expanded to include new and additional underlying biological pathways controlling tumor behavior and the host tumor microenvironment. Therefore, including one or more of the groups of genes, or one or more subsets of genes making up the groups of genes provides a more accurate picture of a patient's specific tumor microenvironment. These focused combinations of gene groups (e.g., gene groups consisting of some or all of the gene group genes listed in Table 1 and/or some or all of the gene group genes listed in Table 1 in combination with some or all of the gene group genes listed in Table 2) are unconventional, and differ from previously described molecular signatures, which do not account for the high levels of genotypic and phenotypic heterogeneity within solid tumors of each TME type.

The TME typing methods described herein have several important applications. For example, one application is identifying a subject's TME type using methods described herein may allow for the subject to be diagnosed as having (or being at a high risk of developing) a treatment-resistant form of cancer (e.g., TME type D, P/A/M, IE/F, or F/H) at a timepoint that is not possible with previously described cancer characterization methods. Another application is earlier detection of treatment-resistant cancer types, enabled by the TME signatures described herein, improve the patient diagnostic technology by enabling earlier and more effective therapeutic intervention for patients than currently possible for patients tested for cancer using other methods (e.g., histological analysis).

As described herein, the inventors have also determined that subjects identified by methods described herein as having certain TME types are characterized as having an increased likelihood of responding to certain immunotherapeutic agents and/or combinations of certain immunotherapeutic agents. For example, TME types IE/F or IE/Inf may be characterized as having an increased likelihood of responding to an immune checkpoint inhibitor comprising an anti-IL-6 antibody; TME types P/A/M or F/H may be characterized as having an increased likelihood of responding to an immune checkpoint inhibitor comprising an anti-CD276 antibody; TME types F/A/M or IE/F may be characterized as having an increased likelihood of responding to an immune checkpoint inhibitor comprising an anti-PD-L2 or anti-SIRPa antibody; TME types IE/B/A may be characterized as having an increased likelihood of responding to an immune checkpoint inhibitor comprising an anti-PD-1 antibody; and/or TME types IE/H or IE/Inf may be characterized as having an increased likelihood of responding to an immune checkpoint inhibitor comprising an anti-PDL-1 antibody. The inventors have also determined that subjects having other TME types (e.g., TME type IE/F, F/A/M, or F/H) are characterized has having an increased likelihood of responding to anti-VEGF, anti-TGF-β, and/or anti-PDGFR agents. The inventors have further determined that subjects having other TME types (e.g., TME type IE/F, F/A/M, or F/H) are characterized has having an increased likelihood of responding to a TKI. Thus, the techniques developed by the inventors and described herein improve patient treatment and associated outcomes by increasing patient comfort and avoiding toxic side effects of treatments (e.g., chemotherapy) that are not expected to be effective for the subject.

Tumor Microenvironments

Aspects of the disclosure relate to methods of determining the TME type of a subject having, suspected of having, or at risk of having cancer. As used herein, a subject may be a mammal, for example a human, non-human primate, rodent (e.g., rat, mouse, guinea pig, etc.), dog, cat, horse, etc. In some embodiments, the subject is a human. The terms "individual" or "subject" may be used interchangeably with "patient." As used herein, "cancer" refers to any malignant and/or invasive growth or tumor caused by abnormal cell growth in a subject and characterized by solid tumors. In some embodiments, a cancer is a malignancy in one or more of bones, muscles, and/or organs of the subject, including sarcomas, lymphomas, blastomas, melanomas, germ cell tumors, and/or carcinomas. In some embodiments, a cancer is a malignancy in one or more of the subject's breast tissue, lung tissue, prostate tissue, uterine, ovarian, and/or cervical tissue, gastrointestinal tissue, skin tissue, liver tissue, kidney tissue, and/or brain and/or spinal tissue.

A subject having cancer may exhibit one or more signs or symptoms of cancer, for example the presence of cancerous cells (e.g., tumor cells), lumps on the affected tissue, fever, swelling, bleeding, nausea, vomiting, and/or weight loss. In some embodiments, a subject having cancer does not exhibit one or more signs or symptoms of cancer. In some embodiments, a subject having cancer has been diagnosed by a medical professional (e.g., a licensed physician) as having cancer based upon one or more assays (e.g., clinical assays, molecular diagnostics, etc.) that indicate that the subject has cancer, even in the absence of one or more signs or symptoms.

A subject suspected of having cancer typically exhibits one or more signs or symptoms of cancer. In some embodiments, a subject suspected of having cancer exhibits one or more signs or symptoms of cancer but has not been diagnosed by a medical professional (e.g., a licensed physician) and/or has not received a test result (e.g., a clinical assay, molecular diagnostic, etc.) indicating that the subject has cancer.

A subject at risk of having cancer may or may not exhibit one or more signs or symptoms of cancer. In some embodiments, a subject at risk of having cancer comprises one or more risk factors that increase the likelihood that the subject will develop cancer. Examples of risk factors include the presence of pre-cancerous cells in a clinical sample, having one or more genetic mutations that predispose the subject to developing cancer, taking one or more medications that increase the likelihood that the subject will develop cancer, and/or a family history of cancer.

FIG. 1 is a flowchart of an illustrative process 100 for determining a TME signature for a subject, using the determined TME signature to identify the TME type for the subject, and optionally using the TME type of the subject to identify whether or not the subject is likely to respond to one or more therapeutic treatments and, optionally, treating the subject with the identified treatment or combination of identified treatments.

Various (e.g., some or all) acts of process 100 may be implemented using any suitable computing device(s). For example, in some embodiments, one or more acts of the illustrative process 100 may be implemented in a clinical or laboratory setting. For example, one or more acts of the process 100 may be implemented on a computing device that is located within the clinical or laboratory setting. In some embodiments, the computing device may directly obtain RNA expression data from a sequencing apparatus located within the clinical or laboratory setting. For example, a computing device included in the sequencing apparatus may directly obtain the RNA expression data from the sequencing apparatus. In some embodiments, the computing device may indirectly obtain RNA expression data from a sequencing apparatus that is located within or external to the clinical or laboratory setting. For example, a computing device that is located within the clinical or laboratory setting may obtain expression data via a communication network, such as Internet or any other suitable network, as aspects of the technology described herein are not limited to any particular communication network.

Additionally or alternatively, one or more acts of the illustrative process 100 may be implemented in a setting that is remote from a clinical or laboratory setting. For example, the one or more acts of process 100 may be implemented on a computing device that is located externally from a clinical or laboratory setting. In this case, the computing device may indirectly obtain RNA expression data that is generated using a sequencing apparatus located within or external to a clinical or laboratory setting. For example, the expression data may be provided to computing device via a communication network, such as Internet or any other suitable network.

It should be appreciated that, in some embodiments, not all acts of process 100, as illustrated in FIG. 1, may be implemented using one or more computing devices. For example, the act 114 of administering one or more therapies to the subject may be implemented manually (e.g., by a clinician).

Process 100 begins optionally at act 102 where sequencing data for a subject is obtained. In some embodiments, the sequencing data may be obtained by sequencing a biological sample (e.g., a biopsy sample and/or tissue obtained from a solid tumor) obtained from the subject using any suitable sequencing technique. The sequencing data may include sequencing data of any suitable type, from any suitable source, and be in any suitable format. Examples of sequencing data, sources of sequencing data, and formats of sequencing data are described herein including in the section called "Obtaining RNA Expression Data."

As one illustrative example, in some embodiments, the sequencing data may comprise bulk sequencing data. The bulk sequencing data may comprise at least 1 million reads, at least 5 million reads, at least 10 million reads, at least 20 million reads, at least 50 million reads, or at least 100 million reads. In some embodiments, the sequencing data comprises bulk RNA sequencing (RNA-seq) data, single cell RNA sequencing (scRNA-seq) data, whole exome sequencing (WES) data, targeted exome sequencing (TES) data, and/or next generation sequencing (NGS) data. In some embodiments, the sequencing data comprises microarray data.

Next, process 100 proceeds optionally to act 104, where the sequencing data obtained at act 102 is processed to obtain RNA expression data. This may be done in any suitable way and may involve normalizing bulk sequencing data to transcripts-per-million (TPM) units (or other units) and/or log transforming the RNA expression levels in TPM units. Converting the data to TPM units and normalization are described herein including with reference to FIG. 2.

Next, process 100 proceeds to act 106, where a tumor microenvironment (TME) signature is generated for the subject using the obtained RNA expression data (e.g., as generated at act 104 from bulk-sequencing data, converted to TPM units and subsequently log-normalized, as described herein including with reference to FIG. 2). As described herein, in some embodiments, a TME signature comprises two or more (e.g., 2, 3, 4, 5, 6, 7, 8, 9, 10, 11, 12, 13, 14, 15, 16, 17, 18, 19, 20, 21, 22, 23, 24, 25, 26, 27, 28, etc.) gene group scores. In some embodiments, the two or more gene group scores comprise gene group scores (which may also be referred to as gene group enrichment scores or gene group expression scores) for some or all of the gene groups shown in Table 1. In some embodiments, the two or more gene group scores comprise gene group scores for some or all of the gene groups shown in Table 1 and also for some or all of the gene groups shown in Table 2.

Accordingly, act 106 comprises: act 106a where the gene group scores are determined using the RNA expression data and act 106b where the TME signature is determined using the gene group scores determined at act 106a. In some embodiments, determining the gene group scores comprises determining, for each of multiple (e.g., some or all of the) gene groups listed in Table 1, a respective gene group score. In some embodiments, determining the gene group scores comprises determining, for each of multiple (e.g., some or all of the) gene groups listed in Table 1 in combination with each of multiple gene groups listed in Table 2, a respective gene group score. In some embodiments, determining the gene group scores comprises determining respective gene group scores for 2, 3, 4, 5, 6, 7, 8, 9, 10, 11, 12, 13, 14, 15, 16, 17, 18, 19, 20, 21, 22, 23, 24, 25, 26, 27, or 28 gene groups (e.g., gene groups listed in Table 1 or gene groups listed in Table 1 in combination with gene groups listed in Table 2).

In some embodiments, the gene group score for a particular gene group may be determined using RNA expression levels for at least some of the genes in the gene group (e.g., the RNA expression levels obtained at act 104). The RNA expression levels may be processed using a gene set enrichment analysis (GSEA) technique to determine the score for the particular gene group. Aspects of determining the gene group scores are described herein, including with reference to FIG. 4 and in the Section titled "Gene Expression Signatures."

For example, in some embodiments, determining the TME signature comprises: determining gene group scores using the RNA expression levels for at least three genes from each of at least two of the gene groups, the gene groups including: MHC II group: HLA-DRB1, HLA-DMA, HLA-DRA, HLA-DQB1, CHITA, HLA-DPB1, HLA-DMB, HLA-DQA1, and HLA-DPA1; NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160; B cells group: PAX5, MS4A1, CD19, CR2, TNFRSF13B, TNFRSF13C, TNFRSF17, CD79B, BLK, CD22, CD79A, STAP1, and FCRL5; CD8 T cells group: KLRK1, CD8B, CD8A, PRF1, EOMES, TRAT1, GZMB, GZMA, GZMK, ZAP70, NKG7, and TBX21; cDC1 group: XCR1, CLEC9A, C1orf54, BATF3, WDFY4, and HLA-DOB; cDC2 group: ITGAX, HLA-DRA, HLA-DRB1, CD1C, FCER1A, CLEC10A, and AMICA1; pDC group: IL3RA, CLEC4C, CCR2, CXCR3, GZMB, DERL3, LILRA4, and SCT; Proliferation rate group: CETN3, CCNB1, CCND1, CCNE1, MCM6, PLK1, CDK2, AURKB, ESCO2, AURKA, MCM2, MKI67, E2F1, BUB1, and MYBL2; T cells group: ITK, CD3G, CD3D, TRBC1, CD3E, TRAT1, TRAC, TRBC2, CD28, CD5, and TBX21; M1 cytokines group: CXCL10, IL23A, IL1B, IL12B, TNF, and CXCL9; Panmacrophage signature group: C1QC, CSF1R, CD163, SIGLEC1, C1QA, VSIG4, MSR1, and CD68; TLS group: CXCL10, SELL, LAMP3, FDCSP, CD86, CXCL13, PTPRCAP, CCR7, LTA, CXCR3, CCL21, CCL19, JCHAIN, CXCL9, and TNERSF17; Proinflammatory cytokines group: IL23A, IFNB1, IL1A, IL1B, TNF, CXCL2, IL6, IL26, CCL2, CCL4, LIF, and CCL3; Antitumor chemokines group: CXCL10, CXCL9, CXCL13, XCL1, CCL5, CCL21, CCL19, and XCL2; Pro-tumor chemokines group: CCL26, CXCL6, CCL20, CXCL8, CXCL1, CCL18, CCL17, and CCL22; Myeloid checkpoints group: PDCD1LG2, HAVCR2, CD274, and C10orf54; Lymphoid checkpoints group: BTLA, TIGIT, LAG3, PVRIG, PDCD1, and CTLA4; Cytotoxic cell inactivation group: PIM2, SERPINB9, LGALS9, CD5, KLRB1, FASLG, KLRD1, LAIR1, LAIR2, and SIGLEC7; Treg cells group: CCR8, TNFRSF18, FOXP3, IKZF2, CTLA4, IKZF4, and IL2RA; Breg group: ZBTB32, NFKBID, SOX5, EBI3, and ZBTB20; Myeloid suppression group: IL10, FGL2, EBI3, CYBB, IL4I1, TGFBI, IDO1, PTGS2, and MSR1; Phagocytosis inhibition group: LILRB3, LILRB1, FCGR2B, LILRB4, SIRPA, SIGLEC10, LILRB2, PECAM1, CD300A, CD300LF, and CD33; Stromal suppression group: IL11, TGFB2, TDO2, TSLP, IL6, TGFB3, and TGFBI; Exclusion group: GAS6, VEGFA, PDGFC, FGF2, EDNRB, TNFAIP6, and CXCL12; Matrix group: VTN, ELN, COL11A1, COL4A1, INC, COL1A1, COL1A2, COL3A1, LAMA3, LGALS9, FN1, COL5A1, LAMB3, LGALS7, and LAMC2; Endothelium group: ECSCR, NOS3, MMRN1, VWF, CLEC14A, FLT1, KDR, ROBO4, ENG, CDH5, and MMRN2; CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2; Matrix remodeling group: LOX, MMP12, MMP9, PLOD2, ADAMTS5, MMP3, ADAMTS4, MMP11, MMP1, CA9, MMP2, and MMP7; Angiogenesis group: VEGFA, TEK, PDGFC, VWF, CXCR2, ANGPT1, FLT1, KDR, ANGPT2, VEGFB, VEGFC, PGF, and CDH5; EMT signature group: RUNX2, FOXM1, SNAI1, TWIST1, and SNAI2; Adipocytes group: GPD1, LBP, PTGER3, DLAT, FABP4, LEP, PLIN1, ADIPOQ, PPP1R1A, ADH1B, LIPE, and COL4A4; Metastasis signature group: MMP9, HPSE, PARP1, CDH2, RCC2, and SERPINH1; Metabolic suppression of CTL group: SPHK1, MSR1, ADORA2A, and ENTPD1; Hypoxia factors group: LOX, FUT11, PGK1, CA12, TPI1, PDK1, EPAS1, LDHA, SLC2A1, PFKFB3, P4HA1, ALDOA, CA9, HK2, and NDRG1; Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1; Acidosis group: SLC16A1, SLC16A4, MAPK14, and SLC9A1; Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3; Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2; and Glycolysis group: ALDOA, TPI1, GPD2, PGK1, LDHA, PFKP, BPGM, ENO1, GPI, and SLC16A3.

As described above, at act 106b, the TME signature is generated. In some embodiments, the TME signature consists of only gene group scores for one or more (e.g., all) of the gene groups listed in Table 1. In some embodiments, the TME signature consists of only gene group scores for one or more (e.g., all) of the gene groups listed in Table 1 and for one or more (e.g., all) of the gene groups listed in Table 2. In some embodiments, the TME signature comprises gene group scores for at least 2, 3, 4, 5, 6, 7, 8, 9, 10, 11, 12, 13, 14, 15, 16, 17, 18, 19, 20, 21, 22, 23, 24, 25, 26, 27, 28, or 29 gene groups listed in Table 1. In some embodiments, the TME signature also comprises gene group scores for at least 2, 3, 4, 5, 6, 7, 8, 9, 10, or 11 gene groups listed in Table 2. In some embodiments, each gene group score for a particular gene group is determined using RNA expression levels of some or all (e.g., at least 2, 3, 4, 5, 6, 7, 8, 9, 10, 11, 12, 13, 14, 15, 16, 17, 18, 19, 20, etc.) of the genes of each gene group listed in Table 1. In some embodiments, each gene group score for a particular gene group is further determined using RNA expression levels of some or all (e.g., at least 2, 3, 4, 5, 6, 7, 8, 9, 10, 11, 12, 13, 14, 15, 16, 17, 18, 19, 20, etc.) of the genes of each gene group listed in Table 2. In other embodiments, the TME signature includes one or more other gene group scores in addition to the gene group scores listed in Table 1.

In some embodiments, determining the gene group scores further comprises determining one or more PROGENy signatures describing signaling pathway activity. For example, PROGENy signatures may be determined for one or more signaling types listed in Table 3. The PROGENy signatures may be determined as described by: Schubert, M., Klinger, B., Klünemann, M. et al. Perturbation-response genes reveal signaling footprints in cancer gene expression. *Nat Commun* 9, 20 (2018). The PROGENy signatures may additionally or alternatively be determined as described by: Bagaev A, Kotlov N, et al. Conserved pan-cancer microenvironment subtypes predict response to immunotherapy. *Cancer Cell.* 14; 39(6): 845-865.e7 (2021). In some embodiments, the TME signature consists of gene group scores for one or more of the gene groups listed in Table 1 and for one or more of the signaling types listed in Table 3. In some embodiments, the TME signature consists of gene group scores for one or more of the gene groups listed in Table 1, for one or more of the gene groups listed in Table 2, and for one or more of the signaling types listed in Table 3.

Next, process 100 proceeds to act 108, where a TME type is identified for the subject using the TME signature generated at act 106*b*. This may be done in any suitable way. For example, in some embodiments, each of the possible TME types is associated with a respective plurality of TME signature clusters. In such embodiments, a TME type for the subject may be identified by associating the TME signature of the subject with a particular one of the plurality of TME signature clusters; and identifying the TME type for the subject as the TME type corresponding to the particular one of the plurality of TME signature clusters to which the TME signature of the subject is associated. Examples of TME types are described herein. Aspects of identifying a TME type for a subject are described herein including in the section herein titled "Generating TME Signature and Identifying TME Type."

In some embodiments, the TME type of a subject is identified to be one of the following TME types: Lymphoid-Cell Enriched (IE/L) type; B-Cell Enriched, Angiogenic (IE/B/A) type; Immune-Enriched, Hypoxic (IE/H) type; Highly Immune-Enriched, Inflamed (IE/Inf) type; Immune-Enriched, Fibrotic (IE/F) type; Fibrotic, Angiogenic, Myeloid (F/A/M) type; Fibrotic, Hypoxic (F/H) type; Immune Desert (D) type; and Faintly Infiltrated, Angiogenic (D/A) type.

In some embodiments, the subject's likelihood of responding to a therapy is identified using the TME type identified at act 108. In some embodiments, when a subject is identified as having a TME type IE/F or IE/Inf at act 108, the subject is identified as having an increased likelihood of responding to an immunotherapy (e.g., an anti-IL-6 antibody) relative to a subject having other TME types. In some embodiments, when a subject is identified as having a TME type F/A/M or F/H at act 108, the subject is identified as having an increased likelihood of responding to an immunotherapy (e.g., an anti-CD276 antibody) relative to a subject having other TME types. In some embodiments, when a subject is identified as having a TME type F/A/M or IE/F at act 108, the subject is identified as having an increased likelihood of responding to an immunotherapy (e.g., an anti-PD-L2 or an anti-SIRPa antibody) relative to a subject having other TME types. In some embodiments, when a subject is identified as having a TME type IE/B/A at act 108, the subject is identified as having an increased likelihood of responding to an immunotherapy (e.g., an anti-PD-1 antibody) relative to a subject having other TME types. In some embodiments, when a subject is identified as having a TME type IE/H or IE/Inf at act 108, the subject is identified as having an increased likelihood of responding to an immunotherapy (e.g., an anti-PDL-1 antibody) relative to a subject having other TME types. In some embodiments, when a subject is identified as having a TME type IE/F, F/A/M, or F/H at act 108, the subject is identified as having an increased likelihood of responding to an anti-VEGF, anti-TGF-β, and/or an anti-PDGFR therapy relative to a subject having other TME types. In some embodiments, when a subject is identified as having a TME type IE/F, F/A/M, or F/H at act 108, the subject is identified as having an increased likelihood of responding to a TKI relative to a subject having other TME types. Aspects of identifying whether or not a subject is likely to respond to a therapy are described herein including in the section below titled "Therapeutic Indications."

In some embodiments, process 100 completes after act 108 completes. In some such embodiments, the determined TME signature and/or identified TME type, and/or the identified likelihood the subject will respond to a therapy may be stored for subsequent use, provided to one or more recipients (e.g., a clinician, a researcher, etc.), and/or used to update the TME signature clusters (as described herein).

However, in some embodiments, one or more other acts are performed after act 108. For example, in the illustrated embodiment of FIG. 1, process 100 may include one or more of optional acts 110, 112, and/or 114. For example, at act 110, a prognosis may be identified for the subject. In some embodiments, the TME type identified for a subject may be associated with a prognostic outcome, and a prognosis may be determined for the subject using the identified TME type. For example, subjects identified as having a TME type that is one of the Lymphoid-Cell Enriched (IE/L) type, the B-Cell Enriched, Angiogenic (IE/B/A) type, the Immune-Enriched, Hypoxic (IE/H) type, the Highly Immune-Enriched, Inflamed (IE/Inf) type, and/or the Faintly Infiltrated, Angiogenic (D/A) type may be identified as being likely to have a good prognosis. In contrast, subjects identified as having a TME type that is one of the Immune-Enriched, Fibrotic (IE/F) type, the Fibrotic, Angiogenic, Myeloid (F/A/M) type, the Fibrotic, Hypoxic (F/H) type, and/or the Immune Desert (D) type may be identified as being likely to have a poor prognosis.

As used herein, the term "poor prognosis" refers to a subject that is unlikely to survive 5 years, 4 years, 3 years, 2 years, or 1 year from testing. The term "unlikely" means that on average this applies to greater than 60% of subjects. As used herein, the term "good prognosis" means that a subject is likely to survive for at least 5 years 4 years, 3 years, 2 years, or 1 year from testing. The term "likely" means that on average this applies to greater than 60% of subjects.

In another example, if a subject is identified as having TME type IE/F or IE/Inf at act 108, the subject is identified as having an increased likelihood of a good prognosis in responding to an immunotherapy such as an anti-IL-6 antibody. The subject is then administered one or more immunotherapies, including an anti-IL-6 antibody, at act 114. Examples of immunotherapies and other therapies are provided herein.

It should be appreciated that although acts 102, 104, 110, 112, and 114 are indicated as optional in the example of FIG. 1, in other embodiments, one or more other acts may be optional (in addition to or instead of acts 102, 104, 110, 112, and 114). For example, in some embodiments, acts 102 and 104 may be optional (e.g., when the sequencing data is obtained and processed to obtain RNA expression data previously, process 100 may begin at act 106 by accessing the previously obtained RNA expression data). In some embodiments, the process 100 may comprise acts 102, 104, 106, 108 and 114, without acts 110 and 112. In some embodiments, the process 100 may comprise acts 102, 104, 106, 108, 112, and 114 without act 110.

TABLE 1

Certain gene expression signatures associated with cell activity and used to generate TME Signatures

| Name | Genes |
| --- | --- |
| Conventional dendritic cells type 1 (cDC1) | XCR1, CLEC9A, C1orf54, BATF3, WDFY4, HLA-DOB |
| Conventional dendritic cells type 2 (cDC2) | ITGAX, HLA-DRA, HLA-DRB1, CD1C, FCER1A, CLEC10A, AMICA1 |
| Plasmacytoid dendritic cells (pDC) | IL3RA, CLEC4C, CCR2, CXCR3, GZMB, DERL3, LILRA4, SCT |
| M1 cytokines | CXCL10, IL23A, IL1B, IL12B, TNF, CXCL9 |
| Panmacrophage signature | C1QC, CSF1R, CD163, SIGLEC1, C1QA, VSIG4, MSR1, CD68 |
| Tertiary Lymphoid Structure (TLS) | CXCL10, SELL, LAMP3, FDCSP, CD86, CXCL13, PTPRCAP, CCR7, LTA, CXCR3, CCL21, CCL19, JCHAIN, CXCL9, TNFRSF17 |
| Proinflammatory cytokines | IL23A, IFNB1, IL1A, IL1B, TNF, CXCL2, IL6, IL26, CCL2, CCL4, LIF, CCL3 |
| Anti-tumor Chemokines | CXCL10, CXCL9, CXCL13, XCL1, CCL5, CCL21, CCL19, XCL2 |
| Pro-tumor chemokines | CCL26, CXCL6, CCL20, CXCL8, CXCL1, CCL18, CCL17, CCL22 |
| Myeloid checkpoints | PDCD1LG2, HAVCR2, CD274, C10orf54 |
| Lymphoid checkpoints | BTLA, TIGIT, LAG3, PVRIG, PDCD1, CTLA4 |
| Cytotoxic cell inactivation | PIM2, SERPINB9, LGALS9, CD5, KLRB1, FASLG, KLRD1, LAIR1, LAIR2, SIGLEC7 |
| Regulatory B (Breg) cells | ZBTB32, NFKBID, SOX5, EBI3, ZBTB20 |
| Myeloid suppression | IL10, FGL2, EBI3, CYBB, IL4I1, TGFBI, IDO1, PTGS2, MSR1 |
| Phagocytosis inhibition | LILRB3, LILRB1, FCGR2B, LILRB4, SIRPA, SIGLEC10, LILRB2, PECAM1, CD300A, CD300LF, CD33 |
| Stromal suppression | IL11, TGFB2, TDO2, TSLP, IL6, TGFB3, TGFBI |
| Exclusion of cytotoxic T lympocytes (CTL) | GAS6, VEGFA, PDGFC, FGF2, EDNRB, TNFAIP6, CXCL12 |
| Endothelium | ECSCR, NOS3, MMRN1, VWF, CLEC14A, FLT1, KDR, ROBO4, ENG, CDH5, MMRN2 |
| Carcinogenic-associated fibroblast (CAF) | FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, ACTA2 |
| Epithelial-mesenchymal transition (EMT) signature | RUNX2, FOXM1, SNAI1, TWIST1, SNAI2 |
| Adipocytes | GPD1, LBP, PTGER3, DLAT, FABP4, LEP, PLIN1, ADIPOQ, PPP1R1A, ADH1B, LIPE, COL4A4 |
| Metastasis signature | MMP9, HPSE, PARP1, CDH2, RCC2, SERPINH1 |
| Metabolic suppression of CTL | SPHK1, MSR1, ADORA2A, ENTPD1 |
| Hypoxia factors | LOX, FUT11, PGK1, CA12, TPI1, PDK1, EPAS1, LDHA, SLC2A1, PFKFB3, P4HA1, ALDOA, CA9, HK2, NDRG1 |
| Autophagy | ATG12, ATG9A, TFEB, RB1CC1, MAP1LC3B, GABARAPL2, ATG4B, ATG7, GABARAP, VMP1, ATG14, GABARAPL1, ATG13, NBR1 |
| Acidosis | SLC16A1, SLC16A4, MAPK14, SLC9A1 |
| Senescence | CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, ATF3 |
| Apoptosis | BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, CASP8AP2 |
| Glycolysis | ALDOA, TPI1, GPD2, PGK1, LDHA, PFKP, BPGM, ENO1, GPI, SLC16A3 |

TABLE 2

Additional gene expression signatures associated with immune escape mechanisms and used to generate TME Signatures

| Name | Genes |
| --- | --- |
| Major histocompatibility complex (MHC) class II cells | HLA-DRB1, HLA-DMA, HLA-DRA, HLA-DQB1, CIITA, HLA-DPB1, HLA-DMB, HLA-DQA1, HLA-DPA1 |
| NK cells | GNLY, KLRK1, KLRF1, GZMH, NCR3, EOMES, NCR1, SH2D1B, IFNG, CD226, FGFBP2, KLRC2, GZMB, KIR2DL4, NKG7, CD244, CD160 |
| B cells | PAX5, MS4A1, CD19, CR2, TNFRSF13B, TNFRSF13C, TNFRSF17, CD79B, BLK, CD22, CD79A, STAP1, FCRL5 |
| CD8 T cells | KLRK1, CD8B, CD8A, PRF1, EOMES, TRAT1, GZMB, GZMA, GZMK, ZAP70, NKG7, TBX21 |
| Proliferation rate | CETN3, CCNB1, CCND1, CCNE1, MCM6, PLK1, CDK2, AURKB, ESCO2, AURKA, MCM2, MKI67, E2F1, BUB1, MYBL2 |
| T cells | ITK, CD3G, CD3D, TRBC1, CD3E, TRAT1, TRAC, TRBC2, CD28, CD5, TBX21 |
| Regulatory T (Treg) cells | CCR8, TNFRSF18, FOXP3, IKZF2, CTLA4, IKZF4, IL2RA |
| Matrix | VTN, ELN, COL11A1, COL4A1, TNC, COL1A1, COL1A2, COL3A1, LAMA3, LGALS9, FN1, COL5A1, LAMB3, LGALS7, LAMC2 |
| Matrix remodeling | LOX, MMP12, MMP9, PLOD2, ADAMTS5, MMP3, ADAMTS4, MMP11, MMP1, CA9, MMP2, MMP7 |
| Angiogenesis | VEGFA, TEK, PDGFC, VWF, CXCR2, ANGPT1, FLT1, KDR, ANGPT2, VEGFB, VEGFC, PGF, CDH5 |

TABLE 3

Signaling types calculated using PROGENy and used to generate TME Signatures

EGFR signaling
Hypoxia signaling
MAPK signaling
PI3K signaling
TGF-β signaling
Trail signaling Biological Samples Aspects of the disclosure relate to methods for determining a tumor microenvironment (TME) type of a subject by obtaining sequencing data from a biological sample that has been obtained from the subject.

Aspects of the disclosure also relate to methods for determining TME types of a reference cohort of subjects by obtaining sequencing data from biological samples that have been obtained from the subjects in the reference cohort.

The biological sample may be from any source in the subject's body including, but not limited to, any fluid such as blood (e.g., whole blood, blood serum, or blood plasma), lymph node, breast, etc. Other source in the subject's body may be from saliva, tears, synovial fluid, cerebrospinal fluid, pleural fluid, pericardial fluid, ascitic fluid, and/or urine, hair, skin (including portions of the epidermis, dermis, and/or hypodermis), oropharynx, laryngopharynx, esophagus, bronchus, salivary gland, tongue, oral cavity, nasal cavity, vaginal cavity, anal cavity, bone, bone marrow, brain, thymus, spleen, appendix, colon, rectum, anus, liver, biliary tract, pancreas, kidney, ureter, bladder, urethra, uterus, vagina, vulva, ovary, cervix, scrotum, penis, prostate, testicle, seminal vesicles, and/or any type of tissue (e.g., muscle tissue, epithelial tissue, connective tissue, or nervous tissue).

The biological sample may be any type of sample including, for example, a sample of a bodily fluid, one or more cells, one or more pieces of tissue(s) or organ(s). In some embodiments, the biological sample comprises tissue sample of the subject. In some embodiments, a tissue sample comprises one or more cell types derived from an organ (e.g., epithelial cells, adipocytes, muscle cells, cartilage cells, bone cells, basal/myoepithelial cells, etc.). In some embodiments, a tissue sample comprises tumor cells. For example, the biological sample may be a sample acquired from a tumor biopsy and/or a resected tumor.

In some embodiments, a tissue sample may be obtained from a subject using a surgical procedure (e.g., laparoscopic surgery, microscopically controlled surgery, or endoscopy), bone marrow biopsy, punch biopsy, endoscopic biopsy, or needle biopsy (e.g., a fine-needle aspiration, core needle biopsy, vacuum-assisted biopsy, or image-guided biopsy).

A sample of lymph node or blood, in some embodiments, refers to a sample comprising cells, e.g., cells from a blood sample or lymph node sample. In some embodiments, the sample comprises non-cancerous cells. In some embodiments, the sample comprises pre-cancerous cells. In some embodiments, the sample comprises cancerous cells. In some embodiments, the sample comprises blood cells. In some embodiments, the sample comprises lymph node cells. In some embodiments, the sample comprises lymph node cells and blood cells.

A sample of blood may be a sample of whole blood or a sample of fractionated blood. In some embodiments, the sample of blood comprises whole blood. In some embodiments, the sample of blood comprises fractionated blood. In some embodiments, the sample of blood comprises buffy coat. In some embodiments, the sample of blood comprises serum. In some embodiments, the sample of blood comprises plasma. In some embodiments, the sample of blood comprises a blood clot.

In some embodiments, a sample of blood is collected to obtain the cell-free nucleic acid (e.g., cell-free DNA) in the blood.

In some embodiments, the sample may be from a cancerous tissue or an organ or a tissue or organ suspected of having one or more cancerous cells. In some embodiments, the sample may be from a healthy (e.g., non-cancerous) tissue or organ. In some embodiments, a sample from a subject (e.g., a biopsy from a subject) may include both healthy and cancerous cells and/or tissue. In certain embodiments, one sample will be taken from a subject for analysis. In some embodiments, more than one (e.g., 2, 3, 4, 5, 6, 7, 8, 9, 10, 11, 12, 13, 14, 15, 16, 17, 18, 19, 20, or more) samples may be taken from a subject for analysis. In some embodiments, one sample from a subject will be analyzed. In certain embodiments, more than one (e.g., 2, 3, 4, 5, 6, 7, 8, 9, 10, 11, 12, 13, 14, 15, 16, 17, 18, 19, 20, or more) samples may be analyzed. If more than one sample from a subject is analyzed, the samples may be procured at the same time (e.g., more than one sample may be taken in the same procedure), or the samples may be taken at different times (e.g., during a different procedure including a procedure 1, 2, 3, 4, 5, 6, 7, 8, 9, 10 days; 1, 2, 3, 4, 5, 6, 7, 8, 9, 10 weeks; 1, 2, 3, 4, 5, 6, 7, 8, 9, 10 months, 1, 2, 3, 4, 5, 6, 7, 8, 9, 10 years, or 1, 2, 3, 4, 5, 6, 7, 8, 9, 10 decades after a first procedure). A second or subsequent sample may be taken or obtained from the same region (e.g., from the same tumor or area of tissue) or a different region (including, e.g., a different tumor). A second or subsequent sample may be taken or obtained from the subject after one or more treatments and may be taken from the same region or a different region. As a non-limiting example, the second or subsequent sample may be useful in determining whether the cancer in each sample has different characteristics (e.g., in the case of samples taken from two physically separate tumors in a patient) or whether the cancer has responded to one or more treatments (e.g., in the case of two or more samples from the same tumor prior to and subsequent to a treatment).

Any of the biological samples described herein may be obtained from the subject using any known technique. See, for example, the following publications on collecting, processing, and storing biological samples, each of which is incorporated by reference herein in its entirety: Biospecimens and biorepositories: from afterthought to science by Vaught et al. (Cancer Epidemiol Biomarkers Prev. 2012 February: 21(2):253-5), and Biological sample collection, processing, storage and information management by Vaught and Henderson (IARC Sci Publ. 2011; (163):23-42).

Any of the biological samples from a subject described herein may be stored using any method that preserves stability of the biological sample. In some embodiments, preserving the stability of the biological sample means inhibiting components (e.g., DNA, RNA, protein, or tissue structure or morphology) of the biological sample from degrading until they are measured so that when measured, the measurements represent the state of the sample at the time of obtaining it from the subject. In some embodiments, a biological sample is stored in a composition that is able to penetrate the same and protect components (e.g., DNA, RNA, protein, or tissue structure or morphology) of the biological sample from degrading. As used herein, degradation is the transformation of a component from one form to another form such that the first form is no longer detected at the same level as before degradation.

In some embodiments, the biological sample is stored using cryopreservation. Non-limiting examples of cryopreservation include, but are not limited to, step-down freezing, blast freezing, direct plunge freezing, snap freezing, slow freezing using a programmable freezer, and vitrification. In some embodiments, the biological sample is stored using lyophilization. In some embodiments, a biological sample is placed into a container that already contains a preservant (e.g., RNALater to preserve RNA) and then frozen (e.g., by snap-freezing), after the collection of the biological sample from the subject. In some embodiments, such storage in a frozen state is done immediately after collection of the biological sample. In some embodiments, a biological sample may be kept at either room temperature or 4° C. for some time (e.g., up to an hour, up to 8 hours, up to one day, up to two days, or a few days) in a preservant or in a buffer without a preservant, before being frozen.

Non-limiting examples of preservants include formalin solutions, formaldehyde solutions, RNALater or other equivalent solutions, TriZol or other equivalent solutions, DNA/RNA Shield or equivalent solutions, EDTA (e.g., Buffer AE (10 mM Tris-Cl; 0.5 mM EDTA, pH 9.0)) and other coagulants, and Acids Citrate Dextrose (e.g., for blood specimens).

In some embodiments, special containers may be used for collecting and/or storing a biological sample. For example, a vacutainer may be used to store blood. In some embodiments, a vacutainer may comprise a preservant (e.g., a coagulant, or an anticoagulant). In some embodiments, a container in which a biological sample is preserved may be contained in a secondary container, for the purpose of better preservation, or for the purpose of avoid contamination.

Any of the biological samples from a subject described herein may be stored under any condition that preserves stability of the biological sample. In some embodiments, the biological sample is stored at a temperature that preserves stability of the biological sample. In some embodiments, the sample is stored at room temperature (e.g., 25° C.). In some embodiments, the sample is stored under refrigeration (e.g., 4° C.). In some embodiments, the sample is stored under freezing conditions (e.g., −20° C.). In some embodiments, the sample is stored under ultralow temperature conditions (e.g., −50° C. to −800° C.). In some embodiments, the sample is stored under liquid nitrogen (e.g., −1700° C.). In some embodiments, a biological sample is stored at −60° C. to-8-° C. (e.g., −70° C.) for up to 5 years (e.g., up to 1 month, up to 2 months, up to 3 months, up to 4 months, up to 5 months, up to 6 months, up to 7 months, up to 8 months, up to 9 months, up to 10 months, up to 11 months, up to 1 year, up to 2 years, up to 3 years, up to 4 years, or up to 5 years). In some embodiments, a biological sample is stored as described by any of the methods described herein for up to 20 years (e.g., up to 5 years, up to 10 years, up to 15 years, or up to 20 years).

Obtaining RNA Expression Data

Aspects of the disclosure relate to methods of determining a TME type of a subject using sequencing data or RNA expression data obtained from a biological sample from the subject.

The RNA expression data used in methods described herein typically is derived from sequencing data obtained from the biological sample.

The sequencing data may be obtained from the biological sample using any suitable sequencing technique and/or apparatus. In some embodiments, the sequencing apparatus used to sequence the biological sample may be selected from any suitable sequencing apparatus known in the art including, but not limited to, Illumina™, SOLid™, Ion Torrent™, PacBio™, a nanopore-based sequencing apparatus, a Sanger sequencing apparatus, or a 454TM sequencing apparatus. In some embodiments, sequencing apparatus used to sequence the biological sample is an Illumina sequencing (e.g., NovaSeq™, NextSeq™, HiSeq™, MiSeq™, or MiniSeq™) apparatus.

After the sequencing data is obtained, it is processed in order to obtain the RNA expression data. RNA expression data may be acquired using any method known in the art including, but not limited to whole transcriptome sequencing, whole exome sequencing, targeted exome sequencing, total RNA sequencing, mRNA sequencing, targeted RNA sequencing, RNA exome capture sequencing, next generation sequencing, and/or deep RNA sequencing. In some embodiments, RNA expression data may be obtained using a microarray assay.

In some embodiments, the sequencing data is processed to produce RNA expression data. In some embodiments, RNA sequence data is processed by one or more bioinformatics methods or software tools, for example RNA sequence quantification tools (e.g., Kallisto) and genome annotation tools (e.g., Gencode v23), in order to produce expression data. The Kallisto software is described in Nicolas L Bray, Harold Pimentel, Páll Melsted and Lior Pachter, Near-optimal probabilistic RNA-seq quantification, Nature Biotechnology 34, 525-527 (2016), doi: 10.1038/nbt.3519, which is incorporated by reference in its entirety herein.

In some embodiments, microarray expression data is processed using a bioinformatics R package, such as "affy" or "limma," in order to produce expression data. The "affy" software is described in Bioinformatics. 2004 Feb. 12; 20(3):307-15. doi: 10.1093/bioinformatics/btg405. "affy—analysis of Affymetrix GeneChip data at the probe level" by Laurent Gautier 1, Leslie Cope, Benjamin M Bolstad, Rafael A Irizarry PMID: 14960456 DOI: 10.1093/bioinformatics/btg405, which is incorporated by reference herein in its entirety. The "limma" software is described in Ritchie M E, Phipson B, Wu D, Hu Y, Law C W, Shi W, Smyth G K "limma powers differential expression analyses for RNA-sequencing and microarray studies." Nucleic Acids Res. 2015 Apr. 20; 43(7):e47. 20. doi.org/10.1093/nar/gkv007PMID: 25605792, PMCID: PMC4402510, which is incorporated by reference herein its entirety.

In some embodiments, sequencing data and/or expression data comprises more than 5 kilobases (kb). In some embodiments, the size of the obtained RNA data is at least 10 kb. In some embodiments, the size of the obtained RNA sequencing data is at least 100 kb. In some embodiments, the size of the obtained RNA sequencing data is at least 500 kb. In some embodiments, the size of the obtained RNA sequencing data is at least 1 megabase (Mb). In some embodiments, the size of the obtained RNA sequencing data is at least 10 Mb. In some embodiments, the size of the obtained RNA sequencing data is at least 100 Mb. In some embodiments, the size of the obtained RNA sequencing data is at least 500 Mb. In some embodiments, the size of the obtained RNA sequencing data is at least 1 gigabase (Gb). In some embodiments, the size of the obtained RNA sequencing data is at least 10 Gb. In some embodiments, the size of the obtained RNA sequencing data is at least 100 Gb. In some embodiments, the size of the obtained RNA sequencing data is at least 500 Gb.

In some embodiments, the expression data is acquired through bulk RNA sequencing. Bulk RNA sequencing may include obtaining expression levels for each gene across RNA extracted from a large population of input cells (e.g., a mixture of different cell types.) In some embodiments, the expression data is acquired through single cell sequencing (e.g., scRNA-seq). Single cell sequencing may include sequencing individual cells.

In some embodiments, bulk sequencing data comprises at least 1 million reads, at least 5 million reads, at least 10 million reads, at least 20 million reads, at least 50 million reads, or at least 100 million reads. In some embodiments, bulk sequencing data comprises between 1 million reads and 5 million reads, 3 million reads and 10 million reads, 5 million reads and 20 million reads, 10 million reads and 50 million reads, 30 million reads and 100 million reads, or 1 million reads and 100 million reads (or any number of reads including, and between).

In some embodiments, the expression data comprises next-generation sequencing (NGS) data. In some embodiments, the expression data comprises microarray data.

Expression data (e.g., indicating expression levels) for a plurality of genes may be used for any of the methods or compositions described herein. The number of genes which may be examined may be up to and inclusive of all the genes of the subject. In some embodiments, expression levels may be determined for all of the genes of a subject. As a non-limiting example, four or more, five or more, six or more, seven or more, eight or more, nine or more, ten or more, eleven or more, twelve or more, 13 or more, 14 or more, 15 or more, 16 or more, 17 or more, 18 or more, 19 or more, 20 or more, 21 or more, 22 or more, 23 or more, 24 or more, 25 or more, 26 or more, 27 or more, 28 or more, 29 or more, 30 or more, 35 or more, 40 or more, 50 or more, 60 or more, 70 or more, 80 or more, 90 or more, 100 or more, 125 or more, 150 or more, 175 or more, 200 or more, 225 or more, 250 or more, 275 or more, or 300 or more genes may be used for any evaluation described herein. As another set of non-limiting examples, the expression data may include, for each gene group listed in Table 1 or Table 2, expression data for at least 3, at least 4, at least 5, at least 10, at least 15, at least 20, or at least 25 genes selected from each gene group.

In some embodiments, RNA expression data is obtained by accessing the RNA expression data from at least one computer storage medium on which the RNA expression data is stored. Additionally or alternatively, in some embodiments, RNA expression data may be received from one or more sources via a communication network of any suitable type. For example, in some embodiments, the RNA expression data may be received from a server (e.g., a SFTP server, or Illumina BaseSpace).

The RNA expression data obtained may be in any suitable format, as aspects of the technology described herein are not limited in this respect. For example, in some embodiments, the RNA expression data may be obtained in a text-based file (e.g., in a FASTQ, FASTA, BAM, or SAM format). In some embodiments, a file in which sequencing data is stored may contains quality scores of the sequencing data. In some embodiments, a file in which sequencing data is stored may contain sequence identifier information.

Expression data, in some embodiments, includes gene expression levels. Gene expression levels may be detected by detecting a product of gene expression such as mRNA and/or protein. In some embodiments, gene expression levels are determined by detecting a level of a mRNA in a sample. As used herein, the terms "determining" or "detecting" may include assessing the presence, absence, quantity and/or amount (which can be an effective amount) of a substance within a sample, including the derivation of qualitative or quantitative concentration levels of such substances, or otherwise evaluating the values and/or categorization of such substances in a sample from a subject.

Figure 2:
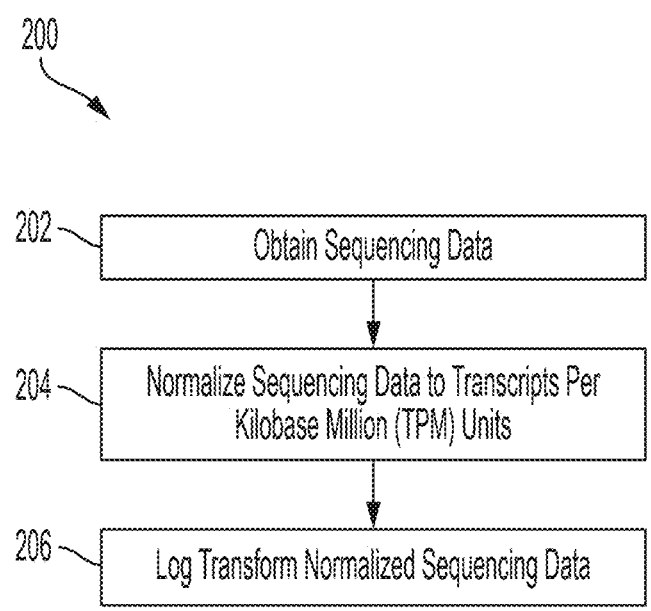
FIG. 2 is a flowchart of an illustrative process 200 for processing sequencing data to obtain RNA expression data, according to some embodiments of the technology described herein.

FIG. 2 shows an exemplary process 200 for processing sequencing data to obtain RNA expression data from sequencing data. Process 200 may be performed by any suitable computing device or devices, as aspects of the technology described herein are not limited in this respect. For example, process 200 may be performed by a computing device part of a sequencing apparatus. In other embodiments, process 200 may be performed by one or more computing devices external to the sequencing apparatus.

Process 200 begins at act 202, where sequencing data is obtained from a biological sample obtained from a subject. The sequencing data is obtained by any suitable method, for example, using any of the methods described herein including in the Section titled "Biological Samples."

In some embodiments, the sequencing data obtained at act 202 comprises RNA-seq data. In some embodiments, the biological sample comprises blood or tissue. In some embodiments, the biological sample comprises one or more tumor cells.

Next, process 200 proceeds to act 204 where the sequencing data obtained at act 202 is normalized to transcripts per kilobase million (TPM) units. The normalization may be performed using any suitable software and in any suitable way. For example, in some embodiments, TPM normalization may be performed according to the techniques described in Wagner et al. (Theory Biosci. (2012) 131:281-285), which is incorporated by reference herein in its entirety. In some embodiments, the TPM normalization may be performed using a software package, such as, for example, the germa package. Aspects of the germa package are described in Wu J, Gentry RIwcfJMJ (2021). "germa: Background Adjustment Using Sequence Information. R package version 2.66.0.," which is incorporated by reference in its entirety herein. In some embodiments, RNA expression levels in TPM units for a particular gene may be calculated according to the following expression $$RNA \text{ expression levels} = A \cdot \frac{1}{\sum (A)} \cdot 10^6$$

where $$A = \frac{\text{total reads mapped to a gene} \cdot 10^3}{\text{gene length in base pairs}}.$$

Next, process 200 proceeds to act 206, where the RNA expression levels in TPM units (as determined at act 204) may be log transformed. Process 200 is illustrative and there are variations. For example, in some embodiments, one or both of acts 204 and 206 may be omitted. Thus, in some embodiments, the RNA expression levels may not be normalized to transcripts per million units and may, instead, be converted to another type of unit (e.g., reads per kilobase million (RPKM) or fragments per kilobase million (FPKM) or any other suitable unit). Additionally or alternatively, in some embodiments, the log transformation of act 206 may be omitted. Instead, no transformation may be applied in some embodiments, or one or more other transformations may be applied in lieu of the log transformation.

RNA expression data obtained by process 200 can include the sequence data generated by a sequencing protocol (e.g., the series of nucleotides in a nucleic acid molecule identified by next-generation sequencing, sanger sequencing, etc.) as well as information contained therein (e.g., information indicative of source, tissue type, etc.) which may also be considered information that can be inferred or determined from the sequence data.

In some embodiments, the RNA expression data may be obtained by a computer processor receiving (e.g., over the internet, over a local network) and/or accessing (e.g., from remote or local computer memory) the RNA expression data. For example, the RNA expression data obtained by process 200 can include information included in a FASTA file, a description and/or quality scores included in a FASTQ file, an aligned position included in a BAM file, and/or any other suitable information obtained from any suitable file.

Gene Expression Signatures Aspects of the disclosure relate to processing of expression data to determine one or more gene expression signatures (e.g., a TME signature). In some embodiments, expression data (e.g., RNA expression data) is processed using a computing device to determine the one or more gene expression signatures. In some embodiments, the computing device may be operated by a user such as a doctor, clinician, researcher, patient, or other individual. For example, the user may provide the expression data as input to the computing device (e.g., by uploading a file), and/or may provide user input specifying processing or other methods to be performed using the expression data.

In some embodiments, expression data may be processed by one or more software programs running on a computing device.

In some embodiments, methods described herein comprise an act of determining a TME signature comprising gene group scores for respective gene groups in a plurality of gene groups. In some embodiments, a TME signature comprises gene group scores for at least one (e.g., 1, 2, 3, 4, 5, 6, 7, 8, 9, 10, 11, 12, 13, 14, 15, 16, 17, 18, 19, 20, 21, 22, 23, 24, 25, 26, 27, 28, or 29) of the gene groups listed in Table 1. In some embodiments, a TME signature comprises gene group scores for at least one (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40) of the gene groups listed in Table 1 and in Table 2. In some embodiments, a TME signature comprises gene group scores and PROGENy scores for at least one (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or 36) of the gene groups listed in Table 1 and Table 3. In some embodiments, a TME signature comprises gene group scores for at least one (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, or 47) of the gene groups listed in Table 1, Table 2, and Table 3.

The number of genes in a gene group used to determine a gene group score may vary. In some embodiments, all RNA expression levels for all genes in a particular gene group may be used to determine a gene group score for the particular gene group. In other embodiments, RNA expression data for fewer than all genes may be used (e.g., RNA expression levels for at least two genes, at least three genes, at least four genes, at least five genes, between 2 and 10 genes, between 3 and 10 genes, between 5 and 15 genes, between 3 and 30 genes, or any other suitable range within these ranges).

In some embodiments, a TME signature comprises a gene group score for the cDC1 group. In some embodiments, this gene group score may be calculated using RNA expression levels of at least three genes (e.g., at least 3, at least 4, at least 5, or at least 6) in the cDC1 group, which is defined by its constituent genes: XCR1, CLEC9A, C1orf54, BATF3, WDFY4, and HLA-DOB.

In some embodiments, a TME signature comprises a gene group score for the cDC2 group. In some embodiments, this gene group score may be calculated using RNA expression levels of at least three genes (e.g., at least 3, at least 4, at least 5, at least 6, or at least 7) in the cDC2 group, which is defined by its constituent genes; ITGAX, HLA-DRA, HLA-DRB1, CD1C, FCER1A, CLEC10A, and AMICA1.

In some embodiments, a TME signature comprises a gene group score for the pDC group. In some embodiments, this gene group score may be calculated using RNA expression levels of at least three genes (e.g., at least 3, at least 4, at least 5, at least 6, at least 7, or at least 8) in the pDC group, which is defined by its constituent genes: IL3RA, CLEC4C, CCR2, CXCR3, GZMB, DERL3, LILRA4, and SCT.

In some embodiments, a TME signature comprises a gene group score for the M1 cytokines group. In some embodiments, this gene group score may be calculated using RNA expression levels of at least three genes (e.g., at least 3, at least 4, at least 5, or at least 6) in the M1 cytokines group, which is defined by its constituent genes: CXCL10, IL23A, IL1B, IL12B, TNF, and CXCL9.

In some embodiments, a TME signature comprises a gene group score for the panmacrophage signature group. In some embodiments, this gene group score may be calculated using RNA expression levels of at least three genes (e.g., at least 3, at least 4, at least 5, at least 6, at least 7, or at least 8) in the panmacrophage group, which is defined by its constituent genes: C1QC, CSF1R, CD163, SIGLEC1, C1QA, VSIG4, MSR1, and CD68;

In some embodiments, a TME signature comprises a gene group score for the TLS group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, at least 14, or at least 15) in the TLS group, which is defined by its constituent genes: CXCL10, SELL, LAMP3, FDCSP, CD86, CXCL13, PTPRCAP, CCR7, LTA, CXCR3, CCL21, CCL19, JCHAIN, CXCL9, and TNFRSF17.

In some embodiments, a TME signature comprises a gene group score for the proinflammatory cytokines group. In some embodiments, this gene group score may be calculated using RNA expression levels of at least three genes (e.g., at least 3, at least 4, at least 5, at least 6, at least 7, at least 8, at least 9, at least 10, at least 11, or at least 12) in the proinflammatory cytokines group, which is defined by its constituent genes: IL23A, IFNB1, IL1A, IL1B, TNF, CXCL2, IL6, IL26, CCL2, CCL4, LIF, and CCL3.

In some embodiments, a TME signature comprises a gene group score for the anti-tumor cytokines group. In some embodiments, this gene group score may be calculated using RNA expression levels of at least three genes (e.g., at least 3, at least 4, at least 5, at least 6, at least 7, or at least 8) in the anti-tumor cytokines group, which is defined by its constituent genes: CXCL10, CXCL9, CXCL13, XCL1, CCL5, CCL21, CCL19, and XCL2.

In some embodiments, a TME signature comprises a gene group score for the pro-tumor cytokines group. In some embodiments, this gene group score may be calculated using RNA expression levels of at least three genes (e.g., at least 3, at least 4, at least 5, at least 6, at least 7, or at least 8) in the pro-tumor cytokines group, which is defined by its constituent genes: CCL26, CXCL6, CCL20, CXCL8, CXCL1, CCL18, CCL17, and CCL22.

In some embodiments, a TME signature comprises a gene group score for the myeloid checkpoints group. In some embodiments, this gene group score may be calculated using RNA expression levels of at least three genes (e.g., at least 3 or at least 4) in the myeloid checkpoints group, which is defined by its constituent genes: PDCD1LG2, HAVCR2, CD274, and C10orf54.

In some embodiments, a TME signature comprises a gene group score for the lymphoid checkpoints group. In some embodiments, this gene group score may be calculated using RNA expression levels of at least three genes (e.g., at least 3, at least 4, at least 5, or at least 6) in the lymphoid checkpoints group, which is defined by its constituent genes: BTLA, TIGIT, LAG3, PVRIG, PDCD1, and CTLA4.

In some embodiments, a TME signature comprises a gene group score for the cytotoxic cell inactivation group. In some embodiments, this gene group score may be calculated using RNA expression levels of at least three genes (e.g., at least 3, at least 4, at least 5, at least 6, at least 7, at least 8, at least 9, or at least 10) in the cytotoxic cell inactivation group, which is defined by its constituent genes: PIM2, SERPINB9, LGALS9, CD5, KLRB1, FASLG, KLRD1, LAIR1, LAIR2, and SIGLEC7.

In some embodiments, a TME signature comprises a gene group score for the Breg cells group. In some embodiments, this gene group score may be calculated using RNA expression levels of at least three genes (e.g., at least 3, at least 4, or at least 5) in the Breg cells group, which is defined by its constituent genes: ZBTB32, NFKBID, SOX5, EBI3, and ZBTB20.

In some embodiments, a TME signature comprises a gene group score for the myeloid suppression group. In some embodiments, this gene group score may be calculated using RNA expression levels of at least three genes (e.g., at least 3, at least 4, at least 5, at least 6, at least 7, at least 8, or at least 9) in the myeloid suppression group, which is defined by its constituent genes: IL10, FGL2, EBI3, CYBB, IL4I1, TGFBI, IDO1, PTGS2, and MSR1.

In some embodiments, a TME signature comprises a gene group score for the phagocytosis inhibition group. In some embodiments, this gene group score may be calculated using RNA expression levels of at least three genes (e.g., at least 3, at least 4, at least 5, at least 6, at least 7, at least 8, at least 9, at least 10, or at least 11) in the phagocytosis inhibition group, which is defined by its constituent genes: LILRB3, LILRB1, FCGR2B, LILRB4, SIRPA, SIGLEC10, LILRB2, PECAM1, CD300A, CD300LF, and CD33.

In some embodiments, a TME signature comprises a gene group score for the stromal suppression group. In some embodiments, this gene group score may be calculated using RNA expression levels of at least three genes (e.g., at least 3, at least 4, at least 5, at least 6, or at least 7) in the stromal suppression group, which is defined by its constituent genes: IL11, TGFB2, TDO2, TSLP, IL6, TGFB3, and TGFBI.

In some embodiments, a TME signature comprises a gene group score for the exclusion of CTL group. In some embodiments, this gene group score may be calculated using RNA expression levels of at least three genes (e.g., at least 3, at least 4, at least 5, at least 6, or at least 7) in the exclusion of CTL group, which is defined by its constituent genes: GAS6, VEGFA, PDGFC, FGF2, EDNRB, TNFAIP6, and CXCL12.

In some embodiments, a TME signature comprises a gene group score for the endothelium group. In some embodiments, this gene group score may be calculated using RNA expression levels of at least three genes (e.g., at least 3, at least 4, at least 5, at least 6, at least 7, at least 8, at least 9, at least 10, or at least 11) in the endothelium group, which is defined by its constituent genes: ECSCR, NOS3, MMRN1, VWF, CLEC14A, FLT1, KDR, ROBO4, ENG, CDH5, and MMRN2.

In some embodiments, a TME signature comprises a gene group score for the CAF group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, or at least 22) in the CAF group, which is defined by its constituent genes: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2.

In some embodiments, a TME signature comprises a gene group score for the EMT signature group. In some embodiments, this gene group score may be calculated using RNA expression levels of at least three genes (e.g., at least 3, at least 4, or at least 5) in the EMT signature group, which is defined by its constituent genes: RUNX2, FOXM1, SNAI1, TWIST1, and SNAI2.

In some embodiments, a TME signature comprises a gene group score for the adipocytes group. In some embodiments, this gene group score may be calculated using RNA expression levels of at least three genes (e.g., at least 3, at least 4, at least 5, at least 6, at least 7, at least 8, at least 9, at least 10, at least 11, or at least 12) in the adipocytes group, which is defined by its constituent genes: GPD1, LBP, PTGER3, DLAT, FABP4, LEP, PLIN1, ADIPOQ, PPP1R1A, ADH1B, LIPE, and COL4A4.

In some embodiments, a TME signature comprises a gene group score for the metastasis group. In some embodiments, this gene group score may be calculated using RNA expression levels of at least three genes (e.g., at least 3, at least 4, at least 5, or at least 6) in the metastasis group, which is defined by its constituent genes: MMP9, HPSE, PARP1, CDH2, RCC2, and SERPINH1.

In some embodiments, a TME signature comprises a gene group score for the metabolic suppression of CTL group. In some embodiments, this gene group score may be calculated using RNA expression levels of at least three genes (e.g., at least 3 or at least 4) in the metabolic suppression of CTL group, which is defined by its constituent genes: SPHK1, MSR1, ADORA2A, and ENTPD1.

In some embodiments, a TME signature comprises a gene group score for the hypoxia factors group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, at least 14, or at least 15) in the hypoxia factors group, which is defined by its constituent genes: LOX, FUT11, PGK1, CA12, TPI1, PDK1, EPAS1, LDHA, SLC2A1, PFKFB3, P4HA1, ALDOA, CA9, HK2, and NDRG1.

In some embodiments, a TME signature comprises a gene group score for the autophagy group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, or at least 14) in the autophagy group, which is defined by its constituent genes: ATG12, ATG9A, TFEB, RB1CC1, MAP1LC3B, GABARAPL2, ATG4B, ATG7, GABARAP, VMP1, ATG14, GABARAPL1, ATG13, and NBR1.

In some embodiments, a TME signature comprises a gene group score for the acidosis group. In some embodiments, this gene group score may be calculated using RNA expression levels of at least three genes (e.g., at least 3 or at least 4) in the acidosis group, which is defined by its constituent genes: SLC16A1, SLC16A4, MAPK14, and SLC9A1.

In some embodiments, a TME signature comprises a gene group score for the senescence group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, or at least 25) in the senescence group, which is defined by its constituent genes: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3.

In some embodiments, a TME signature comprises a gene group score for the apoptosis group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, at least 14, at least 15, at least 16, at least 17, or at least 18) in the apoptosis group, which is defined by its constituent genes: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2.

In some embodiments, a TME signature comprises a gene group score for the glycolysis group. In some embodiments, this gene group score may be calculated using RNA expression levels of at least three genes (e.g., at least 3, at least 4, at least 5, at least 6, at least 7, at least 8, at least 9, or at least 10) in the glycolysis group, which is defined by its constituent genes: ALDOA, TPI1, GPD2, PGK1, LDHA, PFKP, BPGM, ENO1, GPI, and SLC16A3.

In some embodiments, at TME signature comprises a gene group score for one or more of the cDC1 group, cDC2 group, the pDC group, the M1 cytokines group, the pan-macrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the MHC II group. In some embodiments, this gene group score may be calculated using RNA expression levels of at least three genes (e.g., at least 3, at least 4, at least 5, at least 6, at least 7, at least 8, or at least 9) in the MCH II group, which is defined by its constituent genes: HLA-DRB1, HLA-DMA, HLA-DRA, HLA-DQB1, CIITA, HLA-DPB1, HLA-DMB, HLA-DQA1, and HLA-DPA1.

In some embodiments, at TME signature comprises a gene group score for one or more of the cDC1 group, cDC2 group, the pDC group, the M1 cytokines group, the pan-macrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the NK cells group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, at least 14, at least 15, at least 16, or at least 17) in the NK cells group, which is defined by its constituent genes: GNLY, KLRK1, KLRF1, GZMH, NCR3, EOMES, NCR1, SH2D1B, IFNG, CD226, FGFBP2, KLRC2, GZMB, KIR2DLA, NKG7, CD244, and CD160.

In some embodiments, at TME signature comprises a gene group score for one or more of the cDC1 group, cDC2 group, the pDC group, the M1 cytokines group, the pan-macrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the B cells group. In some embodiments, this gene group score may be calculated using RNA expression levels of at least three genes (e.g., at least 3, at least 4, at least 5, at least 6, at least 7, at least 8, at least 9, at least 10, at least 11, at least 12, or at least 13) in the B cells group, which is defined by its constituent genes: PAX5, MS4A1, CD19, CR2, TNFRSF13B, TNFRSF13C, TNFRSF17, CD79B, BLK, CD22, CD79A, STAP1, and FCRL5.

In some embodiments, at TME signature comprises a gene group score for one or more of the cDC1 group, cDC2 group, the pDC group, the M1 cytokines group, the pan-macrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the CD8 T cells group. In some embodiments, this gene group score may be calculated using RNA expression levels of at least three genes (e.g., at least 3, at least 4, at least 5, at least 6, at least 7, at least 8, at least 9, at least 10, at least 11, or at least 12) in the CD8 T cells group, which is defined by its constituent genes: KLRK1, CD8B, CD8A, PRF1, EOMES, TRAT1, GZMB, GZMA, GZMK, ZAP70, NKG7, and TBX21.

In some embodiments, at TME signature comprises a gene group score for one or more of the cDC1 group, cDC2 group, the pDC group, the M1 cytokines group, the pan-macrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the proliferation rate group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, at least 14, or at least 15) in the proliferation rate group, which is defined by its constituent genes: CETN3, CCNB1, CONDI, CCNE1, MCM6, PLK1, CDK2, AURKB, ESCO2, AURKA, MCM2, MKI67, E2F1, BUB1, and MYBL2.

In some embodiments, at TME signature comprises a gene group score for one or more of the cDC1 group, cDC2 group, the pDC group, the M1 cytokines group, the pan-macrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the T cells group. In some embodiments, this gene group score may be calculated using RNA expression levels of at least three genes (e.g., at least 3, at least 4, at least 5, at least 6, at least 7, at least 8, at least 9, at least 10, or at least 11) in the T cells group, which is defined by its constituent genes: ITK, CD3G, CD3D, TRBC1, CD3E, TRAT1, TRAC, TRBC2, CD28, CD5, and TBX21.

In some embodiments, at TME signature comprises a gene group score for one or more of the cDC1 group, cDC2 group, the pDC group, the M1 cytokines group, the pan-macrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the Treg cells group. In some embodiments, this gene group score may be calculated using RNA expression levels of at least three genes (e.g., at least 3, at least 4, at least 5, at least 6, or at least 7) in the Treg cells group, which is defined by its constituent genes: CCR8, TNFRSF18, FOXP3, IKZF2, CTLA4, IKZF4, and IL2RA.

In some embodiments, at TME signature comprises a gene group score for one or more of the cDC1 group, cDC2 group, the pDC group, the M1 cytokines group, the pan-macrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the matrix group. In some embodiments, this gene group score may be calculated using RNA expression levels of at least three genes (e.g., at least 3, at least 4, at least 5, at least 6, at least 7, at least 8, at least 9, at least 10, at least 11, at least 12, at least 13, at least 14, or at least 15) in the matrix group, which is defined by its constituent genes: VIN, ELN, COL11A1, COL4A1, TNC, COL1A1, COL1A2, COL3A1, LAMA3, LGALS9, FN1, COL5A1, LAMB3, LGALS7, and LAMC2.

In some embodiments, at TME signature comprises a gene group score for one or more of the cDC1 group, cDC2 group, the pDC group, the M1 cytokines group, the panmacrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the matrix remodeling group. In some embodiments, this gene group score may be calculated using RNA expression levels of at least three genes (e.g., at least 3, at least 4, at least 5, at least 6, at least 7, at least 8, at least 9, at least 10, at least 11, or at least 12) in the matrix remodeling group, which is defined by its constituent genes: LOX, MMP12, MMP9, PLOD2, ADAMTS5, MMP3, ADAMTS4, MMP11, MMP1, CA9, MMP2, and MMP7.

In some embodiments, at TME signature comprises a gene group score for one or more of the cDC1 group, cDC2 group, the pDC group, the M1 cytokines group, the panmacrophage signature group, the TLS group, the proinflammatory cytokines group, the anti-tumor chemokines group, the pro-tumor chemokines group, the myeloid checkpoints group, the lymphoid checkpoints group, the cytotoxic cell inactivation group, the Breg cells group, the myeloid suppression group, the phagocytosis inhibition group, the stromal suppression group, the exclusion of CTL group, the endothelium group, the CAF group, the EMT signature group, the adipocytes group, the metastasis signature group, the metabolic suppression of CTL group, the hypoxia factors group, the autophagy group, the acidosis group, the senescence group, the apoptosis group, the glycolysis group, and a gene group score for the angiogenesis group. In some embodiments, this gene group score may be calculated using RNA expression levels of at least three genes (e.g., at least 3, at least 4, at least 5, at least 6, at least 7, at least 8, at least 9, at least 10, at least 11, at least 12, or at least 13) in the angiogenesis group, which is defined by its constituent genes: VEGFA, TEK, PDGFC, VWF, CXCR2, ANGPT1, FLT1, KDR, ANGPT2, VEGFB, VEGFC, PGF, and CDH5.

In some embodiments, determining a TME signature comprises determining a respective gene group score for each of at least two of the following gene groups, using, for a particular gene group, RNA expression levels for at least three genes in the particular gene group to determine the gene group score for the particular group, the gene groups including: MHC II group: HLA-DRB1, HLA-DMA, HLA-DRA, HLA-DQB1, CIITA, HLA-DPB1, HLA-DMB, HLA-DQA1, and HLA-DPA1; NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160; B cells group: PAX5, MS4A1, CD19, CR2, TNFRSF13B, TNFRSF13C, TNFRSF17, CD79B, BLK, CD22, CD79A, STAP1, and FCRL5; CD8 T cells group: KLRK1, CD8B, CD8A, PRF1, EOMES, TRAT1, GZMB, GZMA, GZMK, ZAP70, NKG7, and TBX21; cDC1 group: XCR1, CLEC9A, C1orf54, BATF3, WDFY4, and HLA-DOB; cDC2 group: ITGAX, HLA-DRA, HLA-DRB1, CD1C, FCER1A, CLEC10A, and AMICA1; pDC group: IL3RA, CLEC4C, CCR2, CXCR3, GZMB, DERL3, LILRA4, and SCT; Proliferation rate group: CETN3, CCNB1, CCND1, CCNE1, MCM6, PLK1, CDK2, AURKB, ESCO2, AURKA, MCM2, MKI67, E2F1, BUB1, and MYBL2; T cells group: ITK, CD3G, CD3D, TRBC1, CD3E, TRAT1, TRAC, TRBC2, CD28, CD5, and TBX21; M1 cytokines group: CXCL10, IL23A, IL1B, IL12B, TNF, and CXCL9; Panmacrophage signature group: C1QC, CSF1R, CD163, SIGLEC1, C1QA, VSIG4, MSR1, and CD68; TLS group: CXCL10, SELL, LAMP3, FDCSP, CD86, CXCL13, PTPRCAP, CCR7, LIA, CXCR3, CCL21, CCL19, JCHAIN, CXCL9, and TNFRSF17; Proinflammatory cytokines group: IL23A, IFNB1, IL1A, IL1B, TNF, CXCL2, IL6, IL26, CCL2, CCL4, LIF, and CCL3; Anti-tumor chemokines group: CXCL10, CXCL9, CXCL13, XCL1, CCL5, CCL21, CCL19, and XCL2; Pro-tumor chemokines group: CCL26, CXCL6, CCL20, CXCL8, CXCL1, CCL18, CCL17, and CCL22; Myeloid checkpoints group: PDCD1LG2, HAVCR2, CD274, and C10orf54; Lymphoid checkpoints group: BTLA, TIGIT, LAG3, PVRIG, PDCD1, and CTLA4; Cytotoxic cell inactivation group: PIM2, SERPINB9, LGALS9, CD5, KLRB1, FASLG, KLRD1, LAIR1, LAIR2, and SIGLEC7; Treg cells group: CCR8, TNFRSF18, FOXP3, IKZF2, CTLA4, IKZF4, and IL2RA; Breg group: ZBTB32, NFKBID, SOX5, EBI3, and ZBTB20; Myeloid suppression group: IL10, FGL2, EBI3, CYBB, IL4I1, TGFBI, IDO1, PTGS2, and MSR1; Phagocytosis inhibition group: LILRB3, LILRB1, FCGR2B, LILRB4, SIRPA, SIGLEC10, LILRB2, PECAM1, CD300A, CD300LF, and CD33; Stromal suppression group: IL11, TGFB2, TDO2, TSLP, IL6, TGFB3, and TGFBI; Exclusion group: GAS6, VEGFA, PDGFC, FGF2, EDNRB, TNFAIP6, and CXCL12; Matrix group: VIN, ELN, COL11A1, COL4A1, TNC, COL1A1, COL1A2, COL3A1, LAMA3, LGALS9, FN1, COL5A1, LAMB3, LGALS7, and LAMC2; Endothelium group: ECSCR, NOS3, MMRN1, VWF, CLEC14A, FLT1, KDR, ROBO4, ENG, CDH5, and MMRN2; CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2; Matrix remodeling group: LOX, MMP12, MMP9, PLOD2, ADAMTS5, MMP3, ADAMTS4, MMP1I, MMP1, CA9, MMP2, and MMP7; Angiogenesis group: VEGFA, TEK, PDGFC, VWF, CXCR2, ANGPT1, FLT1, KDR, ANGPT2, VEGFB, VEGFC, PGF, and CDH5; EMT signature group: RUNX2, FOXM1, SNAI1, TWIST1, and SNAI2; Adipocytes group: GPD1, LBP, PTGER3, DLAT, FABP4, LEP, PLIN1, ADIPOQ, PPP1R1A, ADH1B, LIPE, and COL4A4; Metastasis signature group: MMP9, HPSE, PARP1, CDH2, RCC2, and SERPINH1; Metabolic suppression of CTL group: SPHK1, MSR1, ADORA2A, and ENTPD1; Hypoxia factors group: LOX, FUT11, PGK1, CA12, TPI1, PDK1, EPAS1, LDHA, SLC2A1, PFKFB3, P4HA1, ALDOA, CA9, HK2, and NDRG1; Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1; Acidosis group: SLC16AI, SLC16A4, MAPK14, and SLC9A1; Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3; Apoptosis group: BCL10, BIK, CASP6, TNFRSF12A, CASP2, CASP3, CASP7, CASP8, CYLD, FAS, IER3, PMAIP1, BCL2L11, TNFRSF10A, TNERSF10B, APAF1, XAF1, and CASP8AP2; and Glycolysis group: ALDOA, TPI1, GPD2, PGK1, LDHA, PFKP, BPGM, ENO1, GPI, and SLC16A3.

In some embodiments, determining a TME signature comprises determining a respective gene group score for each of the following gene groups, using, for a particular gene group, RNA expression levels for at least three genes in the particular gene group to determine the gene group score for the particular group, the gene groups including: MHC II group: HLA-DRB1, HLA-DMA, HLA-DRA, HLA-DQB1, CIITA, HLA-DPB1, HLA-DMB, HLA-DQA1, and HLA-DPA1; NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160; B cells group: PAX5, MS4A1, CD19, CR2, TNFRSF13B, TNFRSF13C, TNFRSF17, CD79B, BLK, CD22, CD79A, STAP1, and FCRL5; CD8 T cells group: KLRK1, CD8B, CD8A, PRF1, EOMES, TRAT1, GZMB, GZMA, GZMK, ZAP70, NKG7, and TBX21; cDC1 group: XCR1, CLEC9A, C1orf54, BATF3, WDFY4, and HLA-DOB; cDC2 group: ITGAX, HLA-DRA, HLA-DRB1, CD1C, FCER1A, CLEC10A, and AMICA1; pDC group: IL3RA, CLEC4C, CCR2, CXCR3, GZMB, DERL3, LILRA4, and SCT; Proliferation rate group: CETN3, CCNB1, CCND1, CCNE1, MCM6, PLK1, CDK2, AURKB, ESCO2, AURKA, MCM2, MKI67, E2F1, BUB1, and MYBL2; T cells group: ITK, CD3G, CD3D, TRBC1, CD3E, TRAT1, TRAC, TRBC2, CD28, CD5, and TBX21; M1 cytokines group: CXCL10, IL23A, IL1B, IL12B, TNF, and CXCL9; Panmacrophage signature group: C1QC, CSF1R, CD163, SIGLEC1, C1QA, VSIG4, MSR1, and CD68; TLS group: CXCL10, SELL, LAMP3, FDCSP, CD86, CXCL13, PTPRCAP, CCR7, LTA, CXCR3, CCL21, CCL19, JCHAIN, CXCL9, and TNFRSF17; Proinflammatory cytokines group: IL23A, IFNB1, IL1A, IL1B, TNF, CXCL2, IL6, IL26, CCL2, CCL4, LIF, and CCL3; Anti-tumor chemokines group: CXCL10, CXCL9, CXCL13, XCL1, CCL5, CCL21, CCL 19, and XCL2; Pro-tumor chemokines group: CCL26, CXCL6, CCL20, CXCL8, CXCL1, CCL18, CCL17, and CCL22; Myeloid checkpoints group: PDCD1LG2, HAVCR2, CD274, and C10orf54; Lymphoid checkpoints group: BTLA, TIGIT, LAG3, PVRIG, PDCD1, and CTLA4; Cytotoxic cell inactivation group: PIM2, SERPINB9, LGALS9, CD5, KLRB1, FASLG, KLRD1, LAIR1, LAIR2, and SIGLEC7; Treg cells group: CCR8, TNFRSF18, FOXP3, IKZF2, CTLA4, IKZF4, and IL2RA; Breg group: ZBTB32, NFKBID, SOX5, EBI3, and ZBTB20; Myeloid suppression group: IL10, FGL2, EBI3, CYBB, IL4I1, TGFBI, IDO1, PTGS2, and MSR1; Phagocytosis inhibition group: LILRB3, LILRB1, FCGR2B, LILRB4, SIRPA, SIGLEC10, LILRB2, PECAM1, CD300A, CD300LF, and CD33; Stromal suppression group: IL11, TGFB2, TDO2, TSLP, IL6, TGFB3, and TGFBI; Exclusion group: GAS6, VEGFA, PDGFC, FGF2, EDNRB, TNFAIP6, and CXCL 12; Matrix group: VTN, ELN, COL11A1, COL4A1, TNC, COL1A1, COL1A2, COL3A1, LAMA3, LGALS9, FN1, COL5A1, LAMB3, LGALS7, and LAMC2; Endothelium group: ECSCR, NOS3, MMRN1, VWF, CLEC14A, FLT1, KDR, ROBO4, ENG, CDH5, and MMRN2; CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2; Matrix remodeling group: LOX, MMP12, MMP9, PLOD2, ADAMTS5, MMP3, ADAMTS4, MMP11, MMP1, CA9, MMP2, and MMP7; Angiogenesis group: VEGFA, TEK, PDGFC, VWF, CXCR2, ANGPT1, FLT1, KDR, ANGPT2, VEGFB, VEGFC, PGF, and CDH5; EMT signature group: RUNX2, FOXM1, SNAI1, TWIST1, and SNAI2; Adipocytes group: GPD1, LBP, PTGER3, DLAT, FABP4, LEP, PLIN1, ADIPOQ, PPP1R1A, ADH1B, LIPE, and COL4A4; Metastasis signature group: MMP9, HPSE, PARP1, CDH2, RCC2, and SERPINH1; Metabolic suppression of CTL group: SPHK1, MSR1, ADORA2A, and ENTPD1; Hypoxia factors group: LOX, FUT11, PGK1, CA12, TPI1, PDK1, EPAS1, LDHA, SLC2A1, PFKFB3, P4HA1, ALDOA, CA9, HK2, and NDRG1; Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1; Acidosis group: SLC16A1, SLC16A4, MAPK14, and SLC9A1; Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3; Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2; and Glycolysis group: ALDOA, TPI1, GPD2, PGK1, LDHA, PFKP, BPGM, ENO1, GPI, and SLC16A3.

In some embodiments, determining a TME signature comprises determining a respective gene group score for each of the following gene groups, using, for a particular gene group, RNA expression levels for each gene in the particular gene group to determine the gene group score for the particular group, the gene groups including: MHC II group: HLA-DRB1, HLA-DMA, HLA-DRA, HLA-DQB1, CIITA, HLA-DPB1, HLA-DMB, HLA-DQA1, and HLA-DPA1; NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160; B cells group: PAX5, MS4A1, CD19, CR2, TNFRSF13B, TNFRSF13C, TNFRSF17, CD79B, BLK, CD22, CD79A, STAP1, and FCRL5; CD8 T cells group: KLRK1, CD8B, CD8A, PRF1, EOMES, TRAT1, GZMB, GZMA, GZMK, ZAP70, NKG7, and TBX21; cDC1 group: XCR1, CLEC9A, C1orf54, BATF3, WDFY4, and HLA-DOB; cDC2 group: ITGAX, HLA-DRA, HLA-DRB1, CD1C, FCER1A, CLEC10A, and AMICA1; pDC group: IL3RA, CLEC4C, CCR2, CXCR3, GZMB, DERL3, LILRA4, and SCT; Proliferation rate group: CETN3, CCNB1, CCND1, CCNE1, MCM6, PLK1, CDK2, AURKB, ESCO2, AURKA, MCM2, MKI67, E2F1, BUB1, and MYBL2; T cells group: ITK, CD3G, CD3D, TRBC1, CD3E, TRAT1, TRAC, TRBC2, CD28, CD5, and TBX21; M1 cytokines group: CXCL10, IL23A, IL1B, IL12B, TNF, and CXCL9; Panmacrophage signature group: C1QC, CSF1R, CD163, SIGLEC1, C1QA, VSIG4, MSR1, and CD68; TLS group: CXCL10, SELL, LAMP3, FDCSP, CD86, CXCL13, PTPRCAP, CCR7, LTA, CXCR3, CCL21, CCL19, JCHAIN, CXCL9, and TNERSF17; Proinflammatory cytokines group: IL23A, IFNB1, IL1A, IL1B, TNF, CXCL2, IL6, IL26, CCL2, CCL4, LIF, and CCL3; Anti-tumor chemokines group: CXCL10, CXCL9, CXCL13, XCL1, CCL5, CCL21, CCL19, and XCL2; Pro-tumor chemokines group: CCL26, CXCL6, CCL20, CXCL8, CXCL1, CCL18, CCL17, and CCL22; Myeloid checkpoints group: PDCD1LG2, HAVCR2, CD274, and C10orf54; Lymphoid checkpoints group: BTLA, TIGIT, LAG3, PVRIG, PDCD1, and CTLA4; Cytotoxic cell inactivation group: PIM2, SERPINB9, LGALS9, CDS, KLRB1, FASLG, KLRD1, LAIR1, LAIR2, and SIGLEC7; Treg cells group: CCR8, TNFRSF18, FOXP3, IKZF2, CTLA4, IKZF4, and IL2RA; Breg group: ZBTB32, NFKBID, SOX5, EBI3, and ZBTB20; Myeloid suppression group: IL10, FGL2, EBI3, CYBB, IL4I1, TGFBI, IDO1, PTGS2, and MSR1; Phagocytosis inhibition group: LILRB3, LILRB1, FCGR2B, LILRB4, SIRPA, SIGLEC10, LILRB2, PECAM1, CD300A, CD300LF, and CD33; Stromal suppression group: IL11, TGFB2, TDO2, TSLP, IL6, TGFB3, and TGFBI; Exclusion group: GAS6, VEGFA, PDGFC, FGF2, EDNRB, TNFAIP6, and CXCL12; Matrix group: VTN, ELN, COL11A1, COL4A1, TNC, COL1A1, COL1A2, COL3A1, LAMA3, LGALS9, FN1, COL5AI, LAMB3, LGALS7, and LAMC2; Endothelium group: ECSCR, NOS3, MMRN1, VWF, CLEC14A, FLT1, KDR, ROBO4, ENG, CDH5, and MMRN2; CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2; Matrix remodeling group: LOX, MMP12, MMP9, PLOD2, ADAMTS5, MMP3, ADAMTS4, MMP11, MMP1, CA9, MMP2, and MMP7; Angiogenesis group: VEGFA, TEK, PDGFC, VWF, CXCR2, ANGPT1, FLT1, KDR, ANGPT2, VEGFB, VEGFC, PGF, and CDH5; EMT signature group: RUNX2, FOXM1, SNAI1, TWIST1, and SNAI2; Adipocytes group: GPD1, LBP, PTGER3, DLAT, FABP4, LEP, PLIN1, ADIPOQ, PPP1R1A, ADH1B, LIPE, and COL4A4; Metastasis signature group: MMP9, HPSE, PARP1, CDH2, RCC2, and SERPINH1; Metabolic suppression of CTL group: SPHK1, MSR1, ADORA2A, and ENTPD1; Hypoxia factors group: LOX, FUT11, PGK1, CA12, TPI1, PDK1, EPAS1, LDHA, SLC2A1, PFKFB3, P4HA1, ALDOA, CA9, HK2, and NDRG1; Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1; Acidosis group: SLC16Al, SLC16A4, MAPK14, and SLC9A1; Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3; Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2; and Glycolysis group: ALDOA, TPI1, GPD2, PGK1, LDHA, PFKP, BPGM, ENO1, GPI, and SLC16A3.

In some embodiments, determining a TME signature comprises determining a respective gene group score for at least one of the following gene groups, using, for a particular gene group, RNA expression levels for at least one of the genes listed below to determine the gene group score for the particular group, the gene groups including: cDC1 group: CLEC9A, C1orf54, BATF3, WDFY4, and HLA-DOB; cDC2 group: ITGAX, CD1C, FCER1A, CLEC10A, and AMICA1; pDC group: IL3RA, CLEC4C, DERL3, LILRA4, and SCT; Panmacrophage signature group: C1QC, C1QA, and VSIG4; TLS group: PTPRCAP, LTA, and JCHAIN; Proinflammatory cytokines group: IL1A, IL26, and LIF; Anti-tumor chemokines group: XCL2; Pro-tumor chemokines group: CXCL6, CCL20, and CCL18; Myeloid checkpoints group: C10orf54; Lymphoid checkpoints group: PVRIG; Cytotoxic cell inactivation group: PIM2, SERPINB9, KLRB1, KLRD1, LAIR1, LAIR2, and SIGLEC7; Treg cells group: FOXP3 and IL2RA; Breg group: ZBTB32, NFKBID, SOX5, EBI3, and ZBTB20; Myeloid suppression group: FGL2, EBI3, and PTGS2; Phagocytosis inhibition group: LILRB3, LILRB1, FCGR2B, LILRB4, SIRPA, SIGLEC10, LILRB2, PECAM1, CD300A, CD300LF, and CD33; Stromal suppression group: IL11, TDO2, and TSLP; Exclusion group: GAS6, PDGFC, EDNRB, and TNFAIP6; Matrix group: TNC; Endothelium group: ECSCR, ROBO4; CAF group: FGF2, CD248, and LGALS1; Matrix remodeling group: PLOD2; Angiogenesis group: DGFC; EMT signature group: RUNX2 and FOXM1; Adipocytes group: GPD1, LBP, PTGER3, DLAT, FABP4, LEP, PLIN1, ADIPOQ, PPP1R1A, ADH1B, LIPE, and COL4A4; Metastasis signature group: HPSE, PARP1, RCC2, and SERPINH1; Metabolic suppression of CTL group: SPHK1, ADORA2A, and ENTPD1; Hypoxia factors group: FUT11, PGK1, CA12, TPI1, PDK1, EPAS1, LDHA, SLC2AI, PFKFB3, P4HA1, ALDOA, HK2, and NDRG1; Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1; Acidosis group: SLC16AI, SLC16A4, MAPK14, and SLC9A1; Senescence group: CDKN2A, CDKN1A, CDKN2B, GLB1, SERPINE1, DPP4, CEBPB, BCL2L1, BCL2L2, TNFRSF10D, ITGB3, IGFBP3, GDF15, IGFBP7, PLAU, STAT1, IGFBP2, and ATF3; Apoptosis group: BCL10, BIK, CASP6, TNFRSF12A, CASP2, CASP3, CASP7, CASP8, CYLD, IER3, PMAIP1, BCL2L11, TNFRSF10A, TNFRSF10B, APAF1, XAF1, and CASP8AP2; and Glycolysis group: ALDOA, TPI1, GPD2, PGK1, LDHA, PFKP, BPGM, ENO1, GPI, and SLC16A3. In some embodiments, determining a TME signature comprises determining a respective gene group score for each of the following gene groups, using, for a particular gene group, RNA expression levels for at least one of the genes listed below to determine the gene group score for the particular group, the gene groups including: cDC1 group: CLEC9A, C1orf54, BATF3, WDFY4, and HLA-DOB; cDC2 group: ITGAX, CD1C, FCER1A, CLEC10A, and AMICA1; pDC group: IL3RA, CLEC4C, DERL3, LILRA4, and SCT; Panmacrophage signature group: C1QC, C1QA, and VSIG4; TLS group: PTPRCAP, LTA, and JCHAIN; Proinflammatory cytokines group: IL1A, IL26, and LIF; Anti-tumor chemokines group: XCL2; Pro-tumor chemokines group: CXCL6, CCL20, and CCL18; Myeloid checkpoints group: C10orf54; Lymphoid checkpoints group: PVRIG; Cytotoxic cell inactivation group: PIM2, SERPINB9, KLRB1, KLRD1, LAIR1, LAIR2, and SIGLEC7; Treg cells group: FOXP3 and IL2RA; Breg group: ZBTB32, NFKBID, SOX5, EBI3, and ZBTB20; Myeloid suppression group: FGL2, EBI3, and PTGS2; Phagocytosis inhibition group: LILRB3, LILRB1, FCGR2B, LILRB4, SIRPA, SIGLEC10, LILRB2, PECAM1, CD300A, CD300LF, and CD33; Stromal suppression group: IL11, TDO2, and TSLP; Exclusion group: GAS6, PDGFC, EDNRB, and TNFAIP6; Matrix group: TNC; Endothelium group: ECSCR, ROBO4; CAF group: FGF2, CD248, and LGALS1; Matrix remodeling group: PLOD2; Angiogenesis group: DGFC; EMT signature group: RUNX2 and FOXM1; Adipocytes group: GPD1, LBP, PTGER3, DLAT, FABP4, LEP, PLIN1, ADIPOQ, PPP1R1A, ADH1B, LIPE, and COL4A4; Metastasis signature group: HPSE, PARP1, RCC2, and SERPINH1; Metabolic suppression of CTL group: SPHK1, ADORA2A, and ENTPD1; Hypoxia factors group: FUT11, PGK1, CA12, TPI1, PDK1, EPAS1, LDHA, SLC2AI, PFKFB3, P4HA1, ALDOA, HK2, and NDRG1; Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1; Acidosis group: SLC16A1, SLC16A4, MAPK14, and SLC9A1; Senescence group: CDKN2A, CDKN1A, CDKN2B, GLB1, SERPINE1, DPP4, CEBPB, BCL2L1, BCL2L2, TNFRSF10D, ITGB3, IGFBP3, GDF15, IGFBP7, PLAU, STAT1, IGFBP2, and ATF3; Apoptosis group: BCL10, BIK, CASP6, TNFRSF12A, CASP2, CASP3, CASP7, CASP8, CYLD, IER3, PMAIP1, BCL2L11, TNFRSF10A, TNFRSF10B, APAF1, XAF1, and CASP8AP2; and Glycolysis group: ALDOA, TPI1, GPD2, PGK1, LDHA, PFKP, BPGM, ENO1, GPI, and SLC16A3.

In some embodiments, determining a TME signature comprises determining a respective gene group score for each of the following gene groups, using, for a particular gene group, RNA expression levels for each of the genes listed below to determine the gene group score for the particular group, the gene groups including: cDC1 group: CLEC9A, C1orf54, BATF3, WDFY4, and HLA-DOB; cDC2 group: ITGAX, CD1C, FCER1A, CLEC10A, and AMICA1; pDC group: IL3RA, CLEC4C, DERL3, LILRA4, and SCT; Panmacrophage signature group: C1QC, C1QA, and VSIG4; TLS group: PTPRCAP, LTA, and JCHAIN; Proinflammatory cytokines group: IL1A, IL26, and LIF; Anti-tumor chemokines group: XCL2; Pro-tumor chemokines group: CXCL6, CCL20, and CCL18; Myeloid checkpoints group: C10orf54; Lymphoid checkpoints group: PVRIG; Cytotoxic cell inactivation group: PIM2, SERPINB9, KLRB1, KLRD1, LAIR1, LAIR2, and SIGLEC7; Treg cells group: FOXP3 and IL2RA; Breg group: ZBTB32, NFKBID, SOX5, EBI3, and ZBTB20; Myeloid suppression group: FGL2, EBI3, and PTGS2; Phagocytosis inhibition group: LILRB3, LILRB1, FCGR2B, LILRB4, SIRPA, SIGLEC10, LILRB2, PECAM1, CD300A, CD300LF, and CD33; Stromal suppression group: IL11, TDO2, and TSLP; Exclusion group: GAS6, PDGFC, EDNRB, and TNFAIP6; Matrix group: TNC; Endothelium group: ECSCR, ROBO4; CAF group: FGF2, CD248, and LGALS1; Matrix remodeling group: PLOD2; Angiogenesis group: DGFC; EMT signature group: RUNX2 and FOXM1; Adipocytes group: GPD1, LBP, PTGER3, DLAT, FABP4, LEP, PLIN1, ADIPOQ, PPP1R1A, ADH1B, LIPE, and COL4A4; Metastasis signature group: HPSE, PARP1, RCC2, and SERPINH1; Metabolic suppression of CTL group: SPHK1, ADORA2A, and ENTPD1; Hypoxia factors group: FUT11, PGK1, CA12, TPI1, PDK1, EPAS1, LDHA, SLC2AI, PFKFB3, P4HA1, ALDOA, HK2, and NDRG1; Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1; Acidosis group: SLC16A1, SLC16A4, MAPK14, and SLC9A1; Senescence group: CDKN2A, CDKN1A, CDKN2B, GLB1, SERPINE1, DPP4, CEBPB, BCL2L1, BCL2L2, TNFRSF10D, ITGB3, IGFBP3, GDF15, IGFBP7, PLAU, STAT1, IGFBP2, and ATF3; Apoptosis group: BCL10, BIK, CASP6, TNFRSF12A, CASP2, CASP3, CASP7, CASP8, CYLD, IER3, PMAIP1, BCL2L11, TNFRSF10A, TNFRSF10B, APAF1, XAF1, and CASP8AP2; and Glycolysis group: ALDOA, TPI1, GPD2, PGK1, LDHA, PFKP, BPGM, ENO1, GPI, and SLC16A3.

Lists of gene groups are provided in Tables 1 and 2.

Figure 3:
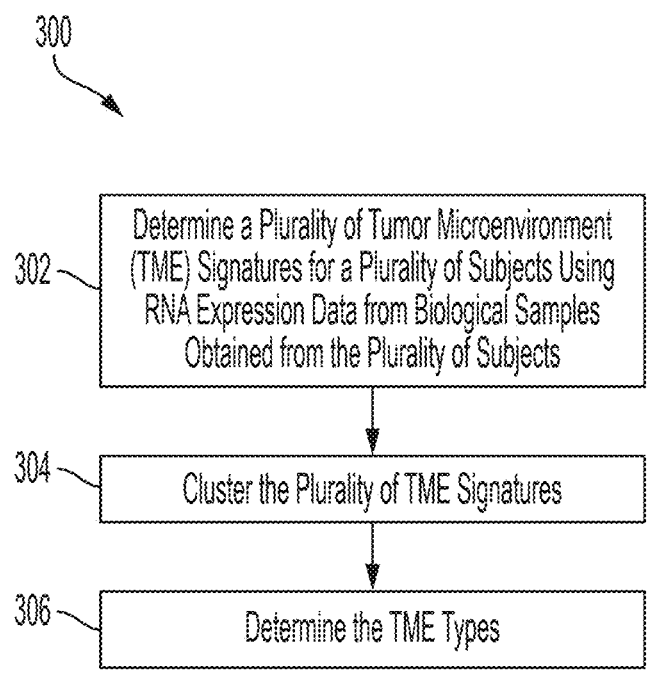
FIG. 3 is a flowchart of an illustrative process 300 for determining TME types for a plurality of subjects, according to some embodiments of the technology described herein.

As described above, aspects of the disclosure relate to determining a TME signature for a subject. That signature may include gene group scores (e.g., gene group scores generated using RNA expression data for gene groups listed in Table 1 or Table 1 in combination with Table 2). Aspects of determining of TME signatures is described next with reference to FIG. 3.

In some embodiments, a TME signature comprises gene group scores generated using a gene set enrichment analysis (GSEA) technique to determine a gene group score for one or more (e.g., 1, 2, 3, 4, 5, 6, 7, 8, 9, 10, 11, 12, 13, 14, 15, 16, 17, 18, 19, 20, 21, 22, 23, 24, 25, 26, 27, 28, or 29) gene groups listed in Table 1 or listed in Table 1 in combination with Table 2. In some embodiments, a TME signature comprises gene group scores generated using a gene set enrichment analysis (GSEA) technique to determine a gene group score for four or more (e.g., 4, 5, 6, 7, 8, 9, 10, 11, 12, 13, 14, 15, 16, 17, 18, 19, or 20) gene groups listed in Table 1 or Table 1 in combination with Table 2. In some embodiments, a TME signature comprises gene group scores generated using a gene set enrichment analysis (GSEA) technique to determine a gene group score for eight or more (e.g., 8, 9, 10, 11, 12, 13, 14, 15, 16, 17, 18, 19, or 20) gene groups listed in Table 1 or listed in Table 1 in combination with Table 2.

In some embodiments, each gene group score is generated using a gene set enrichment analysis (GSEA) technique, using RNA expression levels of at least some genes in the gene group. In some embodiments, using a GSEA technique comprises using single-sample GSEA. Aspects of single sample GSEA (ssGSEA) are described in Barbie et al. Nature. 2009 Nov. 5; 462(7269): 108-112, the entire contents of which are incorporated by reference herein. In some embodiments, ssGSEA is performed according to the following expression:

$$ssGSEA \text{ score} = \frac{\sum_i^n r_i^{1.25}}{\sum_i^n r_i^{0.25}} - \frac{(M - n + 1)}{2}$$

where $r_i$ represents the rank of the $i^{th}$ gene in expression matrix, where n represents the number of genes in the gene set (e.g., the number of genes in the first gene group when ssGSEA is being used to determine a gene group score for the first gene group using expression levels of the genes in the first gene group), and where M represents total number of genes in expression matrix. Additional, suitable techniques of performing GSEA are known in the art and are contemplated for use in the methods described herein without limitation. In some embodiments, a TME signature is calculated by performing ssGSEA on expression data from a plurality of subjects, for example expression data from one or more cohorts of subjects, such as TCGA, Metabric, FUSCCTNBC, GSE103091, GSE106977, GSE21653, GSE25066, GSE41998, GSE47994, GSE81538, GSE96058, etc., in order to produce a plurality of gene enrichment scores.

Figure 4:
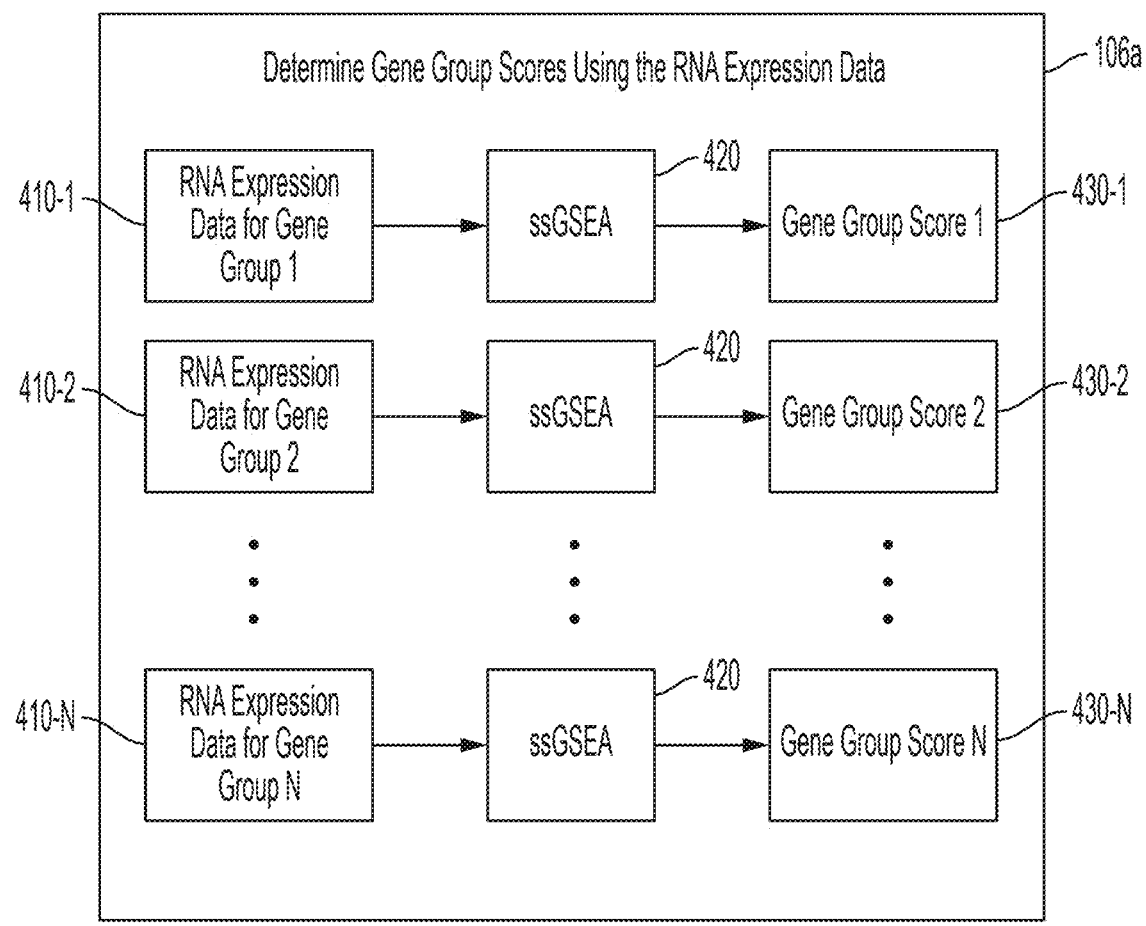
FIG. 4 is a diagram of an illustrative technique for determining gene group scores, according to some embodiments of the technology described herein.

FIG. 4 depicts an illustrative example of how gene group scores may be determined as part of act 106a of process 100. As shown in the example of FIG. 4, a "TME signature" comprises multiple gene group scores 420 (e.g., functional gene expression signatures (FGESes)) determined for respective multiple gene groups. Each gene group score, for a particular gene group, is computed by performing a respective ssGSEA 410-1, 410-2, . . . , 410-N on RNA expression data for one or more (e.g., at least two, at least three, at least four, at least five, at least six, etc., or all) genes in the particular gene group.

For example, as shown in FIG. 4, a gene group score (labelled "Gene Group Score 1") for gene group 1 is computed from RNA expression data for one or more genes in gene group 1. As another example, a gene group score (labelled "Gene Group Score 2") for gene group 2 is computed from RNA expression data for one or more genes in gene group 2. As another example, a gene group score (labelled "Gene Group Score N") for gene group N is computed from RNA expression data for one or more genes in gene group N, where N is an integer value of any suitable value (e.g., there may be any suitable number of gene group scores generated).

Although the example of FIG. 4 shows that the gene expression group score includes three explicitly depicted gene group scores for a respective set of three gene groups, it should be appreciated that in other embodiments, the first gene expression signature may include scores for any suitable number of groups (e.g., not just three; the number of groups could be fewer or greater than three). As indicated by the vertical ellipsis in FIG. 4, determining gene group scores of a TME signature may comprise determining gene group scores for 4, 5, 6, 7, 8, 9, 10, 11, 12, 13, 14, 15, 16, 17, 18, 19, 20, or more gene groups using RNA expression data from one or more respective genes in each respective gene group, as aspects of the technology described herein are not limited in this respect. In another example, a TME signature may include scores for only a subset of the gene groups listed in Table 1 or listed in Table 1 in combination with Table 2. As another example, the gene expression group score may include one or more scores for one or more gene groups other than those gene groups listed in Table 1 (either in addition to the score(s) for the groups in Table 1 or instead of one or more of the scores for the groups in Table 1, for example the gene groups listed in Table 2).

In some embodiments, RNA expression levels for a particular gene group may be embodied in at least one data structure having fields storing the expression levels. The data structure or data structures may be provided as input to software comprising code that implements a ssGSEA technique and processes the expression levels in the at least one data structure to compute a score for the particular gene group.

The number of genes in a gene group used to determine a gene group score may vary. In some embodiments, all RNA expression levels for all genes in a particular gene group may be used to determine a gene group score for the particular gene group. In other embodiments, RNA expression data for fewer than all genes may be used (e.g., RNA expression levels for at least two genes, at least three genes, at least four genes, at least five genes, between 2 and 10 genes, between 3 and 10 genes, between 5 and 15 genes, or any other suitable range within these ranges).

In some embodiments, RNA expression levels for a particular gene group may be embodied in at least one data structure having fields storing the expression levels. The data structure or data structures may be provided as input to software comprising code that is configured to perform suitable scaling (e.g., median scaling) to produce a score for the particular gene group.

In some embodiments, ssGSEA is performed on expression data comprising three or more (e.g., 3, 4, 5, 6, 7, 8, 9, 10, 11, 12, 13, 14, 15, 16, 17, 18, 19, or 20) gene groups set forth in Table 1 or set forth in Table 1 in combination with Table 2. In some embodiments, each of the gene groups separately comprises one or more (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, or more) genes listed in Table 1 or listed in Table 1 in combination with Table 2. In some embodiments, a TME signature is produced by performing ssGSEA on all of the gene groups in Table 1, each gene group including all listed genes in Table 1. In some embodiments, a TME signature is produced by performing ssGSEA on all of the gene groups in Table 1 and Table 2, each gene group including all listed genes in Table 1 and Table 2.

In some embodiments, one or more (e.g., a plurality) of gene enrichment scores are normalized in order to produce a TME signature for the RNA expression data (e.g., RNA expression data of the subject or of a cohort of subjects). In some embodiments, the gene enrichment scores are normalized by median scaling. In some embodiments, the gene enrichment scores are normalized by rank estimation and median scaling. In some embodiments, median scaling comprises clipping the range of gene enrichment scores, for example clipping to about-1.0 to about +1.0, −2.0 to about +3.0, −3.0 to about +3.0, −4.0 to +4.0, −5.0 to about +5.0. In some embodiments, median scaling produces a TME signature of the subject.

In some embodiments, a TME signature of a subject is determined using a clustering algorithm to identify a TME type. In some embodiments, the clustering comprises unsupervised clustering. In some embodiments, the unsupervised clustering comprises a dense clustering approach. In some embodiments, the unsupervised clustering comprises a hierarchical clustering approach. In some embodiments, clustering comprises calculating intersample similarity (e.g., using a Pearson correlation coefficient that, for example, may take on values in the range of [−1,1]), converting the distance matrix into a graph where each sample forms a node and two nodes form an edge with a weight equal to their Pearson correlation coefficient, removing edges with weight lower than a specified threshold, and applying a Louvain community detection algorithm to calculate graph partitioning into clusters. In some embodiments, the optimum weight threshold for observed clusters was calculated by employing minimum DaviesBouldin, maximum Calinski-Harabasz, and Silhouette techniques. In some embodiments, separations with low-populated clusters (<5% of samples) are excluded.

In some embodiments, a TME signature of a subject is compared to pre-existing clusters of TME types and assigned a TME type based on that comparison.

Some aspects of determining gene group scores for gene groups are also described in U.S. Pat. No. 11,302,420, entitled "SYSTEMS AND METHODS FOR GENERATING, VISUALIZING AND CLASSIFYING MOLECULAR FUNCTIONAL PROFILES," the entire contents of which are incorporated by reference herein.

Generating TME Signature and Identifying TME Type

As described herein, FIG. 1 illustrates the determination of a subject's TME signature, identification of the subject's TME type using the TME signature, identification of whether the subject is likely to respond to a therapy based on the identified TME type, and optionally, treatment of the subject based on identified therapies the subject is likely to respond to.

As described herein, in some embodiments, one of a plurality of different TME types may be identified for the subject using the TME signature determined for the subject using the techniques described herein. In some embodiments, the plurality of TME types comprise a Lymphoid-Cell Enriched (IE/L) type, a B-Cell Enriched, Angiogenic (IE/B/A) type, an Immune-Enriched, Hypoxic (IE/H) type, a Highly Immune-Enriched, Inflamed (IE/Inf) type, an Immune-Enriched, Fibrotic (IE/F) type, a Fibrotic, Angiogenic, Myeloid (F/A/M) type, a Fibrotic, Hypoxic (F/H) type, an Immune Desert (D) type, and a Faintly Infiltrated, Angiogenic (D/A) type, as described herein and further below.

In some embodiments, each of the plurality of TME types is associated with a respective TME signature cluster in a plurality of TME signature clusters. The TME type for a subject may be determined by: (1) associating the TME signature of the subject with a particular one of the plurality of TME signature clusters; and (2) identifying the TME type for the subject as the TME type corresponding to the particular one of the plurality of TME signature clusters to which the TME signature of the subject is associated.

Figure 5:
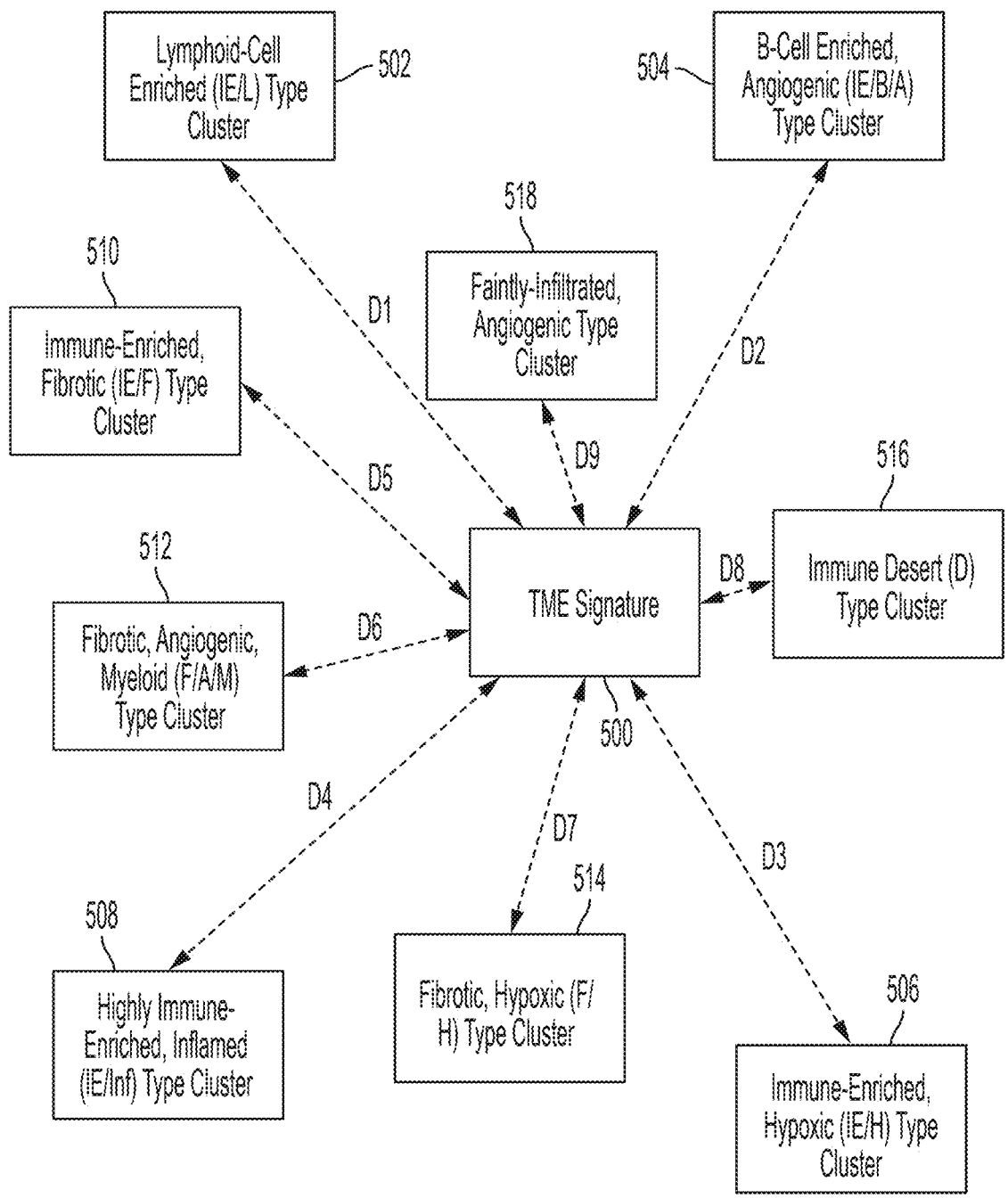
FIG. 5 is a diagram depicting an illustrative technique for identifying a TME type using a TME signature, according to some embodiments of the technology described herein.

FIG. 5 shows an illustrative TME signature 500. In some embodiments, the TME signature comprises at least eight gene group scores for gene groups listed in Table 1 or listed in Table 1 in combination with Table 2 and/or Table 3. However, it should be appreciated, that a TME signature may include fewer than eight gene group scores (e.g., by omitting scores for one or more of the gene groups listed in Table 1, Table 2, and/or Table 3) or more than eight gene group scores (e.g., by including scores for one or more other gene groups in addition to or instead of the gene groups listed in Table 1, Table 2, and/or Table 3). In some embodiments, a TME signature may be embodied in at least one data structure comprising fields storing the gene group scores as part of the TME signature.

In some embodiments, the TME signature clusters may be generated by: (1) obtaining TME signatures (using the techniques described herein) for a plurality of subjects; and (2) clustering the TME signatures so obtained into the plurality of clusters. Any suitable clustering technique may be used for this purpose including, but not limited to, a dense clustering algorithm, spectral clustering algorithm, k-means clustering algorithm, hierarchical clustering algorithm, and/or an agglomerative clustering algorithm.

For example, intersample similarity may be calculated using a Pearson correlation. A distance matrix may be converted into a graph where each sample forms a node, and two nodes form an edge with a weight equal to their Pearson correlation coefficient. Edges with weights lower than a specified threshold may be removed. A Louvain community detection algorithm may be applied to calculate graph partitioning into clusters. To mathematically determine the optimum weight threshold for observed clusters minimum DaviesBouldin, maximum Calinski-Harabasz, and Silhouette techniques may be employed. Separations with low-populated clusters (<5% of samples) may be excluded.

Accordingly, in some embodiments, generating the TME signature clusters involves: (A) obtaining multiple sets of RNA expression data obtained by sequencing biological samples from multiple respective subjects, each of the multiple sets of RNA expression data indicating RNA expression levels for genes in a first plurality of gene groups (e.g., one or more of the gene groups in Table 1 or in Table 1 and Table 2); (B) generating multiple TME signatures from the multiple sets of RNA expression data, each of the multiple TME signatures comprising gene group scores for respective gene groups, the generating comprising, for each particular one of the multiple TME signatures: (i) determining the TME signature by determining the gene group scores using the RNA expression levels in the particular set of RNA expression data for which the particular one TME signature is being generated, and (ii) clustering the multiple signatures to obtain the plurality of TME signature clusters. In some embodiments, determining the TME signature further includes determining one or more PROGENy scores using the PROGENy algorithm in addition to determining the gene group scores, the PROGENy scores being included in the TME signature in addition to the gene group scores.

The resulting TME signature clusters may each contain any suitable number of TME signatures (e.g., at least 10, at least 100, at least 500, at least 500, at least 1000, at least 5000, between 100 and 10,000, between 500 and 20,000, or any other suitable range within these ranges), as aspects of the technology described herein are not limited in this respect.

The number of TME signature clusters in the example of FIG. 5 is nine. And although, in some embodiments, it may be possible that the number of clusters is different, it should be appreciated that an important aspect of the present disclosure is the inventors' discovery that certain TMEs may be characterized into nine types based upon the generation of TME signatures using methods described herein.

For example, as shown in FIG. 5, a subject's TME signature 500 may be associated with one of nine TME clusters: 502, 504, 506, 508, 510, 512, 514, 516, or 518, corresponding to the Lymphoid-Cell Enriched (IE/L) type, the B-Cell Enriched, Angiogenic (IE/B/A) type, the Immune-Enriched, Hypoxic (IE/H) type, the Highly Immune-Enriched, Inflamed (IE/Inf) type, the Immune-Enriched, Fibrotic (IE/F) type, the Fibrotic, Angiogenic, Myeloid (F/A/M) type, the Fibrotic, Hypoxic (F/H) type, the Immune Desert (D) type, and the Faintly Infiltrated, Angiogenic (D/A) type. In this example, the TME signature 500 is compared to each cluster 502, 504, 506, 508, 510, 512, 514, 516, or 518 (e.g., using a distance-based comparison or any other suitable metric) and, based on the result of the comparison, the TME signature 500 is associated with the closest signature cluster (when a distance-based comparison is performed, or the "closest" in the sense of whatever metric or measure of distance is used). In this example, TME signature 500 is associated with the Immune Desert (D) type cluster 516 because the measure of distance D8 between the TME signature 500 and (e.g., a centroid or other point representative of) cluster 516 is smaller than the measures of the distance D1, D2, D3, D4, D5, D6, D7, and D9 between the TME signature 500 and (e.g., a centroid or other point(s) representative of) clusters 502, 504, 506, 508, 510, 512, 514, 516, and 518, respectively.

In some embodiments, a subject's TME signature may be associated with one of nine TME signature clusters by using a machine learning technique (e.g., such as k-nearest neighbors (KNN) or any other suitable classifier) to assign the TME signature to one of the nine TME signature clusters. The machine learning technique may be trained to assign TME signatures on the meta-cohorts represented by the signatures in the clusters.

In some embodiments, the TME types described herein may be described by qualitative characteristics, for example high signals for certain gene expression signatures or scores or low signals for certain other gene expression signatures or scores. In some embodiments, a "high" signal refers to a gene expression signal or score (e.g., a gene enrichment score) that is at least 1-fold, 2-fold, 3-fold, 4-fold, 5-fold, 6-fold, 7-fold, 8-fold, 9-fold, 10-fold, 20-fold, 50-fold, 100-fold, 1000-fold, or more increased relative to the score of the same gene or gene group in a subject having a different TME type (e.g., a different TME type within the same type of cancer). In some embodiments, a "low" signal refers to a gene expression signal or score (e.g., a gene enrichment score.) that is at least 1-fold, 2-fold, 3-fold, 4-fold, 5-fold, 6-fold, 7-fold, 8-fold, 9-fold, 10-fold, 20-fold, 50-fold, 100-fold, 1000-fold, or more decreased relative to the score of the same gene or gene group in a subject having a different TME type (e.g., a different TME type within a same type of cancer).

The tumor microenvironment of a solid tumor may contain variable numbers of immune cells, stromal cells, blood vessels, and extracellular matrix.

In some embodiments, the TME types comprise the Lymphoid-Cell Enriched (IE/L) type, the B-Cell Enriched, Angiogenic (IE/B/A) type, the Immune-Enriched, Hypoxic (IE/H) type, the Highly Immune-Enriched, Inflamed (IE/Inf) type, the Immune-Enriched, Fibrotic (IE/F) type, the Fibrotic, Angiogenic, Myeloid (F/A/M) type, the Fibrotic, Hypoxic (F/H) type, the Immune Desert (D) type, and the Faintly Infiltrated, Angiogenic (D/A) type.

In some embodiments, the TME type identified for a subject may be associated with a prognostic outcome, and a prognosis may be determined for the subject using the identified TME type. As used herein, the term "poor prognosis" refers to a subject that is unlikely to survive 5 years, 4 years, 3 years, 2 years, or 1 year from testing. The term "unlikely" means that on average this applies to greater than 60% of subjects. As used herein, the term "good prognosis" means that a subject is likely to survive for at least 5 years 4 years, 3 years, 2 years, or 1 year from testing. The term "likely" means that on average this applies to greater than 60% of subjects.

In some embodiments, the Lymphoid-Cell Enriched (IE/L) TME type is characterized by a lymphoid cell enriched TME, particularly including T cells and B cells. In some embodiments, the IE/L type is characterized by low gene expression scores from myeloid-cell-associated gene groups, stroma-associated gene groups, and tumor-intrinsic feature gene groups (e.g., indicating hypoxia, acidosis, autophagy, etc.). In some embodiments, the IE/L TME type is characterized by checkpoint molecule expression characteristic for lymphoid cells (e.g., PD1, CTLA4, LAG3, TIGIT, etc.). In some embodiments, the IE/L TME type comprises a moderate tumor proliferation rate signal and a high predicted proportion of tumor cells relative to other TME types. In some embodiments, the IE/L TME type is characterized by low gene expression scores associated with matrix remodeling, effector cell exclusion, angiogenesis, EMT, and/or CAF. In some embodiments, the IE/L TME type is associated with good survival prognosis.

In some embodiments, the B-Cell Enriched, Angiogenic (IE/B/A) TME type is characterized by high gene expression scores from lymphoid and myeloid-cell-associated gene groups and increased gene expression scores from B cell-associated gene groups. In some embodiments, the IE/B/A TME type is characterized by high gene expression scores associated with lymphoid cell checkpoints, including those found on B cells and DC (PVRIG, BTLA, CD40LG). In some embodiments, the IE/B/A TME type is characterized by high angiogenesis and TLD gene signature levels. In some embodiments, the IE/B/A TME type is characterized by a low tumor proliferation rate signal. In some embodiments, the IE/B/A TME type is characterized by a high adipocyte signal. In some embodiments, the IE/B/A TME type is characterized by increased fibroblast, endothelial cell, angiogenesis, and tertiary lymphoid structure (TLS) signals. In some embodiments, the IE/B/A TME type is associated with good survival prognosis.

In some embodiments, the Immune-Enriched, Hypoxic (IE/H) TME type is characterized by high gene expression scores associated with cytotoxic lymphocytes, hypoxia, apoptosis, and glycolysis. In some embodiments, the IE/H TME type is characterized by high gene expression scores associated with myeloid-cell-associated checkpoints, particularly in comparison to the IE/L and IE/B/A TME types, and increased gene expression scores associated with lymphoid cells in comparison with fibrotic (F/A/M, IE/F, F/H) and desert (D, D/A) TME types. In some embodiments, the IE/H TME type is characterized by upregulated EGFR and MAPK pathways. In some embodiments, the IE/H TME type is characterized by high tumor proliferation rates. In some embodiments, the IE/H TME type is characterized by low gene expression scores associated with B cells, dendritic cells, and T cells. In some embodiments, the IE/H TME type is characterized by increased gene expression scores associated with epithelial-mesenchymal transition (EMT), senescence, and matrix remodeling. In some embodiments, the IE/H TME type is associated with an intermediate survival prognosis that may be worse than other immune-enriched TME types but better than fibrotic and immune desert TME types.

In some embodiments, the Highly Immune-Enriched, Inflamed (IE/Inf) TME type is characterized by the highest gene expression scores associated with lymphoid and myeloid immune cells, particularly in connection with high levels of cytotoxic cells, CD8 T cells, B cells, and dendritic cells and a high expression of lymphoid- and myeloid-cell-associated checkpoint molecules. In some embodiments, the IE/Inf TME type is characterized by high gene expression scores associated with pro-inflammatory cytokines, pro-tumor chemokines, phagocytosis inhibition, myeloid suppression, MHCI, and apoptosis and low gene expression scores associated with stroma. In some embodiments, the IE/Inf TME type is characterized by low tumor proliferation rate scores and low gene expression scores associated with stromal cells. In some embodiments, the IE/Inf TME type is associated with good survival prognosis.

In some embodiments, the Immune-Enriched, Fibrotic (IE/F) TME type is characterized by high immune cell infiltration (e.g., including expression of a majority of T cell types) and high checkpoint expression, with the highest level of myeloid cells among all the TME types. In some embodiments, the IE/F TME type is characterized by high gene expression scores associated with pro-inflammatory cytokines, EMT, CAF, senescence, phagocytosis inhibition, and apoptosis. In some embodiments, the IE/F TME type is characterized by high gene expression scores associated with stroma and angiogenesis, and the TGF-β pathway is highly upregulated. In some embodiments, the IE/F TME type is characterized by low tumor proliferation rate scores. In some embodiments, the IE/F TME type is associated with poor prognosis.

In some embodiments, the Fibrotic, Angiogenic, Myeloid (F/A/M) TME type is characterized by low immune cell infiltration (e.g., by myeloid cells) and high gene expression scores associated with stroma, including fibroblasts and angiogenesis. In some embodiments, the F/A/M TME type is characterized by low checkpoint expression, with most checkpoint expression occurring in stroma- and myeloid-cell-associated molecules (PD-L2, SIRPA, VISTA, CD276, CD36). In some embodiments, the F/A/M TME type is characterized by highly upregulated TGF-B, MAPK, and EGFR signaling pathways and high gene expression scores associated with hypoxia. In some embodiments, the F/A/M TME type is characterized by a high level of myeloid cells relative to other non-immune-enriched TME types. In some embodiments, the F/A/M TME type is associated with poor prognosis.

In some embodiments, the Fibrotic, Hypoxic (F/H) TME type is characterized by a high percentage of tumor cells and low or absent immune cell infiltration. In some embodiments, the F/H TME type is characterized by high tumor proliferation rate scores and high gene expression scores associated with hypoxia. In some embodiments, the F/H TME type is characterized by upregulated EGFR, MAPK, PI3K, and TGF-β signaling pathways. In some embodiments, the F/H TME type is characterized by higher gene expression scores associated with stromal cells. In some embodiments, the F/H type is characterized by intermediate gene expression scores associated with fibroblasts. In some embodiments, the F/H TME type is characterized by lower gene expression scores associated with endothelial cell levels and angiogenesis when compared to other stromal TME types. In some embodiments, the F/H TME type is associated with a poor prognosis.

In some embodiments, the Immune Desert (D) TME type is characterized by a high percentage of tumor cells and low or absent immune cell infiltration. In some embodiments, the D TME type is characterized by high tumor proliferation rate scores and high tumor cell proportion scores. In some embodiments, the D TME type is characterized by low to moderate gene expression scores associated with hypoxia and stroma. In some embodiments, the D TME type is associated with a moderate prognosis.

In some embodiments, the Faintly Infiltrated, Angiogenic (D/A) TME type is characterized by immune cell infiltration that is minimal, but higher than observed for the D TME type. In some embodiments, the D/A TME type is characterized by a relatively high percentage of tumor cells and moderate gene expression scores associated with angiogenesis and endothelium levels. In some embodiments, the D/A TME type is characterized by low tumor proliferation rate scores. In some embodiments, the D/A TME type is associated with a slightly upregulated TGF-B signaling pathway. In some embodiments, the D/A TME type is associated with a good prognosis.

Table 4 below describes examples of TME signatures produced by ssGSEA analysis and normalization (e.g., median scaling) of expression data (e.g., for gene groups listed in Tables 1 or 2) and PROGENy scores (e.g., for signaling pathways listed in Table 3) acquired from one or more subjects. The gene group scores are characterized by functional gene expression signatures (FGESes) (e.g., for gene groups listed in Tables 1 and 2) and PROGENy scores (e.g., for signaling pathways listed in Table 3).

In some embodiments, the present disclosure provides methods for identifying a subject having, suspected of having, or at risk of having cancer as having an increased likelihood of having a good prognosis (e.g., as measured by overall survival (OS) or progression-free survival (PFS)). In some embodiments, the method comprises determining a TME type of the subject as described herein.

In some embodiments, the methods comprise identifying the subject as having a decreased risk of cancer progression relative to other TME types. In some embodiments, "decreased risk of cancer progression" may indicate better prognosis of cancer or decreased likelihood of having advanced disease in a subject. In some embodiments, "decreased risk of cancer progression" may indicate that the subject who has cancer is expected to be more responsive to certain treatments. For instance, "decreased risk of cancer progression" indicates that a subject is at least 10%, 20%, 30%, 40%, 50%, 60%, 70%, 80%, 90%, or 100% likely to experience a progression-free survival

TABLE 4

Median FGES and PROGENy score values for the acquired IE subtypes.

|  | IE/L | IE/B/A | IE/H | IE/Inf | IE/F | F/A/M | F/M | D | D/A |
|---|---|---|---|---|---|---|---|---|---|
| Pro-inflammatory cytokines | 0.01524 | 0.104316 | 0.344786 | 0.780095 | 0.974331 | 0.228718 | −0.09303 | −0.8772 | −0.51683 |
| Pro-tumor chemokines | −0.05366 | 0.126402 | 0.381087 | 0.53001 | 0.740942 | 0.254426 | −0.00027 | −0.68344 | −0.49757 |
| Apoptosis | −0.30868 | −0.01414 | 0.646077 | 0.548484 | 0.407981 | 0.004731 | 0.219145 | −0.50188 | −0.39852 |
| Metabolic suppression of CTL | −0.19959 | 0.269514 | 0.161025 | 0.95052 | 1.121335 | 0.313833 | −0.36759 | −0.93076 | −0.40273 |
| Pan-macrophage signature | −0.12545 | 0.383106 | 0.34589 | 0.889761 | 1.018378 | 0.13311 | −0.69237 | −1.14704 | −0.37455 |
| Myeloid checkpoints | −0.01258 | 0.374758 | 0.418558 | 1.356075 | 1.098024 | −0.00368 | −0.63141 | −1.01384 | −0.35432 |
| Myeloid suppression | 0.007725 | 0.401711 | 0.457068 | 1.286924 | 1.145334 | 0.061185 | −0.55749 | −1.06075 | −0.45948 |
| Phagocytosis inhibition | 0.055618 | 0.457029 | 0.304193 | 1.332993 | 1.215488 | 0.102545 | −0.6729 | −0.96438 | −0.40755 |
| cDC1 | 0.359568 | 0.565099 | 0.175546 | 1.622917 | 1.033089 | −0.04526 | −0.7664 | −0.91905 | −0.32802 |
| cDC2 | 0.174005 | 0.643716 | 0.17616 | 1.101112 | 1.113534 | 0.009949 | −0.71625 | −0.90136 | −0.2951 |
| pDC | 0.387398 | 0.5874 | 0.148386 | 1.564649 | 0.957152 | −0.10551 | −0.81771 | −0.81513 | −0.28154 |
| Lymphoid checkpoints | 0.47496 | 0.543153 | 0.514481 | 2.14067 | 0.994932 | −0.29886 | −0.7974 | −0.75808 | −0.28971 |
| NK cells | 0.575099 | 0.393494 | 0.421565 | 1.636855 | 0.773766 | −0.28607 | −0.79276 | −0.73447 | −0.21877 |
| CD8 T cells | 0.474212 | 0.583501 | 0.400325 | 1.745321 | 0.921811 | −0.28053 | −0.8431 | −0.78411 | −0.18835 |
| Cytotoxic cell inactivation | 0.237663 | 0.526251 | 0.427 | 1.719083 | 1.118569 | −0.09759 | −0.80172 | −0.90173 | −0.39883 |
| T cells | 0.328545 | 0.61254 | 0.325305 | 1.370948 | 0.881338 | −0.20895 | −0.97361 | −0.96679 | −0.25703 |
| TLS | 0.241582 | 0.694314 | 0.285592 | 1.445683 | 0.959908 | −0.13107 | −0.89163 | −0.92851 | −0.32153 |
| Anti-tumor chemokines | 0.228772 | 0.629286 | 0.321783 | 1.187548 | 0.815576 | −0.13952 | −0.91361 | −0.96402 | −0.25852 |
| MHCII | 0.176548 | 0.429554 | 0.35098 | 0.909253 | 0.698253 | −0.09265 | −1.16604 | −1.52853 | −0.40532 |
| M1 cytokines | 0.200833 | 0.306475 | 0.538175 | 1.046888 | 0.693538 | −0.13958 | −0.62433 | −0.93772 | −0.40728 |
| Treg cells | 0.231753 | 0.321679 | 0.412103 | 1.512913 | 0.806454 | −0.19427 | −0.59945 | −0.70607 | −0.40259 |
| B cells | 0.359339 | 0.907397 | 0.074885 | 1.899974 | 0.828986 | −0.22133 | −0.71484 | −0.59843 | −0.20293 |
| Breg | 0.243817 | 0.096671 | 0.08048 | 1.21673 | 0.604387 | −0.19961 | −0.27264 | −0.51144 | −0.21294 |
| EGFR | −0.43031 | −0.4202 | 0.402416 | −0.32829 | 0.291356 | 0.258158 | 1.146649 | −0.07428 | −0.22083 |
| MAPK | −0.57207 | −0.29642 | 0.487018 | −0.26416 | 0.232643 | 0.263196 | 1.097052 | −0.0702 | −0.18307 |
| Hypoxia | −0.39284 | −0.45462 | 0.41616 | −0.53533 | −0.16149 | 0.3233 | 1.032555 | 0.156081 | −0.15733 |

TABLE 4-continued

Median FGES and PROGENy score values for the acquired IE subtypes.

| | IE/L | IE/B/A | IE/H | IE/Inf | IE/F | F/A/M | F/M | D | D/A |
|---|---|---|---|---|---|---|---|---|---|
| Hypoxia factors | −0.75055 | −0.2731 | 0.248856 | −0.34012 | 0.388744 | 0.415181 | 0.842252 | −0.22789 | −0.24268 |
| Glycolysis | −0.35366 | −0.34733 | 0.487458 | 0.020331 | 0.280512 | 0.190073 | 0.631154 | −0.32033 | −0.49162 |
| PI3K | −0.62406 | 0.04001 | 0.097656 | 0.017793 | 0.258015 | 0.113011 | 0.273141 | −0.10114 | −0.12493 |
| Autophagy | −0.54738 | −0.03315 | 0.145072 | −0.11319 | 0.24403 | 0.166151 | 0.065402 | −0.12217 | 0.076617 |
| Acidosis | −0.85329 | −0.05031 | 0.177497 | −0.36192 | 0.194423 | 0.251371 | 0.364804 | −0.03315 | −0.03257 |
| Proliferation rate | 0.082841 | −0.55204 | 0.373831 | 0.145875 | −0.49805 | −0.19739 | 0.219949 | 0.246296 | −0.31568 |
| Endothelium | −0.57787 | 0.483156 | −0.32975 | −0.00529 | 1.264458 | 0.564278 | −0.23872 | −0.56911 | 0.211901 |
| Angiogenesis | −0.80388 | 0.217088 | −0.24969 | −0.11514 | 1.225516 | 0.70787 | 0.144589 | −0.50928 | 0.086154 |
| EMT | −0.70018 | −0.14782 | 0.120125 | 0.050464 | 0.878431 | 0.590199 | 0.444338 | −0.50019 | −0.24238 |
| TGF-β | −0.76622 | 0.232819 | −0.13517 | −0.43933 | 1.374063 | 1.032184 | 0.396197 | −0.42975 | 0.081008 |
| Metastasis | −0.39361 | 0.144157 | 0.232756 | 0.519417 | 0.573847 | 0.404218 | 0.15003 | −0.69165 | −0.46735 |
| Matrix remodeling | −0.60507 | 0.128235 | 0.221902 | 0.202107 | 0.893 | 0.661137 | 0.284449 | −0.82094 | −0.45632 |
| Stromal suppression | −0.67449 | 0.203813 | 0.11295 | 0.167419 | 1.199143 | 0.687159 | 0.24593 | −0.75974 | −0.27338 |
| Senescence | −0.43691 | 0.126187 | 0.302339 | 0.258465 | 1.029354 | 0.545135 | 0.34871 | −0.89115 | −0.45047 |
| Exclusion of CTL | −0.87197 | 0.389002 | −0.11407 | 0.054169 | 1.106678 | 0.654849 | 0.031617 | −0.76818 | 0.026168 |
| Matrix | −0.91666 | 0.310028 | 0.105903 | 0.10537 | 0.884051 | 0.658147 | 0.143381 | −0.92227 | −0.21274 |
| CAF | −0.98006 | 0.381897 | 0.003901 | 0.135957 | 1.069344 | 0.746713 | 0.058838 | −0.86851 | −0.08972 |
| Adipocytes | 0.002322 | 0.651408 | −0.3551 | −0.10362 | 0.567199 | 0.045384 | −0.30838 | −0.05381 | 0.088202 |
| Trail | 0.417634 | 0.346346 | −0.10902 | 0.777719 | 0.414492 | −0.19688 | −0.63333 | −0.3906 | −0.07673 | event (e.g., relapse, retreatment, or death) than another cancer patient or population of cancer patients (e.g., patients having a same cancer, but not the same TME type as the subject).

In some embodiments, the methods further comprise identifying the subject as having an increased risk of cancer progression relative to other TME types. In some embodiments, "increased risk of cancer progression" may indicate less positive prognosis of cancer or increased likelihood of having advanced disease in a subject. In some embodiments, "increased risk of cancer progression" may indicate that the subject who has cancer is expected to be less responsive or unresponsive to certain treatments and show less or no improvements of disease symptoms. For instance, "increased risk of cancer progression" indicates that a subject is at least 10%, 20%, 30%, 40%, 50%, 60%, 70%, 80%, 90%, or 100% more likely to experience a progression-free survival event (e.g., relapse, retreatment, or death) than another cancer patient or population of cancer patients (e.g., patients having a same cancer, but not the same TME type as the subject).

In some embodiments, the methods described herein comprise the use of at least one computer hardware processor to perform the determination.

In some embodiments, the present disclosure provides a method for providing a prognosis, predicting survival, or stratifying patient risk of a subject suspected of having, or at risk of having cancer. In some embodiments, the method comprises determining a TME type of the subject as described herein.

Updating TME Clusters Based on New Data

Techniques for generating TME clusters are described herein. It should be appreciated that the TME clusters may be updated as additional TME signatures are computed for patients. In some embodiments, the TME signature of the subject is one of a threshold number TME signatures for a threshold number of subjects. In some embodiments, when the threshold number of TME signatures is generated the TME signature clusters are updated. For example, once a threshold number of new TME signatures are obtained (e.g., 1 new signature, 10 new signatures, 100 new signatures, 500 new signatures, any suitable threshold number of signatures in the range of 10-1,000 signatures), the new signatures may be combined with the TME signatures previously used to generate the TME clusters and the combined set of old and new TME signatures may be clustered again (e.g., using any of the clustering algorithms described herein or any other suitable clustering algorithm) to obtain an updated set of TME signature clusters.

In this way, data obtained from a future patient may be analyzed in a way that takes advantage of information learned from patients whose TME signature was computed prior to that of the future patient. In this sense, the machine learning techniques described herein (e.g., the unsupervised clustering machine learning techniques) are adaptive and learn with the accumulation of new patient data. This facilitates improved characterization of the TME type that future patients may have and may improve the selection of treatment for those patients.

Therapeutic Indications

Aspects of the disclosure relate to methods of identifying or selecting a therapeutic agent for a subject based upon determination of the subject's TME type. The disclosure is based, in part, on the recognition that subjects having certain TME types have an increased likelihood of responding to certain therapies (e.g., immunotherapeutic agents) relative to subjects having other TME types. For example, TME types IE/F or IE/Inf may have an increased likelihood of responding to anti-inflammatory drugs (e.g., TME types IE/F, F/A/M or F/H may have an increased likelihood of responding to anti-fibrotic drugs; TME types IE/H, F/A/M or IE/F may have an increased likelihood of responding to myeloid cell targeted immune checkpoint inhibitors; TME types IE/L, IE/B/A or IE/Inf may have an increased likelihood of responding to lymphoid cell targeted immune checkpoint inhibitors; and TME types IE/H or F/H may have an increased likelihood of responding to hypoxia-activated pro-drugs and anti-glycolitic agents). As specific examples, TME types IE/H, IE/F, IE/Inf, and/or F/A/M may have an increased likelihood of responding to anti-PDL-1, anti-PD-L2, and/or anti-SIRPa antibody immune checkpoint inhibitors; TME types IE/F or IE/Inf may have an increased likelihood of responding to anti-IL-6 antibody immune checkpoint inhibitors; TME types F/A/M or F/H may have an increased likelihood of responding to anti-CD276 antibody immune checkpoint inhibitors; TME types IE/B/A, IE/Lymph, IE/H, IE/Inf, and/or IE/F may have an increased likelihood of responding to anti-PD-1, anti-LAG3, and/or anti-TIGIT antibody immune checkpoint inhibitors; TME types IE/F, F/A/M, or F/H may have an increased likelihood of responding to anti-VEGF, anti-TGF-β, and/or anti-PDGFR therapies relative to subjects having other TME types; and/or TME types IE/F, P/A/M, or F/H may have an increased likelihood of responding to tyrosine kinase inhibitors (TKIs) relative to subjects having other TME types. The disclosure is also based, in part, on the recognition that subjects having TME types IE/B/A, F/A/M, or D/A may have an increased likelihood of responding to anti-angiogenic therapies relative to subjects having other TME types. The disclosure also relates to the recognition that subjects having TME types F/H, D, and/or D/A may have an increased likelihood of responding to vaccines, immune activators and adoptive cell transfer therapy relative to subjects having other TME types.

In some embodiments, the therapeutic agents are immuno-oncology (IO) agents. An IO agent may be a small molecule, peptide, protein (e.g., antibody, such as monoclonal antibody), interfering nucleic acid, or a combination of any of the foregoing. In some embodiments, the IO agents comprise a PD1 inhibitor, PD-L1 inhibitor, or PD-L2 inhibitor. Examples of IO agents include but are not limited to cemiplimab, nivolumab, pembrolizumab, avelumab, durvalumab, atezolizumab, BMS1166, BMS202, etc. In some embodiments, the IO agents comprise a combination of atezolizumab and albumin-bound paclitaxel, pembrolizumab and albumin-bound paclitaxel, pembrolizumab and paclitaxel, or pembrolizumab and Gemcitabine and Carboplatin.

In some embodiments, the therapeutic agents are tyrosine kinase inhibitors (TKIs). A TKI may be a small molecule, peptide, protein (e.g., antibody, such as monoclonal antibody), interfering nucleic acid, or a combination of any of the foregoing. Examples of TKIs include but are not limited to Axitinib (Inlyta®), Cabozantinib (Cabometyx®)), Imatinib mesylate (Gleevec®), Dasatinib (Sprycel®), Nilotinib (Tasigna®), Bosutinib (Bosulif®), Sunitinib (Sutent®), etc. In some embodiments, the TKI inhibitor comprises neratinib, apatinib, toripalimab and anlotinib, or anlotinib.

In some embodiments, the therapeutic agents are anti-VEGF agents. An anti-VEGF agent may be a small molecule, peptide, protein (e.g., antibody, such as monoclonal antibody), interfering nucleic acid, or a combination of any of the foregoing. Examples of anti-VEGF therapies include but are not limited to Bevacizumab (Avastin®), Sunitinib, Sorafenib, Pazopanib, etc. In some embodiments, the anti-VEGF agent comprises liposomal doxorubicin, bevacizumab, and everolimus.

In some embodiments, methods described by the disclosure further comprise a step of administering one or more therapeutic agents to the subject based upon the determination of the subject's TME type. In some embodiments, a subject is administered one or more (e.g., 1, 2, 3, 4, 5, or more) IO agents. In some embodiments, a subject is administered one or more (e.g., 1, 2, 3, 4, 5, or more) TKIs. In some embodiments, a subject is administered one or more (e.g., 1, 2, 3, 4, 5, or more) anti-VEGF agents.

Aspects of the disclosure relate to methods of treating a subject having (or suspected or at risk of having) cancer based upon a determination of the TME type of the subject. In some embodiments, the methods comprise administering one or more (e.g., 1, 2, 3, 4, 5, or more) therapeutic agents to the subject. In some embodiments, the therapeutic agent (or agents) administered to the subject are selected from small molecules, peptides, nucleic acids, radioisotopes, cells (e.g., CAR T-cells, etc.), and combinations thereof.

Examples of therapeutic agents include chemotherapies (e.g., cytotoxic agents, etc.), immunotherapies (e.g., immune checkpoint inhibitors, such as PD-1 inhibitors, PD-L1 inhibitors, etc.), antibodies (e.g., anti-HER2 antibodies), cellular therapies (e.g. CAR T-cell therapies), gene silencing therapies (e.g., interfering RNAs, CRISPR, etc.), antibody-drug conjugates (ADCs), and combinations thereof. In some embodiments, a subject is administered an effective amount of a therapeutic agent.

"An effective amount" as used herein refers to the amount of each active agent required to confer therapeutic effect on the subject, either alone or in combination with one or more other active agents. Effective amounts vary, as recognized by those skilled in the art, depending on the particular condition being treated, the severity of the condition, the individual patient parameters including age, physical condition, size, gender and weight, the duration of the treatment, the nature of concurrent therapy (if any), the specific route of administration and like factors within the knowledge and expertise of the health practitioner. These factors are well known to those of ordinary skill in the art and can be addressed with no more than routine experimentation. It is generally preferred that a maximum dose of the individual components or combinations thereof be used, that is, the highest safe dose according to sound medical judgment. It will be understood by those of ordinary skill in the art, however, that a patient may insist upon a lower dose or tolerable dose for medical reasons, psychological reasons, or for virtually any other reasons.

Empirical considerations, such as the half-life of a therapeutic compound, generally contribute to the determination of the dosage. For example, antibodies that are compatible with the human immune system, such as humanized antibodies or fully human antibodies, may be used to prolong half-life of the antibody and to prevent the antibody being attacked by the host's immune system. Frequency of administration may be determined and adjusted over the course of therapy, and is generally (but not necessarily) based on treatment, and/or suppression, and/or amelioration, and/or delay of a cancer. Alternatively, sustained continuous release formulations of an anti-cancer therapeutic agent may be appropriate. Various formulations and devices for achieving sustained release are known in the art.

In some embodiments, dosages for an anti-cancer therapeutic agent as described herein may be determined empirically in individuals who have been administered one or more doses of the anti-cancer therapeutic agent. Individuals may be administered incremental dosages of the anti-cancer therapeutic agent. To assess efficacy of an administered anti-cancer therapeutic agent, one or more aspects of a cancer (e.g., tumor microenvironment, tumor formation, tumor growth, or TME types, etc.) may be analyzed.

Generally, for administration of any of the anti-cancer antibodies described herein, an initial candidate dosage may be about 2 mg/kg. For the purpose of the present disclosure, a typical daily dosage might range from about any of 0.1 µg/kg to 3 µg/kg to 30 µg/kg to 300 µg/kg to 3 mg/kg, to 30 mg/kg to 100 mg/kg or more, depending on the factors mentioned above. For repeated administrations over several days or longer, depending on the condition, the treatment is sustained until a desired suppression or amelioration of symptoms occurs or until sufficient therapeutic levels are achieved to alleviate a cancer, or one or more symptoms thereof. An exemplary dosing regimen comprises administering an initial dose of about 2 mg/kg, followed by a weekly maintenance dose of about 1 mg/kg of the antibody, or followed by a maintenance dose of about 1 mg/kg every other week. However, other dosage regimens may be useful, depending on the pattern of pharmacokinetic decay that the practitioner (e.g., a medical doctor) wishes to achieve. For example, dosing from one-four times a week is contemplated. In some embodiments, dosing ranging from about 3 µg/mg to about 2 mg/kg (such as about 3 µg/mg, about 10 µg/mg, about 30 µg/mg, about 100 µg/mg, about 300 µg/mg, about 1 mg/kg, and about 2 mg/kg) may be used. In some embodiments, dosing frequency is once every week, every 2 weeks, every 4 weeks, every 5 weeks, every 6 weeks, every 7 weeks, every 8 weeks, every 9 weeks, or every 10 weeks; or once every month, every 2 months, or every 3 months, or longer. The progress of this therapy may be monitored by conventional techniques and assays and/or by monitoring TME types as described herein. The dosing regimen (including the therapeutic used) may vary over time.

Dosing of immuno-oncology agents is well-known, for example as described by Louedec et al. *Vaccines* (Basel). 2020 December; 8(4): 632. For example, dosages of pembrolizumab, for example, include administration of 200 mg every 3 weeks or 400 mg every 6 weeks, by infusion over 30 minutes.

Dosing of TKIs is also well-known, for example as described by Gerritse et al. *Cancer Treat Rev.* 2021 June; 97:102171. doi: 10.1016/j.ctrv.2021.102171. Combination dosing of TKIs and IO agents is also known, for example as described by Rassy et al. *Ther Adv Med Oncol.* 2020; 12: 1758835920907504.

When the anti-cancer therapeutic agent is not an antibody, it may be administered at the rate of about 0.1 to 300 mg/kg of the weight of the patient divided into one to three doses, or as disclosed herein. In some embodiments, for an adult patient of normal weight, doses ranging from about 0.3 to 5.00 mg/kg may be administered. The particular dosage regimen, e.g., dose, timing, and/or repetition, will depend on the particular subject and that individual's medical history, as well as the properties of the individual agents (such as the half-life of the agent, and other considerations well known in the art).

For the purpose of the present disclosure, the appropriate dosage of an anti-cancer therapeutic agent will depend on the specific anti-cancer therapeutic agent(s) (or compositions thereof) employed, the type and severity of cancer, whether the anti-cancer therapeutic agent is administered for preventive or therapeutic purposes, previous therapy, the patient's clinical history and response to the anti-cancer therapeutic agent, and the discretion of the attending physician. Typically, the clinician will administer an anti-cancer therapeutic agent, such as an antibody, until a dosage is reached that achieves the desired result.

Administration of an anti-cancer therapeutic agent can be continuous or intermittent, depending, for example, upon the recipient's physiological condition, whether the purpose of the administration is therapeutic or prophylactic, and other factors known to skilled practitioners. The administration of an anti-cancer therapeutic agent (e.g., an anti-cancer antibody) may be essentially continuous over a preselected period of time or may be in a series of spaced dose, e.g., either before, during, or after developing cancer.

As used herein, the term "treating" refers to the application or administration of a composition including one or more active agents to a subject, who has a cancer, a symptom of a cancer, or a predisposition toward a cancer, with the purpose to cure, heal, alleviate, relieve, alter, remedy, ameliorate, improve, or affect the cancer or one or more symptoms of cancer, or the predisposition toward cancer.

Alleviating cancer includes delaying the development or progression of the disease or reducing disease severity. Alleviating the disease does not necessarily require curative results. As used therein, "delaying" the development of a disease (e.g., a cancer) means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detected and assessed using clinical techniques known in the art. Alternatively, or in addition to the clinical techniques known in the art, development of the disease may be detectable and assessed based on other criteria. However, development also refers to progression that may be undetectable. For purpose of this disclosure, development or progression refers to the biological course of the symptoms. "Development" includes occurrence, recurrence, and onset. As used herein "onset" or "occurrence" of a cancer includes initial onset and/or recurrence.

Examples of the antibody anti-cancer agents include, but are not limited to, alemtuzumab (Campath), trastuzumab (Herceptin), Ibritumomab tiuxetan (Zevalin), Brentuximab vedotin (Adcetris), Ado-trastuzumab emtansine (Kadcyla), blinatumomab (Blincyto), Bevacizumab (Avastin), Cetuximab (Erbitux), ipilimumab (Yervoy), nivolumab (Opdivo), pembrolizumab (Keytruda), atezolizumab (Tecentriq), avelumab (Bavencio), durvalumab (Imfinzi), and panitumumab (Vectibix).

Examples of an immunotherapy include, but are not limited to, a PD-1 inhibitor or a PD-L1 inhibitor, a CTLA-4 inhibitor, adoptive cell transfer, therapeutic cancer vaccines, oncolytic virus therapy, T-cell therapy, and immune checkpoint inhibitors.

Examples of radiation therapy include, but are not limited to, ionizing radiation, gamma-radiation, neutron beam radiotherapy, electron beam radiotherapy, proton therapy, brachytherapy, systemic radioactive isotopes, and radiosensitizers.

Examples of a surgical therapy include, but are not limited to, a curative surgery (e.g., tumor removal surgery), a preventive surgery, a laparoscopic surgery, and a laser surgery.

Examples of the chemotherapeutic agents include, but are not limited to, R-CHOP, Carboplatin or Cisplatin, Docetaxel, Gemcitabine, Nab-Paclitaxel, Paclitaxel, Pemetrexed, and Vinorelbine. Additional examples of chemotherapy include, but are not limited to, Platinating agents, such as Carboplatin, Oxaliplatin, Cisplatin, Nedaplatin, Satraplatin, Lobaplatin, Triplatin, Tetranitrate, Picoplatin, Prolindac, Aroplatin and other derivatives; Topoisomerase I inhibitors, such as Camptothecin, Topotecan, irinotecan/SN38, rubitecan, Belotecan, and other derivatives; Topoisomerase II inhibitors, such as Etoposide (VP-16), Daunorubicin, a doxorubicin agent (e.g., doxorubicin, doxorubicin hydrochloride, doxorubicin analogs, or doxorubicin and salts or analogs thereof in liposomes), Mitoxantrone, Aclarubicin, Epirubicin, Idarubicin, Amrubicin, Amsacrine, Pirarubicin, Valrubicin, Zorubicin, Teniposide and other derivatives; Antimetabolites, such as Folic family (Methotrexate, Pemetrexed, Raltitrexed, Aminopterin, and relatives or derivatives thereof); Purine antagonists (Thioguanine, Fludarabine, Cladribine, 6-Mercaptopurine, Pentostatin, clofarabine, and relatives or derivatives thereof) and Pyrimidine antagonists (Cytarabine, Floxuridine, Azacitidine, Tegafur, Carmofur, Capacitabine, Gemcitabine, hydroxyurea, 5-Fluorouracil (5FU), and relatives or derivatives thereof); Alkylating agents, such as Nitrogen mustards (e.g., Cyclophosphamide, Melphalan, Chlorambucil, mechlorethamine, Ifosfamide, mechlorethamine, Trofosfamide, Prednimustine, Bendamustine, Uramustine, Estramustine, and relatives or derivatives thereof); nitrosoureas (e.g., Carmustine, Lomustine, Semustine, Fotemustine, Nimustine, Ranimustine, Streptozocin, and relatives or derivatives thereof); Triazenes (e.g., Dacarbazine, Altretamine, Temozolomide, and relatives or derivatives thereof); Alkyl sulphonates (e.g., Busulfan, Mannosulfan, Treosulfan, and relatives or derivatives thereof); Procarbazine; Mitobronitol, and Aziridines (e.g., Carboquone, Triaziquone, ThioTEPA, triethylenemalamine, and relatives or derivatives thereof); Antibiotics, such as Hydroxyurea, Anthracyclines (e.g., doxorubicin agent, daunorubicin, epirubicin and relatives or derivatives thereof); Anthracenediones (e.g., Mitoxantrone and relatives or derivatives thereof); *Streptomyces* family antibiotics (e.g., Bleomycin, Mitomycin C, Actinomycin, and Plicamycin); and ultraviolet light.

In some aspects, the disclosure provides a method for treating cancer, the method comprising administering one or more therapeutic agents (e.g., one or more anti-cancer agents, such as one or more immunotherapeutic agents) to a subject identified as having a particular TME type, wherein the TME type of the subject has been identified by method as described by the disclosure.

Reports

In some aspects, methods disclosed herein comprise generating a report for assisting with the preparation of recommendation for prognosis and/or treatment. The generated report can provide summary of information, so that the clinician can identify the TME type or suitable therapy. The report as described herein may be a paper report, an electronic record, or a report in any format that is deemed suitable in the art. The report may be shown and/or stored on a computing device known in the art (e.g., handheld device, desktop computer, smart device, website, etc.). The report may be shown and/or stored on any device that is suitable as understood by a skilled person in the art.

In some embodiments, methods disclosed herein can be used for commercial diagnostic purposes. For example, the generated report may include, but is limited to, information concerning expression levels of one or more genes from any of the gene groups described herein, clinical and pathologic factors, patient's prognostic analysis, predicted response to the treatment, classification of the TME type (e.g., as belonging to one of the types described herein), the alternative treatment recommendation, and/or other information. In some embodiments, the methods and reports may include database management for the keeping of the generated reports. For instance, the methods as disclosed herein can create a record in a database for the subject (e.g., subject 1, subject 2, etc.) and populate the specific record with data for the subject. In some embodiments, the generated report can be provided to the subject and/or to the clinicians. In some embodiments, a network connection can be established to a server computer that includes the data and report for receiving or outputting. In some embodiments, the receiving and outputting of the date or report can be requested from the server computer.

Computer Implementation

Figure 20:
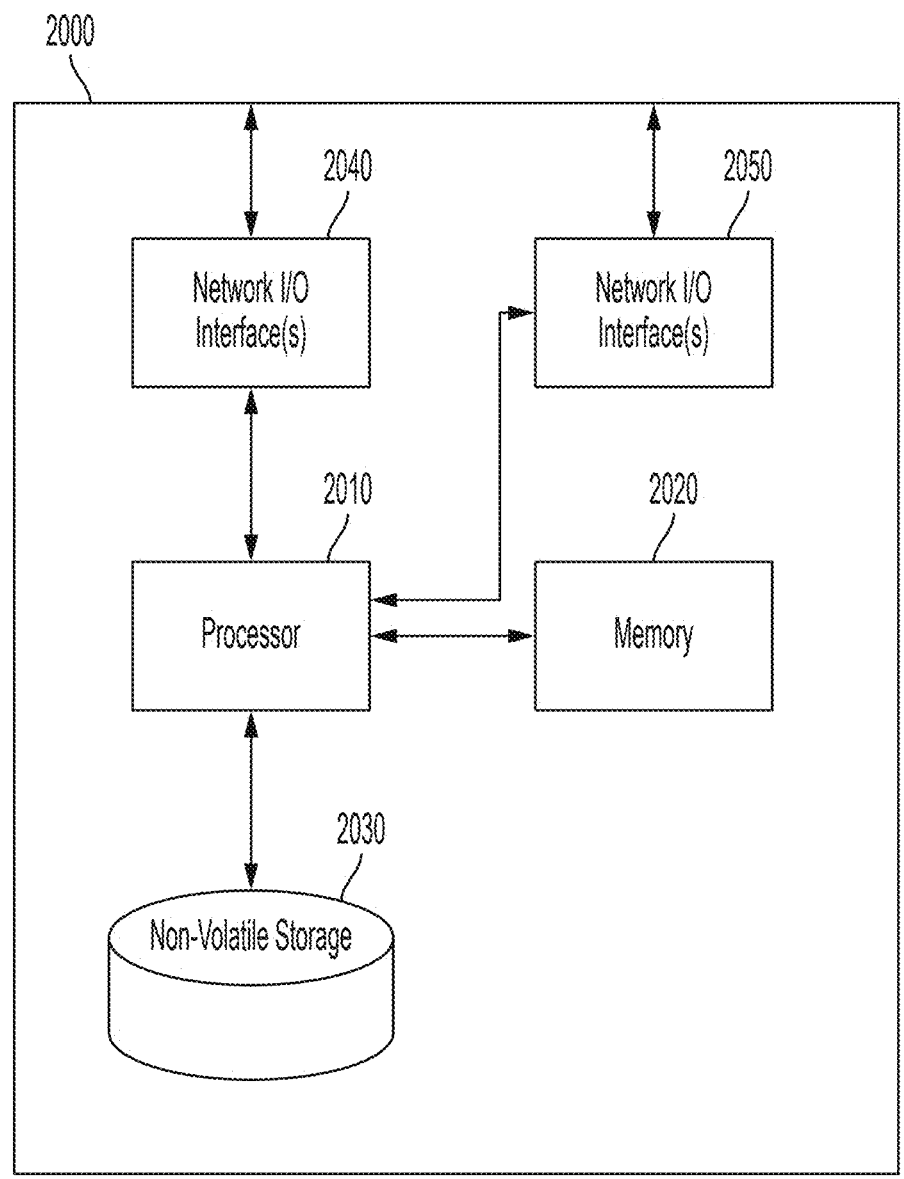
FIG. 20 depicts an illustrative implementation of a computer system that may be used in connection with some embodiments of the technology described herein.

An illustrative implementation of a computer system 2000 that may be used in connection with any of the embodiments of the technology described herein (e.g., such as the method of FIG. 1, FIG. 2, or FIG. 3) is shown in FIG. 20. The computer system 2000 includes one or more processors 2010 and one or more articles of manufacture that comprise non-transitory computer-readable storage media (e.g., memory 2020 and one or more non-volatile storage media 2030). The processor 2010 may control writing data to and reading data from the memory 2020 and the non-volatile storage device 2030 in any suitable manner, as the aspects of the technology described herein are not limited to any particular techniques for writing or reading data. To perform any of the functionality described herein, the processor 2010 may execute one or more processor-executable instructions stored in one or more non-transitory computer-readable storage media (e.g., the memory 2020), which may serve as non-transitory computer-readable storage media storing processor-executable instructions for execution by the processor 2010.

Computing device 2000 may also include a network input/output (I/O) interface 2040 via which the computing device may communicate with other computing devices (e.g., over a network), and may also include one or more user I/O interfaces 2050, via which the computing device may provide output to and receive input from a user. The user VO interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software, or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

The foregoing description of implementations provides illustration and description but is not intended to be exhaustive or to limit the implementations to the precise form disclosed. Modifications and variations are possible in light of the above teachings or may be acquired from practice of the implementations. In other implementations the methods depicted in these figures may include fewer operations, different operations, differently ordered operations, and/or additional operations. Further, non-dependent blocks may be performed in parallel.

It will be apparent that example aspects, as described above, may be implemented in many different forms of software, firmware, and hardware in the implementations illustrated in the figures. Further, certain portions of the implementations may be implemented as a "module" that performs one or more functions. This module may include hardware, such as a processor, an application-specific integrated circuit (ASIC), or a field-programmable gate array (FPGA), or a combination of hardware and software.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone, a tablet, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

EXAMPLE

Tumor immune escape (IE) processes represent the major cause of most of the cases of cancer therapy resistance. Escape mechanisms, from antigen presentation machinery loss to cytotoxic cell exclusion, are widely reviewed in literature; however, they are rarely analyzed systemically. An approach to classify patients according to comprehensive RNA/DNA- or proteome-based analysis of their tumor samples is rapidly evolving, and the existing classifications of tumor microenvironment offer new insights into the concept of rational therapy selection. However, these classifications are mostly based on different types of tumor-infiltrating immune cells and pay almost no attention to tumor-intrinsic features, such as hypoxia or autophagy, or stroma activation and immune suppression mechanisms, such as metabolic shifts and exclusion-all of them contributing to tumor immune escape and, potentially, therapy resistance.

In this example, a method is described for deep systemic analysis of the tumor features, immune infiltrating cells, stroma, and various suppressive mechanisms, enabling differentiation of nine patient groups united by a certain combination of immune escape strategies. This classification shows that certain IE processes often work simultaneously, which means they should be considered together when selecting treatment options. Additionally, classification of patients in this way distinguishes patient groups which, most likely, will benefit from a certain type of immunotherapy (i.e. ICI), or stroma-oriented therapy (i.e. VEGFR inhibitors), or from other therapy classes, and, thus, can be used for development of new treatment combinations.

Novel signatures describing immune escape mechanisms include the following: Pro-tumor chemokines, Anti-tumor chemokines, Myeloid checkpoints, Lymphoid checkpoints, Cytotoxic cell inactivation, Myeloid suppression, Phagocytosis inhibition, Stromal suppression, Exclusion of CTL, Metabolic suppression of CTL, Autophagy, Acidosis, Senescence, Apoptosis, Glycolysis, Metastasis, and Hypoxia factors. Novel signatures describing cell types which take part in immune escape (pro-tumor) or help to overcome immune escape (anti-tumor) include the following: Breg (regulatory B cells), cDC1 (conventional dendritic cells type 1), cDC2 (conventional dendritic cells type 2), pDC (plasmacytoid dendritic cells), and Adipocytes.

On the basis of the collected set of signatures related to tumor immune escape and anti-tumor immunity, nine new clusters were identified. The clusters were characterized by distinct combinations of immune escape mechanisms and level of immune infiltrate: Lymphoid-cell-Enriched (IE/L, moderate lymphoid immune checkpoint (ICP) expression, good prognosis); B-cell-enriched, Angiogenic (IE/B/A, mostly B-cell-expressed ICP expression); Immune-Enriched, Hypoxic (IE/H, moderate lymphoid and myeloid ICP expression, moderate hypoxia); Highly Immune-Enriched, Inflamed (IE/Inf, high lymphoid and myeloid ICP expression, high inflammation, the best prognosis); Immune-Enriched, Fibrotic (IE/F, high lymphoid, myeloid and stromal ICP expression, high stroma activation and inflammation); Fibrotic, Angiogenic, Myeloid (F/A/M, low myeloid and stromal ICP, high stroma activation, bad prognosis); Fibrotic, Hypoxic (F/H, low angiogenesis, moderate stroma activation, high hypoxia, the worst prognosis); Immune Desert (D, trace expression of ICP, low hypoxia); and Faintly Infiltrated, Angiogenic (D/A, trace expression of ICP, moderate angiogenesis). The proposed clusters differentiate patients according to their immune escape mechanisms and TME structure and can help to reduce the incidence of therapy resistance.

At present, the biggest problem facing cancer immunotherapy is to deeply dissect its complex drug resistance mechanisms and adopt effective combination therapy strategies to overcome it. The identification of biomarkers that could predict clinical efficacy is also an urgent issue, as well as the development of models allowing stratification of patients into responders and non-responders. The first developed tumor microenvironment (TME) classifications often distinguish "cold", "hot" and "intermediate" tumors, according to immune infiltration and overall inflammation (5,7), and postulate that patients with "hot" tumors would generally gain more benefits from immunotherapy (7). There also are a number of deeper TME classifications. C1-C6 subtypes of TME were identified for 33 solid tumors by evaluation of the five selected immune expression signatures (8). However, diagnoses were distributed unevenly between the subtypes, meaning that such classification does not identify features common for all solid cancers. In the second study, 29 solid cancers were analyzed to identify six immune phenotypes based on cytotoxic cell content, and the main purpose of the classification was to link immune cell content with genomic tumor features and identify scenarios of tumor immune infiltration (9). In another work, researchers developed a machine learning framework and identified 69 cell states and 10 multicellular communities called ecotypes. Cell states and ecotypes were associated with overall survival and could help to predict therapy outcome to a certain extent (10). Apart from RNA-seq, the mass-spectrometry method was also used to profile tumors to distinguish ten protein-based classes in six types of solid tumors. They recognized two subtypes, where one is associated with the adaptive immune response and the other with the humoral immune response (11).

The observed classifications indeed allow the distinction of reproducible TME states and subtypes, but still have several limitations: they commonly consider a limited number of TME components, mostly circling around different features describing immune cell infiltration and activation, and only a couple of studies offer associations of the defined TME types with therapy response. In BostonGene, TME classification was also developed, which covered not only immune cell subtypes, but also cell trafficking, tumor cell proliferation and transformation and stroma compartment formation, which allowed definition of four TME subtypes-Molecular Functional Portraits (MFP)—which were highly associated with patient response to selected immunotherapies like anti-PD1 and thus can be regarded as biomarkers (12). Still, more evidence has emerged that immunotherapies and targeted therapies with single agents often show low efficacy or cause rapid development of drug resistance due to suppressive TME or tumor immune evasion. Thus, more detailed analysis of the immune escape mechanisms is needed to stratify the patients and elucidate the best beneficiaries for certain therapy combinations, or to define the most probable non-responders. In this example, a solid tumor classification based on 41 manually curated gene expression signatures and 7 signaling pathways is described, which allows analysis of the complex aspects of active and suppressive immune infiltration, immune escape mechanisms, and pathway activation in each sample.

Signatures Used for IE Subtyping

A set of functional gene expression signatures (FGES) and signaling pathways calculated by the PROGENy algorithm (13) were collected, which allowed the distinction of different IE-associated clusters of TCGA patients (Tables 1, 2, and 3). The selected features help to describe different IE mechanisms, as well as components of active and suppressive immune infiltration.

A combination of FGES were used. FGES were developed earlier in BostonGene and published by Bagaev et al., 2021 (12), describing tumor-infiltrating cell types, stromal components, EMT and proliferation rate. Some of these signatures were updated in accordance with new published data and after validation of their specificity on the internal database of single cell and bulk RNA-seq samples of whole tumor, sorted cells, blood, other tissue biopsies, etc.: Treg cells, Matrix, Endothelium, CAF, Matrix remodeling, Angiogenesis, EMT signature, and MI signature (M1 cytokines). FGES were also created de novo as a result of literature analysis and validated on the same database, describing different components of the immune-active and immune-suppressive tumor microenvironment and IE mechanisms: Pro-inflammatory cytokines, Pro-tumor chemokines, Anti-tumor chemokines, Myeloid checkpoints, Lymphoid checkpoints, Cytotoxic cell inactivation, Myeloid suppression, Phagocytosis inhibition, Stromal suppression, Exclusion of CTL, Metabolic suppression of CTL, Autophagy, Acidosis, Senescence, Apoptosis, Glycolysis, Metastasis, Hypoxia factors, Breg, cDC1, cDC2, pDC, and Adipocytes.

FGES Development and Validation

Figure 6C:
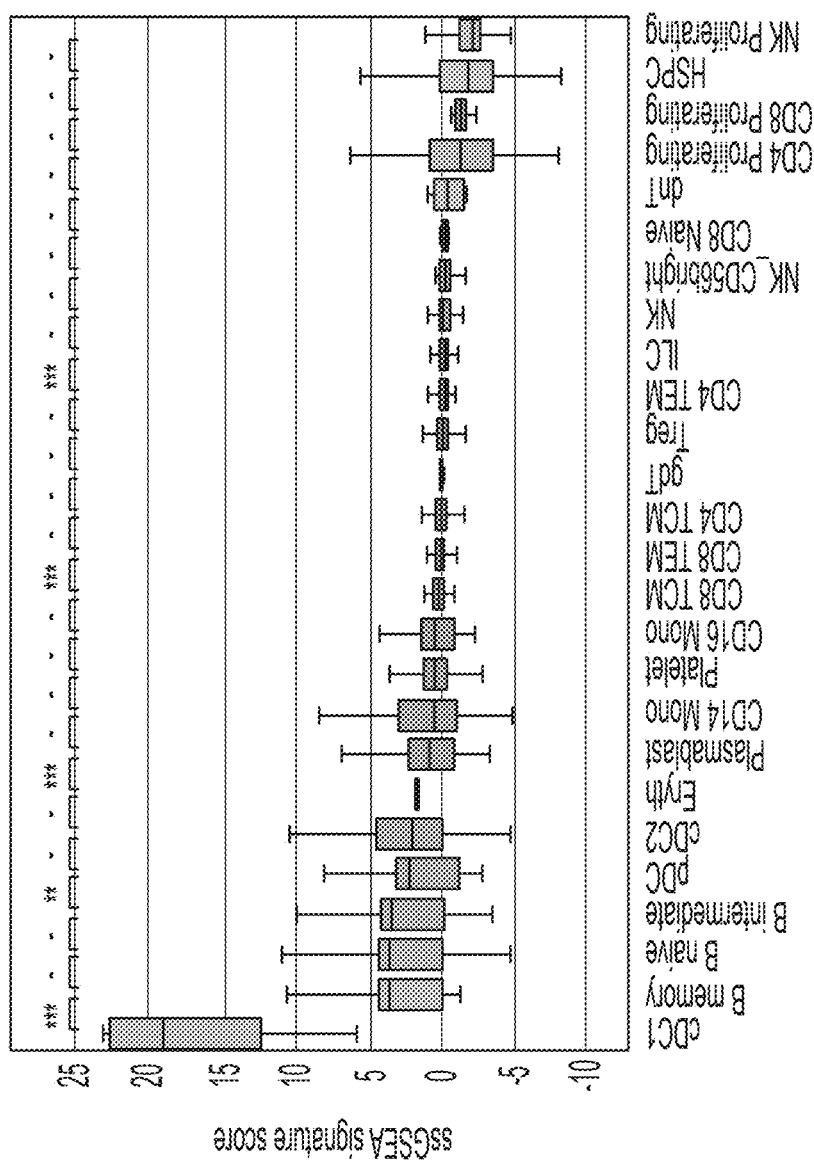
FIGS. 6A-6D show an example of a cell-type-specific functional gene expression signature (FGES) validation for type 1 conventional dendritic cells (cDC1), according to some embodiments of the technology described herein. Genes collected for an FGES were checked for cross-correlation (FIG. 6A) and expression intensity (FIG. 6B). Then, a composed FGES was tested for specificity on single-cell (FIG. 6C) and sorted-cell (FIG. 6D) RNA sequencing (RNA-seq) data.
Figure 6A:
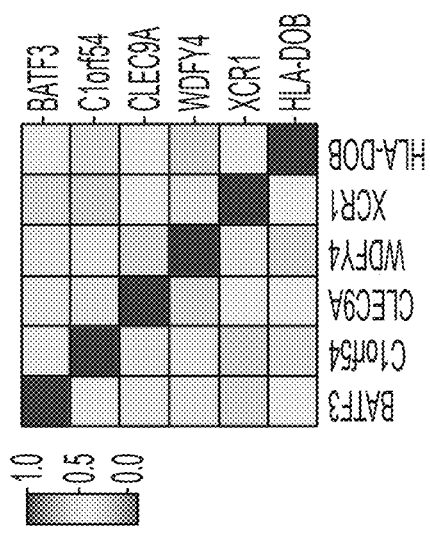
Figure 6B:
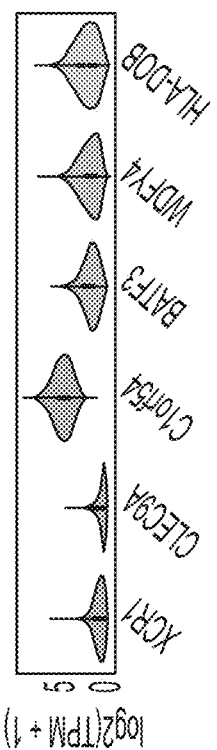
Figure 6D:
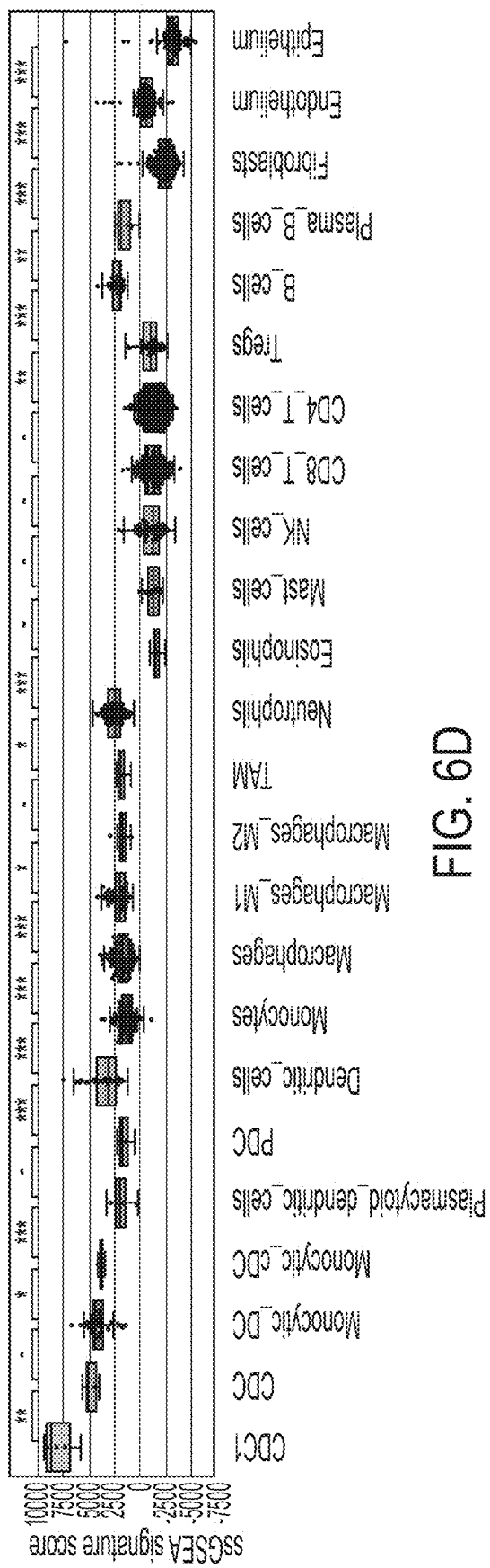
Figures 7A, 7B, 7C:
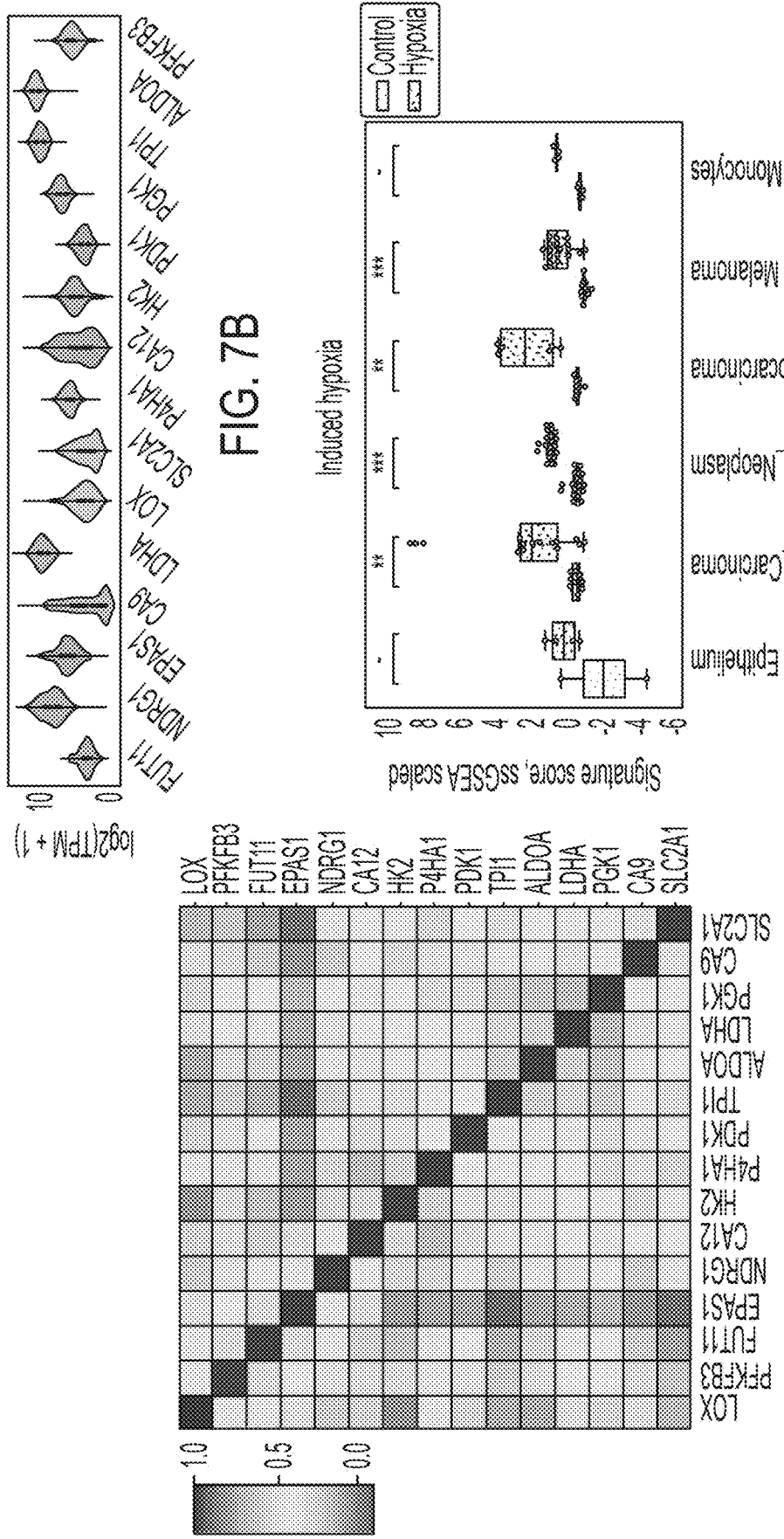
FIGS. 7A-7C show an example of a process describing FGES validation, according to some embodiments of the technology described herein. Genes collected for the FGES were checked for cross-correlation (FIG. 7A) and expression intensity (FIG. 7B). Then, the composed FGES was tested for specificity (FIG. 7C) on RNA-seq samples with a certain condition (e.g., with induced hypoxia).
Figure 8A:
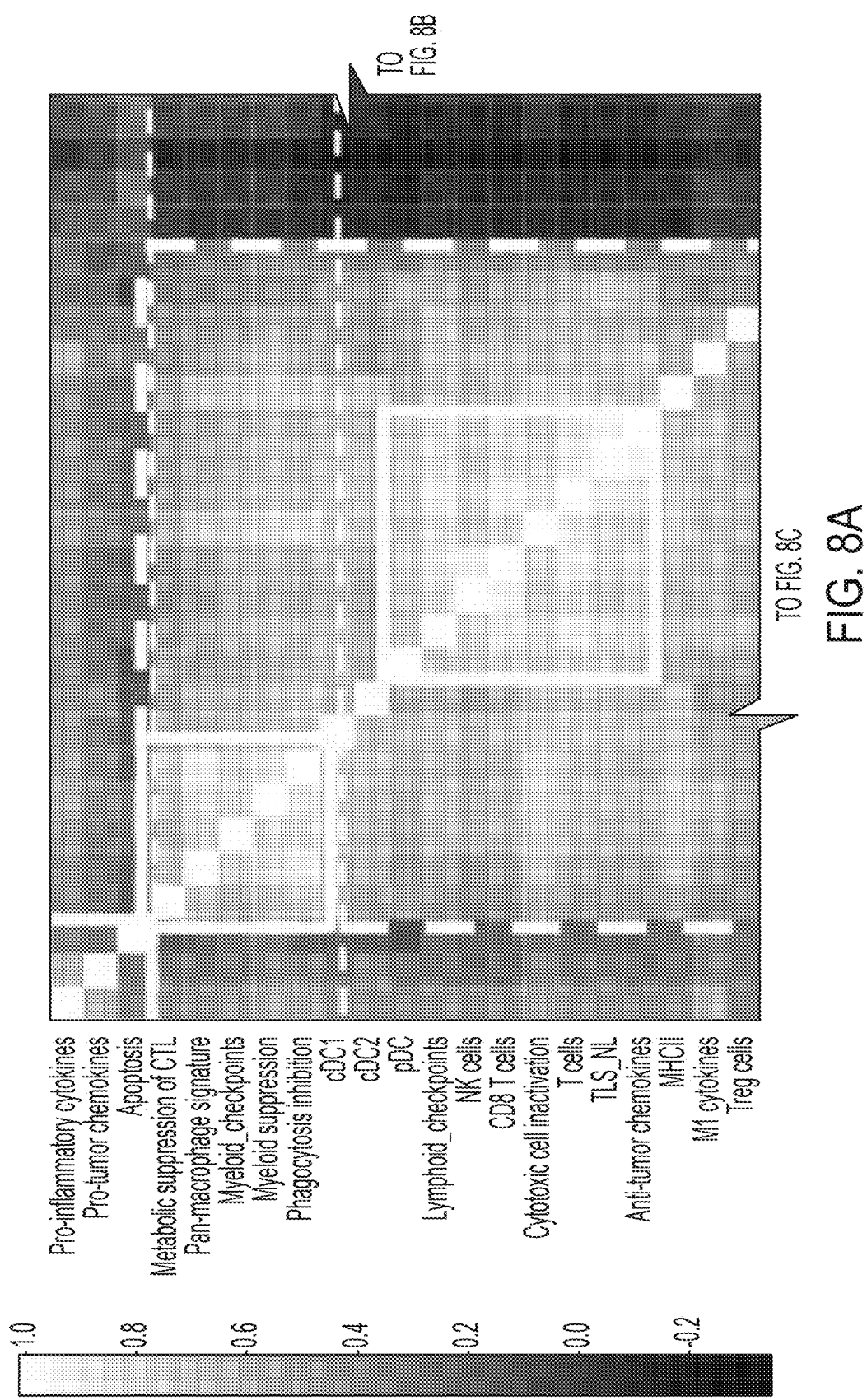
FIGS. 8A-8D are a clustered heatmap depicting the results of Spearman correlation analysis of the features selected for immune escape clustering, according to some embodiments of the technology described herein. Five functional groups are highlighted by solid squares. A meta-group of processes associated with immune infiltration is highlighted by a dashed square. To the right, a schematic illustration and major therapy targets are shown for each functional group.
Figure 8B:
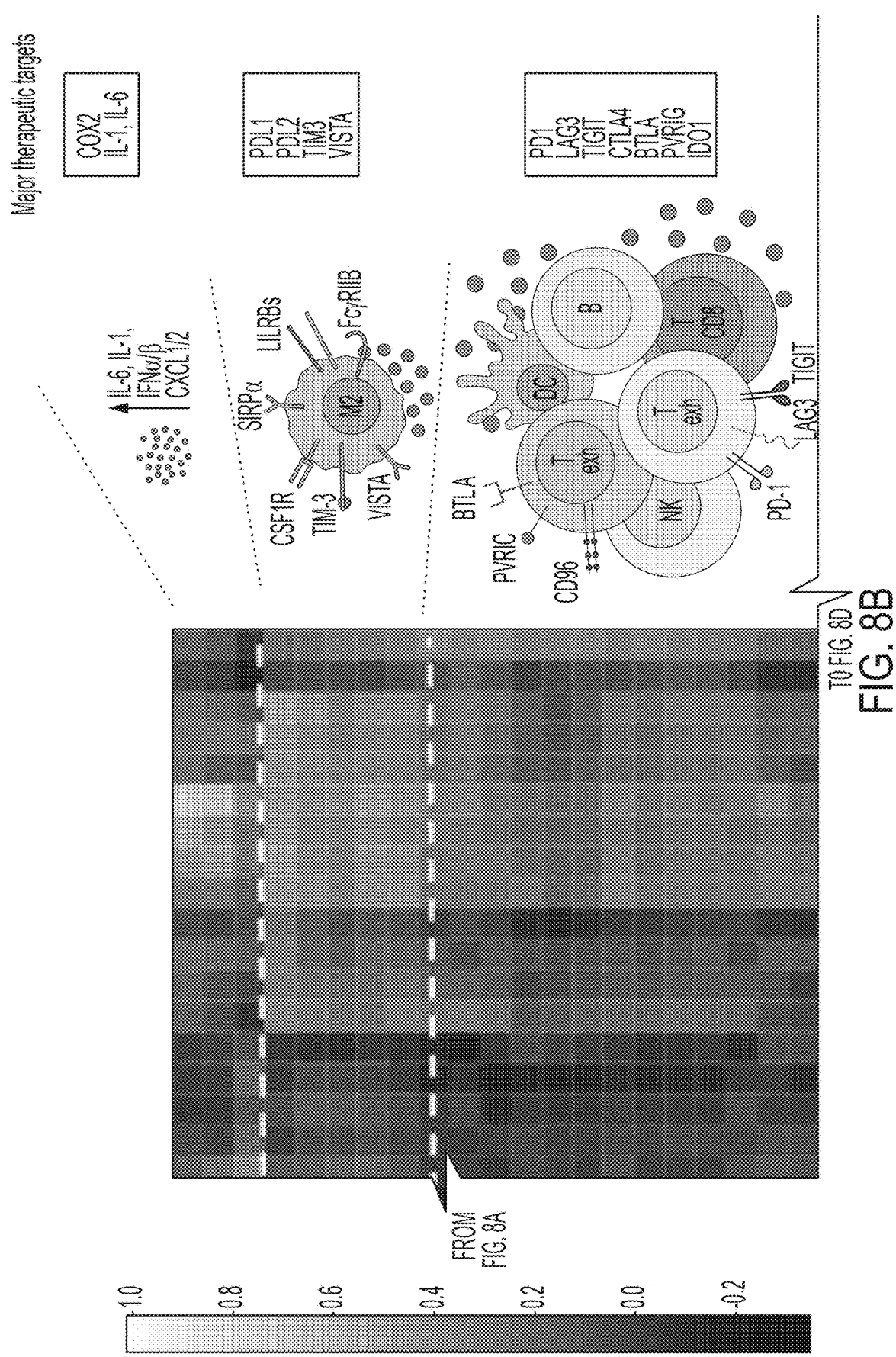
Figure 8C:
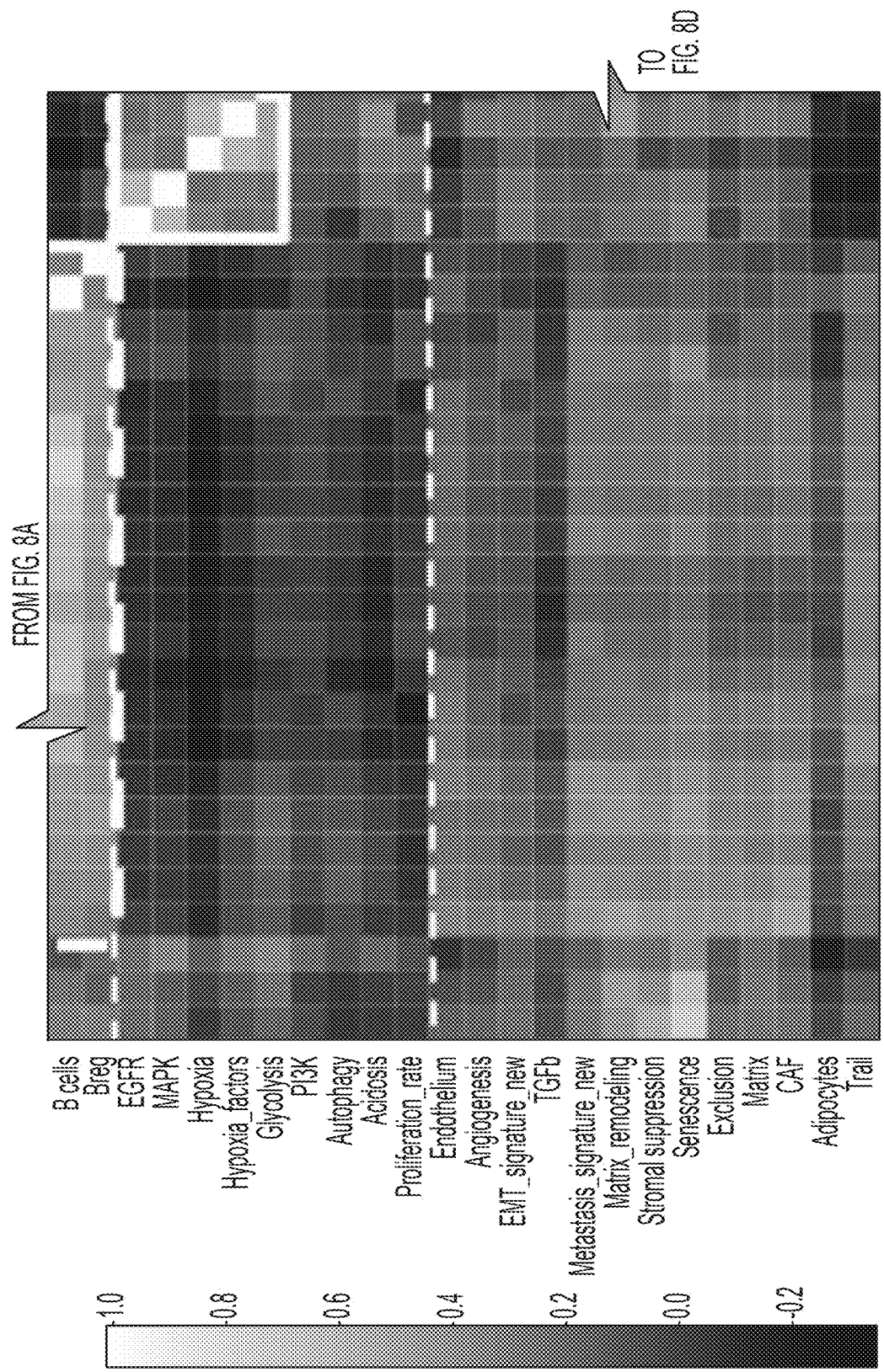
Figure 8D:
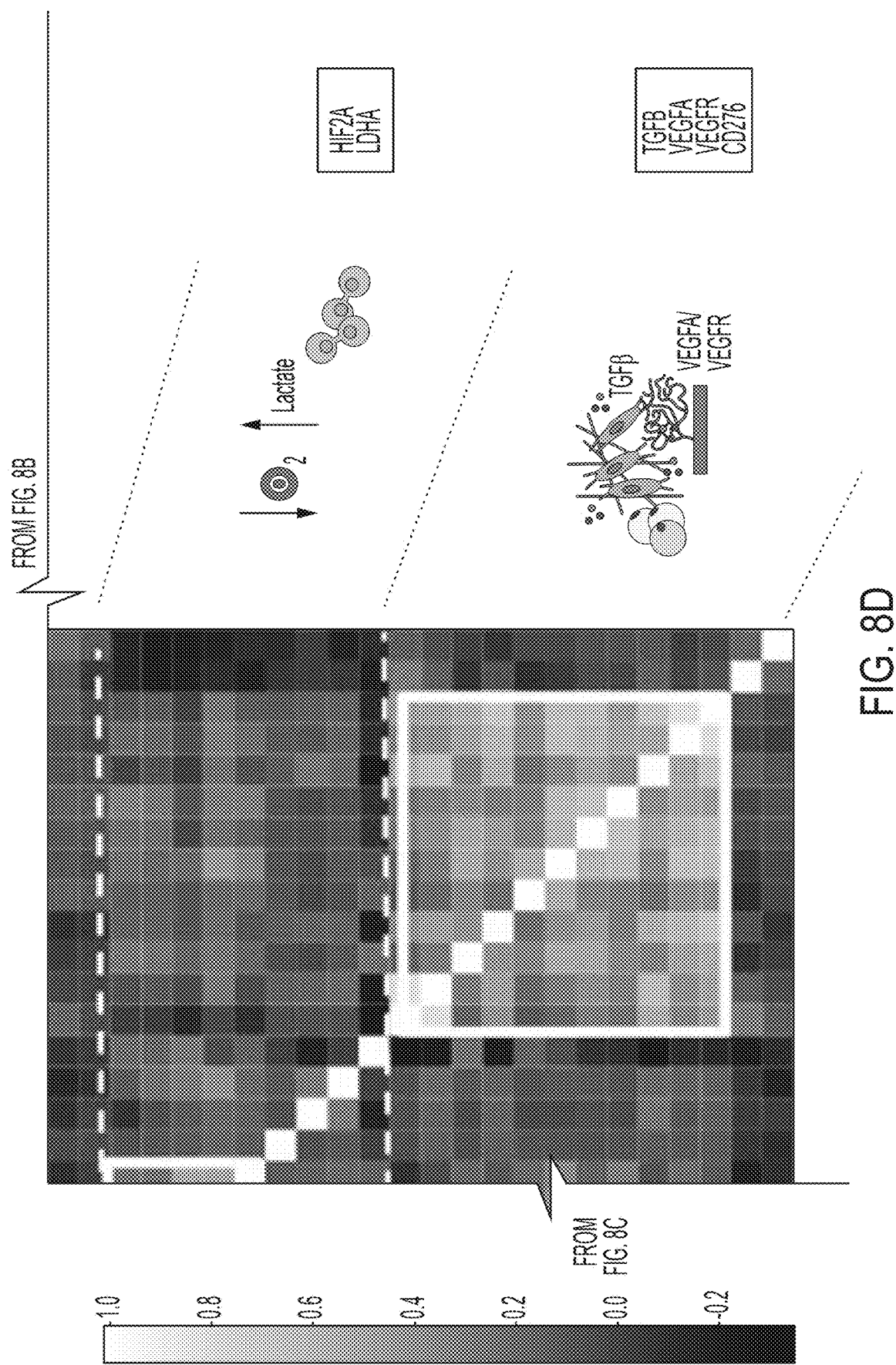
Figure 9A:
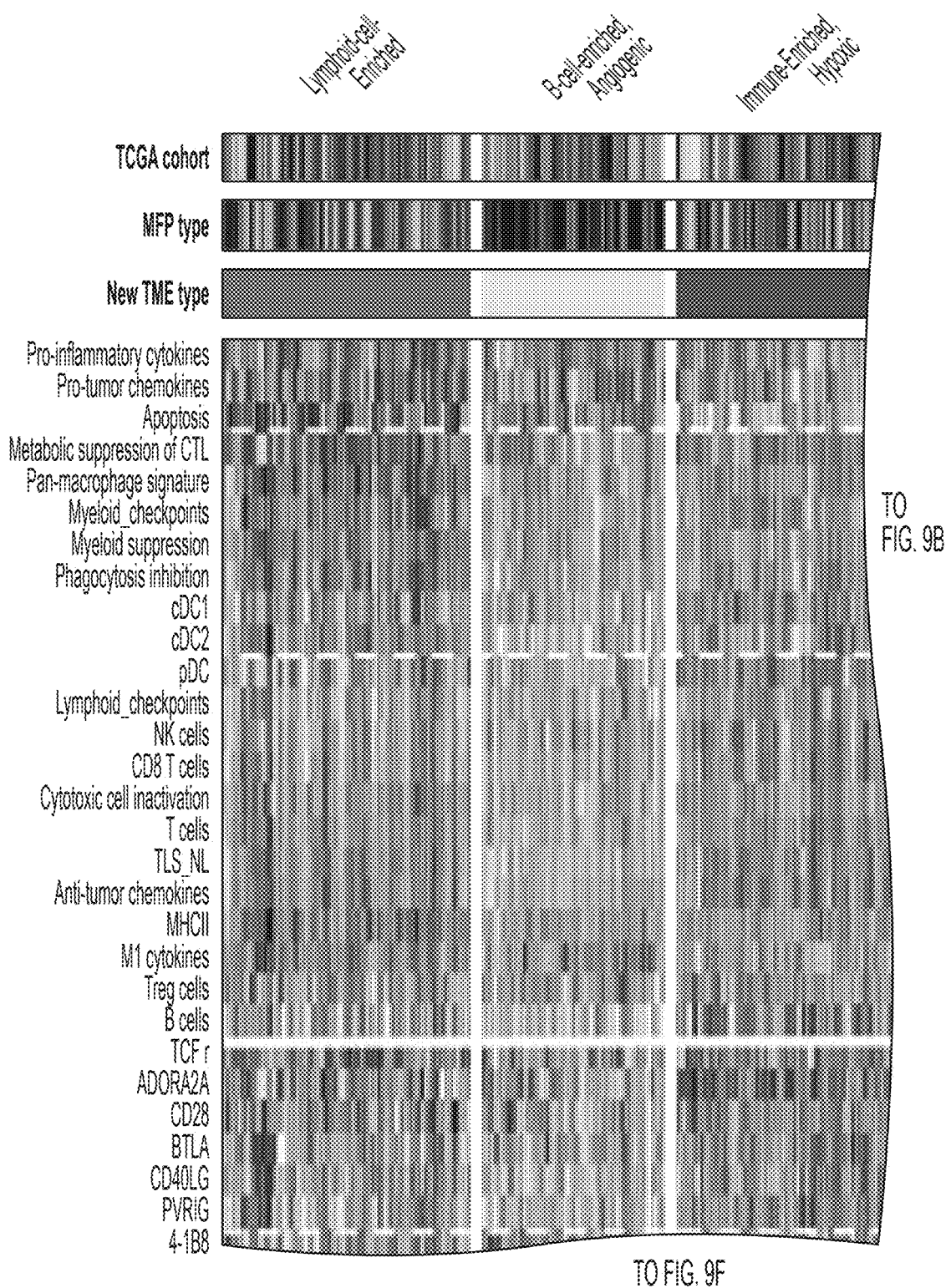
FIGS. 9A-9J are a heatmap depicting the results of agglomerative clustering of The Cancer Genome Atlas (TCGA) samples based on 48 immune escape (IE)-based functional gene expression signatures (FGES) and Pathway Responsive GENes (PROGENy) scores, complemented by the expression intensities of a range of clinically relevant immune checkpoint molecules (in the central part of the heatmap), according to some embodiments of the technology described herein. Clustering features are separated into three major groups: features related to immune cell infiltration, tumor-associated features, and stroma-associated features. Immune checkpoint single gene expression was not used in clustering. The order of the features reflects the results of the hierarchical cluster analysis shown in FIGS. 8A-8D. Patients with total loss of gene(s) encoding one of the crucial components of the MHCI antigen presenting (AP) machinery (HLA-A/B/C, B2M, TAP1/2, TAPBP, ERAP1/2) are shown on a separate heatmap.
Figure 9B:
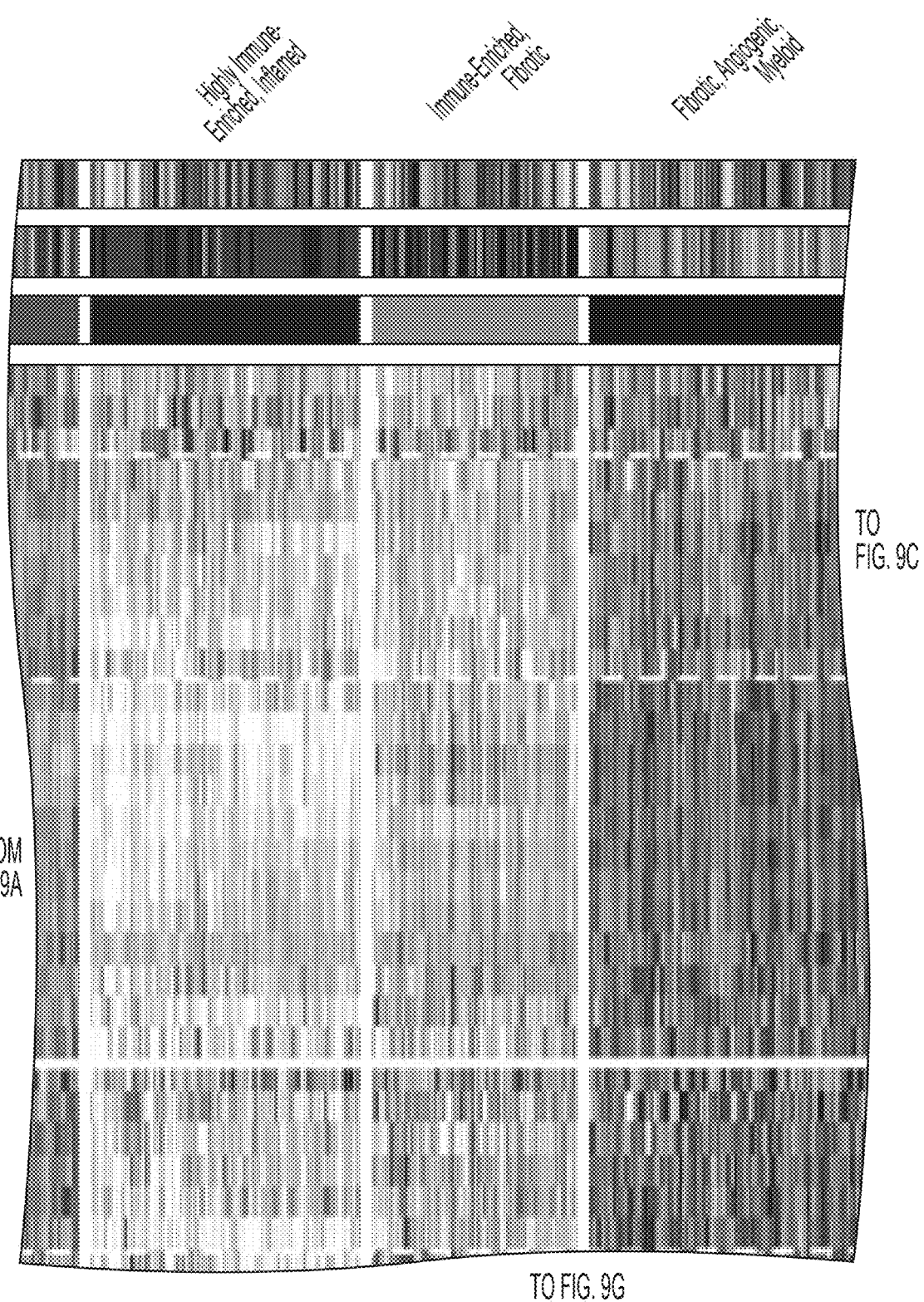
Figure 9C:
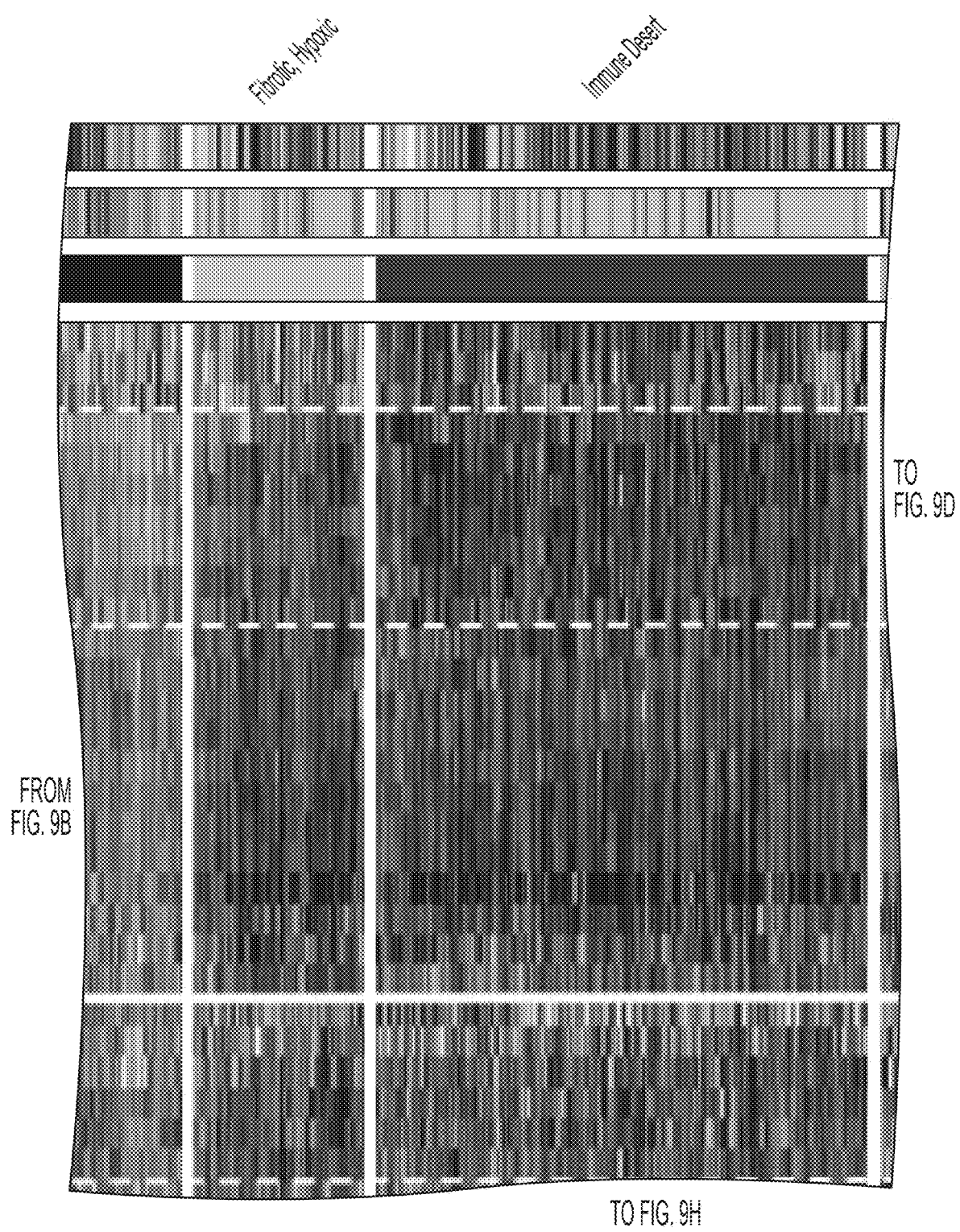
Figure 9D:
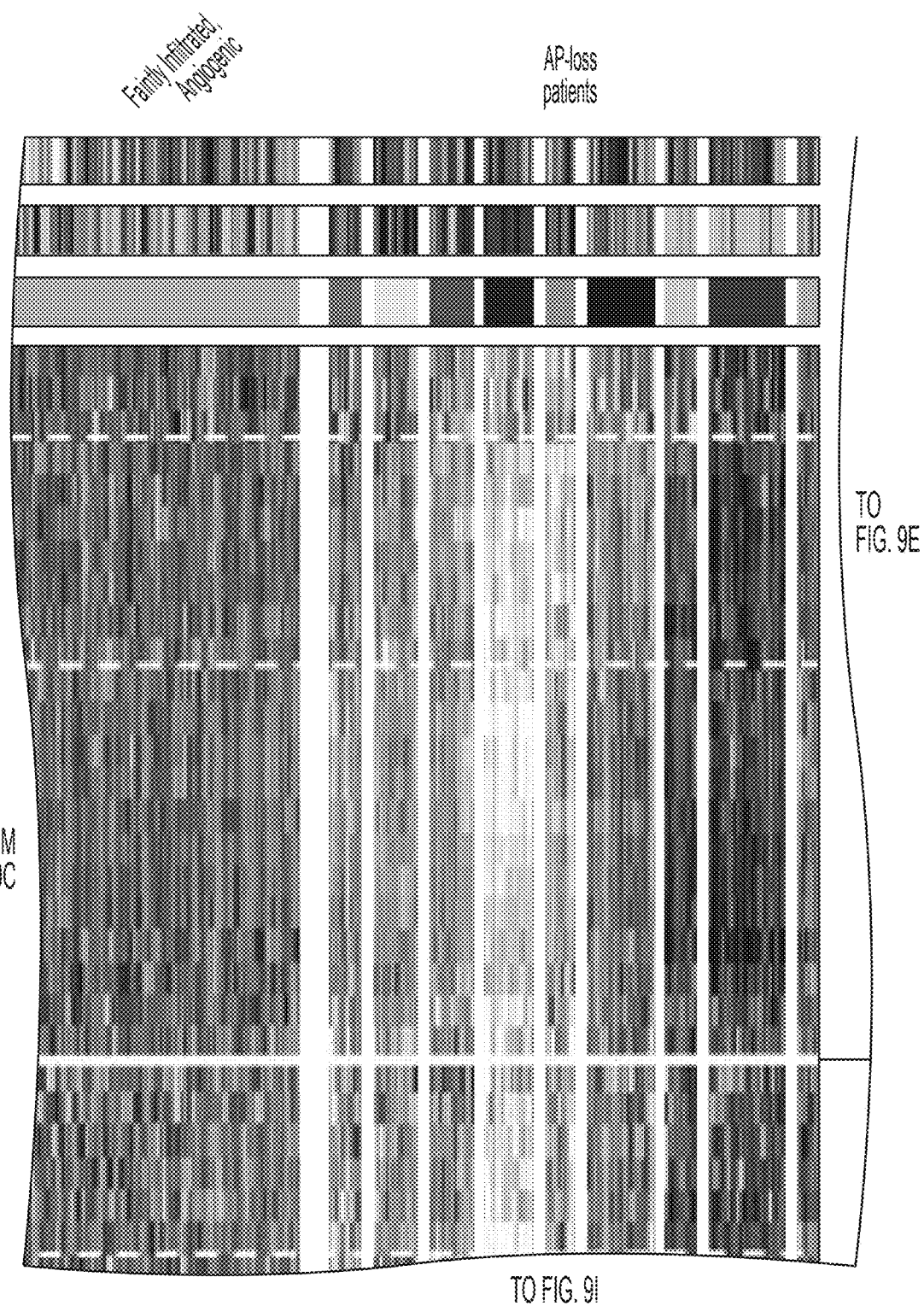
Figure 9E:
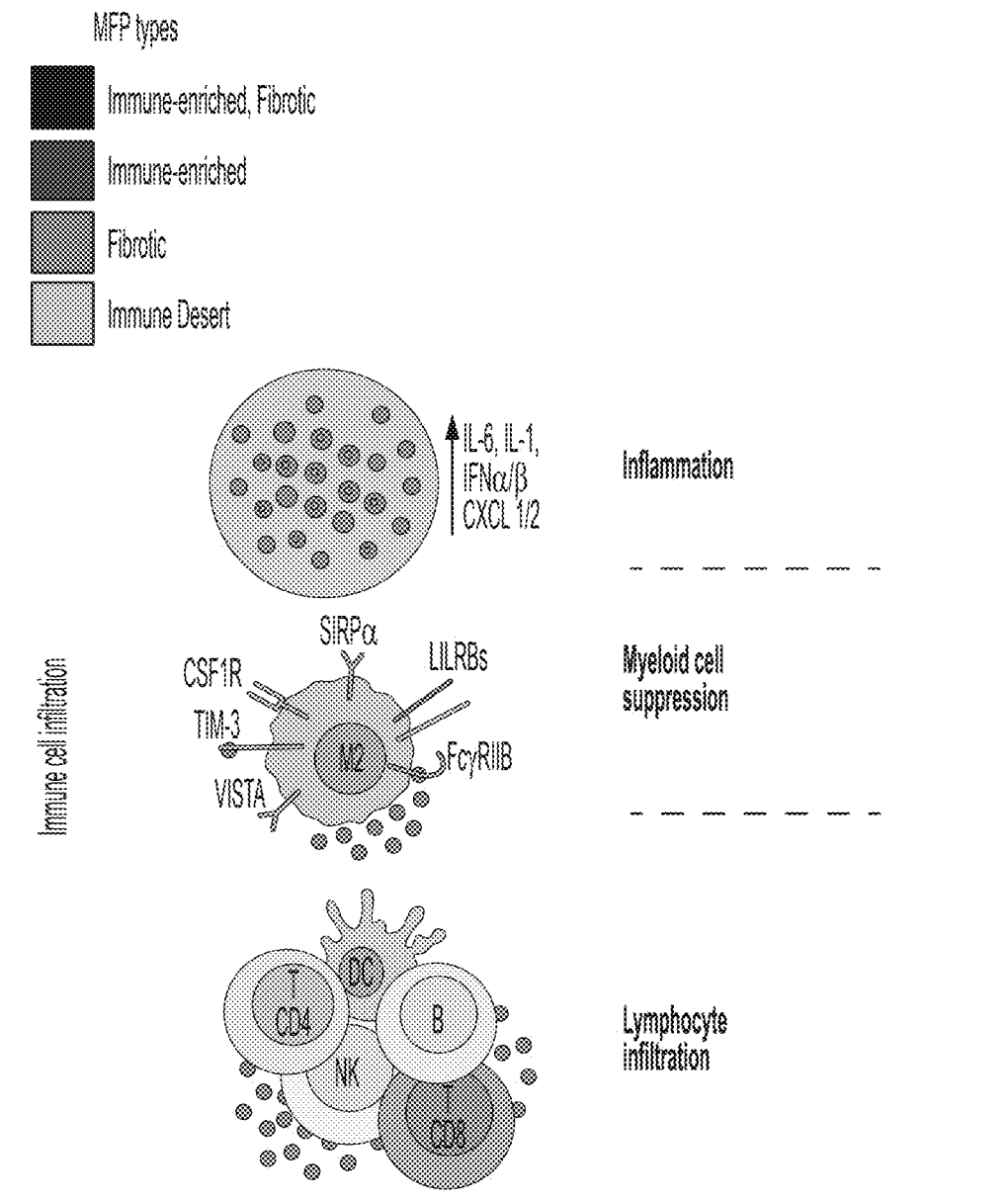
Figure 9F:
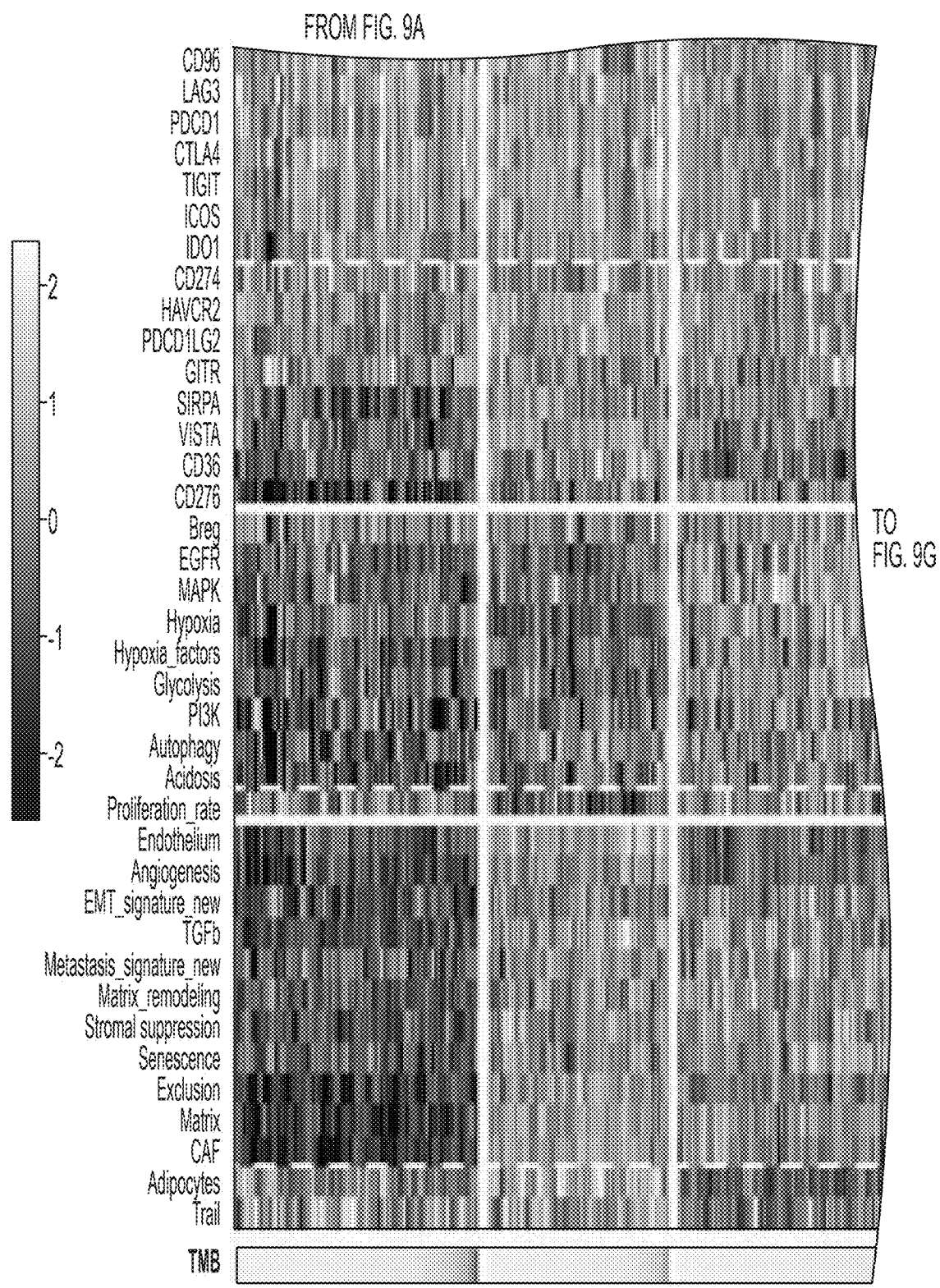
Figure 9G:
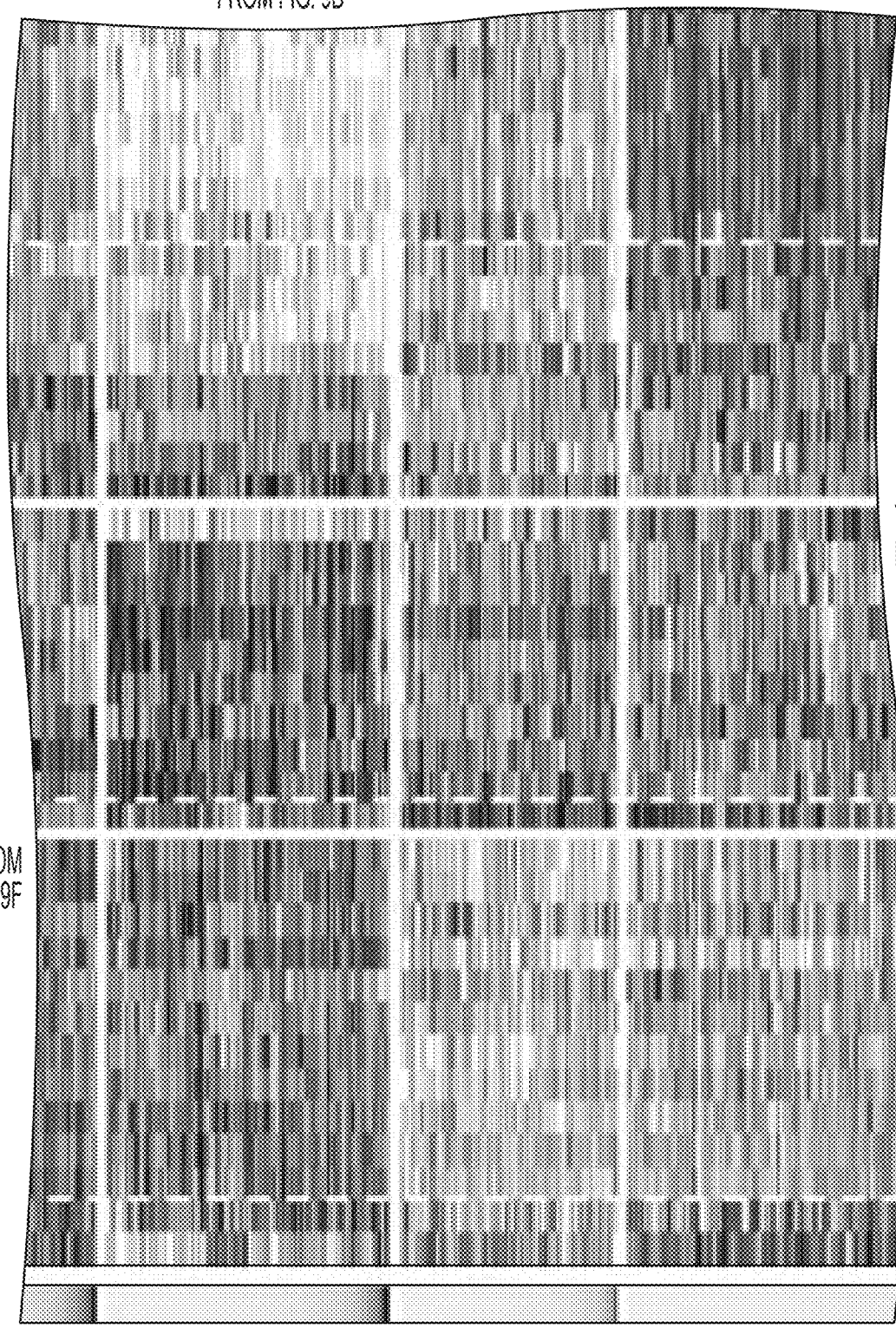
Figure 9H:
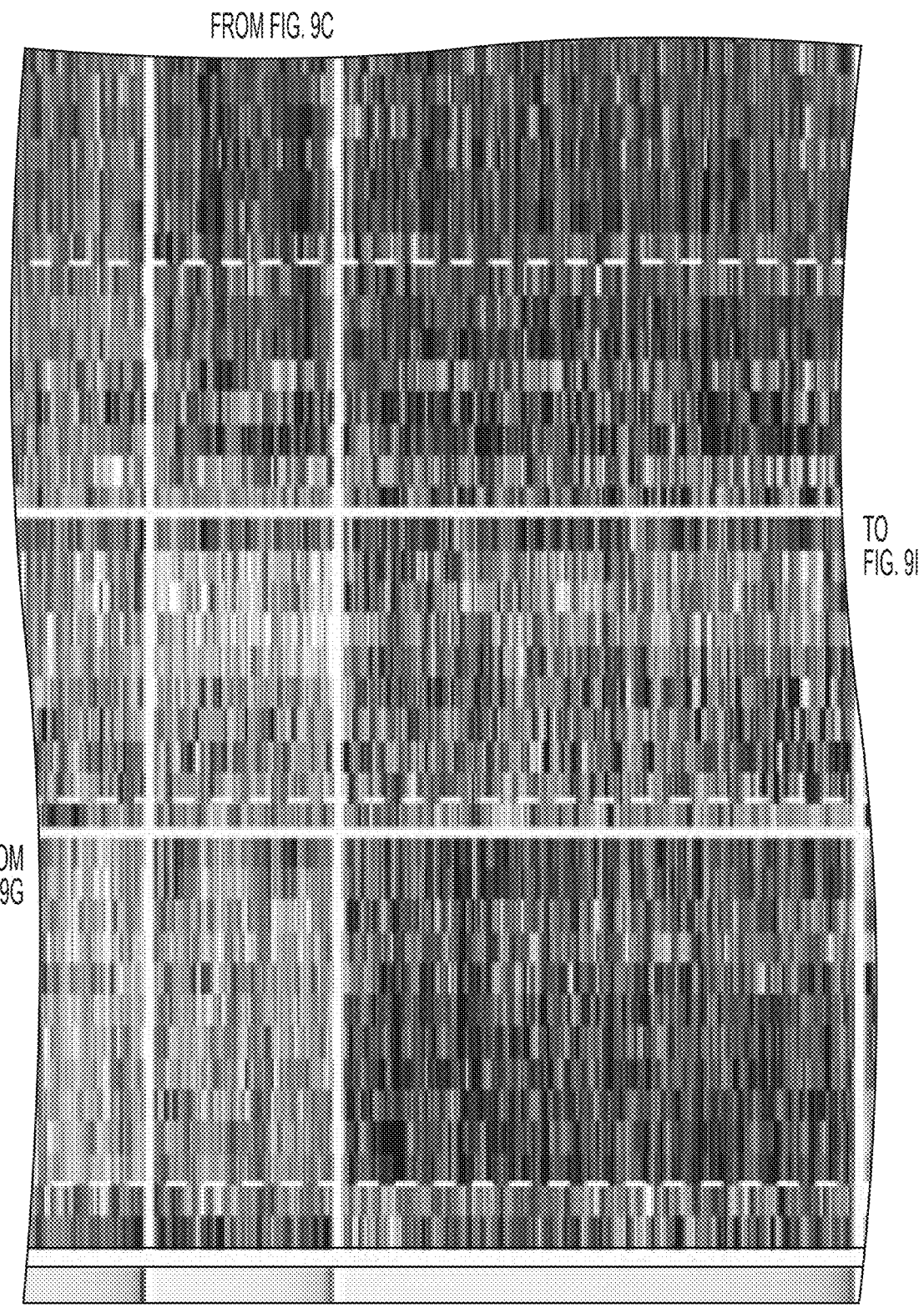
Figure 9I:
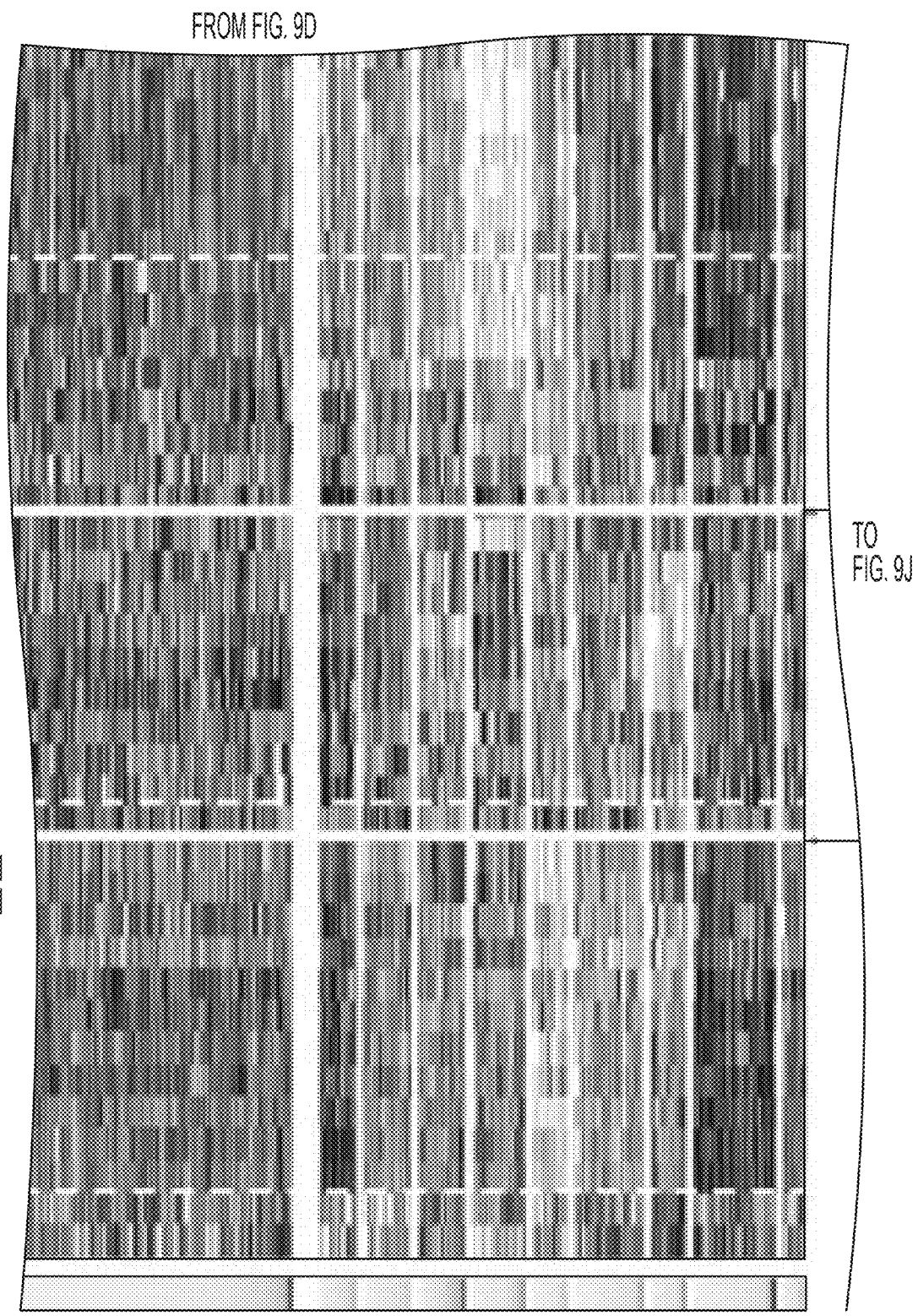
Figure 9J:
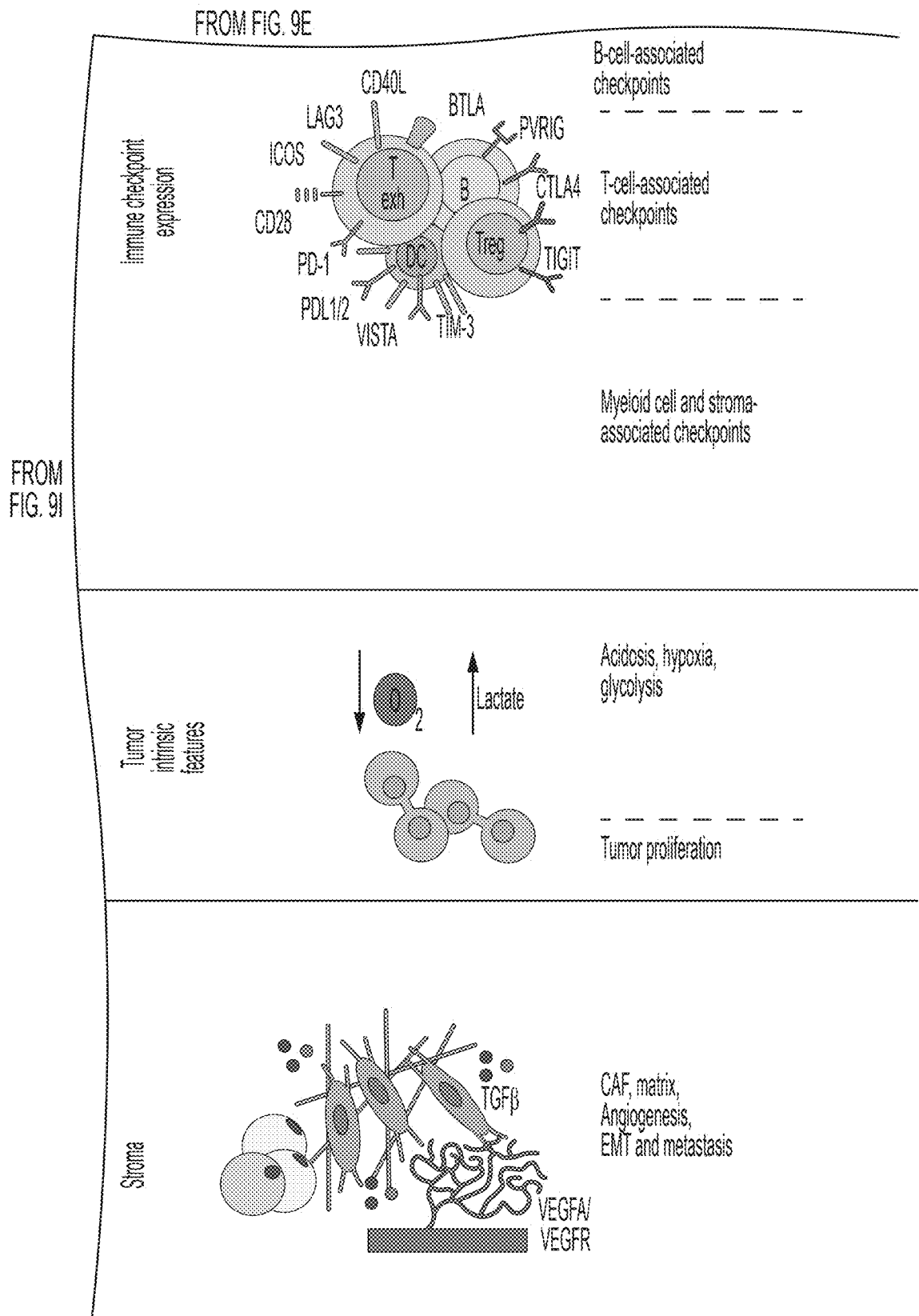
Figures 10A, 10B:
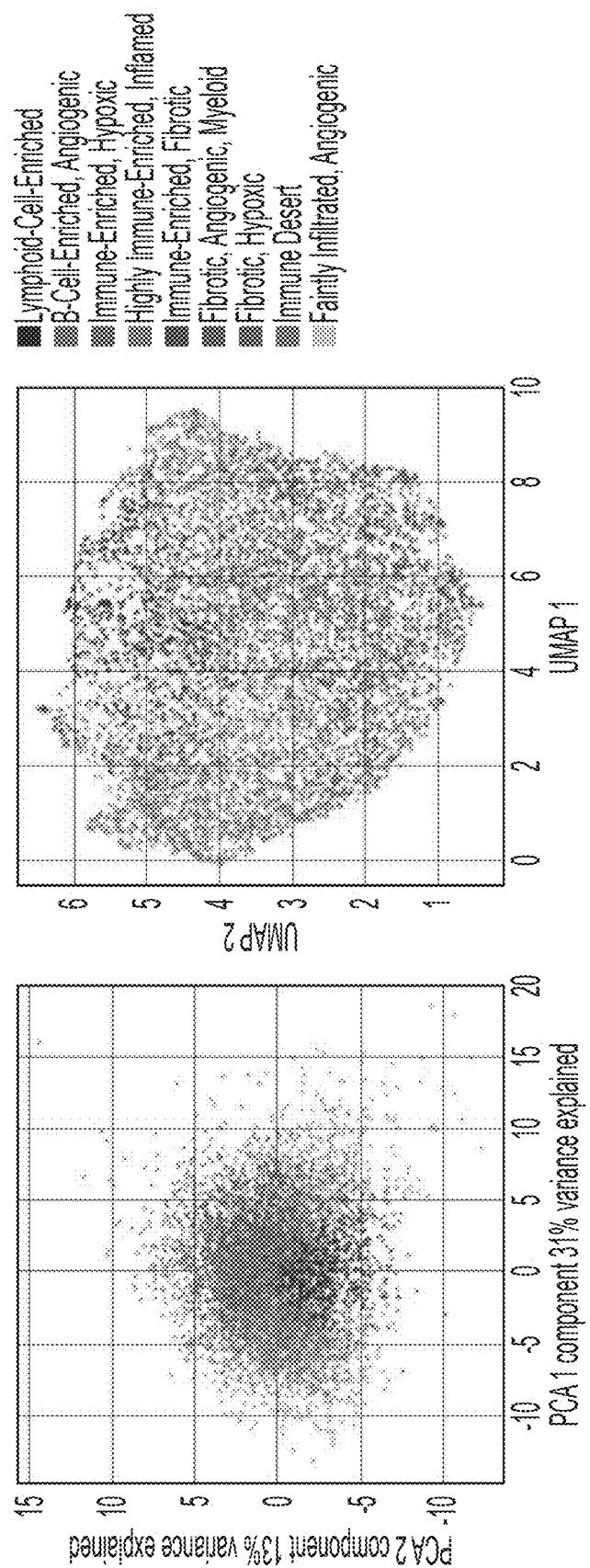
FIGS. 10A-10B are principal component analysis (PCA) (FIG. 10A) and uniform manifold approximation and projection (UMAP) (FIG. 10B) plots showing the distribution of the acquired IE clusters among the analyzed TOGA samples, according to some embodiments of the technology described herein.
Figure 11A:
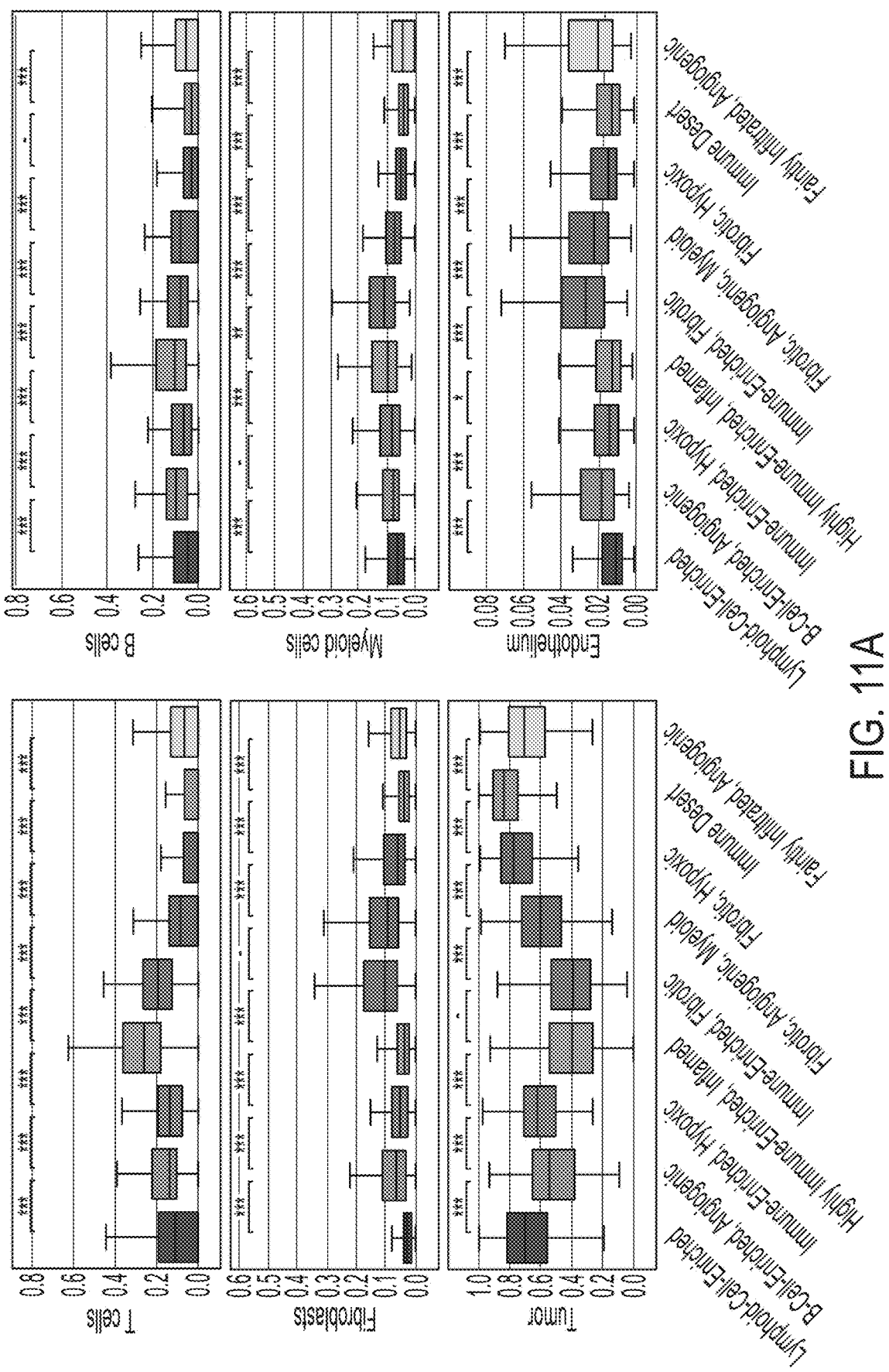
FIG. 11A is a group of boxplots showing differences in cell percentages defined by Kassandra deconvolution analysis (14), characteristic for the nine IE subtypes, for T cells, fibroblasts, tumor cells, B cells, myeloid cells, and endothelium cells, according to some embodiments of the technology described herein.
Figure 11B:
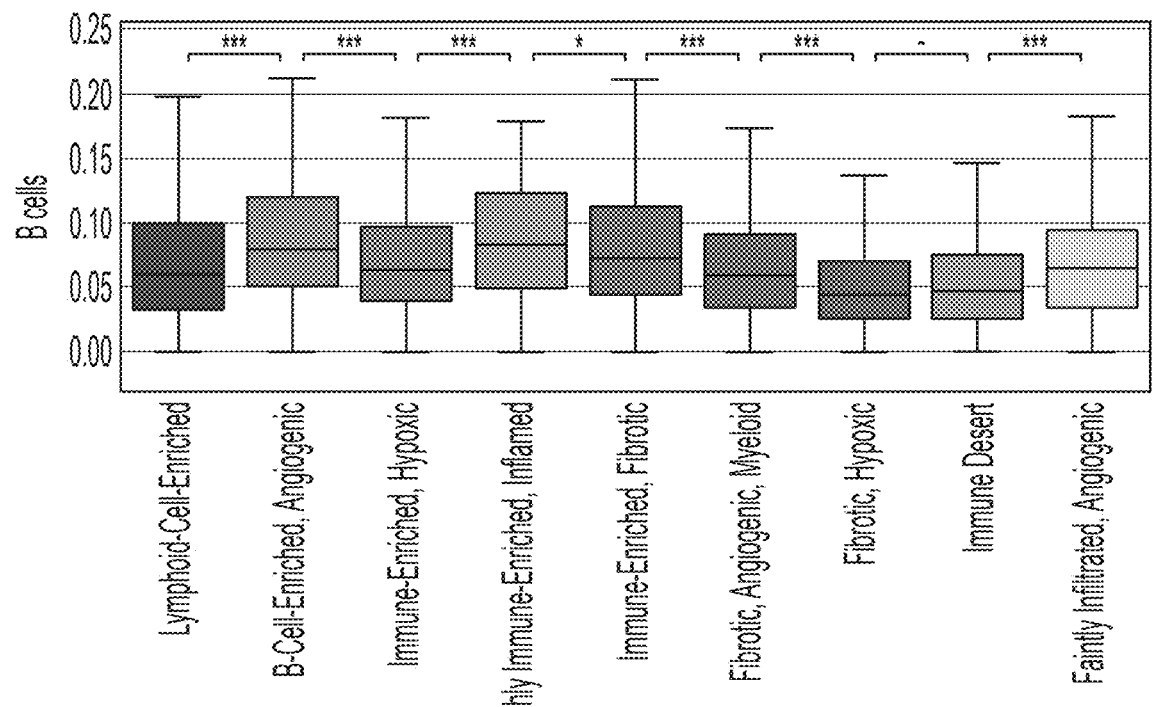
Figure 11C:
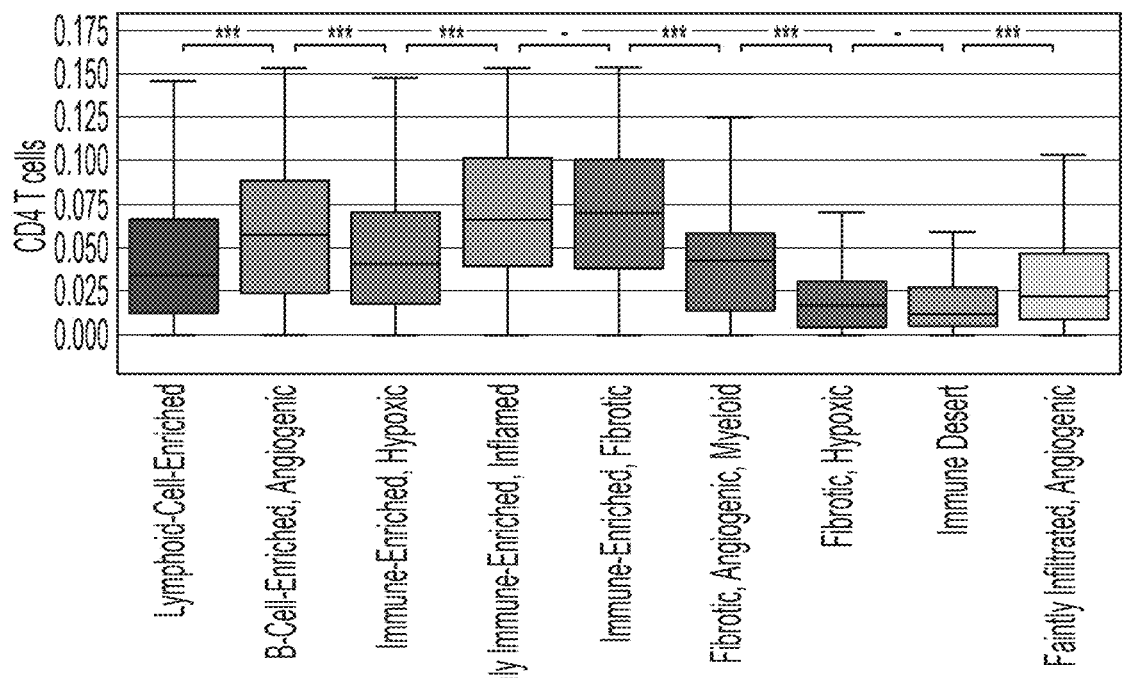
Figure 11D:
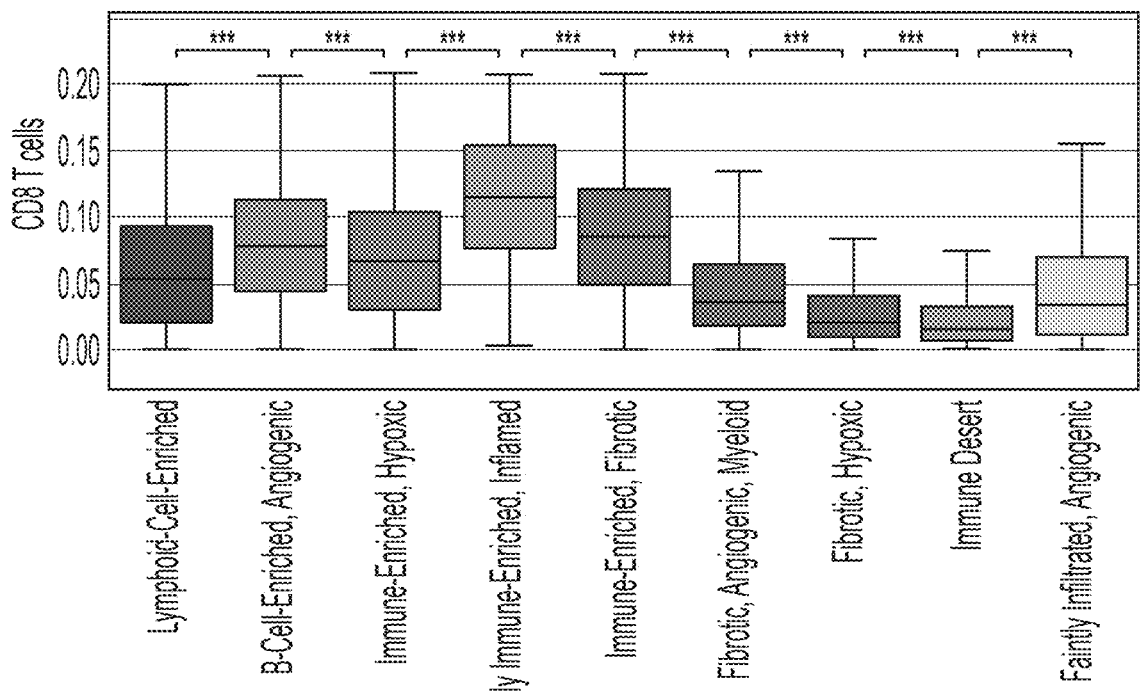
Figure 11E:
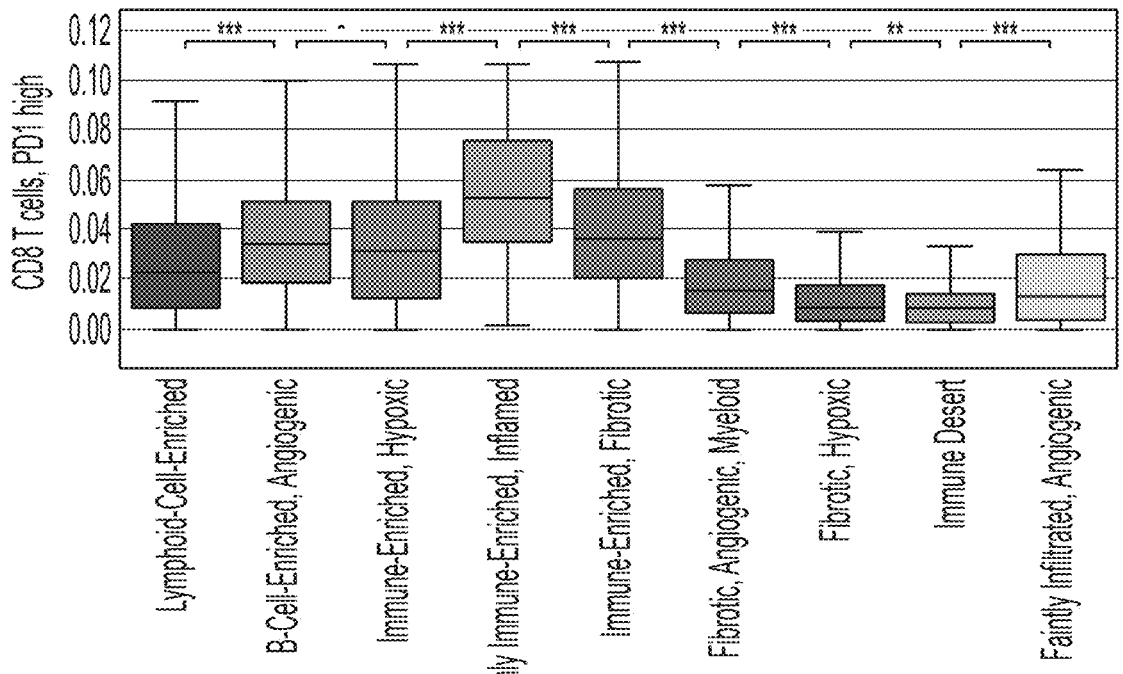
Figure 11F:
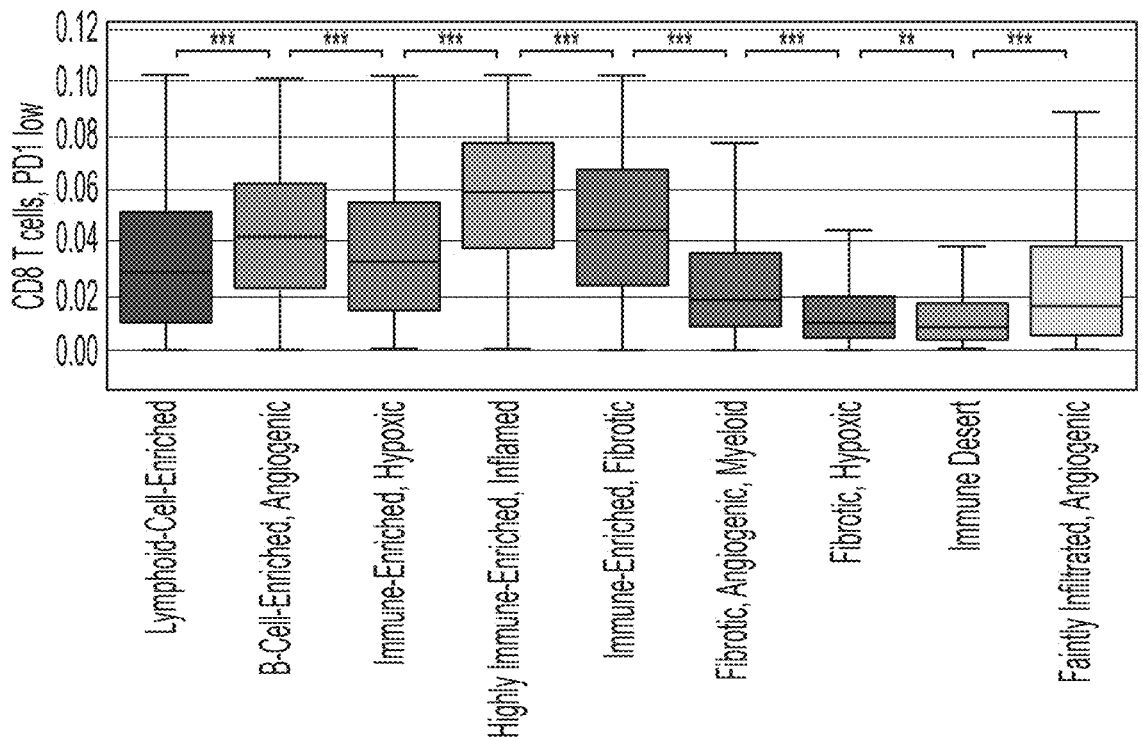
Figure 11G:
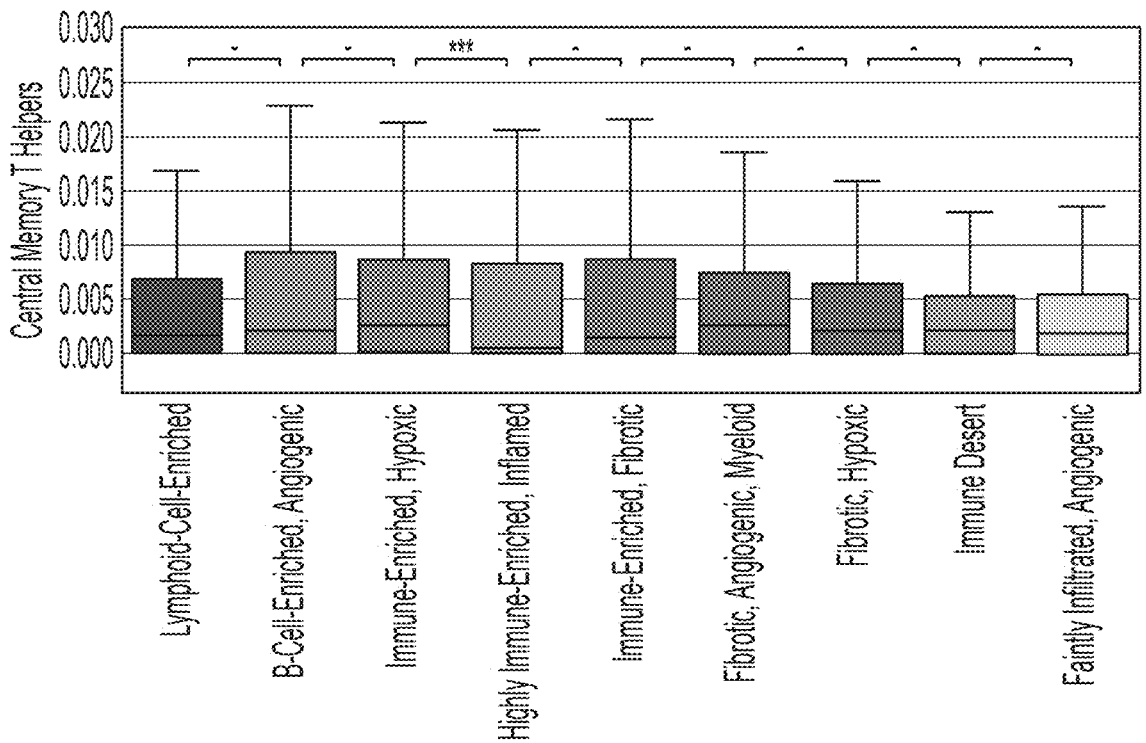
Figure 11H:
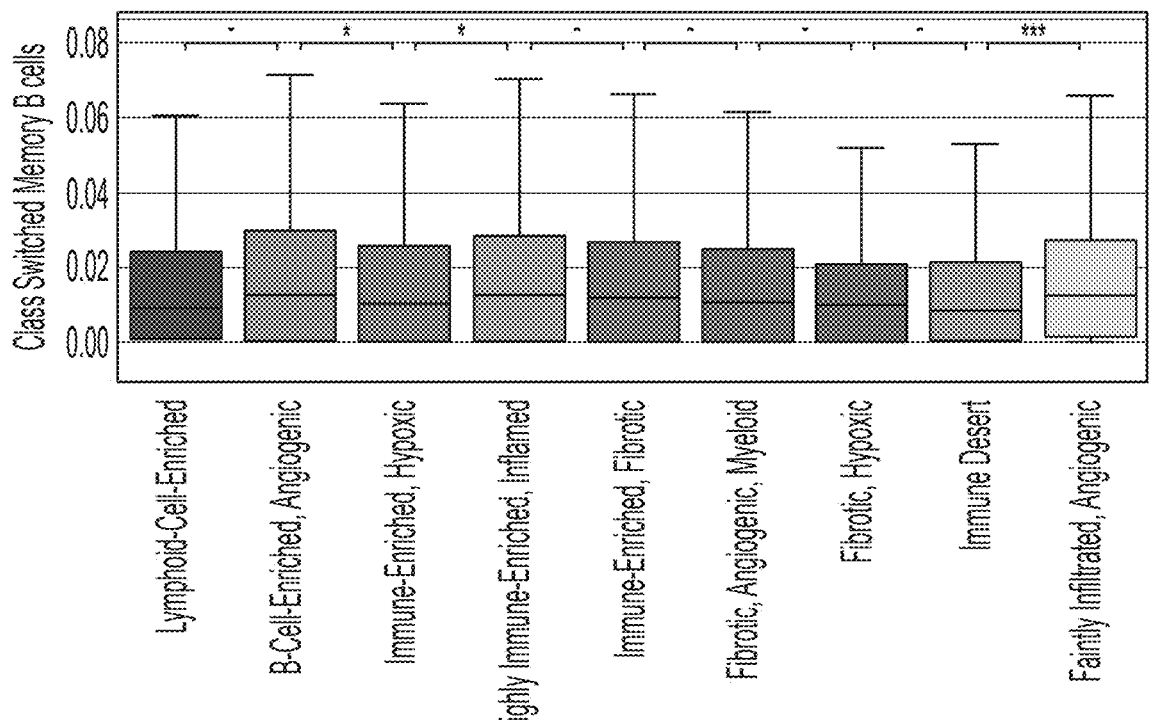
Figure 11I:
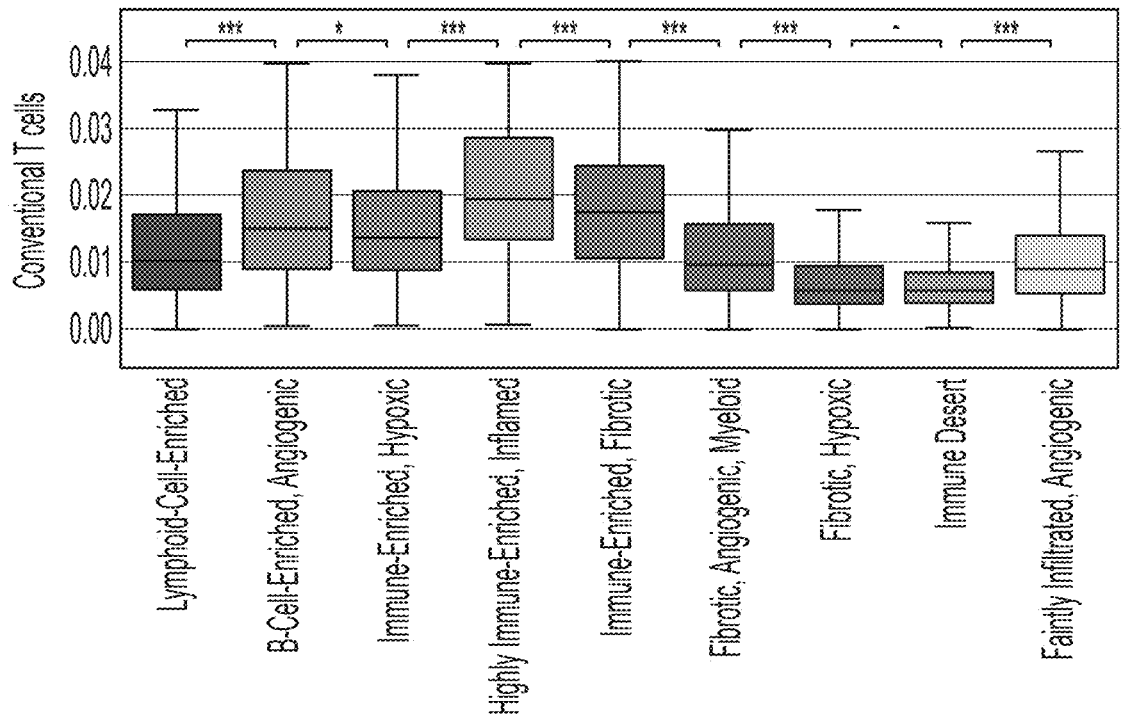
Figure 11J:
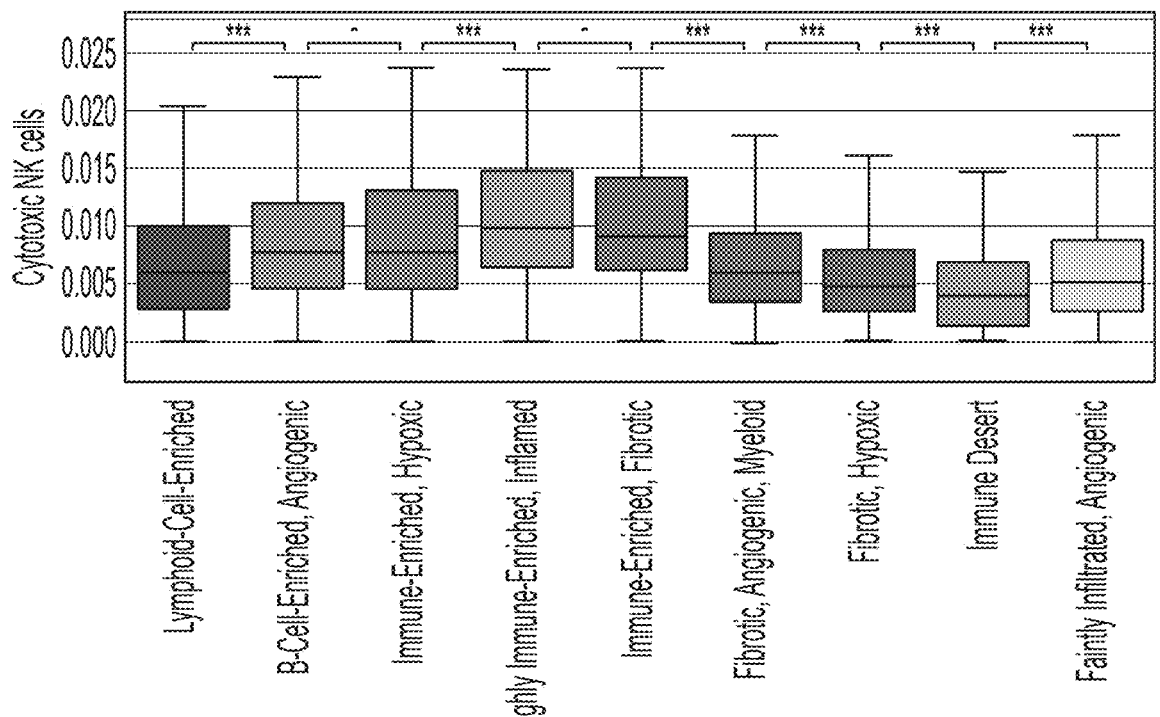
Figure 11K:
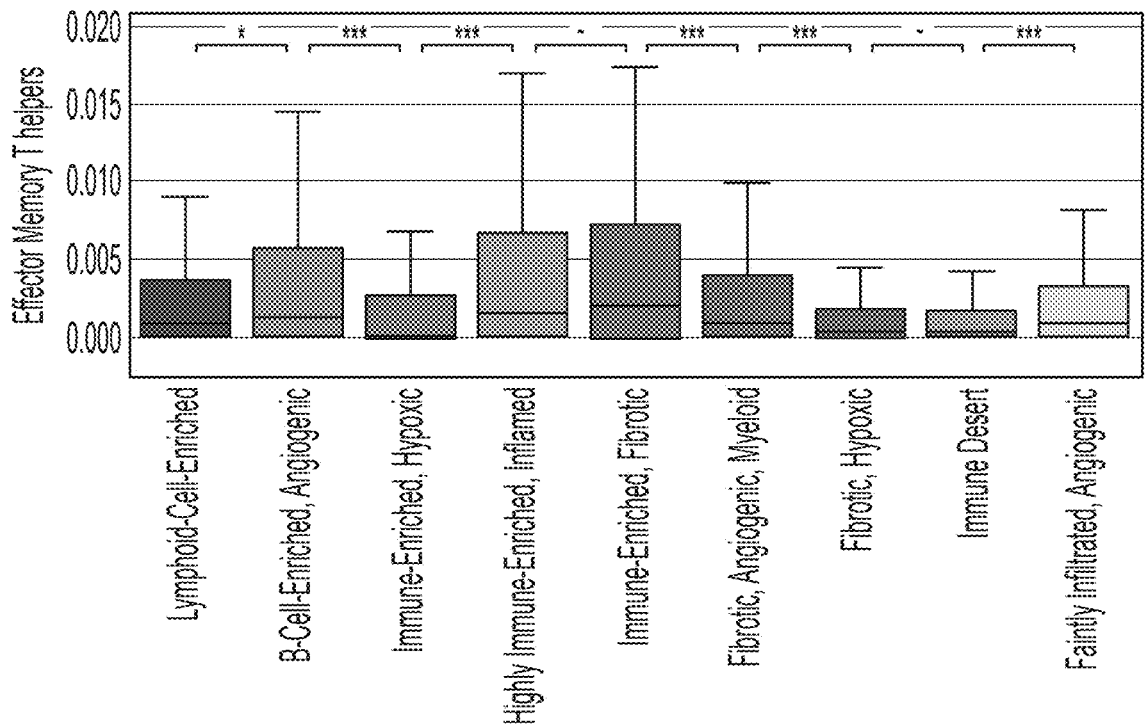
Figure 11L:
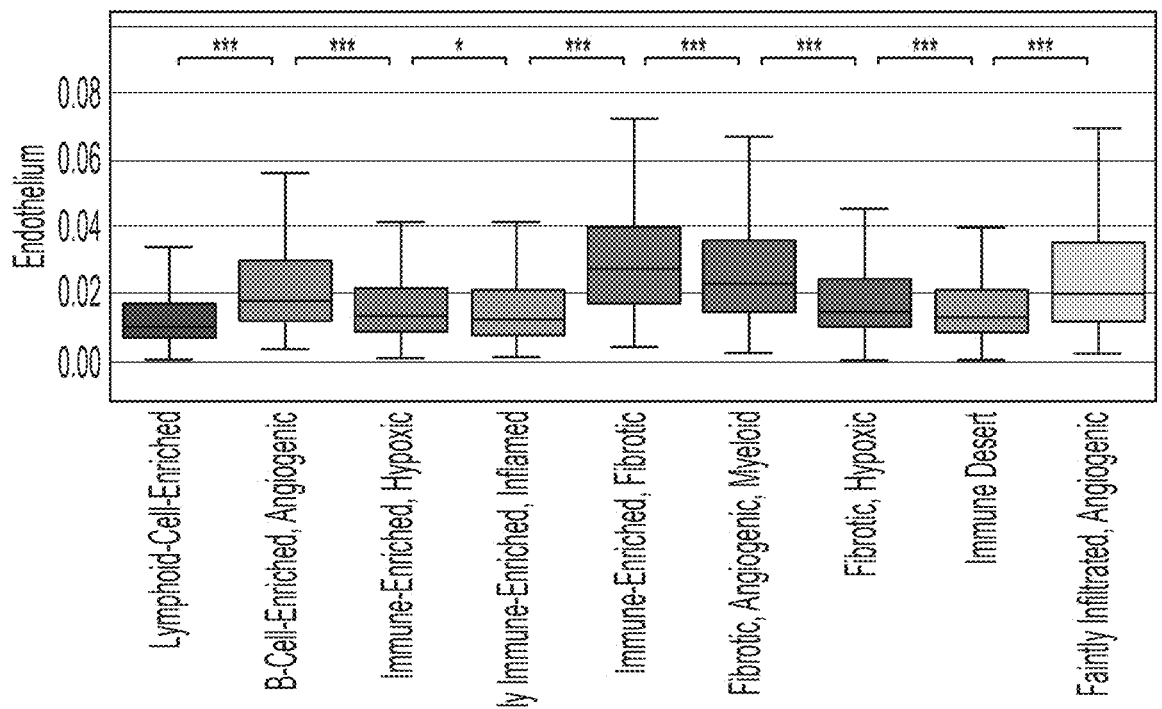
Figure 11M:
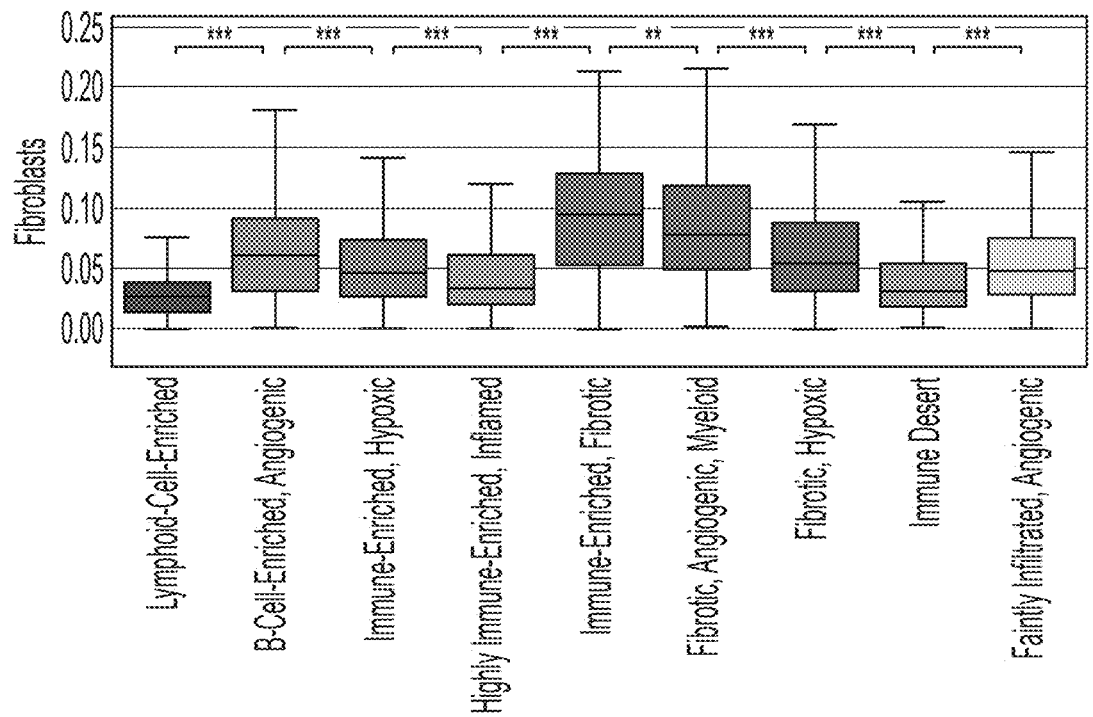
Figure 11N:
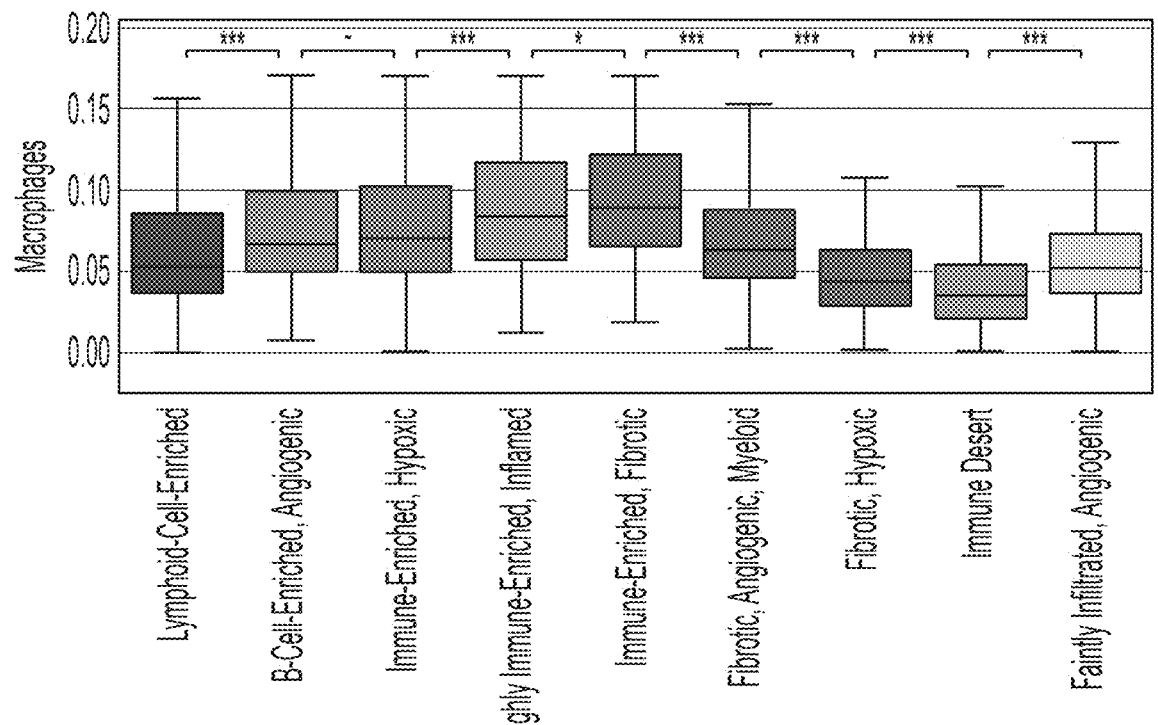
Figure 11O:
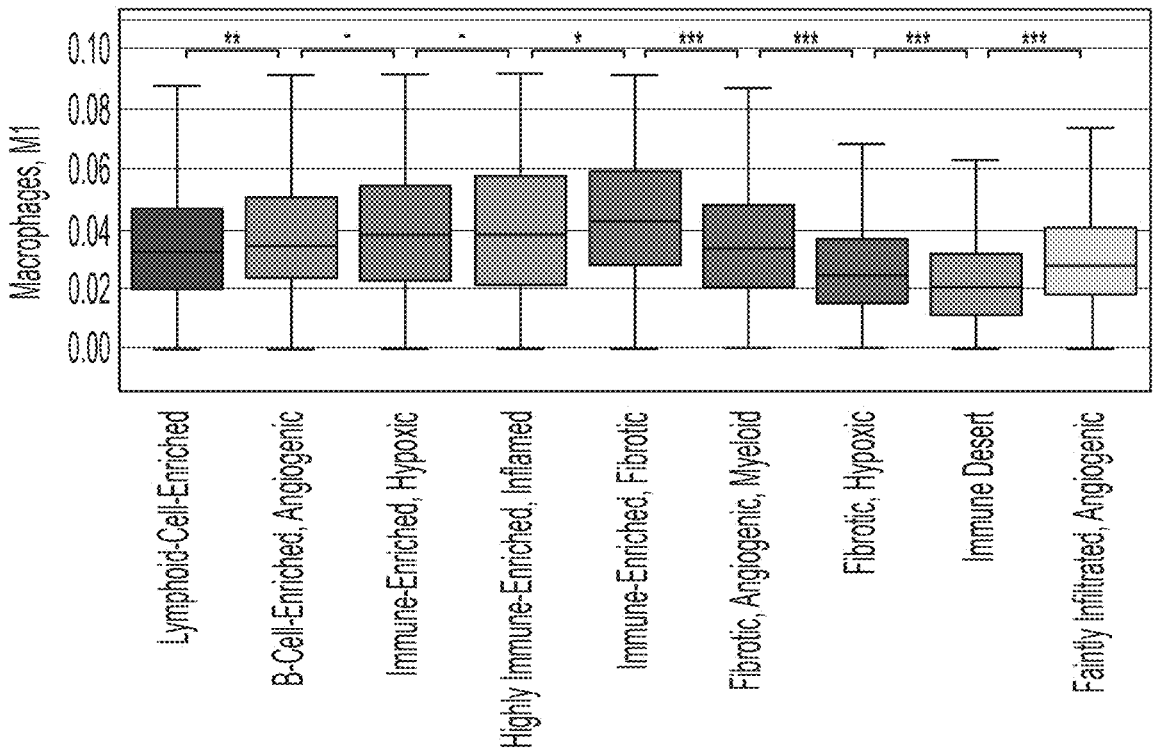
Figure 11P:
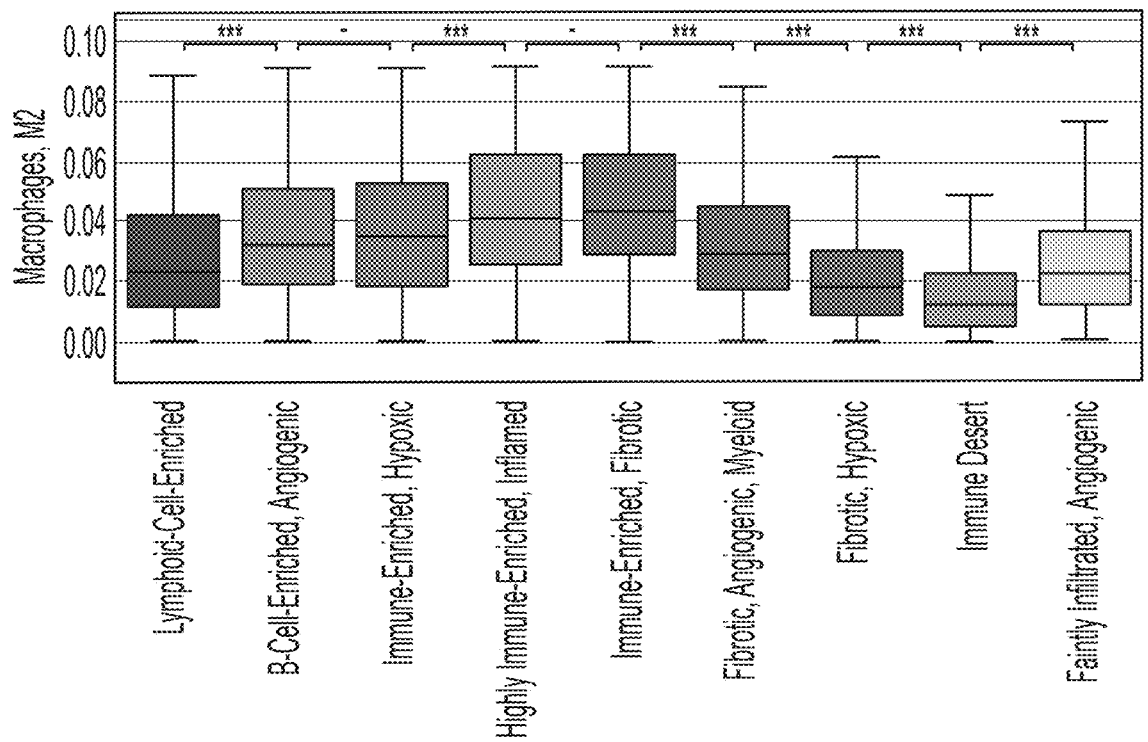
Figure 11Q:
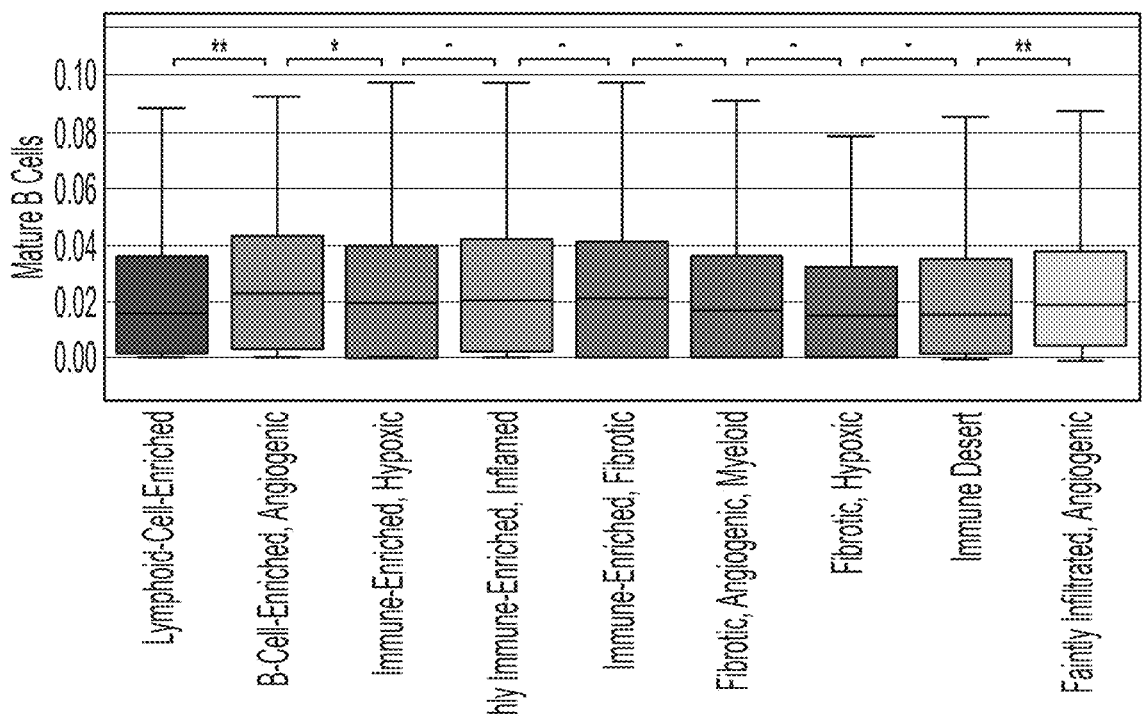
Figure 11R:
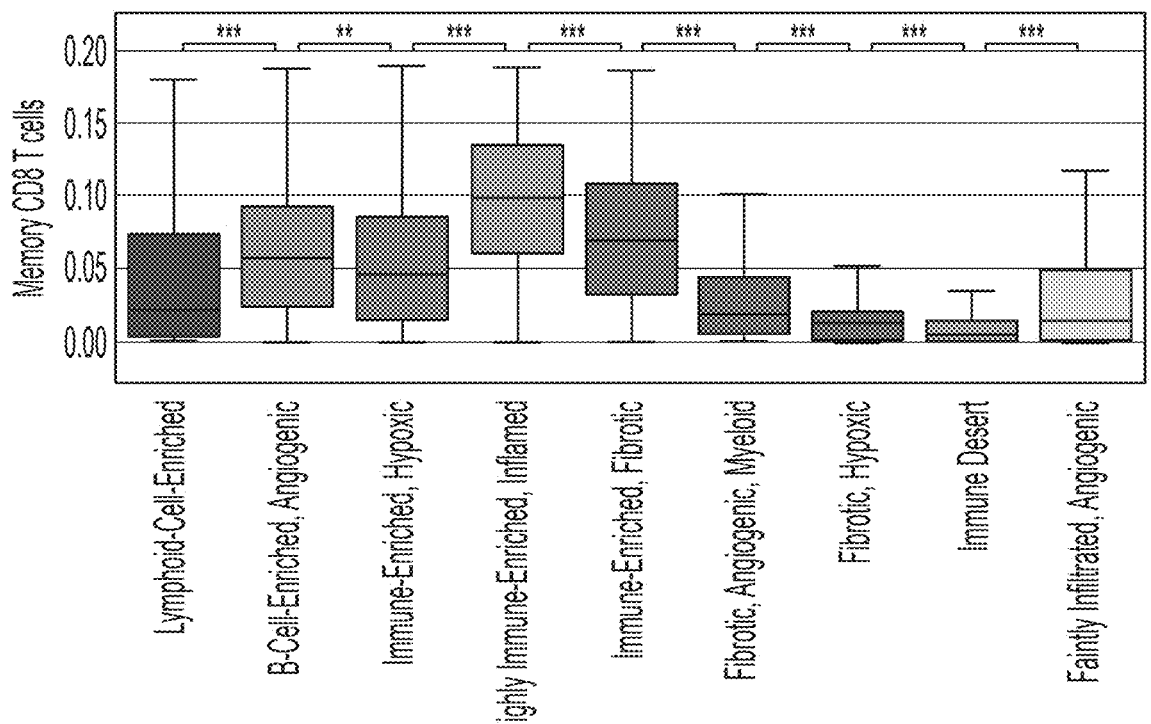
Figure 11S:
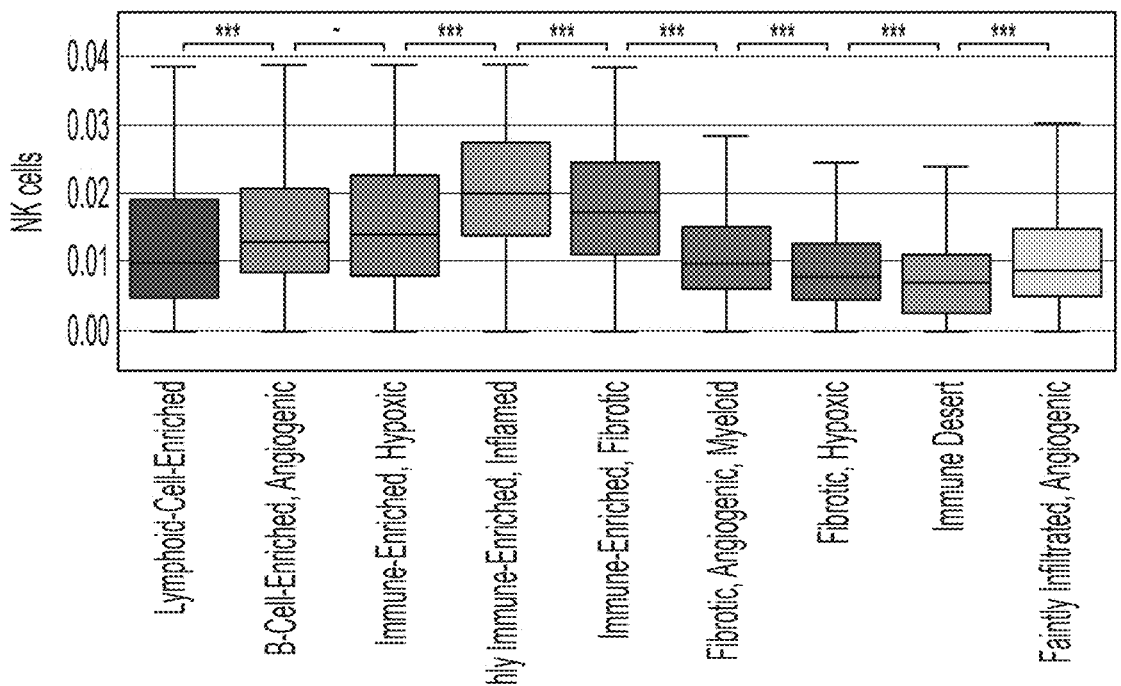
Figure 11T:
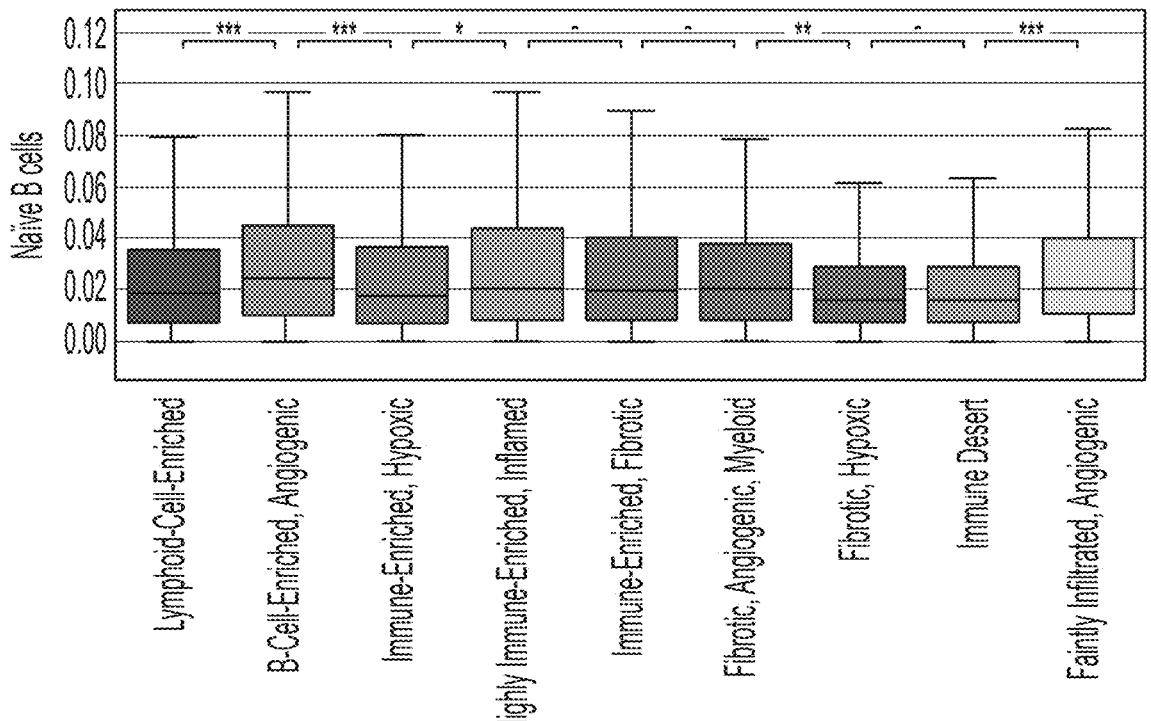
Figure 11U:
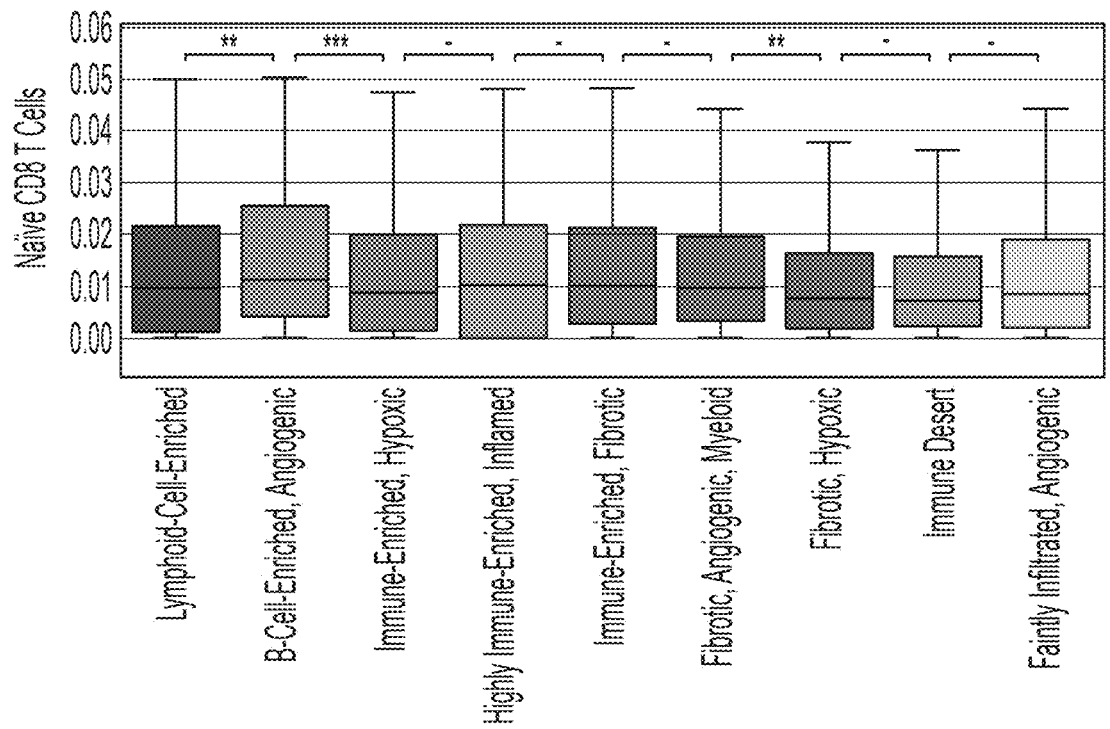
Figure 11V:
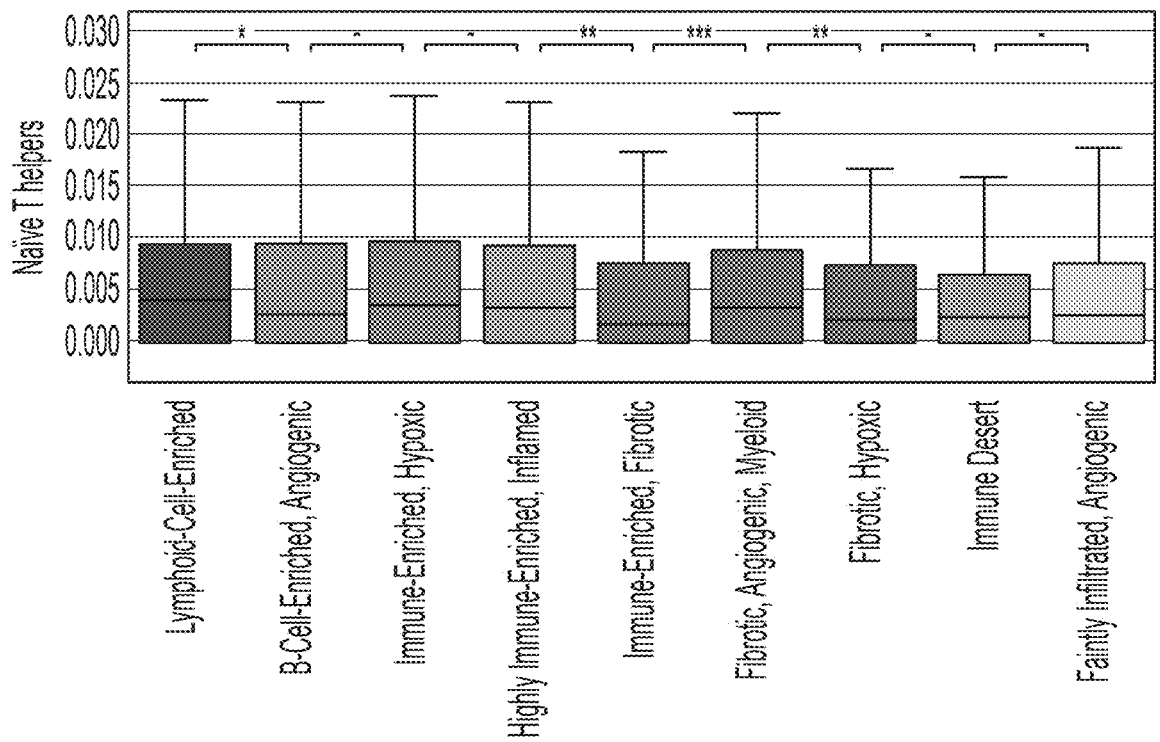
Figure 11W:
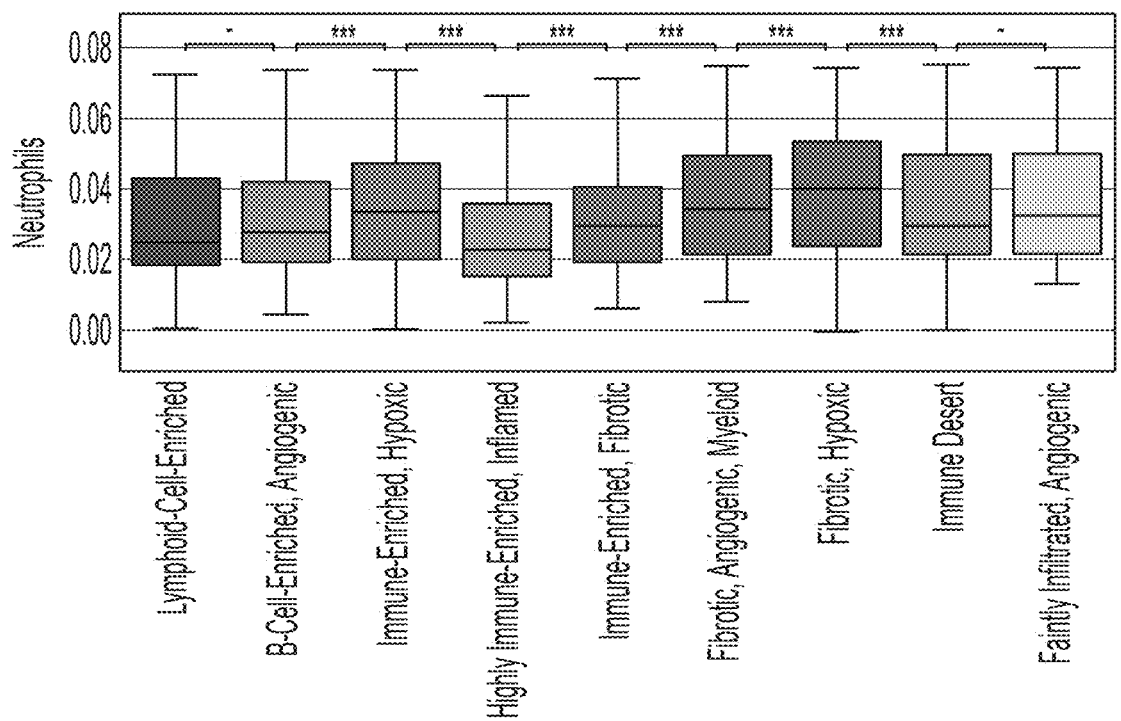
Figure 11X:
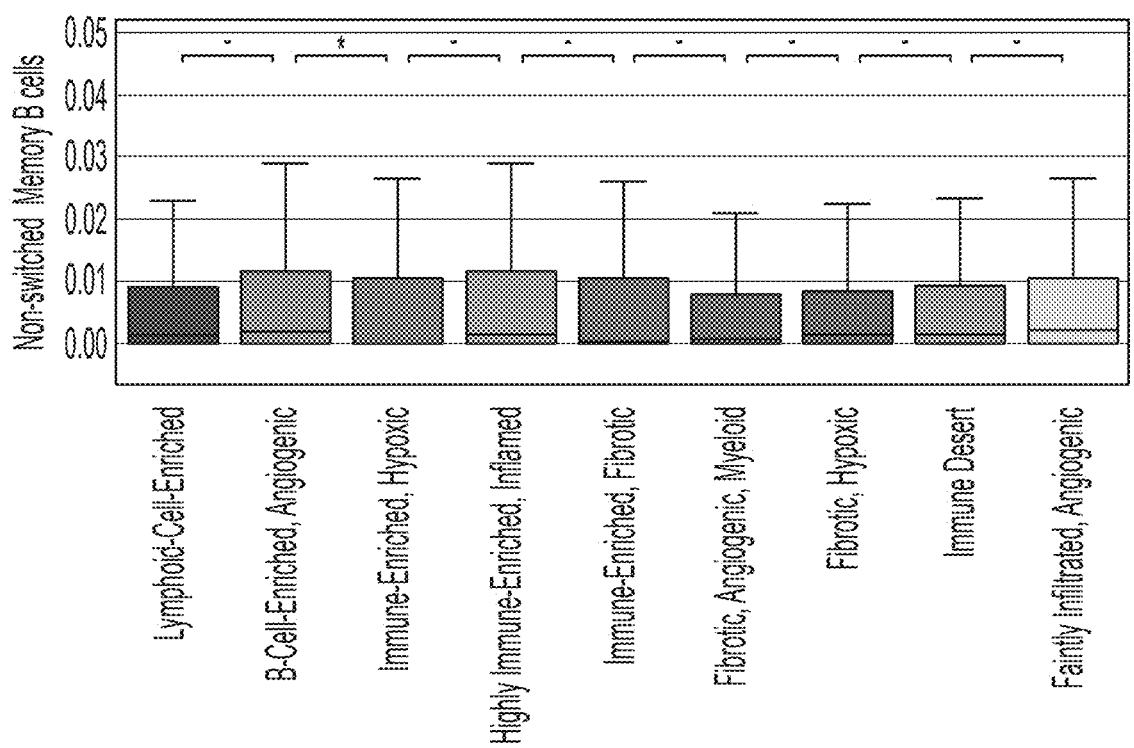
Figure 11Y:
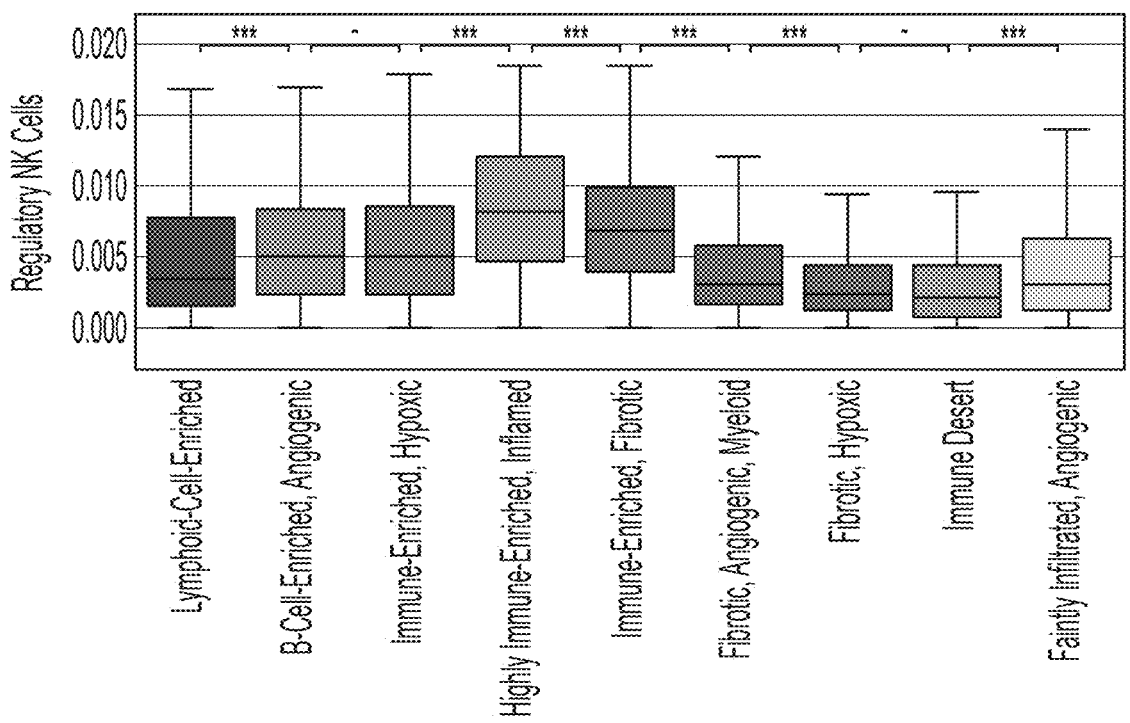
Figure 11Z:
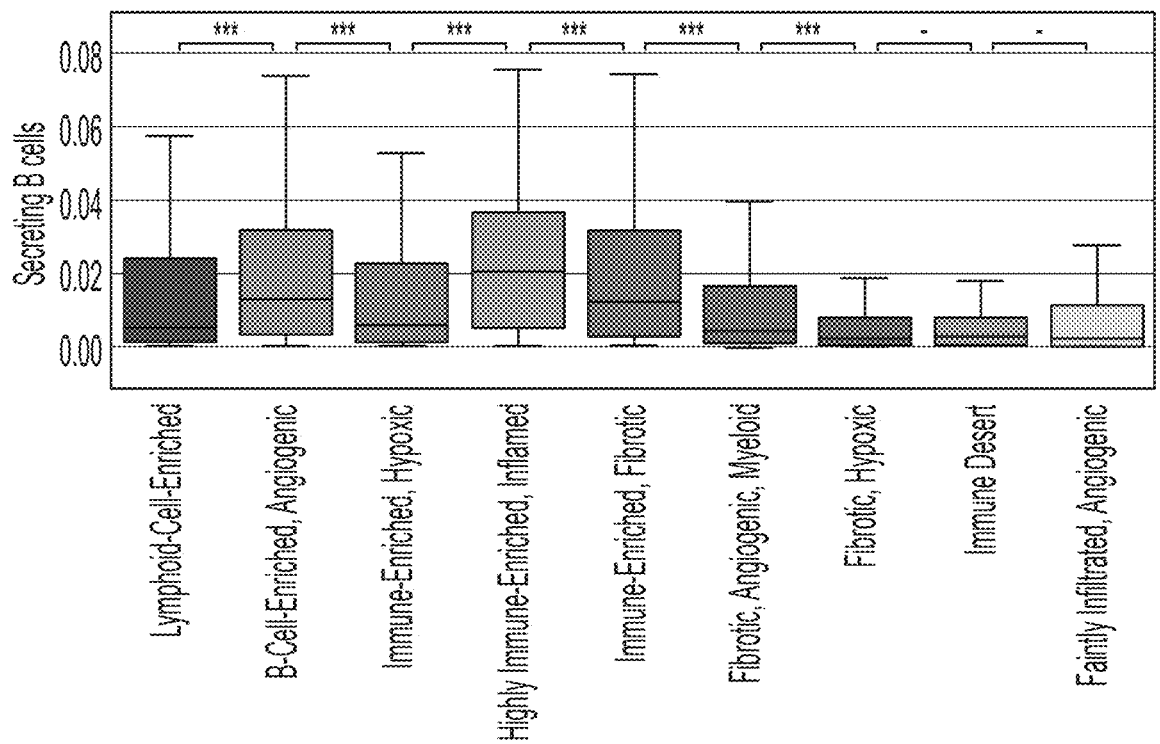
Figure 11A:
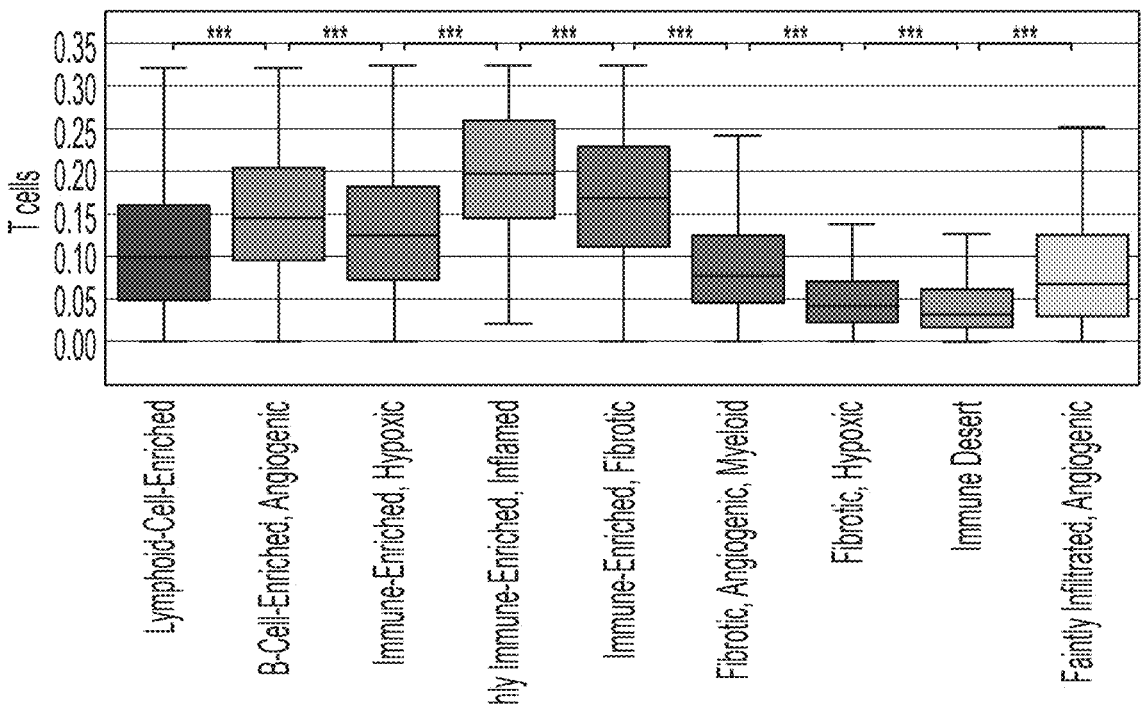
Figure 11A:
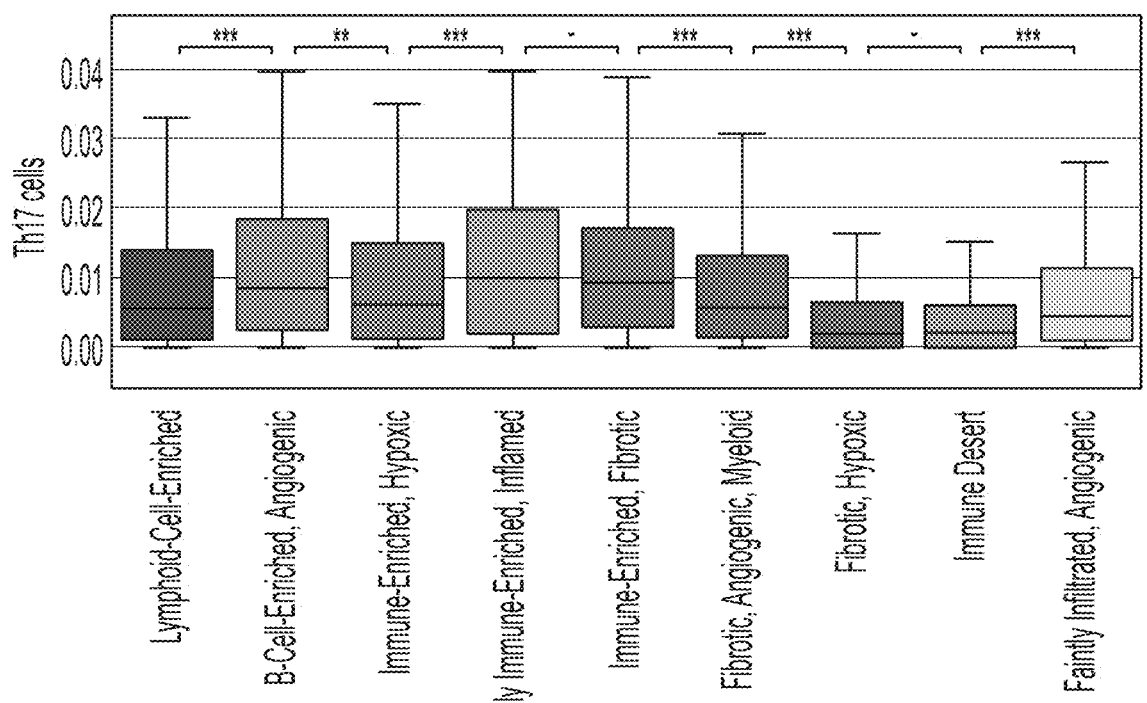
Figure 11A:
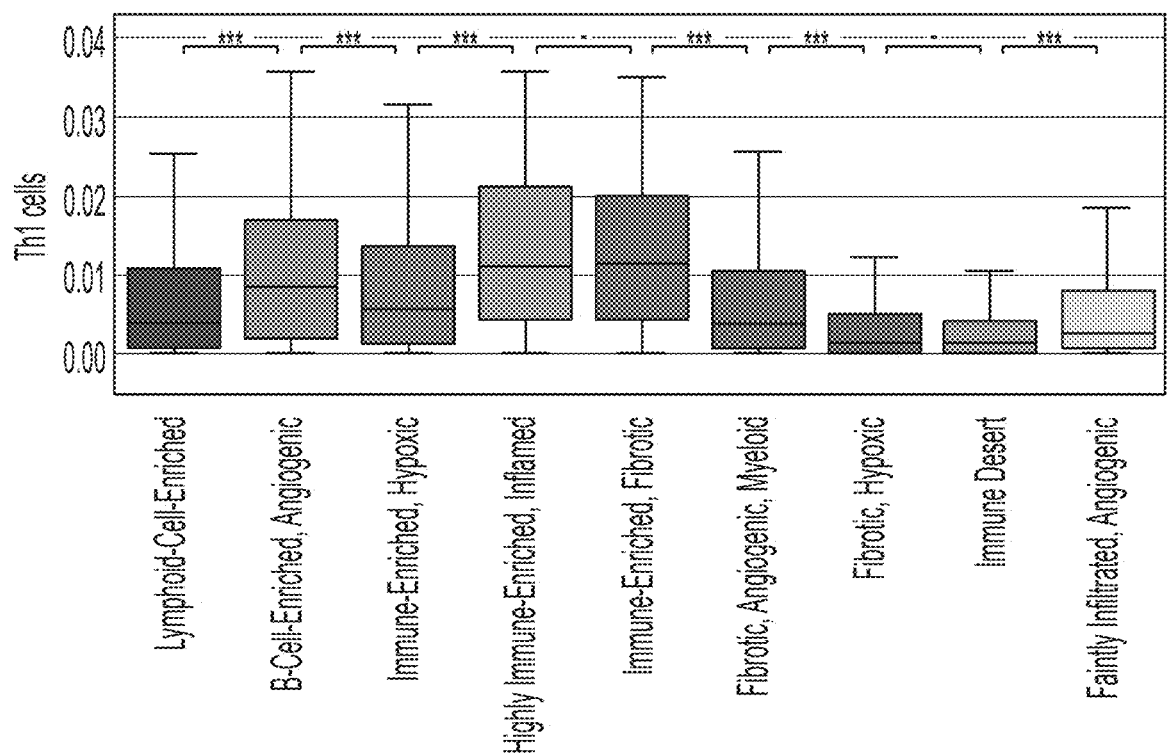
Figure 11A:
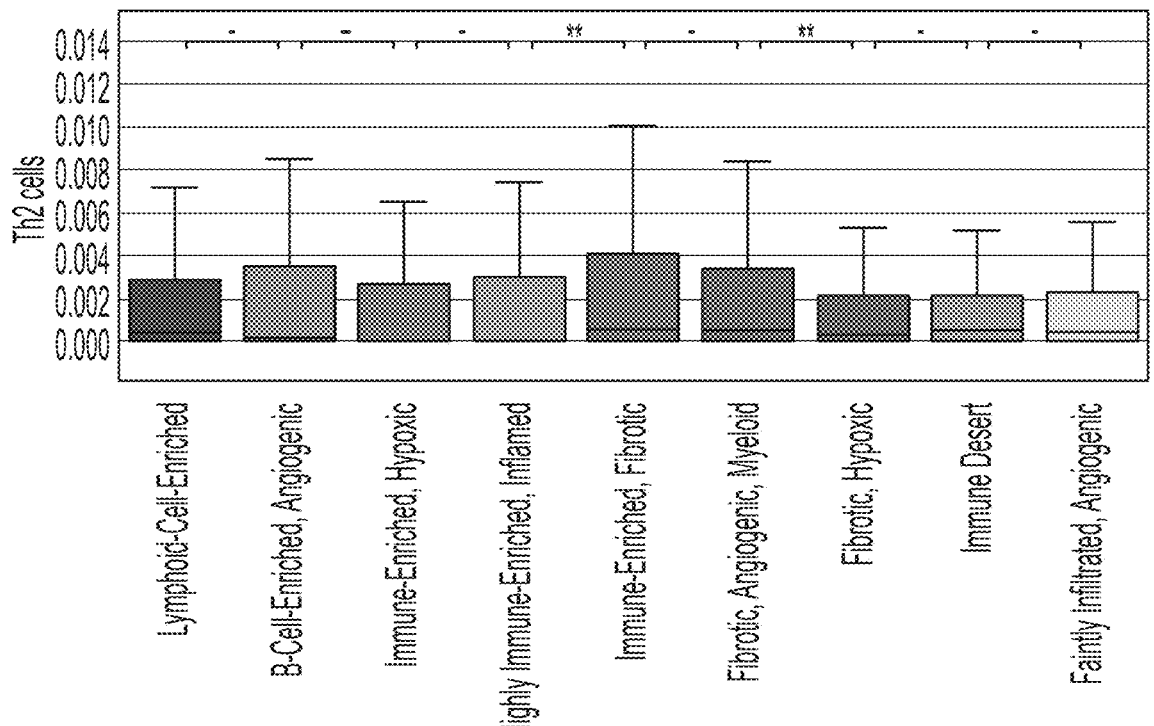
Figure 11A:
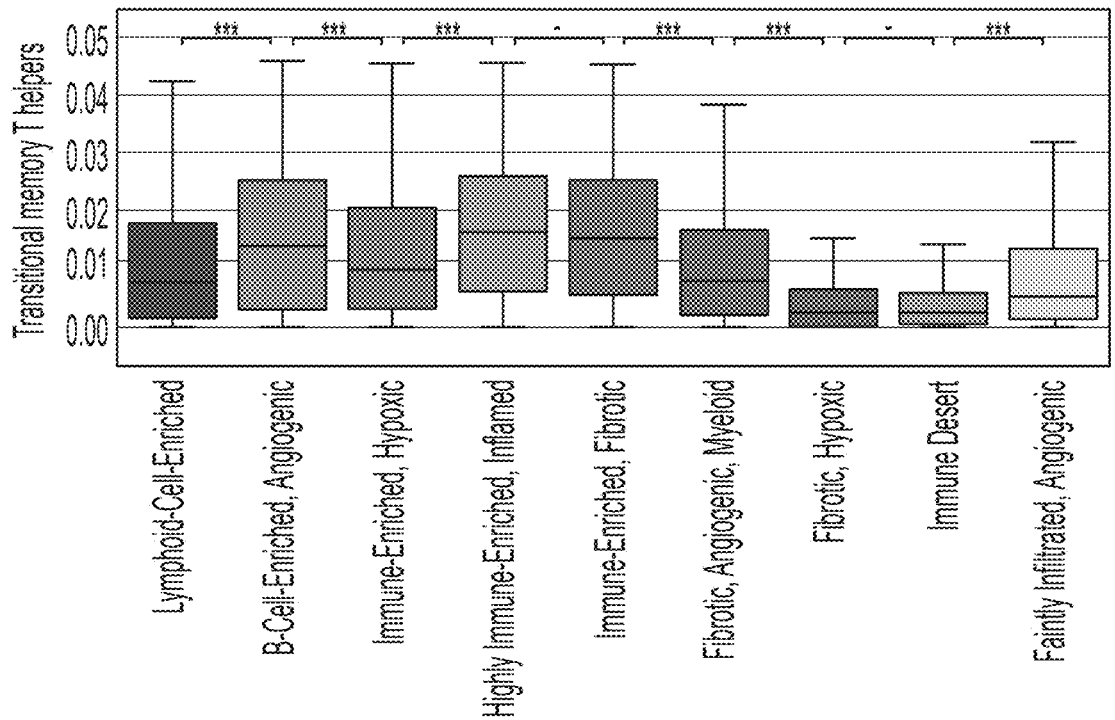
Figure 11A:
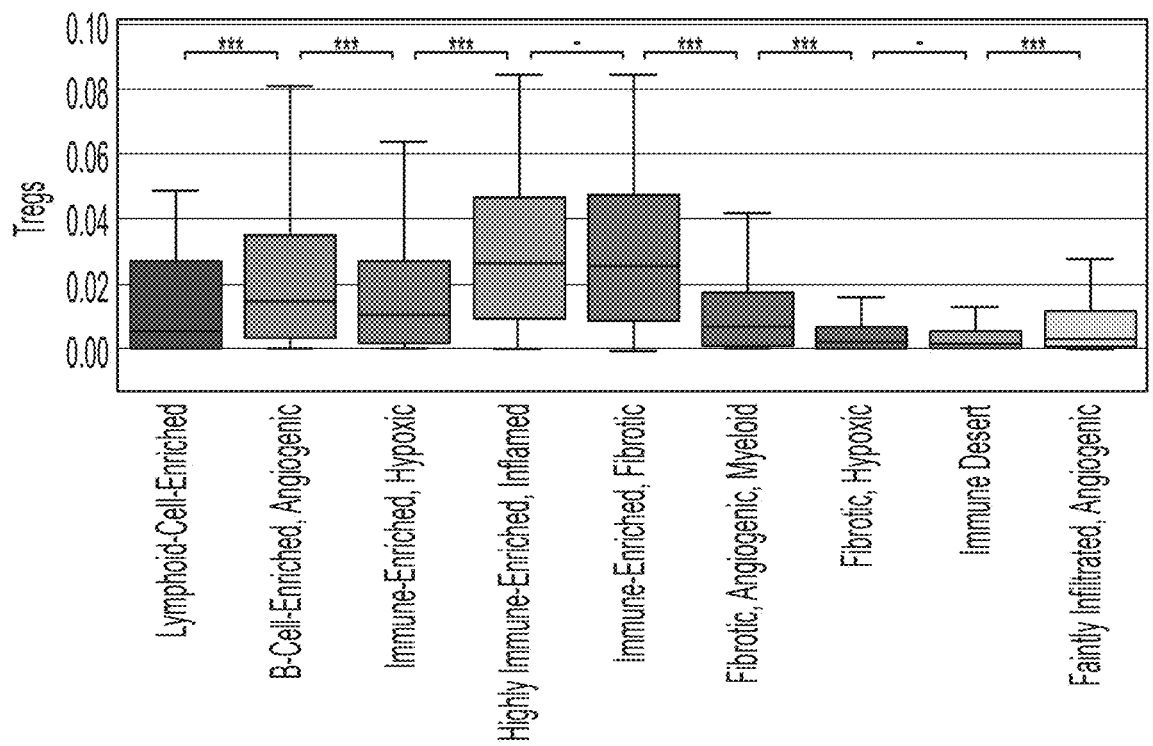
Figure 11A:
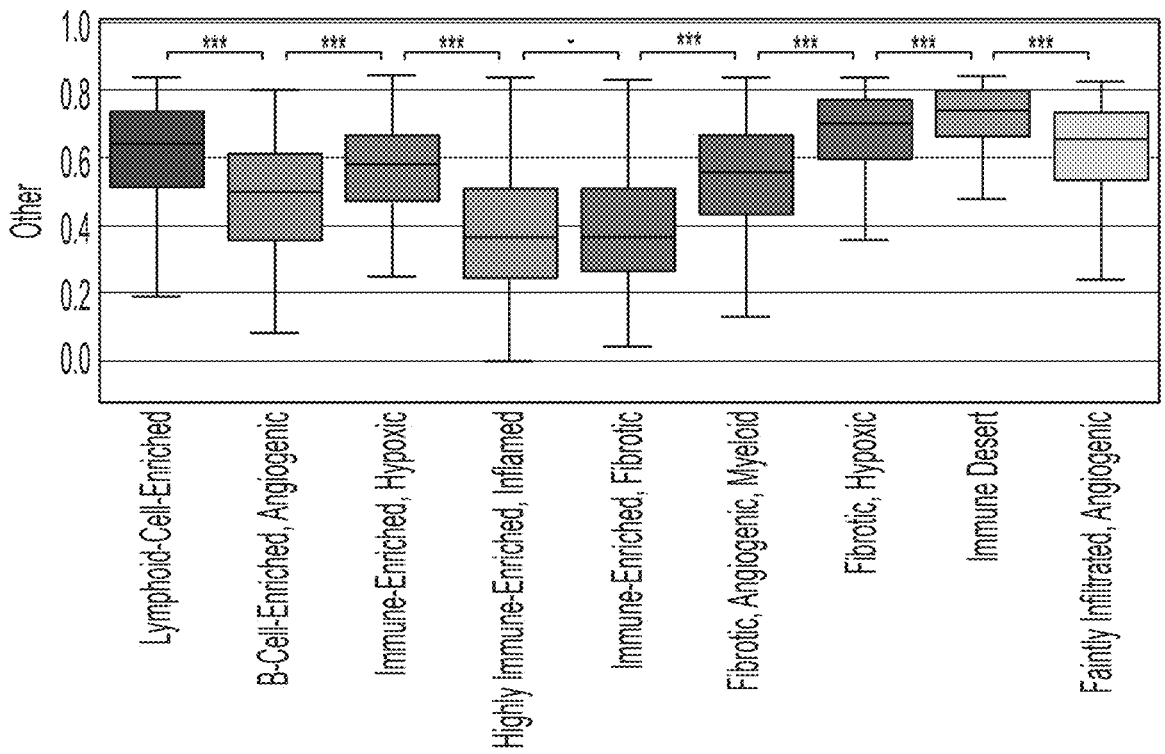
Figure 11A:
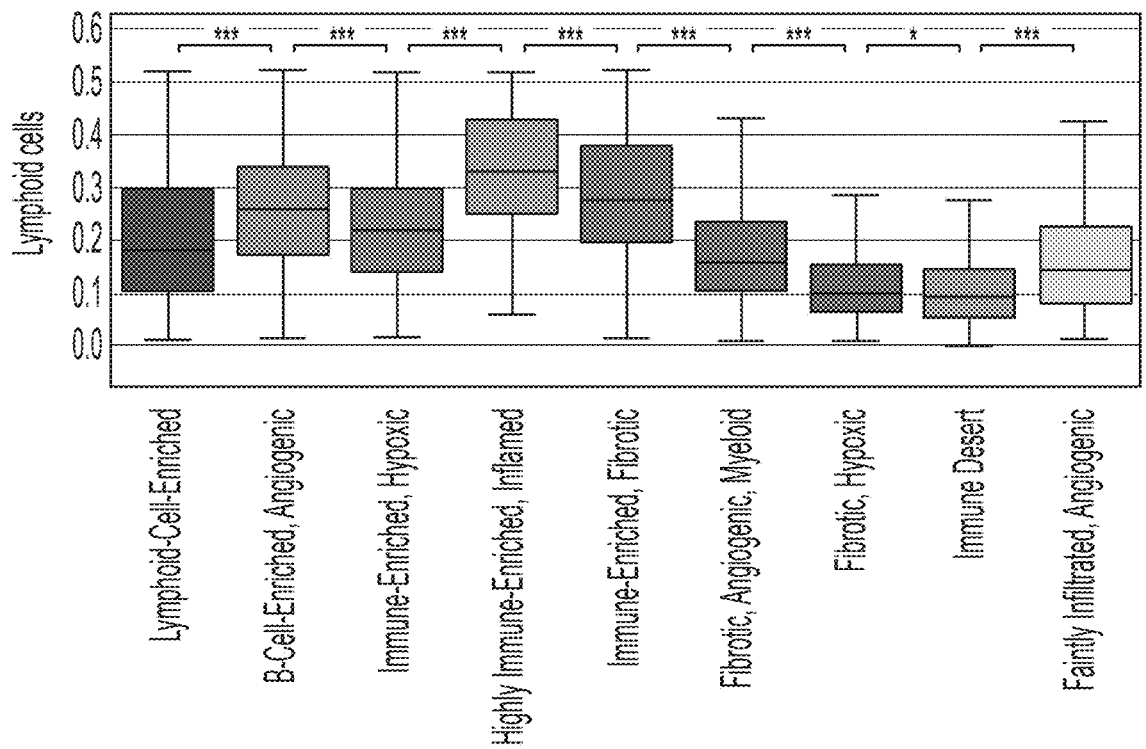
Figure 11A:
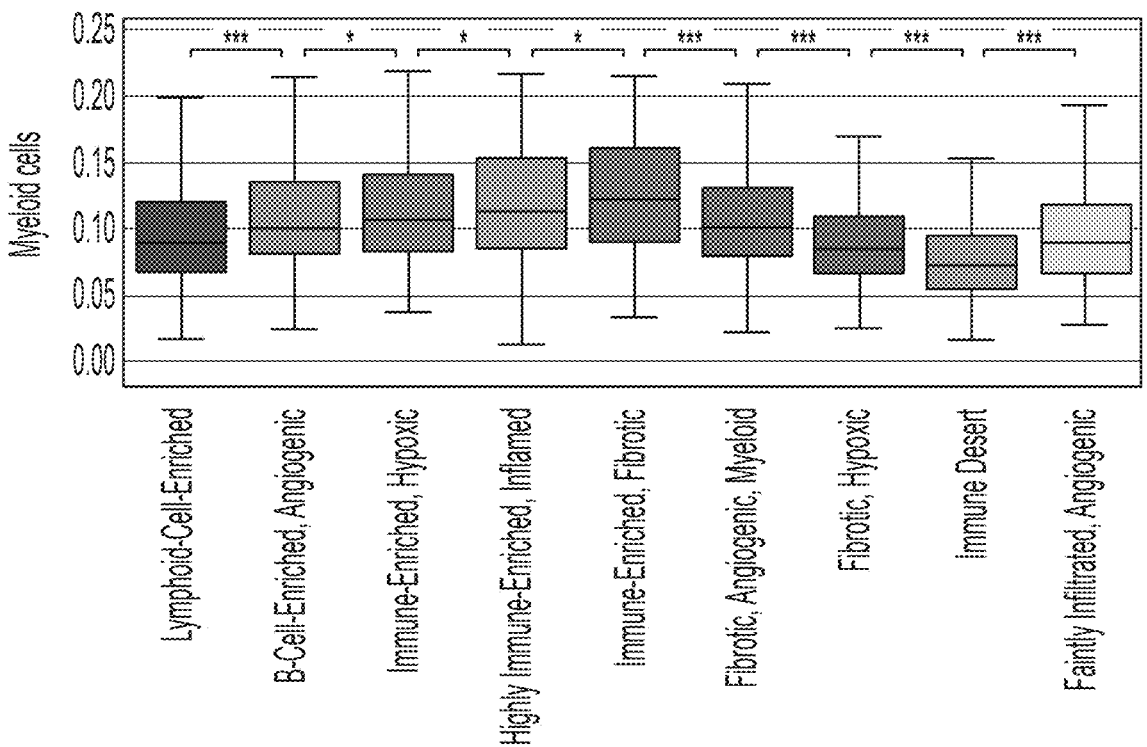
Figure 11A:
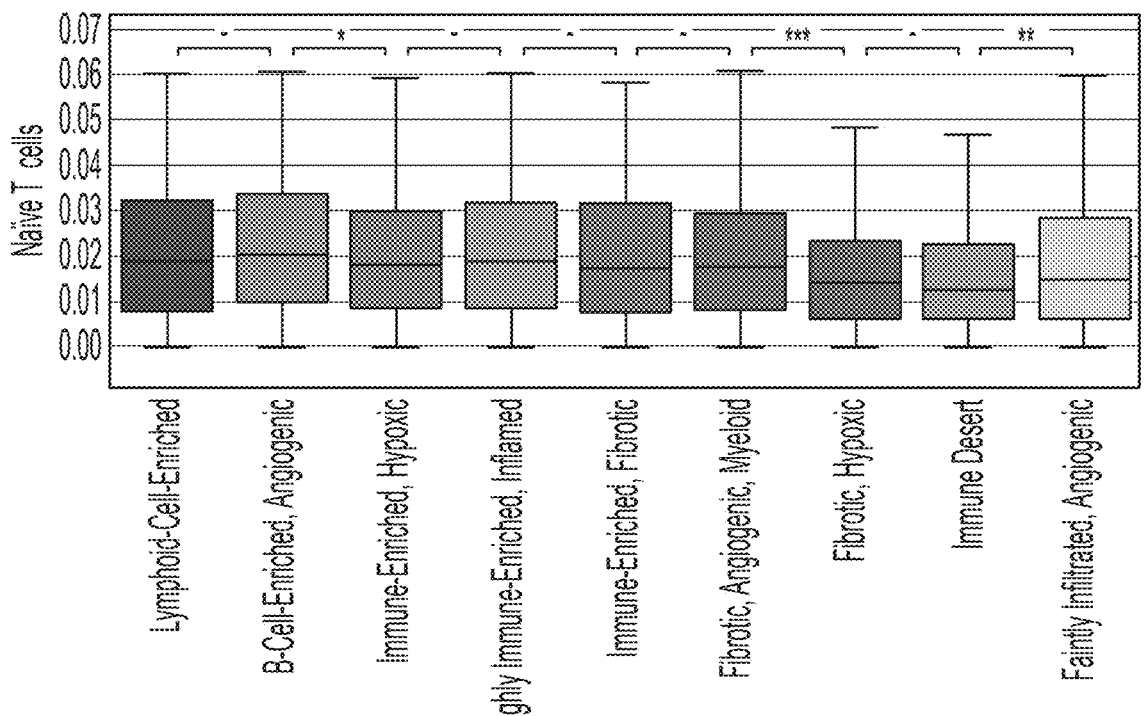
Figure 11A:
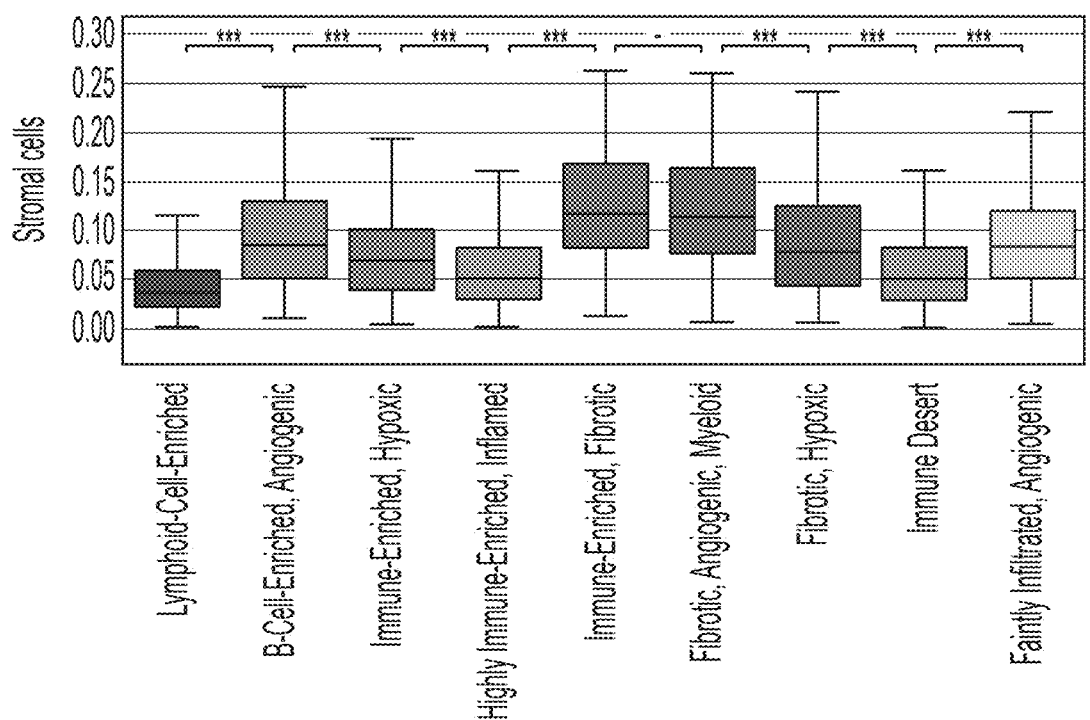
Figure 11A:
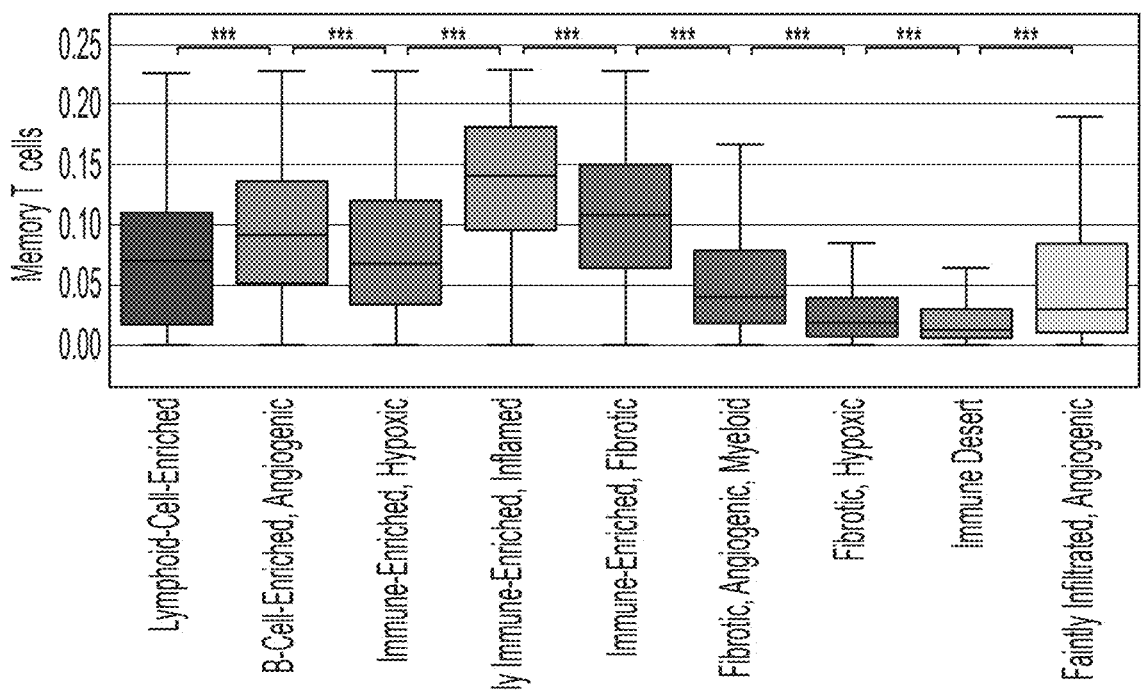
Figure 11A:
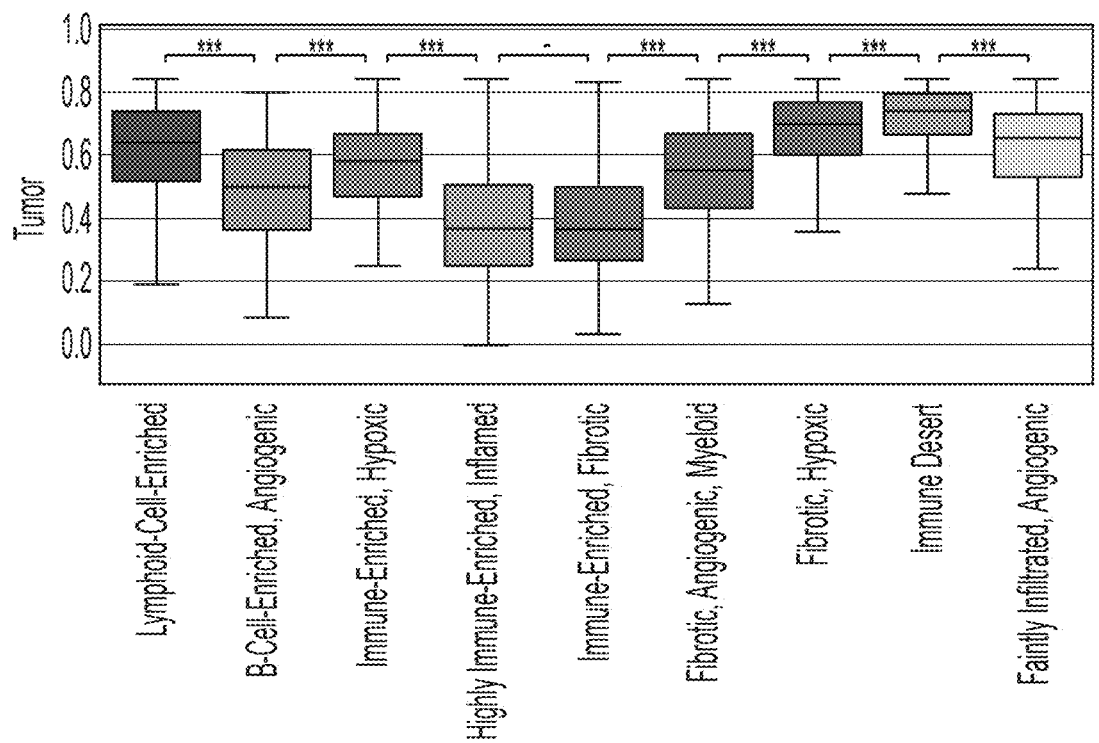
Figures 1, 12A:
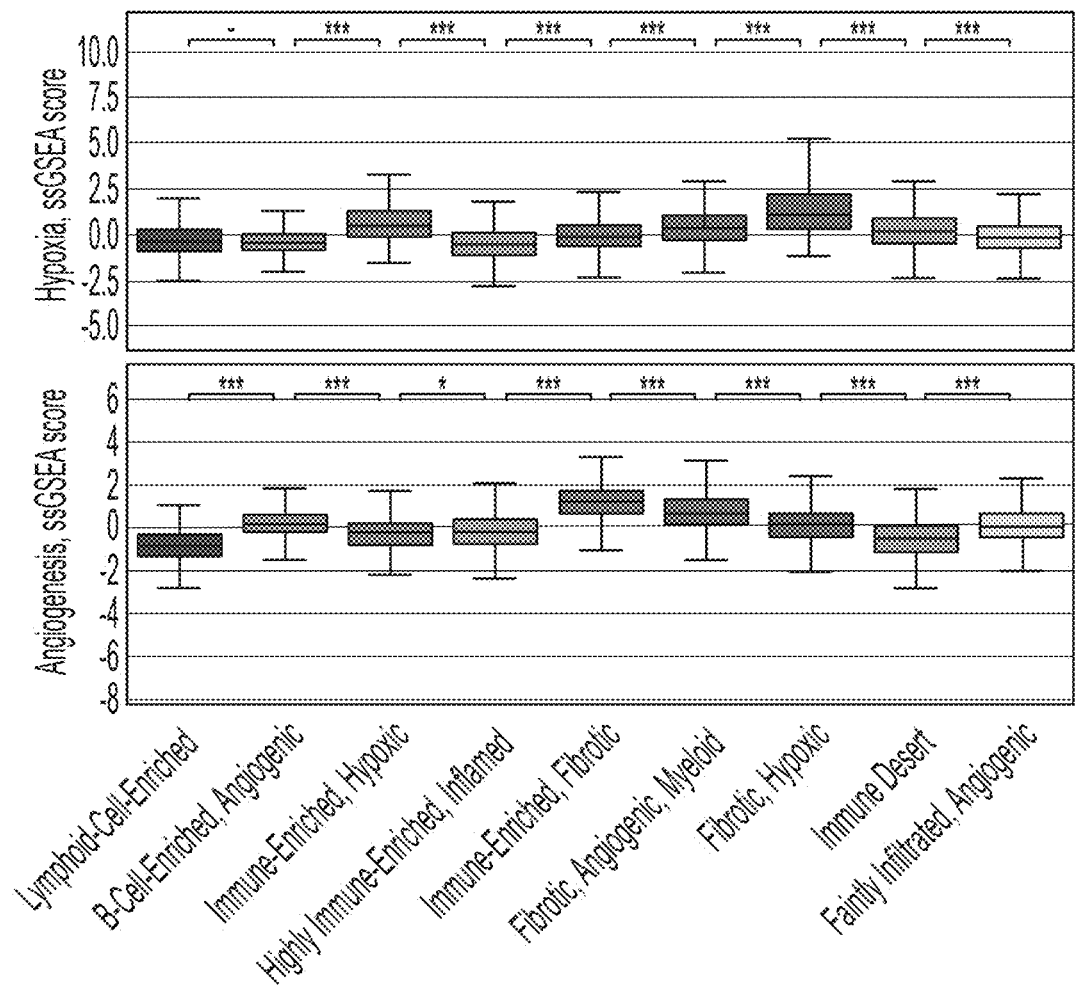
Figures 2, 12A:
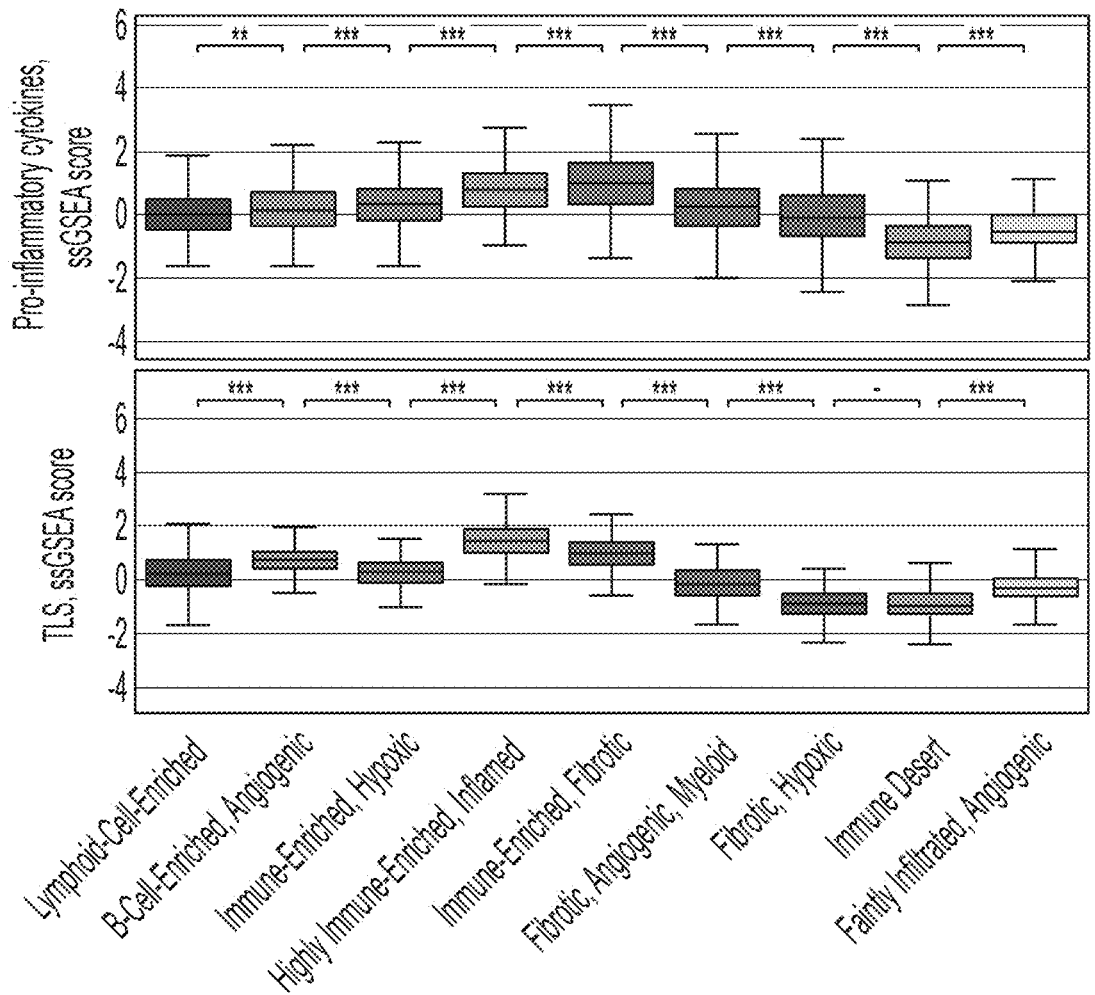
Figure 12B:
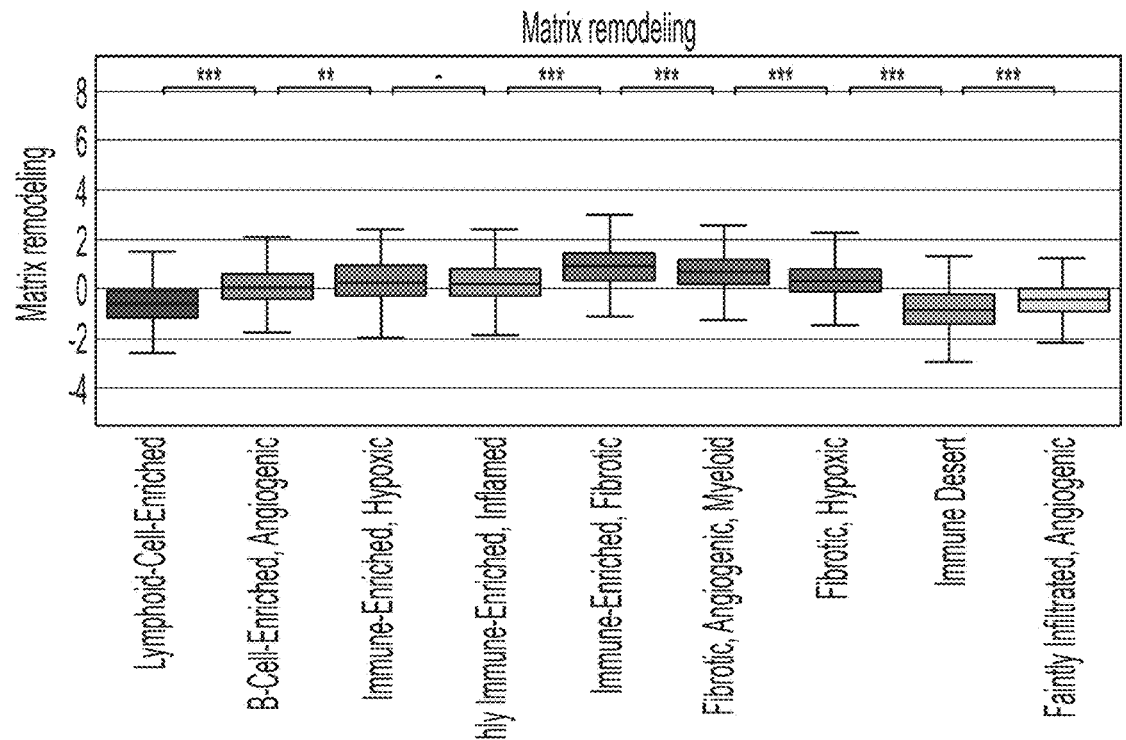
Figure 12C:
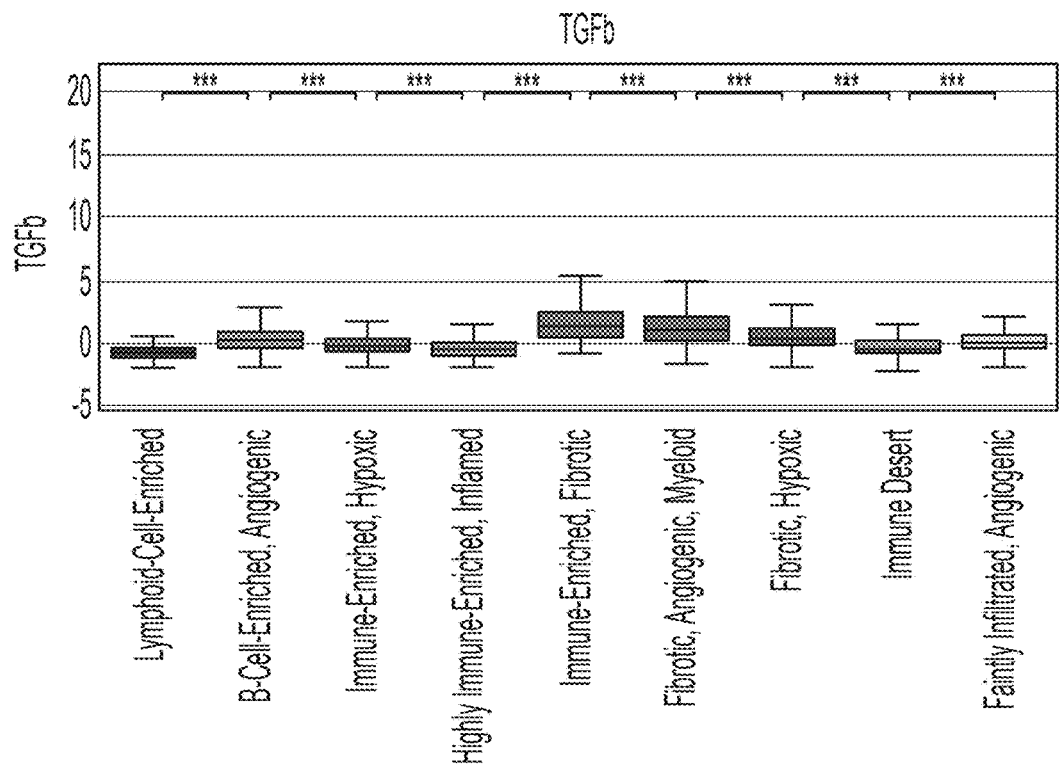
Figure 12D:
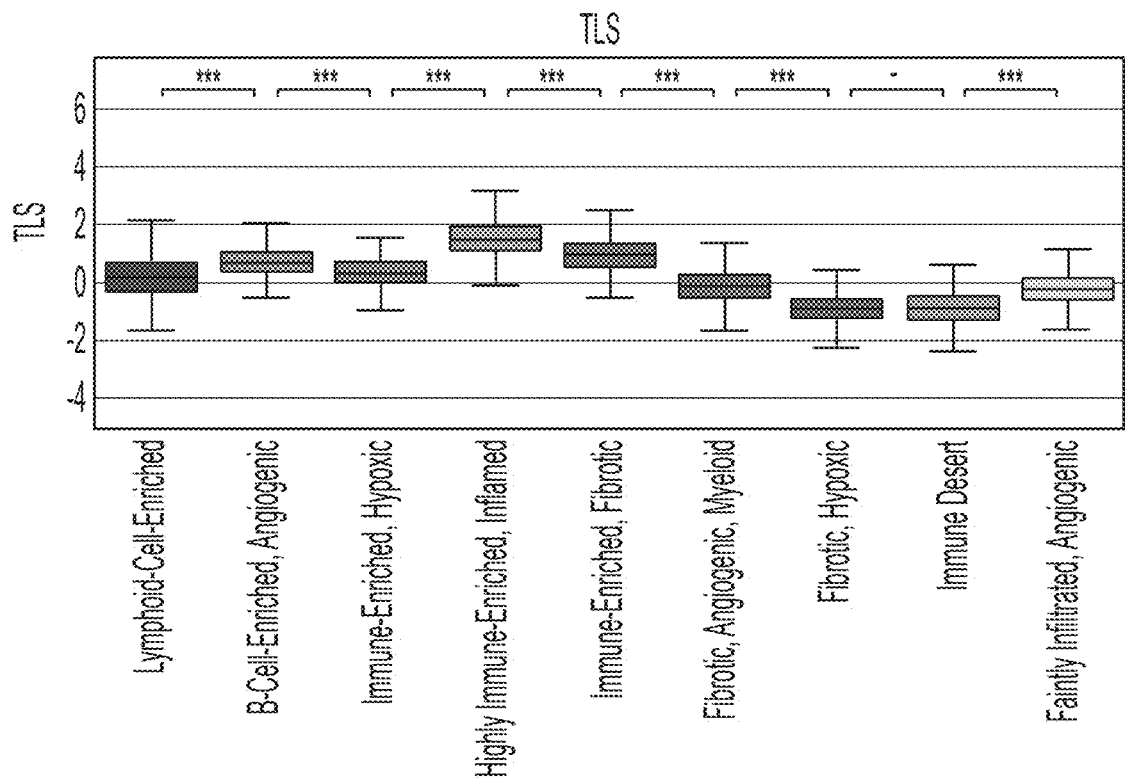
Figure 12E:
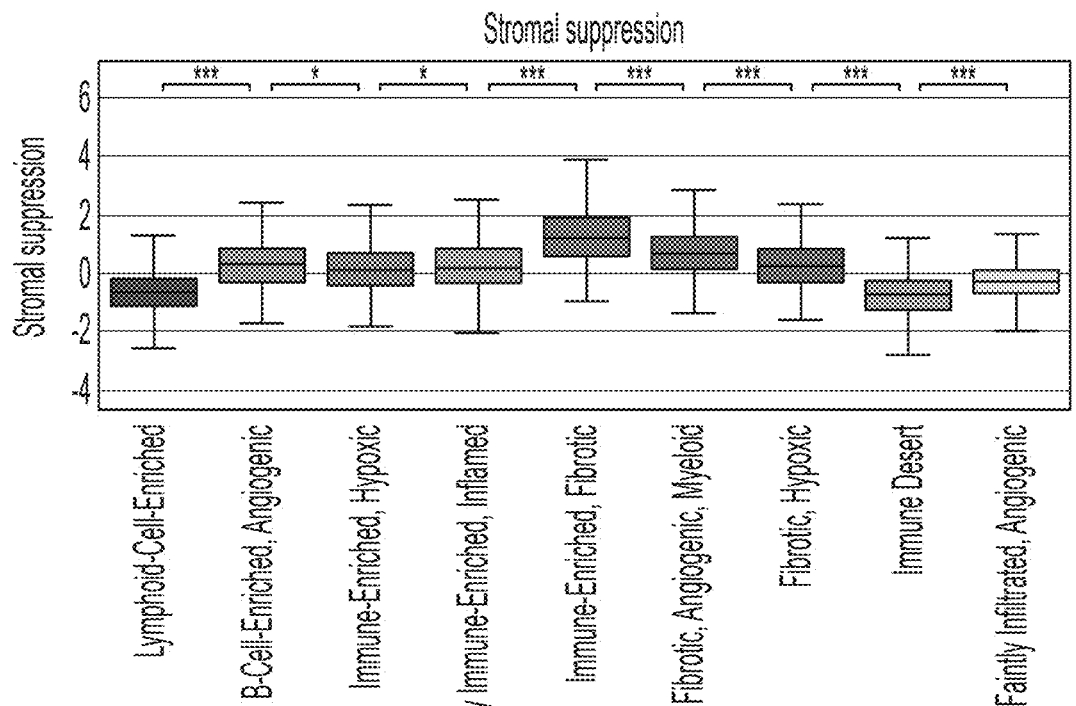
Figure 12F:
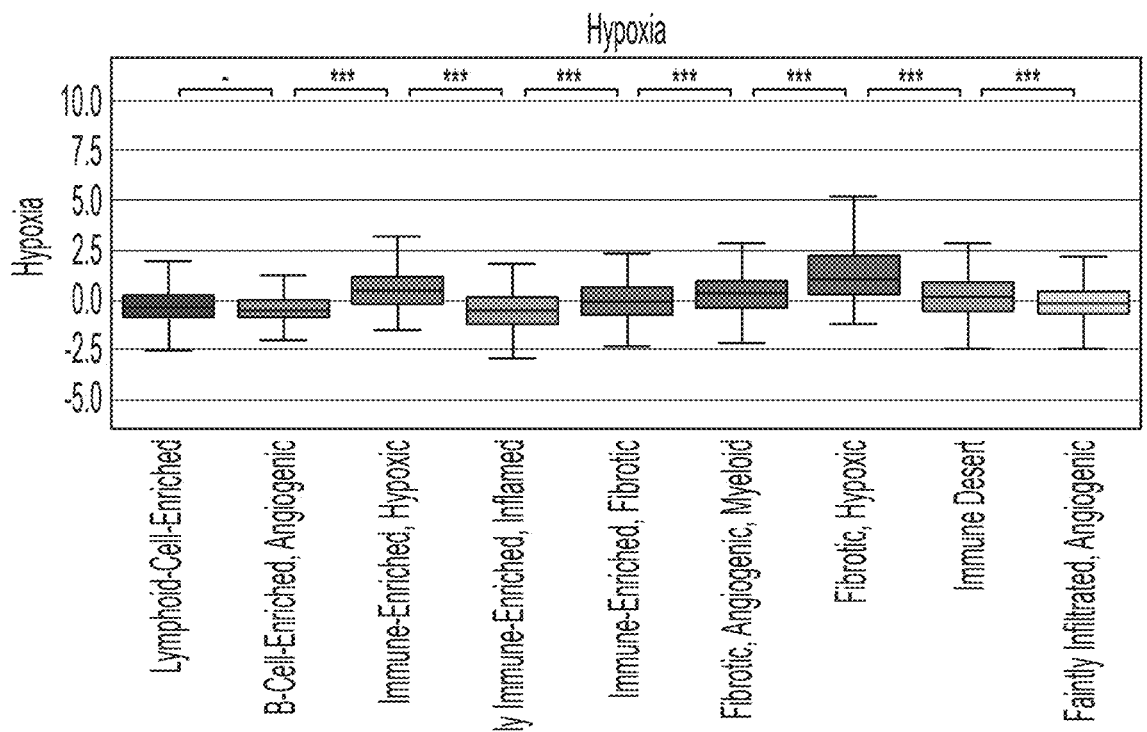
Figure 12G:
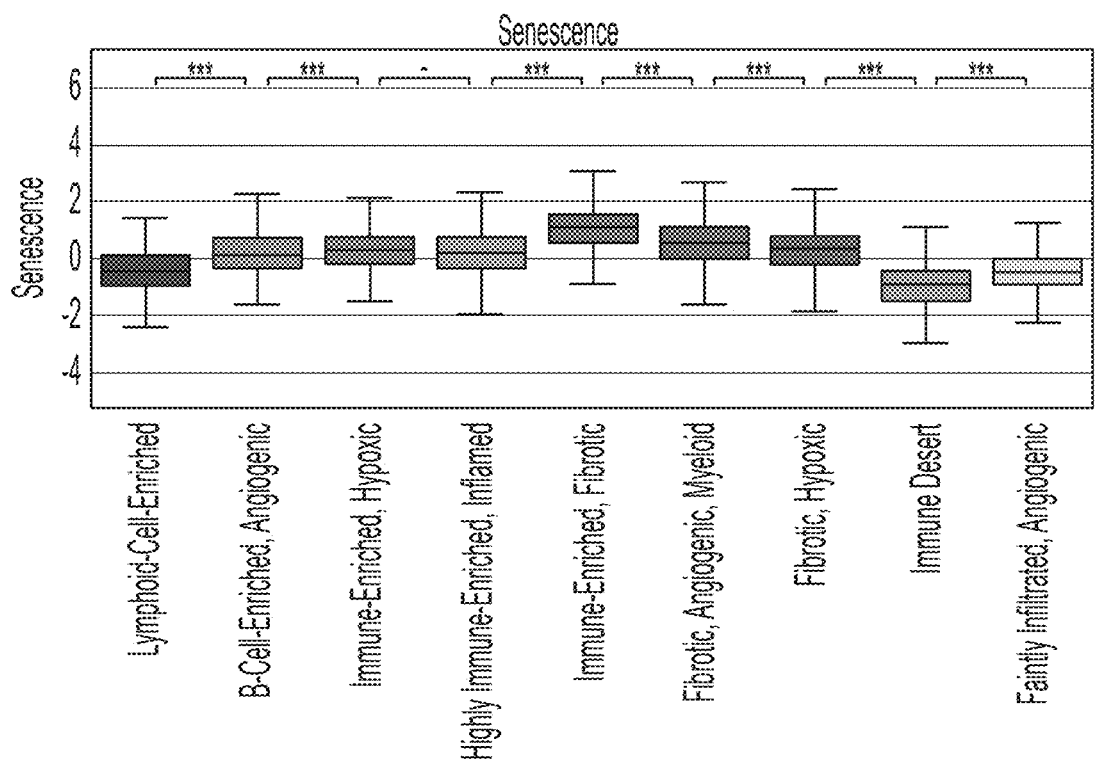
Figure 12H:
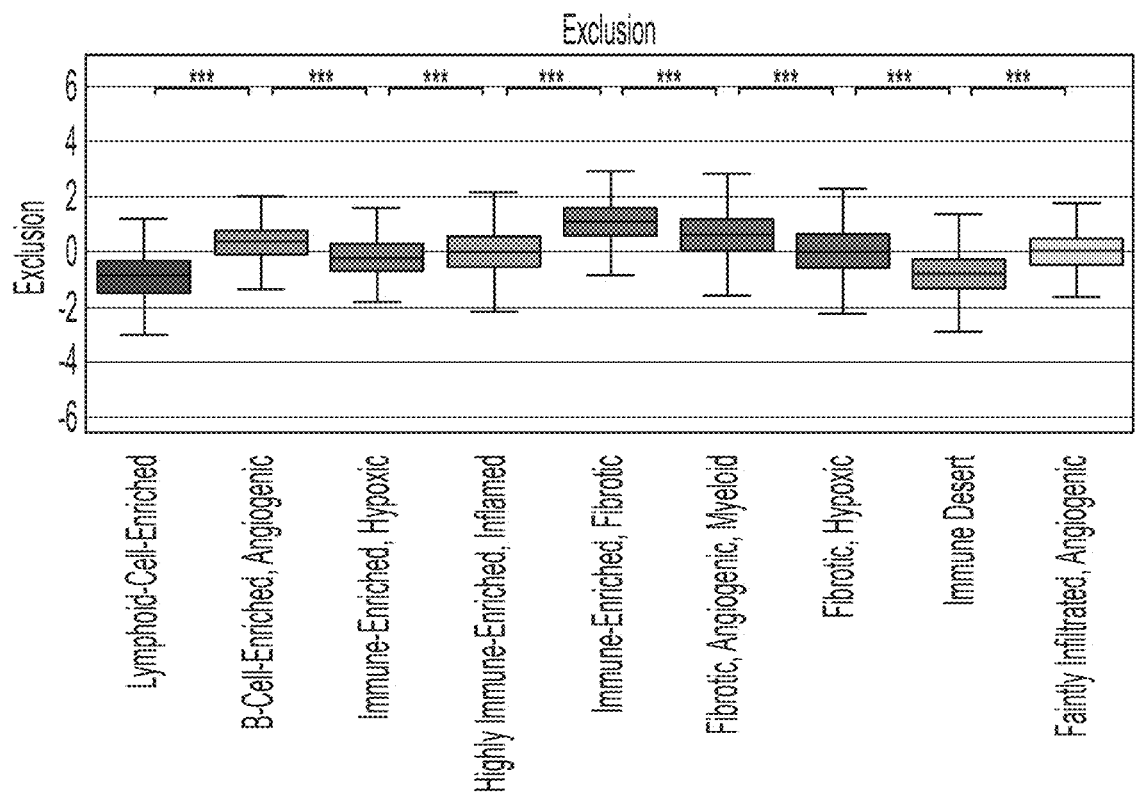
Figure 12I:
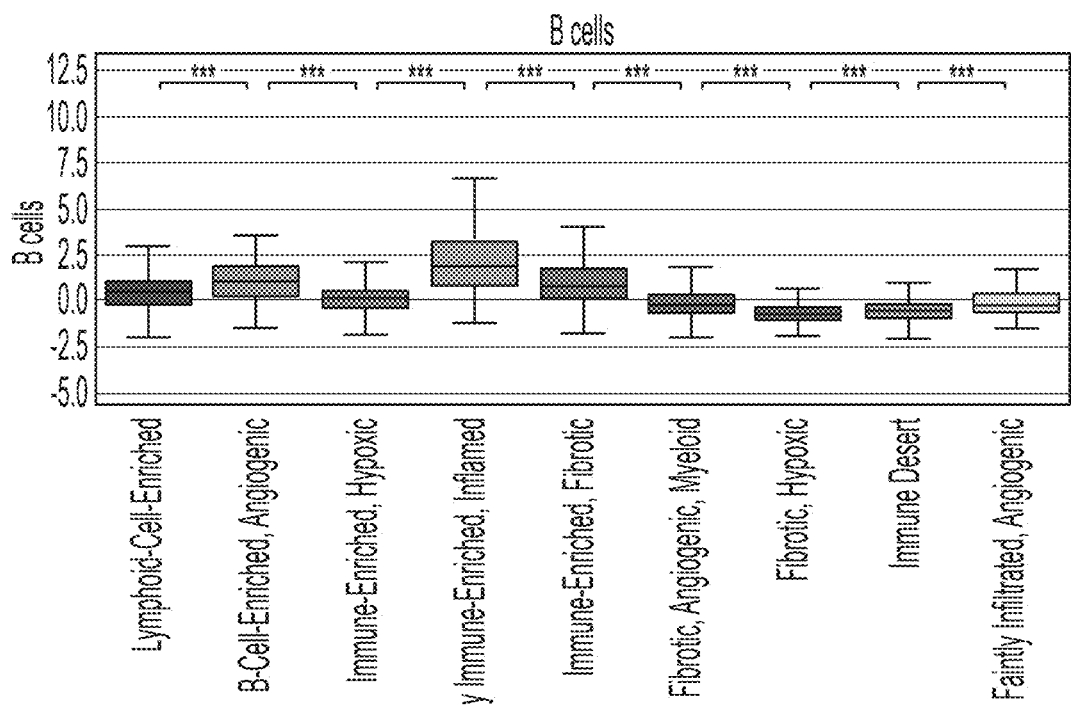
Figure 12J:
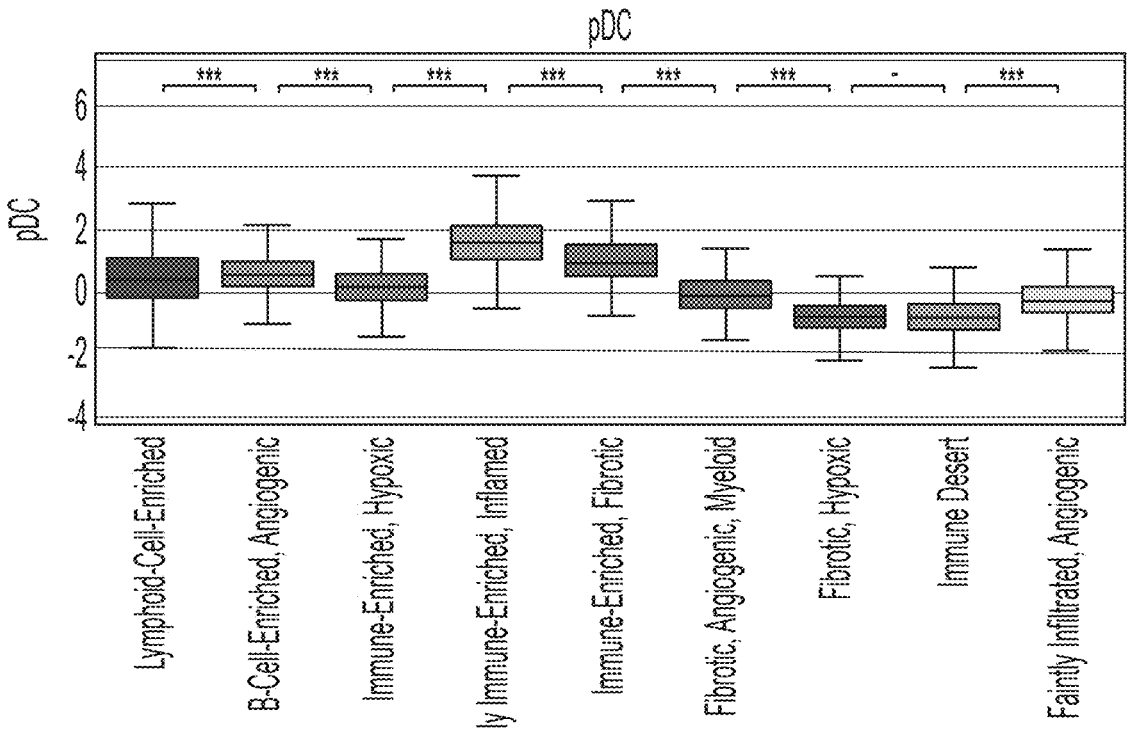
Figure 12K:
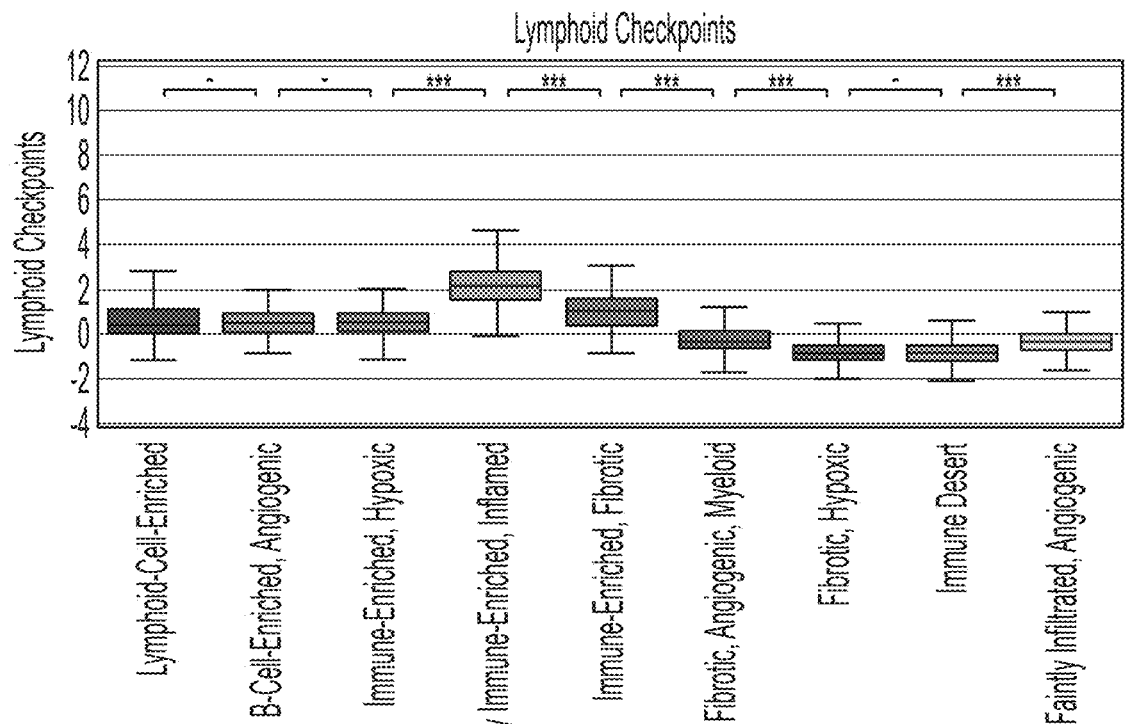
Figure 12L:
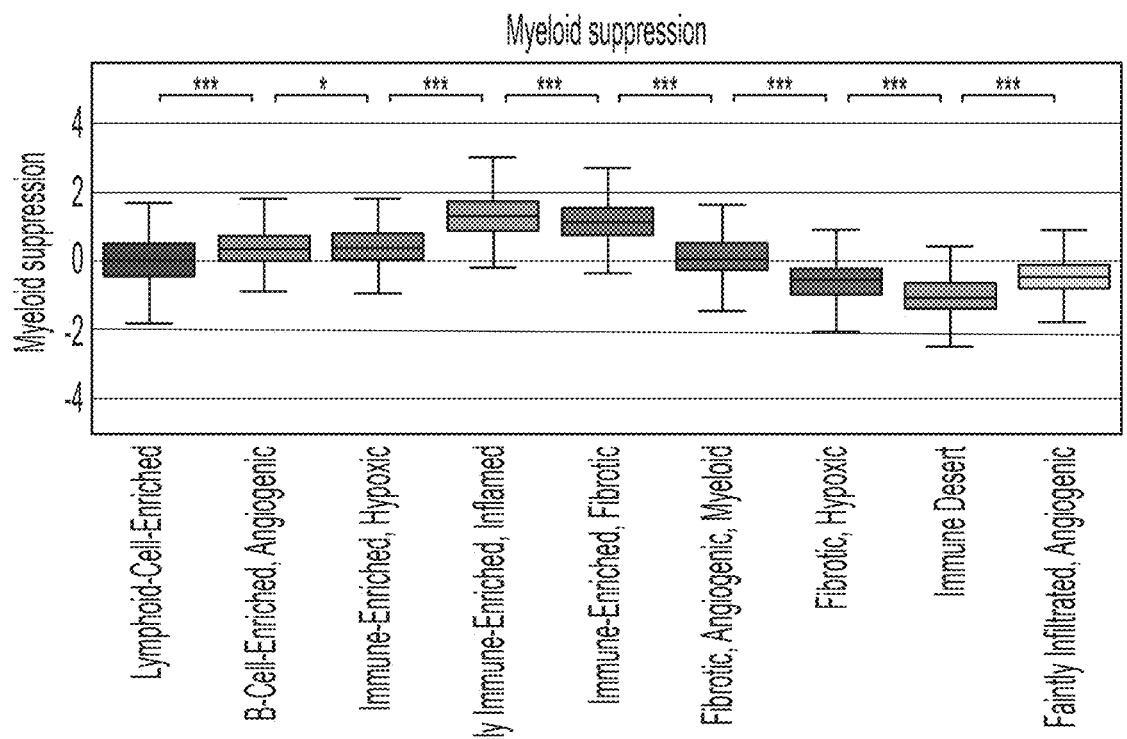
Figure 12M:
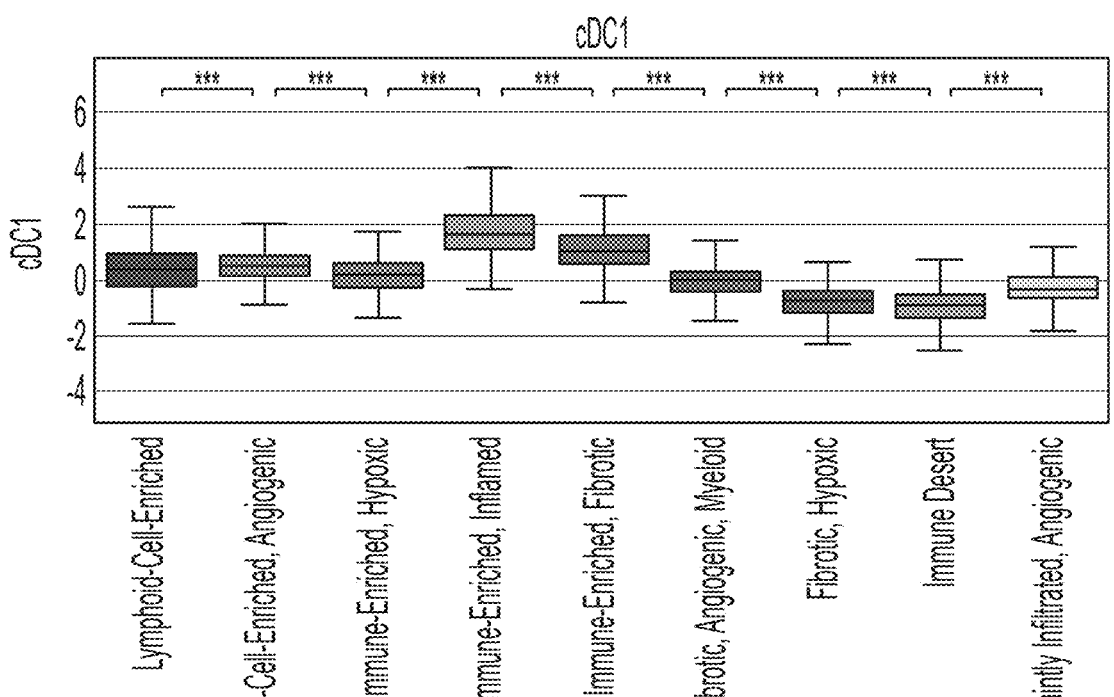
Figure 12N:
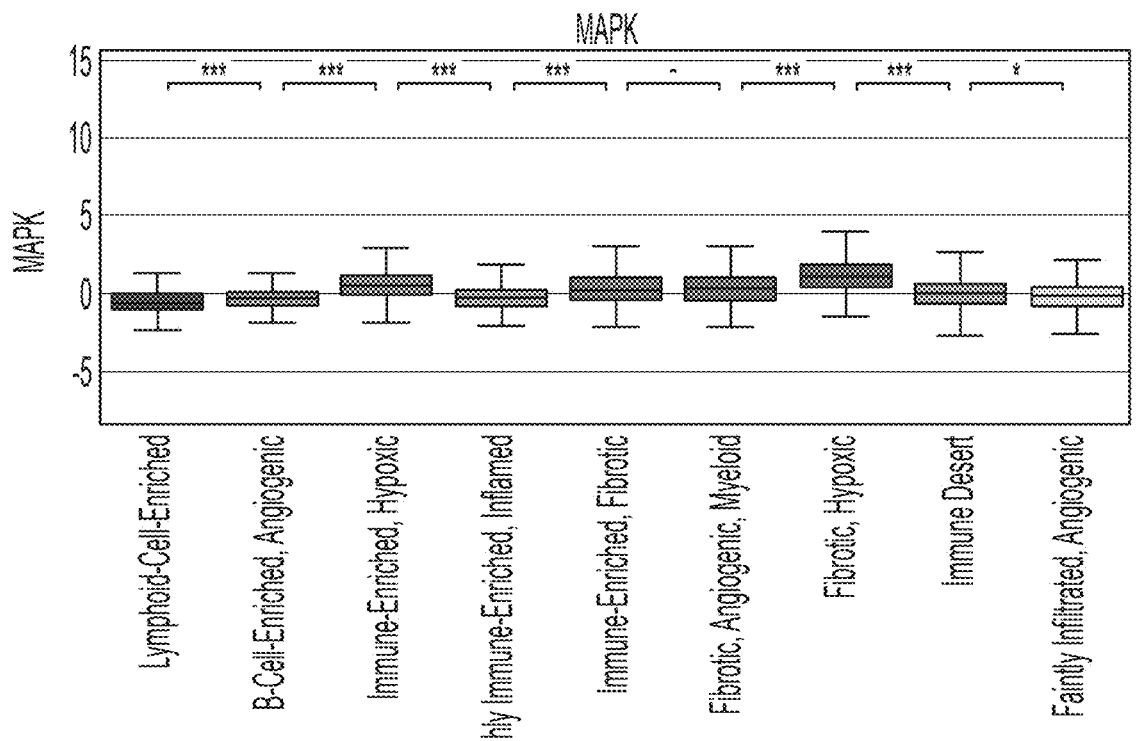
Figure 12O:
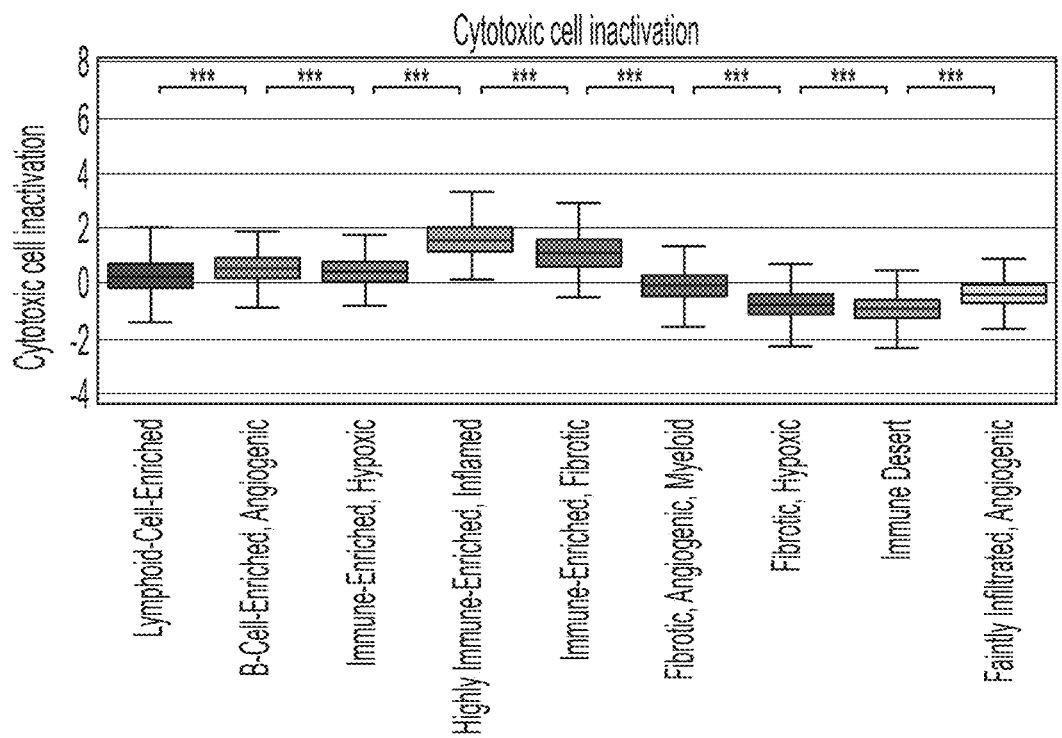
Figure 12P:
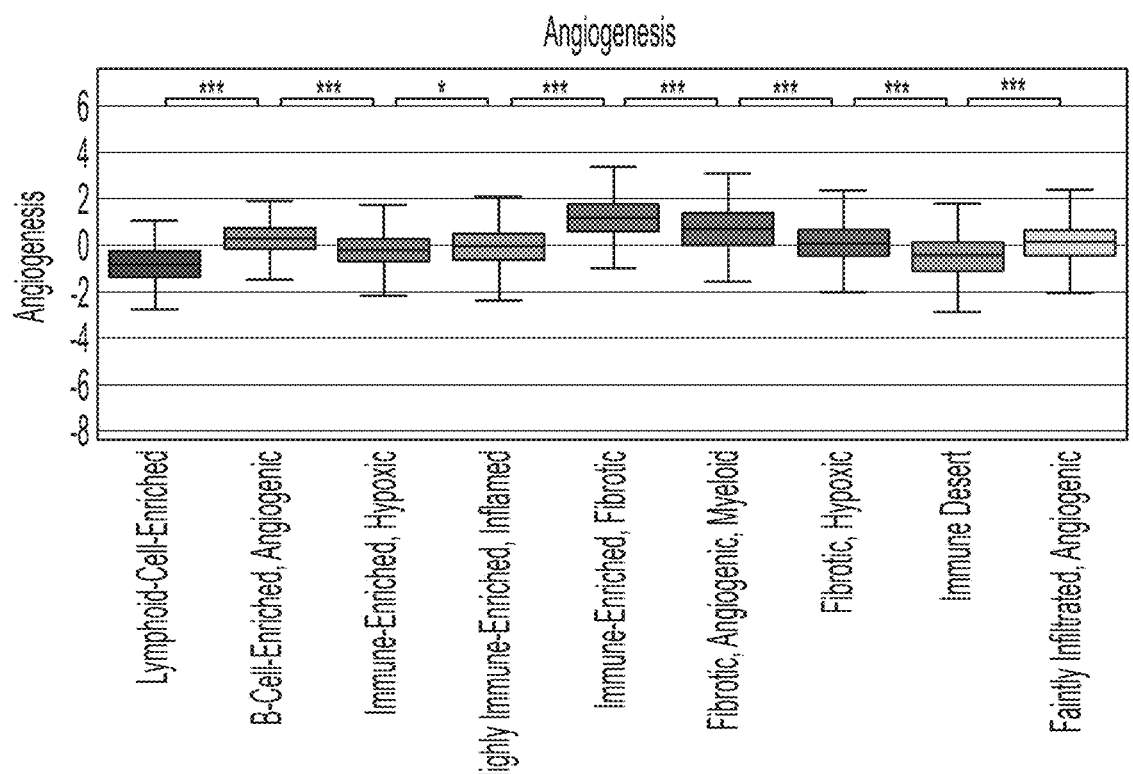
Figure 12Q:
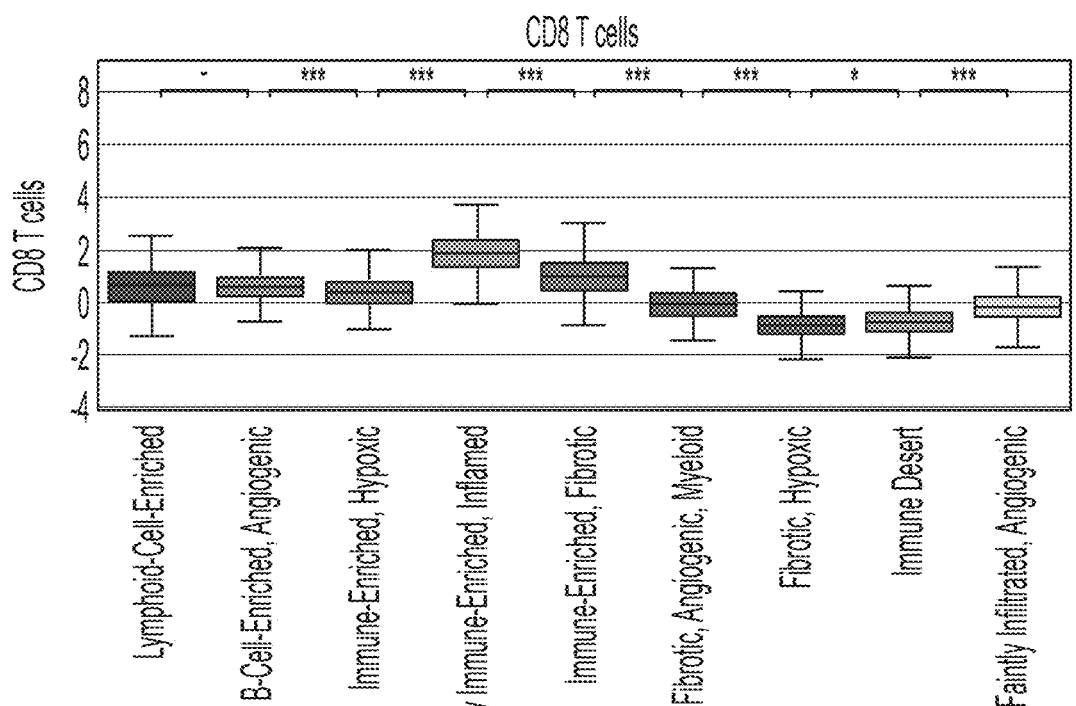
Figure 12R:
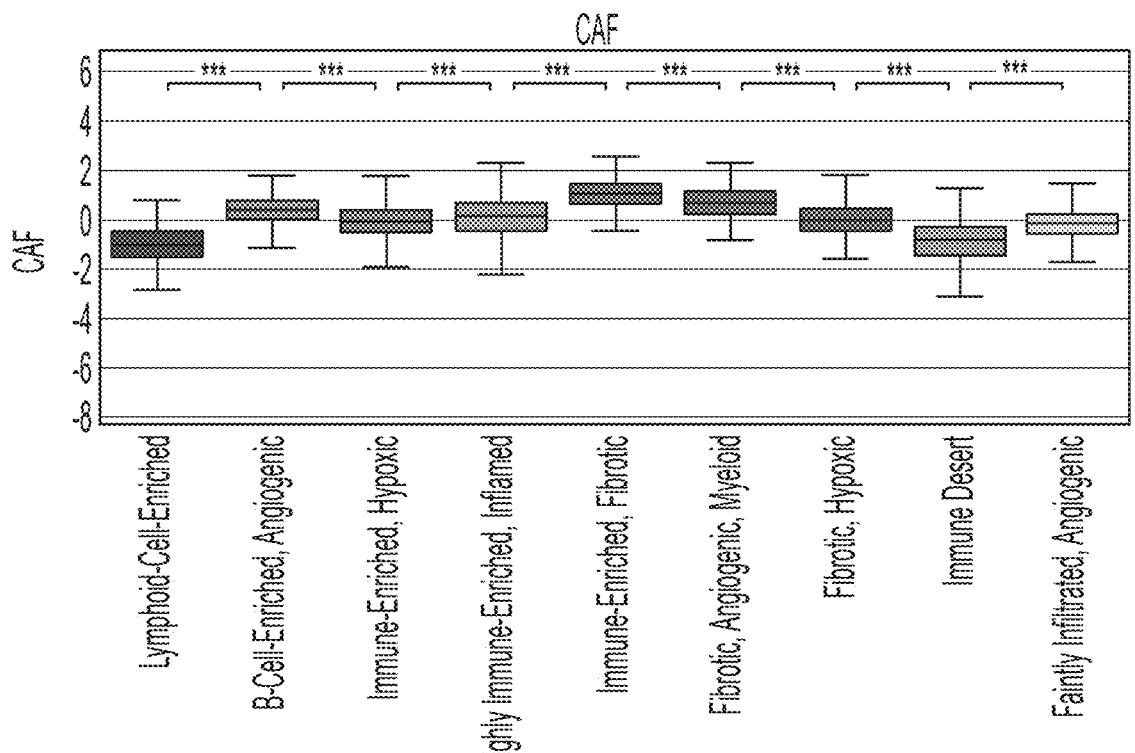
Figure 12S:
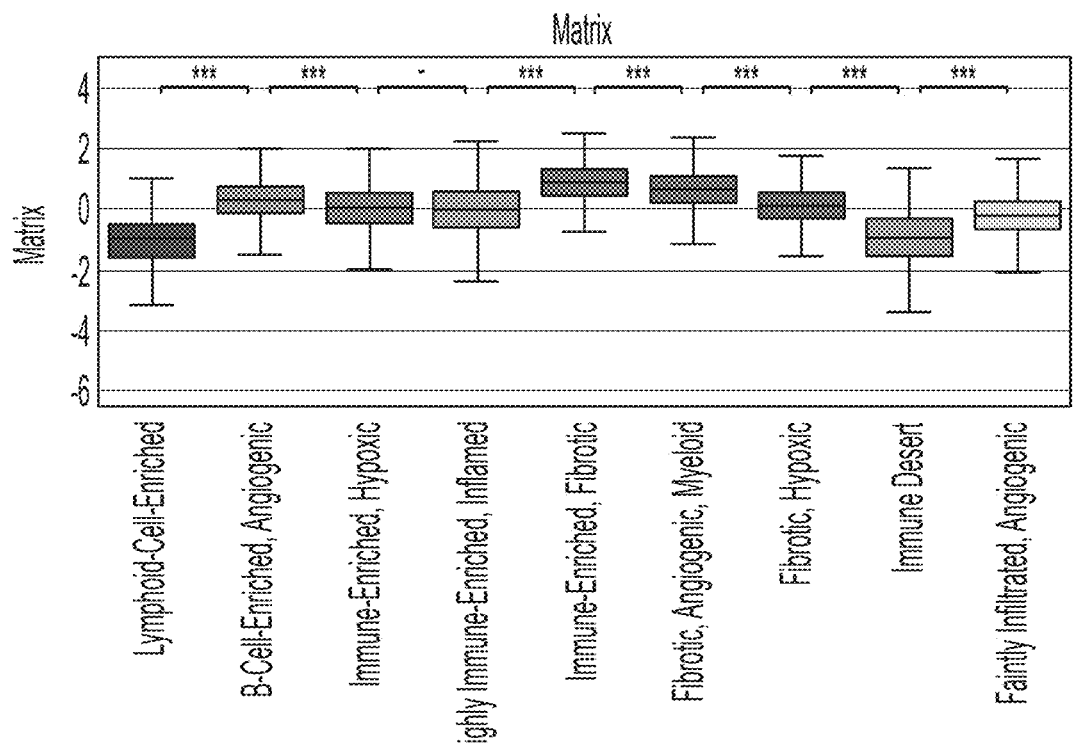
Figure 12T:
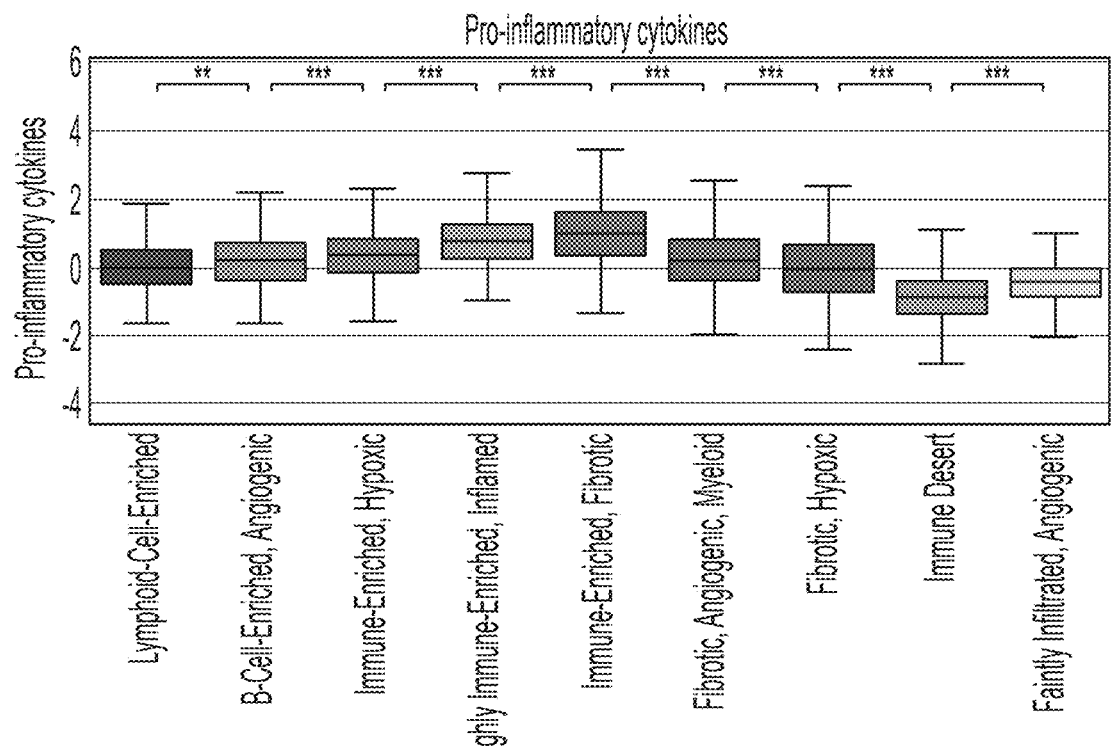
Figure 12U:
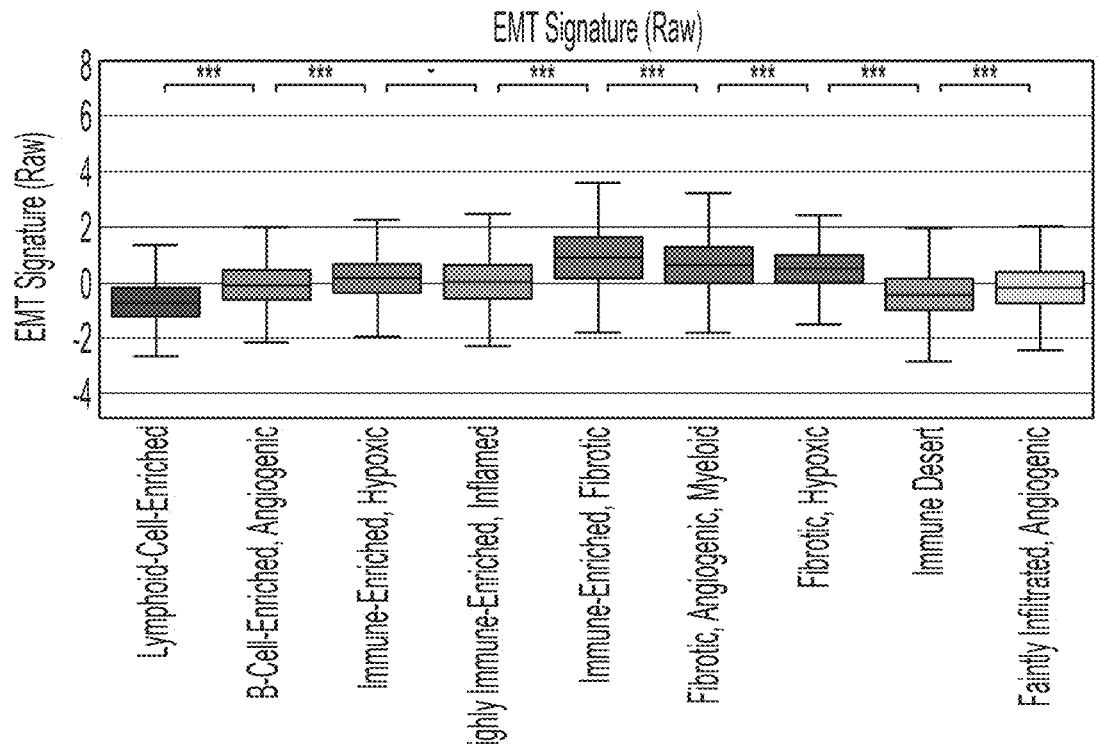
Figure 12V:
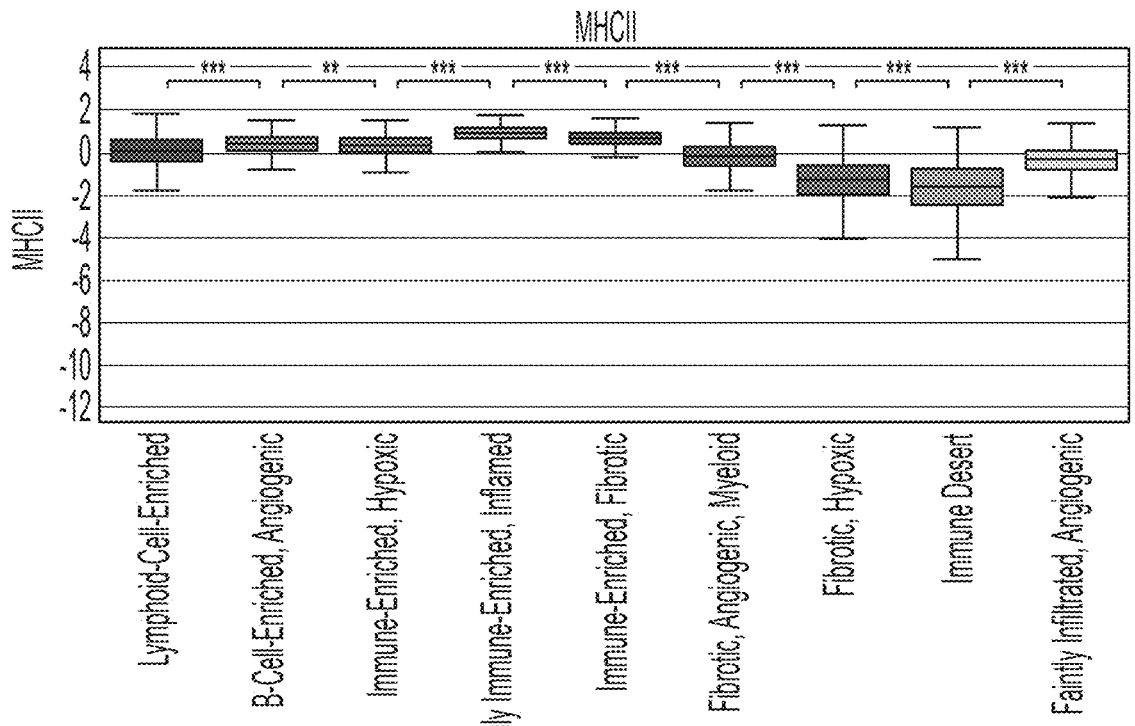
Figure 12W:
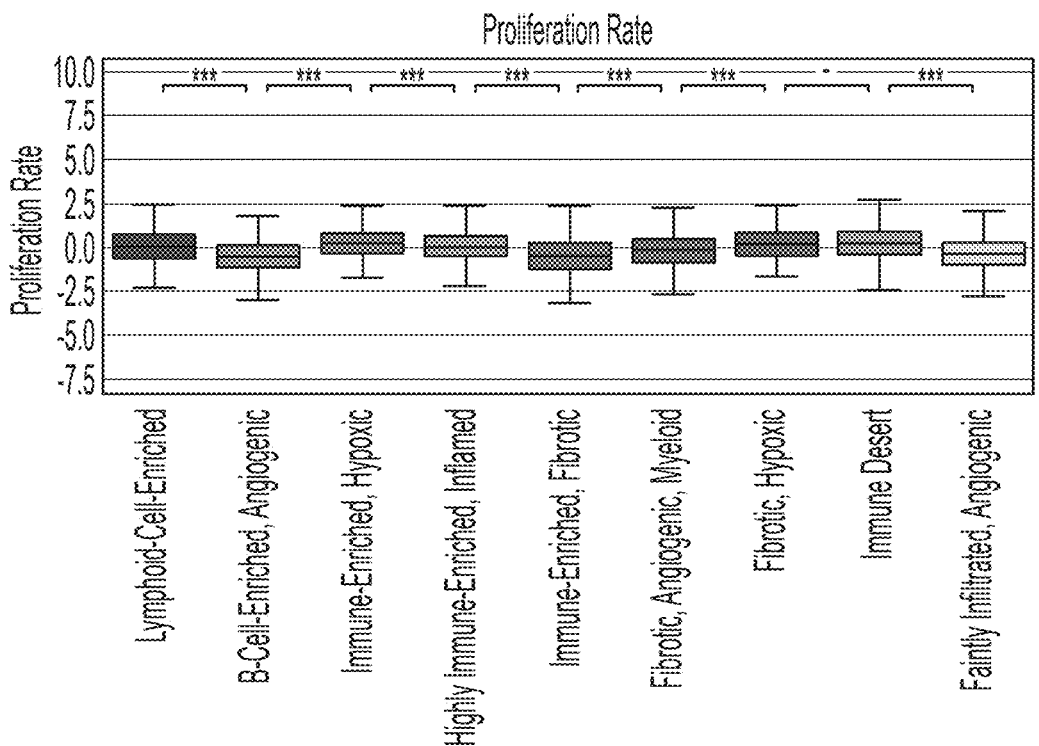
Figure 12X:
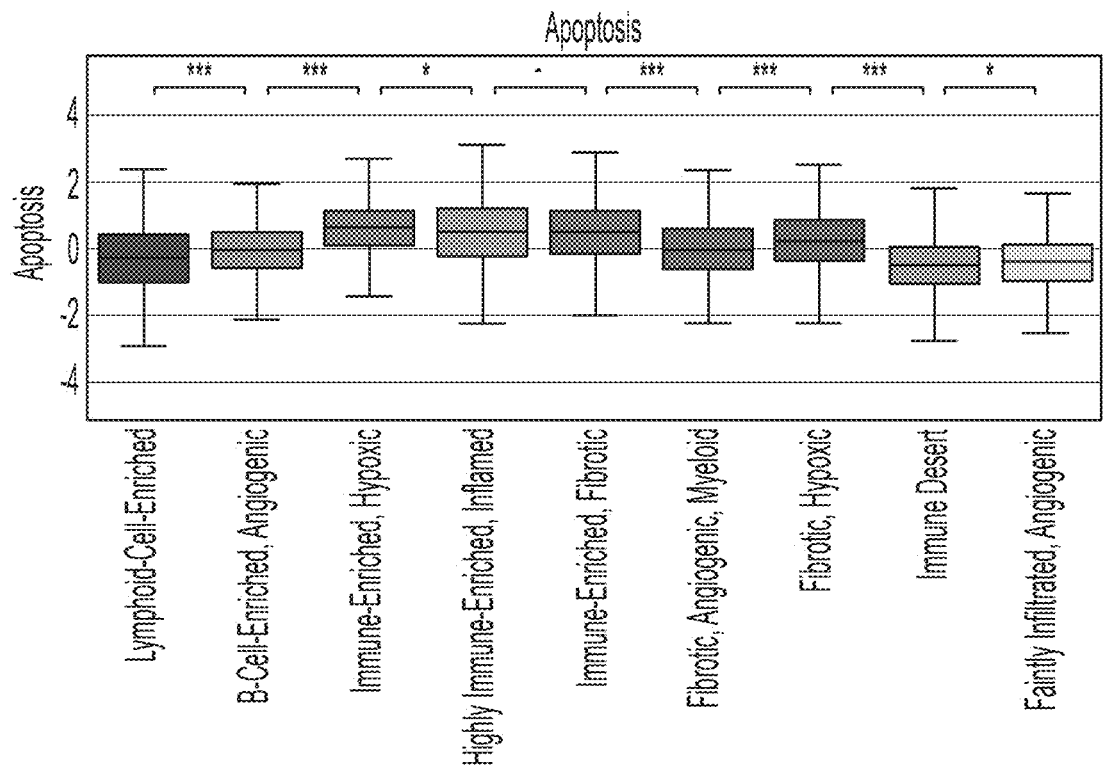
Figure 12Y:
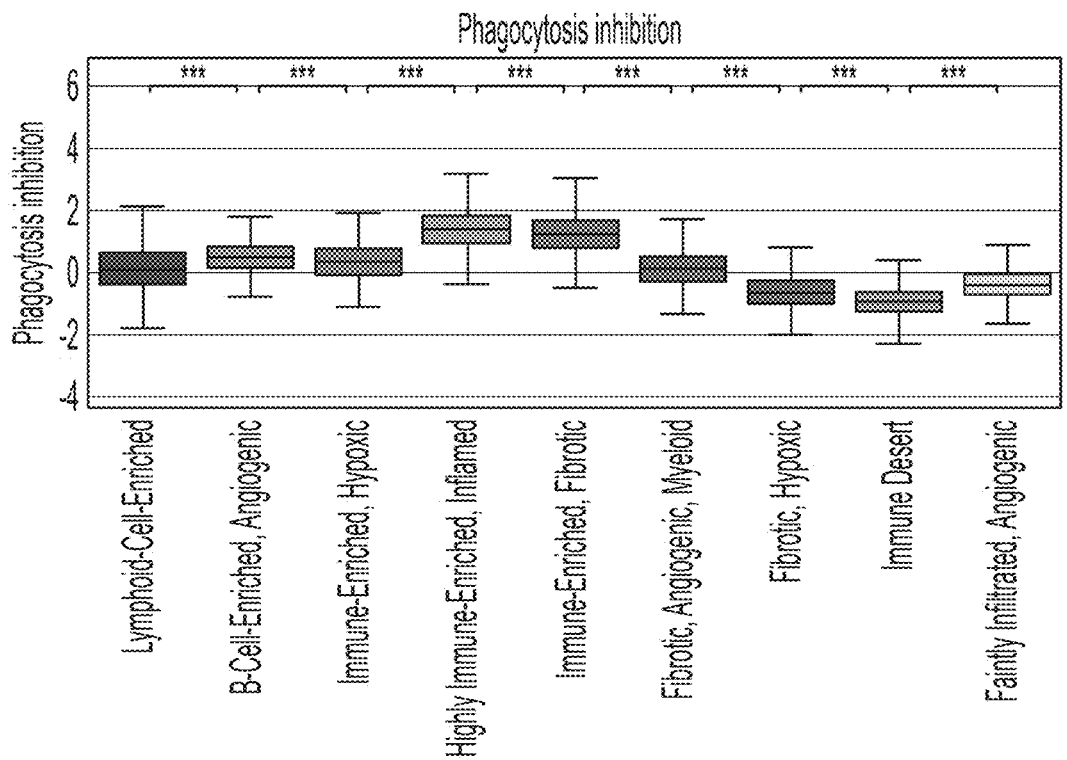
Figure 12Z:
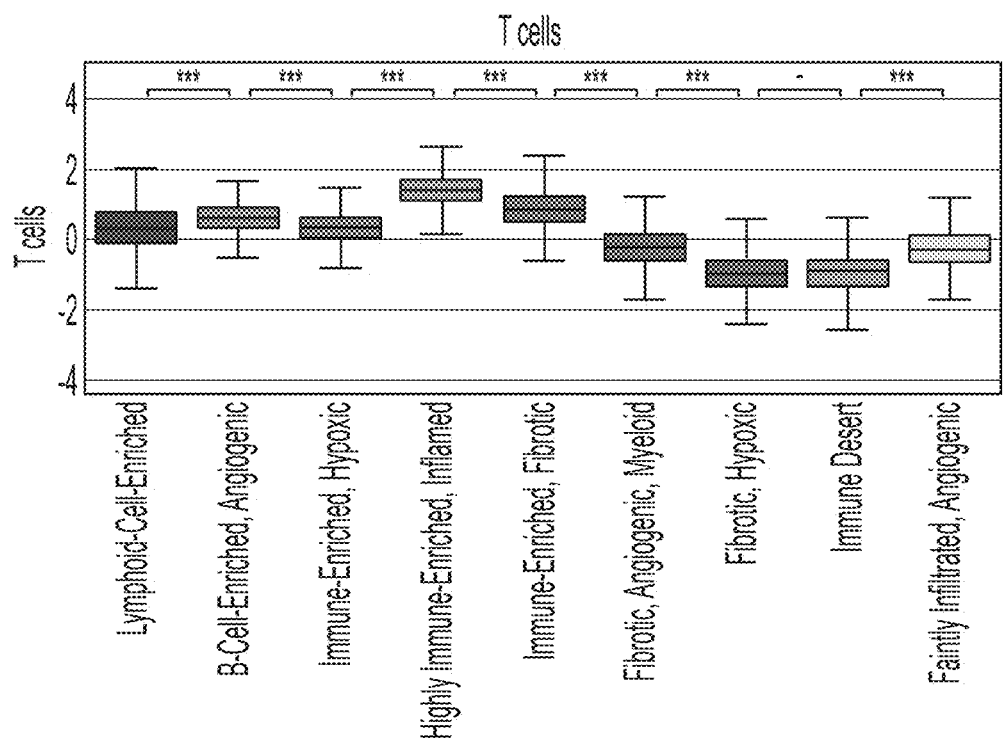
Figure 12A:
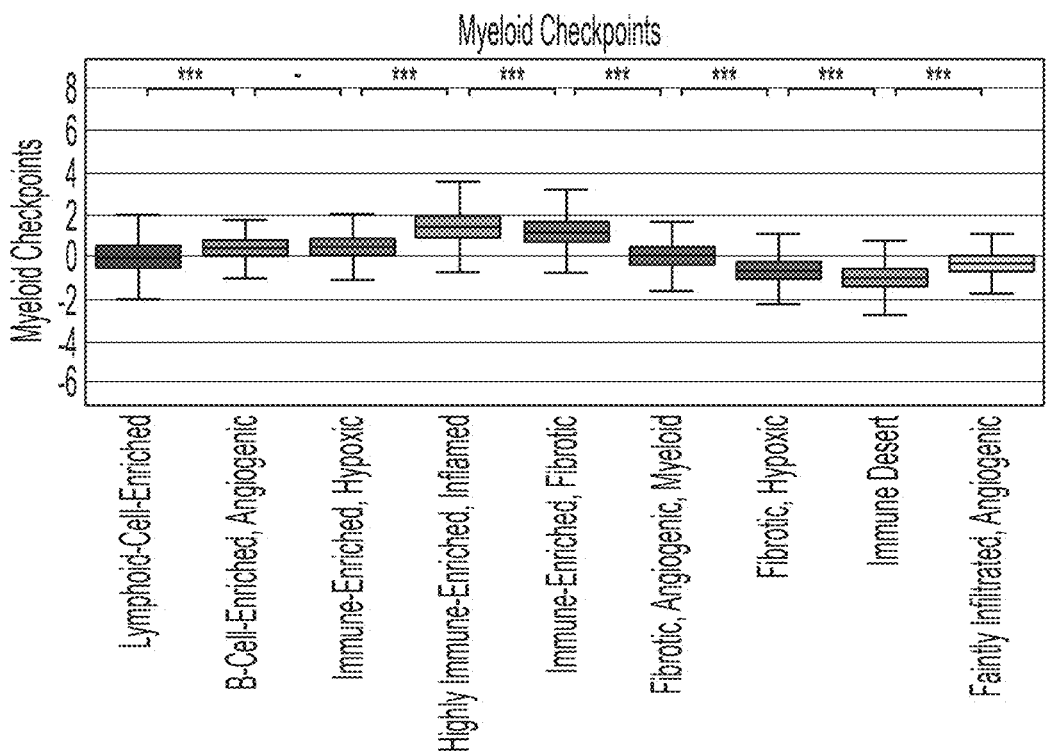
Figure 12A:
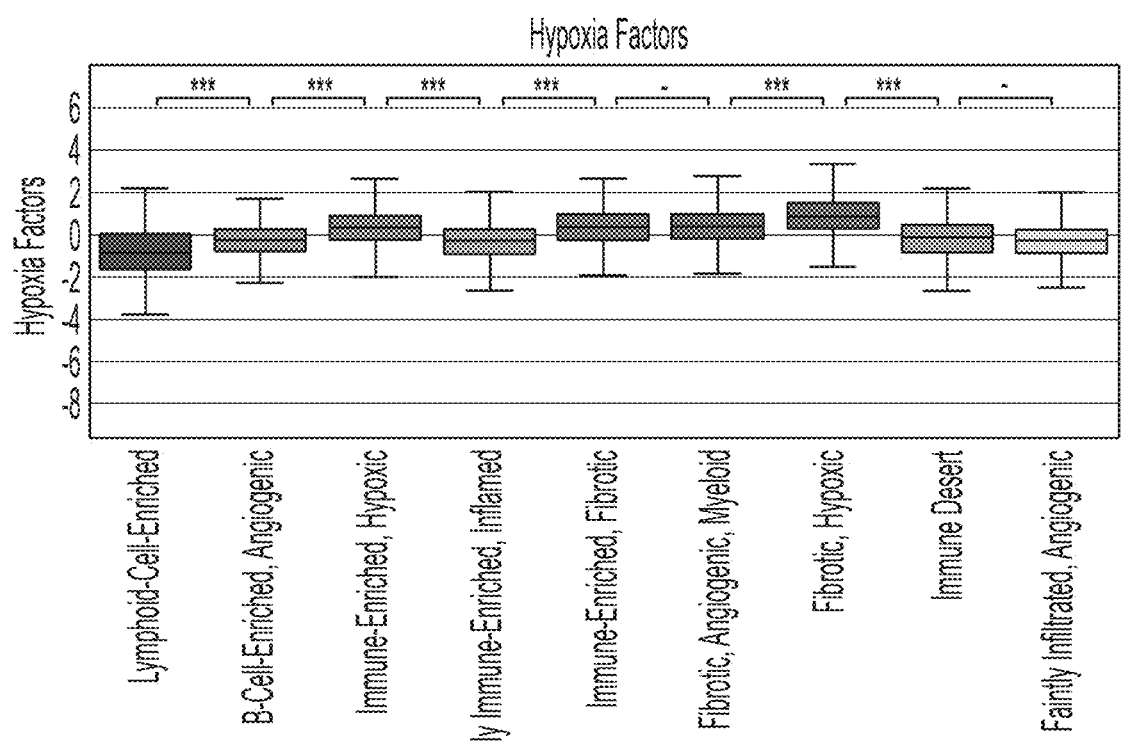

All genes composing an FGES were checked for adequate expression level and correlation with other genes—the genes describing one process should be well correlated (FIGS. 6A-6B and FIGS. 7A-7B). Then, a collected gene signature was checked for specificity to a certain cell type (in case of cell-type- or cell-state-describing signatures, i.e., cDC1) or to the samples with a certain condition (in case of process-describing signatures, i.e., Senescence) (FIGS. 6C-6D and FIG. 7C) and was corrected if needed by deletion or addition of genes. FGES validation was performed on train data (approximately 75% of all samples) taken from datasets of different origin and acquisition method, public and internal, to make sure that an FGES score did not reflect the features of a certain dataset and was generalizable. At last, the final FGES was checked on test data-approximately 25% of samples, which were not used at the validation step- and approved for further use in case of successive performance.

According to Spearman clustered correlation heatmap on pan-cancer TCGA data, the selected FGES and progeny-calculated pathways form five functional groups (FIGS. 8A-8D), inside which processes correlate with each other and describe five major directions of immune escape:
1. Excessive inflammation and apoptosis
2. Myeloid suppression and myeloid checkpoints
3. Lymphoid & DC infiltration, lymphoid checkpoints, and CTL suppression processes (groups 2 and 3 also correlate with each other, forming a meta-group characterizing immune infiltration)
4. Hypoxia, glycolysis, and MAPK/EGFR activation
5. Stroma activation (CAFs, Angiogenesis), senescence, EMT, and metastasis.

Unsupervised Clustering Defines 9 IE-Associated Clusters

To identify immune escape clusters on the cohort of N=7362 TCGA patients (Table 5), the Agglomerative clustering method (17) was used with the following parameters:
1. Sample distance matrix was computed using the Euclidean distance metric;
2. Linkage criterion which minimizes the variance of the clusters was selected;
3. Number of clusters was determined empirically, according to their biological meaning and the minimal size of the Unclassified cluster.

48 FGES (Table 1 and Table 2) and PROGENy scores (Table 3) were used as clustering parameters.

TABLE 5

The cohorts used for identification of 9 distinct Immune Escape subtypes. All cohorts are derived from the TCGA Project.

| Cohort name | # of samples |
|---|---|
| Invasive Breast Carcinoma | 1029 |
| Squamous Cell Carcinoma of the Head and Neck | 501 |
| Thyroid Papillary Carcinoma | 485 |
| Lung Adenocarcinoma | 480 |
| Clear Cell Renal Cell Carcinoma | 479 |
| Squamous Cell Lung Carcinoma | 471 |
| Cutaneous Melanoma | 444 |
| Prostate Cancer | 443 |
| Stomach Adenocarcinoma | 377 |
| Urinary Bladder Urothelial Carcinoma | 371 |
| Hepatocellular Carcinoma | 344 |
| Epithelial Ovarian Cancer | 314 |
| Uterine Cervical Neoplasm | 293 |
| Papillary Renal Cell Carcinoma | 275 |
| Colon Adenocarcinoma | 260 |
| Esophageal Neoplasm | 163 |
| Uterine Corpus Endometrial Carcinoma | 160 |
| Paraganglioma | 155 |
| Pancreatic Adenocarcinoma | 142 |
| Rectal Adenocarcinoma | 83 |
| Uveal Melanoma | 78 |
| Adrenocortical carcinoma | 76 |
| Chromophobe Renal Cell Carcinoma | 63 |
| Uterine Carcinosarcoma | 55 |
| Cholangiocarcinoma | 34 |

As a result, nine distinct Immune Escape subtypes plus a group of unclassified patients were found (FIGS. 9-14; Table 4). As used herein, "low" signal or "low" gene group scores may be less than or equal to approximately −1, "moderate" signal or "moderate" gene group scores may be in a range from approximately −1 to 1, and "high" signal or "high" gene group scores may be greater than or equal to approximately 1.

Lymphoid-Cell-Enriched (IE/L).

The main feature of this cluster was lymphoid-cell-infiltrated TME, particularly with T cells and B cells, with relatively low signal from myeloid-cell-associated FGES and very low scores of FGES describing stroma and tumor intrinsic features (hypoxia, acidosis, autophagy, etc.). A prevalence of checkpoint molecule expression characteristic for lymphoid cells was observed (PD1, CTLA4, LAG3, TIGIT, etc.), Tumor proliferation rate FGES score was moderate, but the deconvolution-predicted proportion of tumor cells was higher compared to other subtypes. Patients of this cluster showed good survival prognosis.

B-Cell-Enriched, Angiogenic (IE/B/A).

This cluster was marked by a high level of infiltration with both lymphoid and myeloid cells, with a slight increase in B cell subtypes. High expression of lymphoid cell checkpoints was observed, especially those found on B cells and DC (PVRIG, BTLA, CD40LG). A low tumor proliferation rate and high score of adipocyte FGES were observed. Fibroblast and endothelial cell proportions, as well as angiogenesis and tertiary lymphoid structure (TLS) FGES scores were mildly increased. This subtype showed good survival prognosis.
Immune-Enriched, Hypoxic (IE/H).

This cluster was characterized by high immune cell infiltration, mostly by cytotoxic lymphocytes, and high levels of hypoxia and glycolysis. A higher expression of myeloid-cell-associated checkpoints was observed compared to the previous two clusters. EGFR and MAPK pathways were upregulated. Tumor proliferation rate FGES score was rather high compared to other subtypes. Scores of FGES describing epithelial-mesenchymal transition (EMT), senescence, and matrix remodeling were mildly increased.
Highly Immune-Enriched, Inflamed (IE/Inf).

This cluster was characterized by the highest prevalence of lymphoid and myeloid immune cells, with especially high levels of cytotoxic cells, B cells and DC, and the highest expression of both lymphoid- and myeloid-cell-associated checkpoint molecules. Pro-inflammatory cytokines and pro-tumor chemokines signature scores were high, while stroma-associated signature scores were low. Tumor proliferation rate signature score was low. Patients of this cluster bad the best prognosis.
Immune-Enriched, Fibrotic (IE/F).

This cluster was marked by high immune cell infiltration and high checkpoint expression, with the highest level of myeloid cells among all the clusters. Tumor proliferation rate signature score was low. Stroma-associated FGES scores were very high (especially angiogenesis). TGF-β pathway was highly upregulated. This cluster was associated with poor prognosis, comparable to non-infiltrated fibrotic subtypes.
Fibrotic, Angiogenic, Myeloid (F/A/M).

This cluster was identified by low immune cell infiltration, mostly by myeloid cells, and high stroma activation, both fibroblasts and angiogenesis. Therefore, checkpoint expression was low and shifted towards stroma- and myeloid-cell-associated molecules (PD-L2, SIRPA, VISTA, CD276, CD36). TGF-β signaling pathway was highly upregulated. MAPK and EGFR pathway scores were also high. Hypoxia level was increased. This cluster was associated with poor prognosis.
Fibrotic, Hypoxic (F/H).

This cluster was characterized by high percentage of tumor cells, while immune cell infiltration was only minimal or completely absent. Proliferation rate and hypoxia levels were high. EGFR, MAPK, PI3K, and TGFb signaling pathways were upregulated. Endothelial cell level and angiogenesis FGES score were lower compared to other stromal subtypes. This cluster was associated with the worst prognosis.
Immune Desert (D).

This cluster was marked by the highest percentage of tumor cells, while immune cell infiltration was very low or completely absent. Tumor proliferation rate signature score and predicted tumor cell proportion were high. Low to moderate hypoxia was observed.
Faintly Infiltrated, Angiogenic (D/A).

This cluster was characterized by minimal immune cell infiltration, rather high percentage of tumor cells, and moderate angiogenesis and endothelium levels. Tumor proliferation rate signature score was low. The TGFb signaling pathway was slightly upregulated. This cluster was associated with good prognosis.

Patients with complete loss of one or more genes, which are crucial components of the MHCI antigen-presenting machinery (AP-loss), demonstrated a similar distribution among the defined IE clusters, with a slight predominance of "Immune Desert" and "Highly Immune-Enriched, Inflamed" subtypes. This pattern reflects the cases of "initial" AP-loss by tumor cells, which leads to poor tumor immunogenicity and poor immune infiltration, resulting in an immune desert subtype, and "acquired" AP-loss-a result of immune pressure and a mechanism of immune escape in highly infiltrated and inflamed tumors.

Figure 13A:
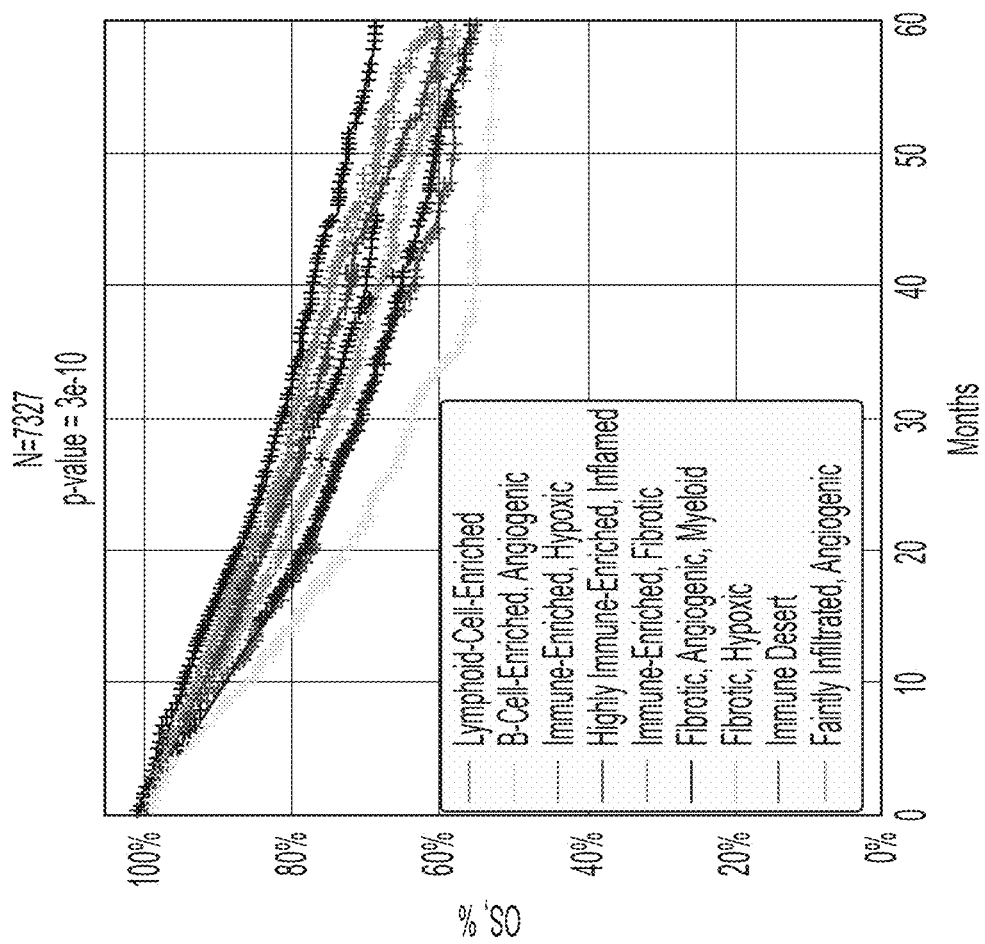
FIGS. 13A-13B show a Kaplan-Meier plot (FIG. 13A) and a Cox regression analysis plot (FIG. 13B) depicting differences in overall survival of the acquired pan-cancer IE subtypes, according to some embodiments of the technology described herein.
Figure 13B:
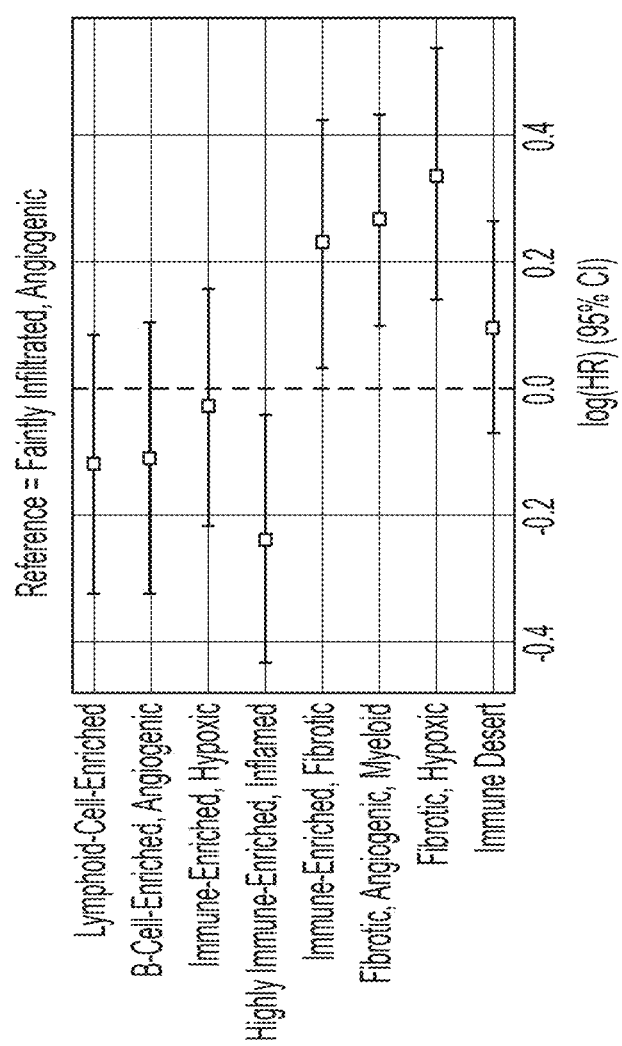

The "Highly Immune-Enriched, Inflamed" subtype was characterized by the highest survival, while the "Fibrotic, Hypoxic" subtype-by the worst survival in the pan-cancer cohort (FIGS. 13A-13B). Generally, all lymphoid-cell-infiltrated non-fibrotic subtypes ("Lymphoid-cell-enriched", "B-cell-enriched, Angiogenic", "Immune-Enriched, Hypoxic", "Highly Immune-Enriched, Inflamed") had better survival prognosis, and all subtypes with a high fibrotic component and/or stroma activation ("Immune-Enriched, Fibrotic", "Fibrotic, Angiogenic, Myeloid", "Fibrotic, Hypoxic") demonstrated poor prognosis. "Immune Desert" subtype demonstrated intermediary survival (FIGS. 13A-13B).

Figure 13C:
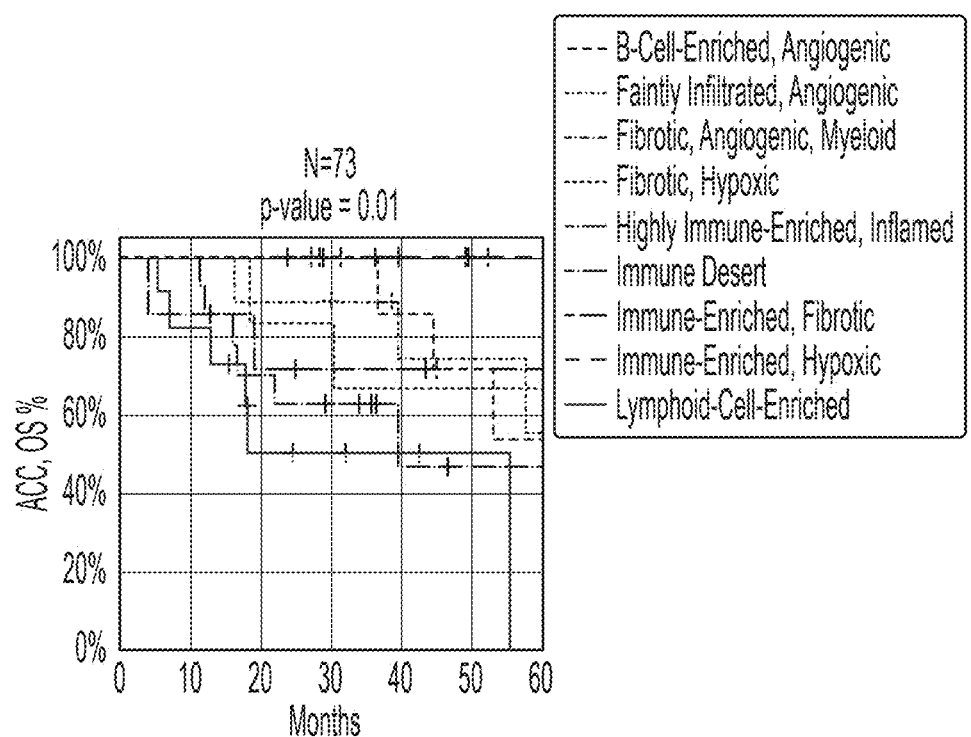
Figure 13D:
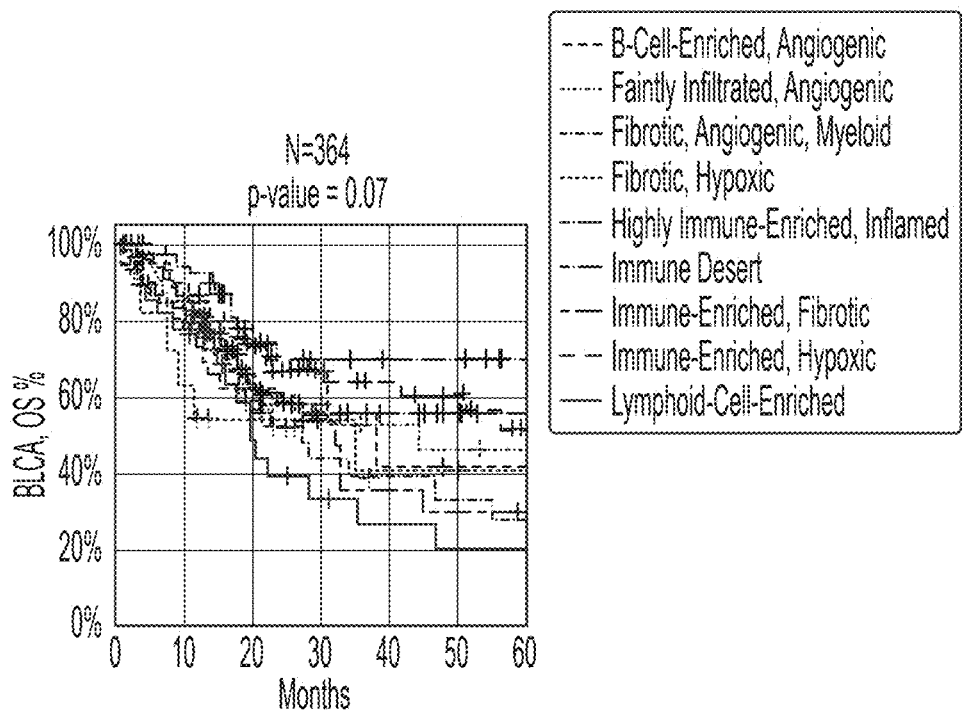
Figure 13E:
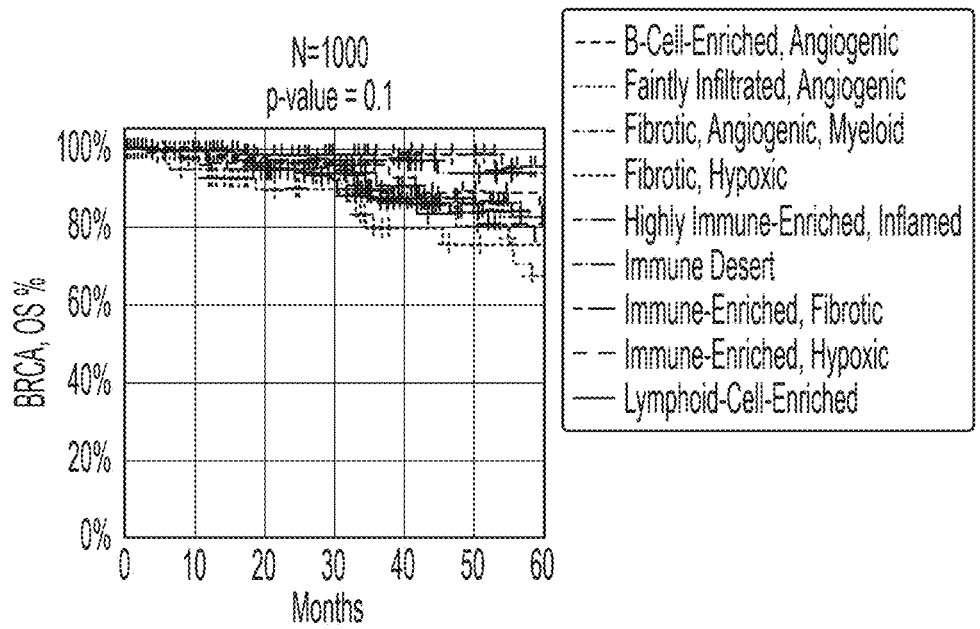
Figure 13F:
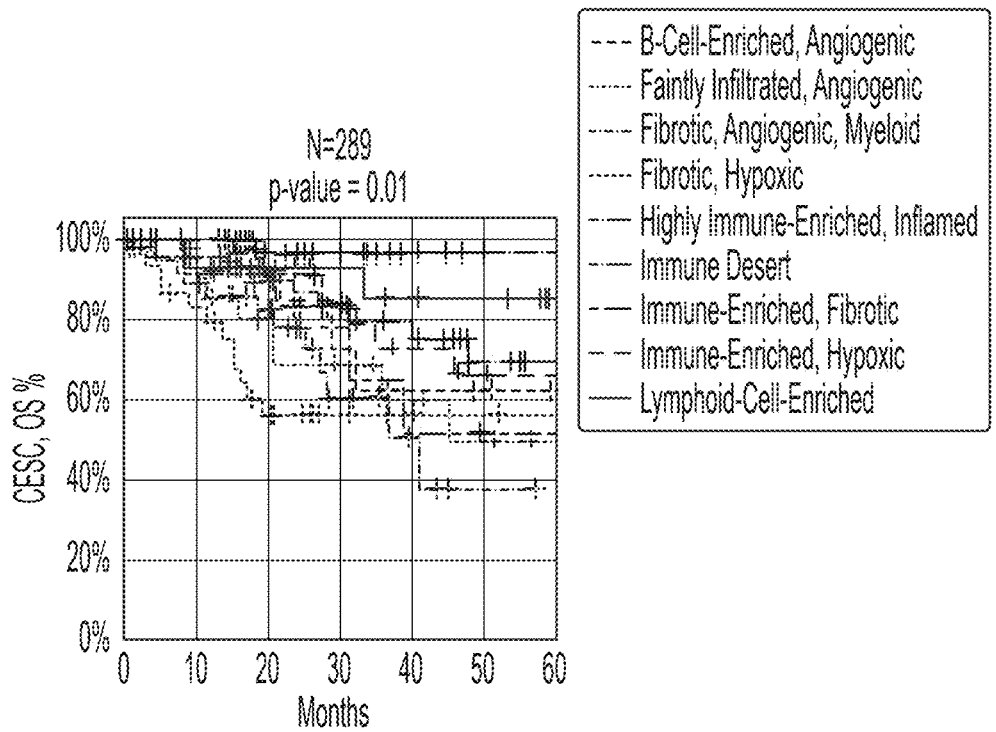
Figure 13G:
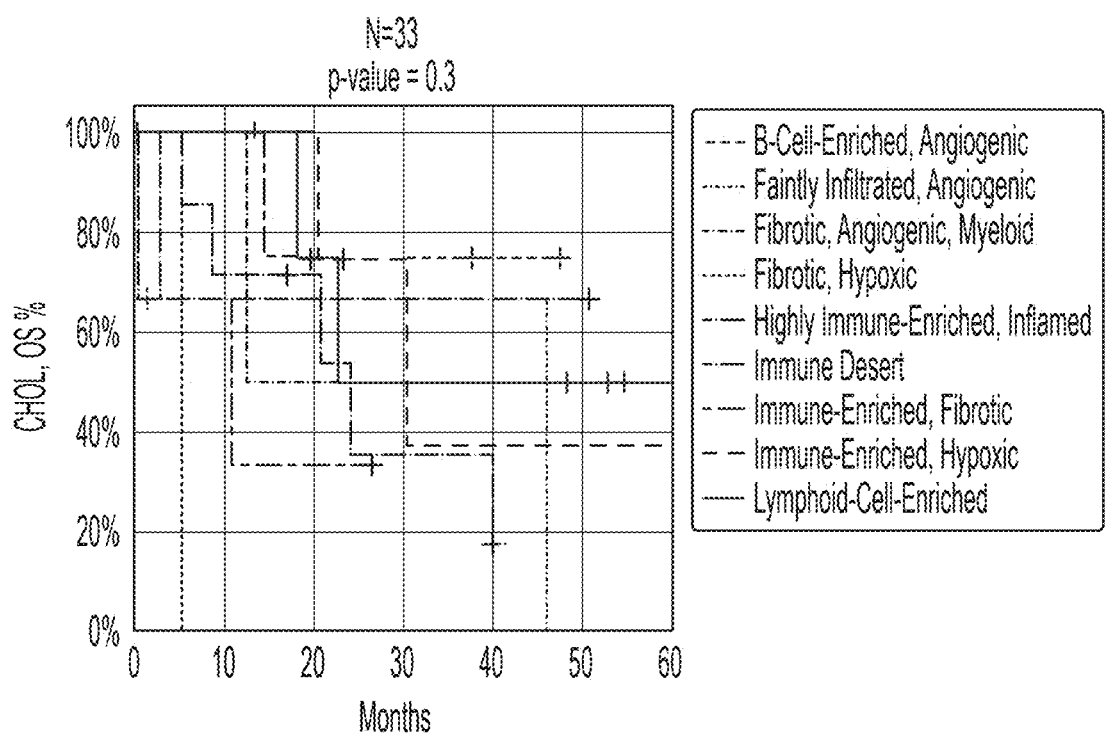
Figure 13H:
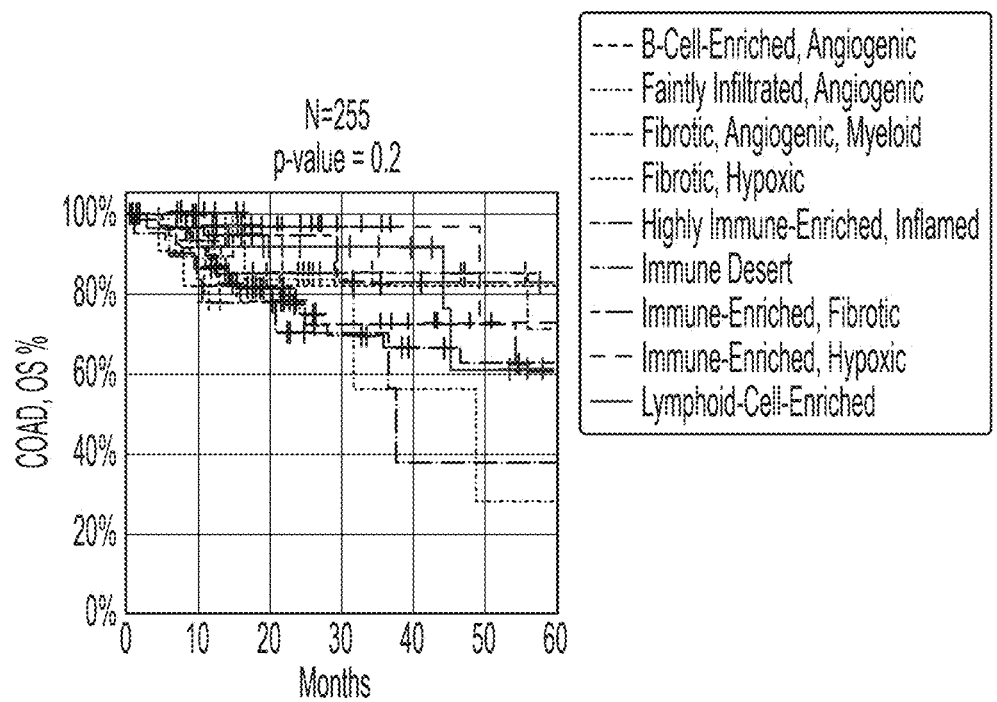
Figure 13I:
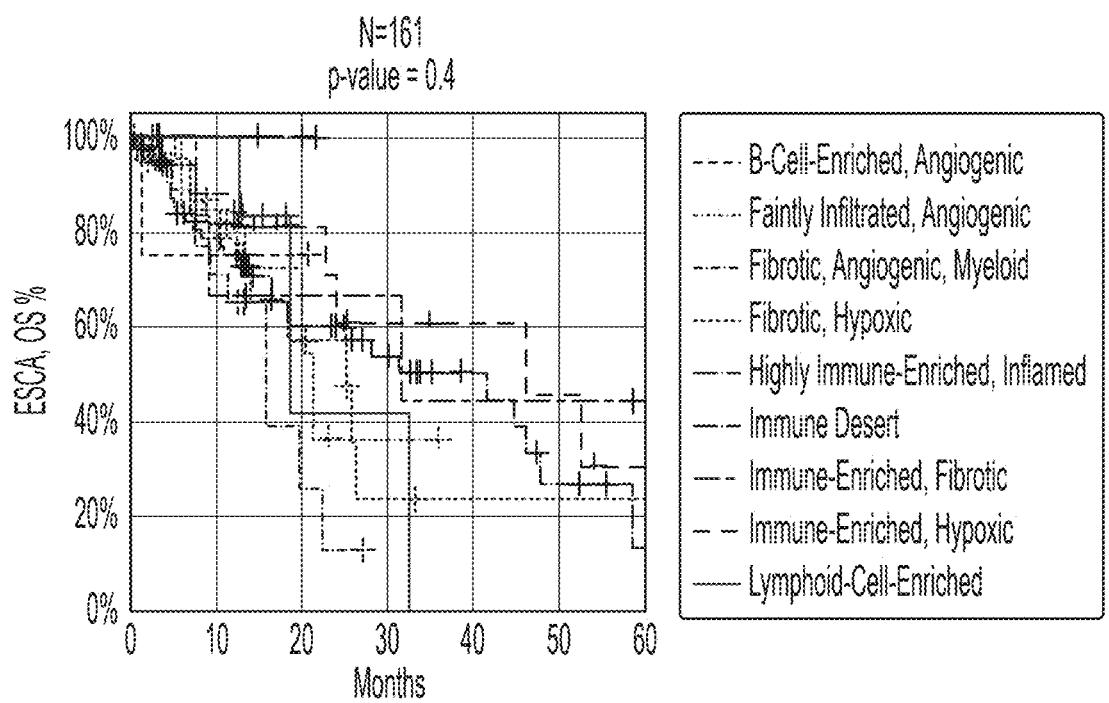
Figure 13J:
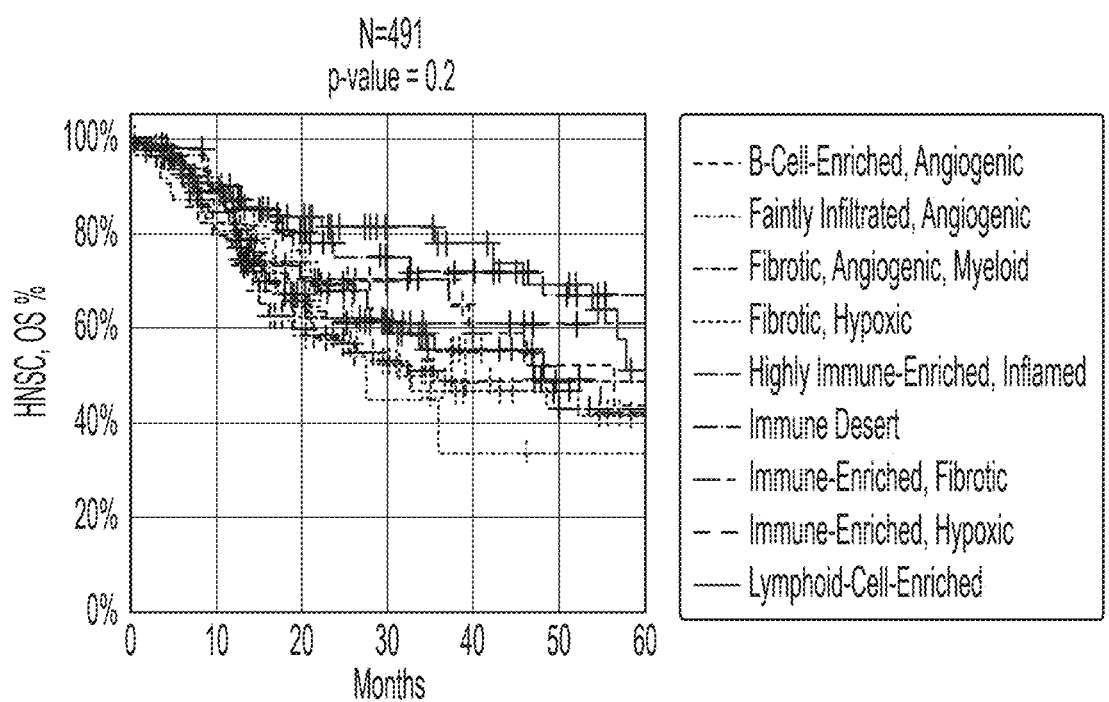
Figure 13K:
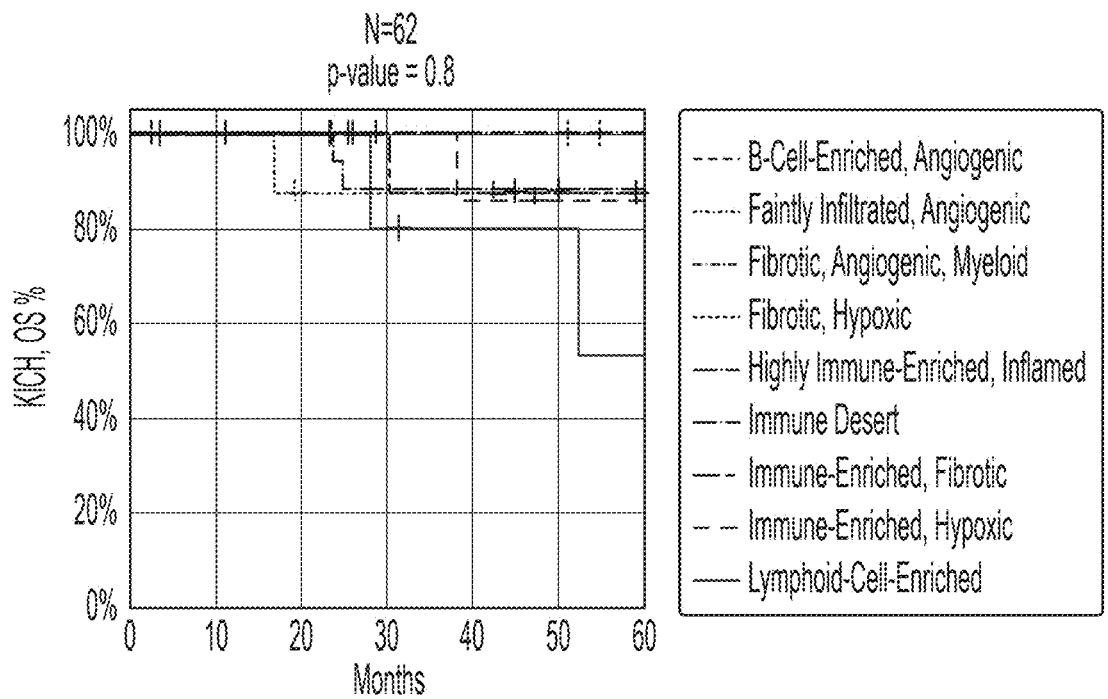
Figure 13L:
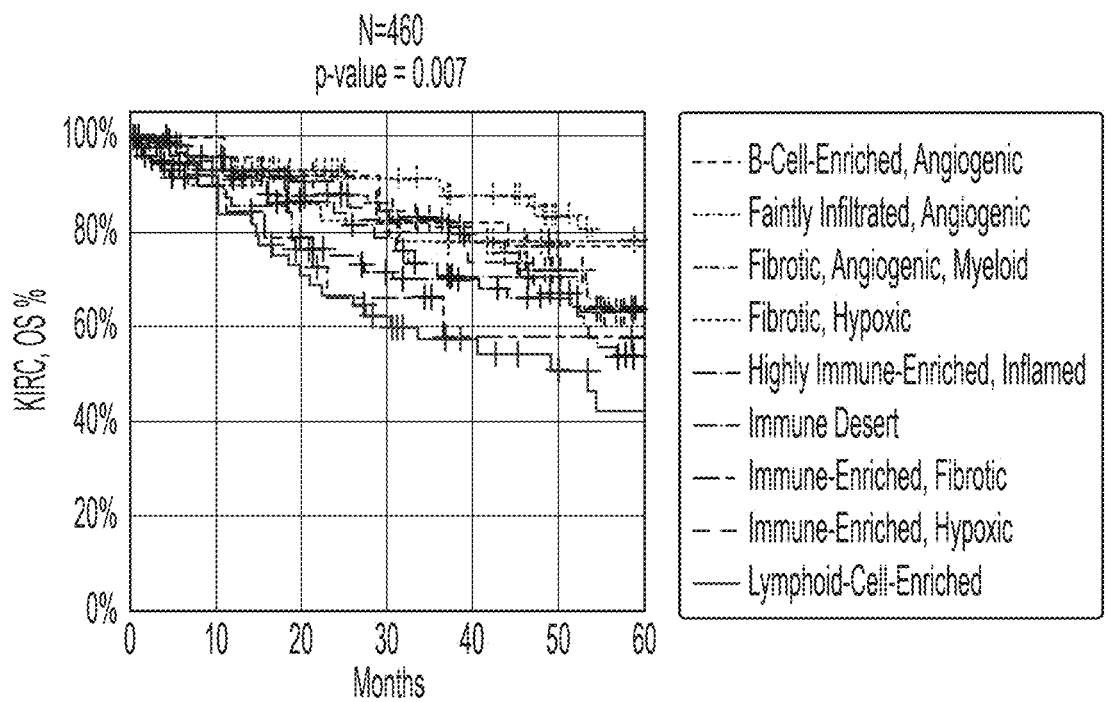
Figure 13M:
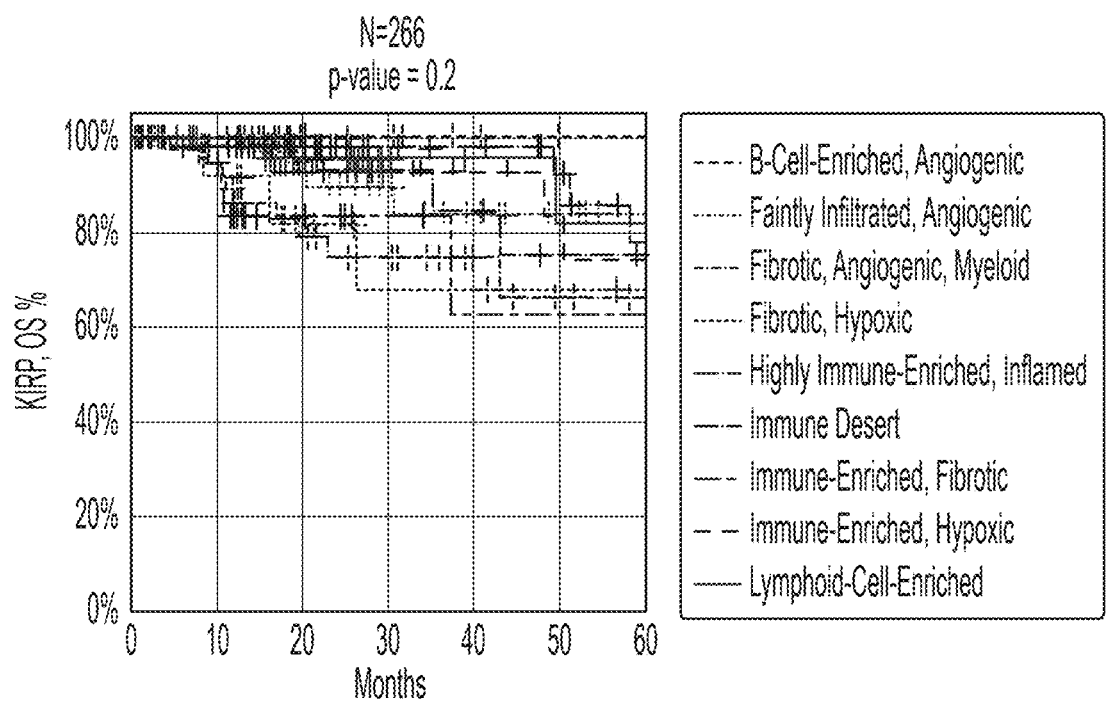
Figure 13N:
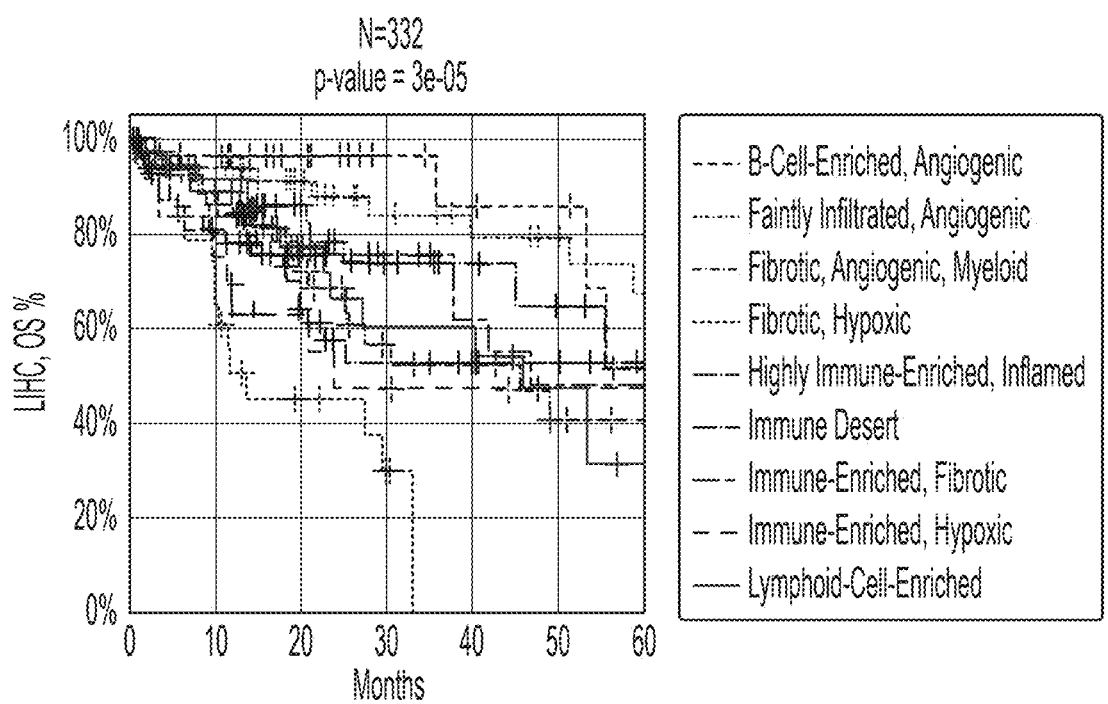
Figure 13O:
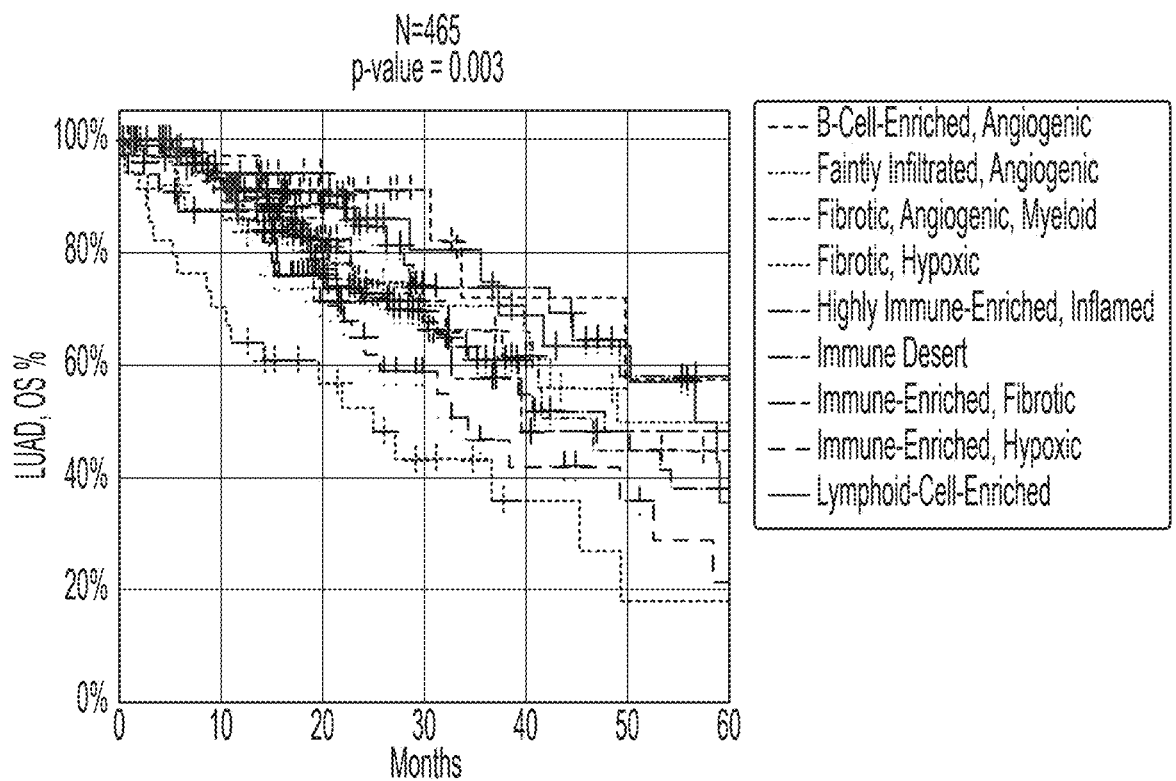
Figure 13P:
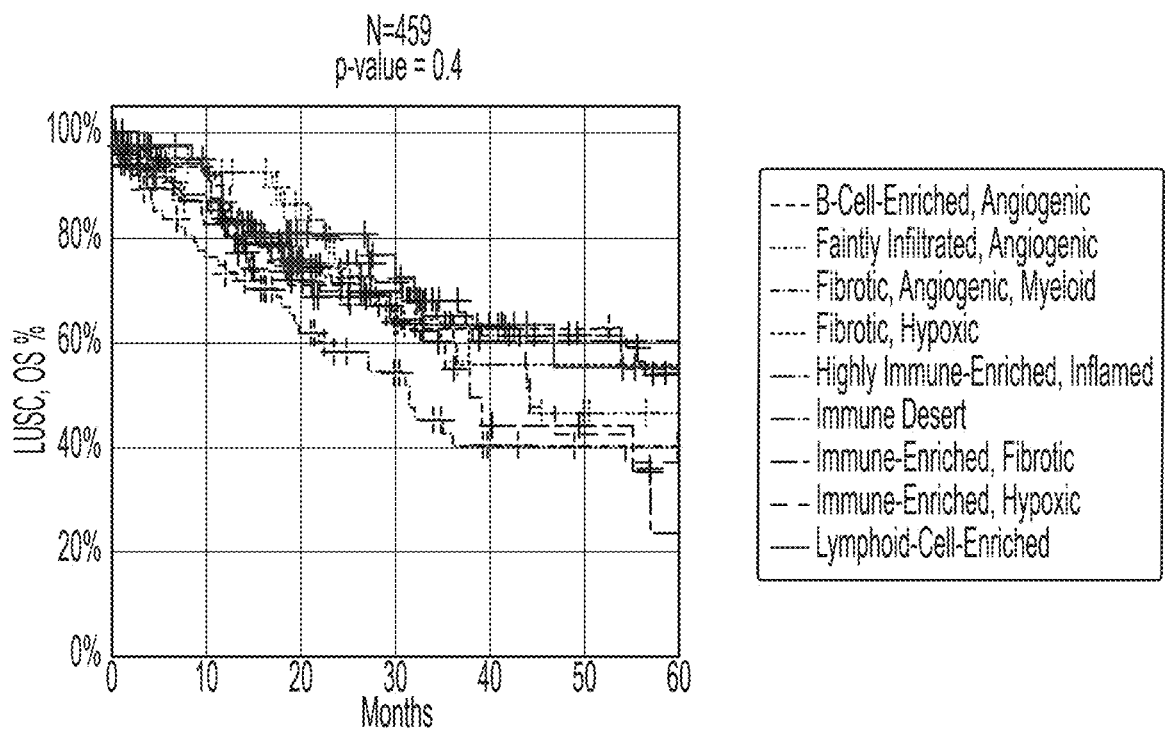
Figure 13Q:
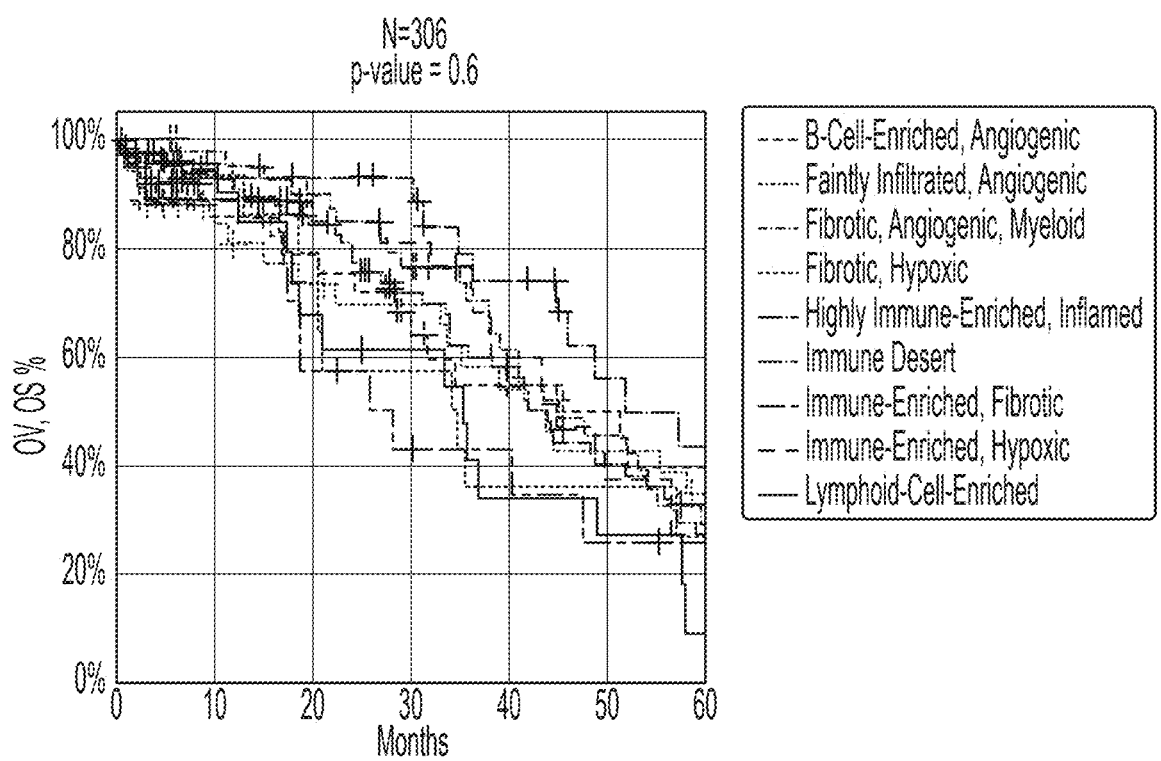
Figure 13R:
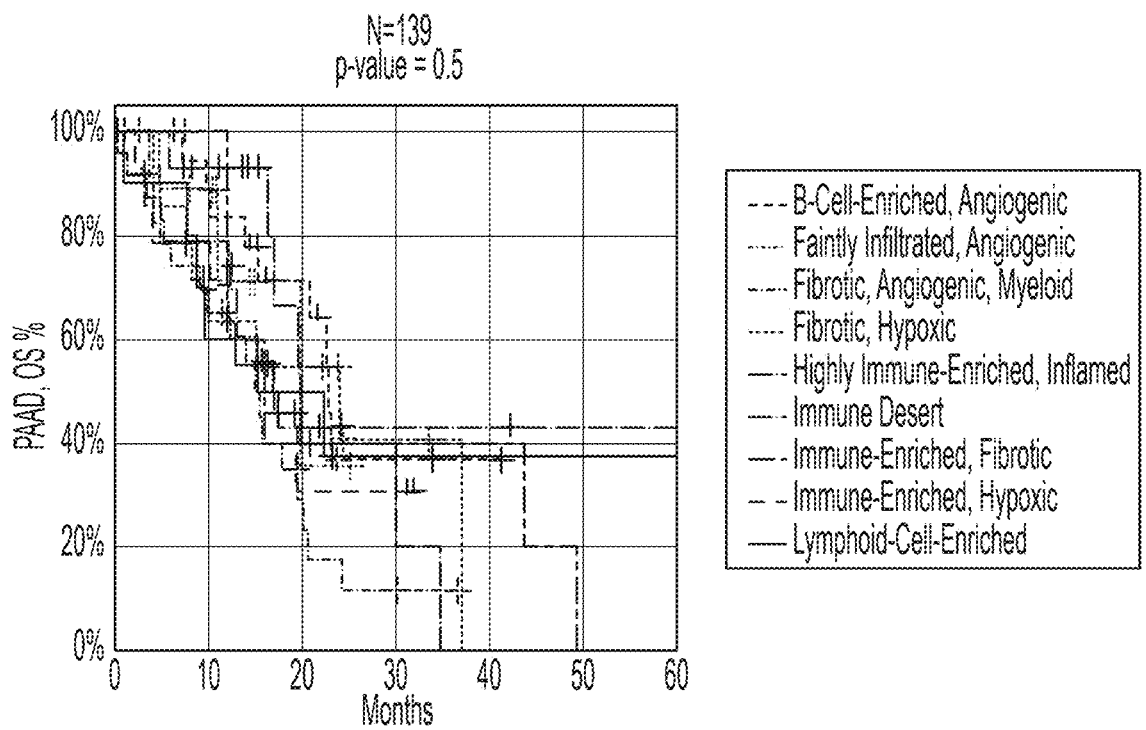
Figure 13S:
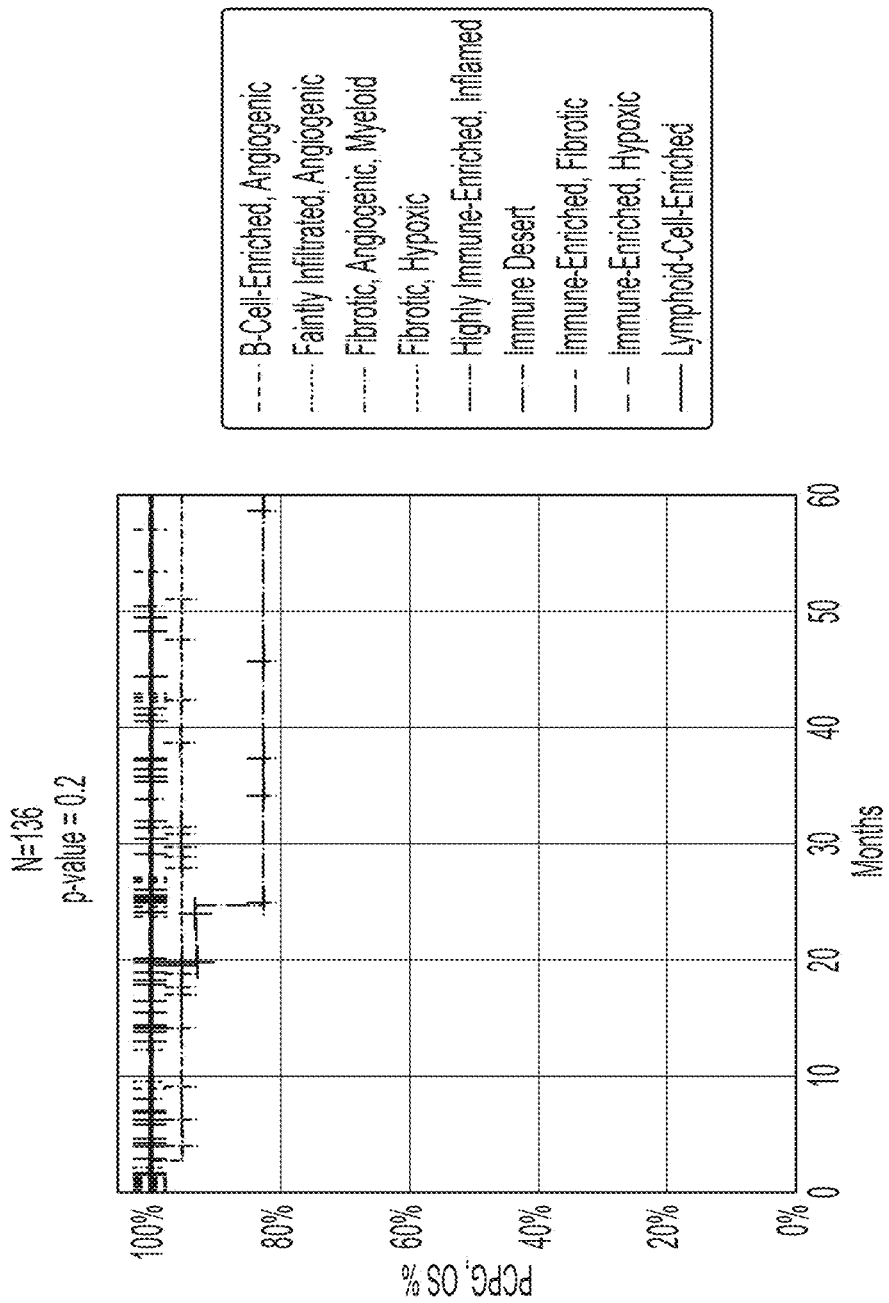
Figure 13T:
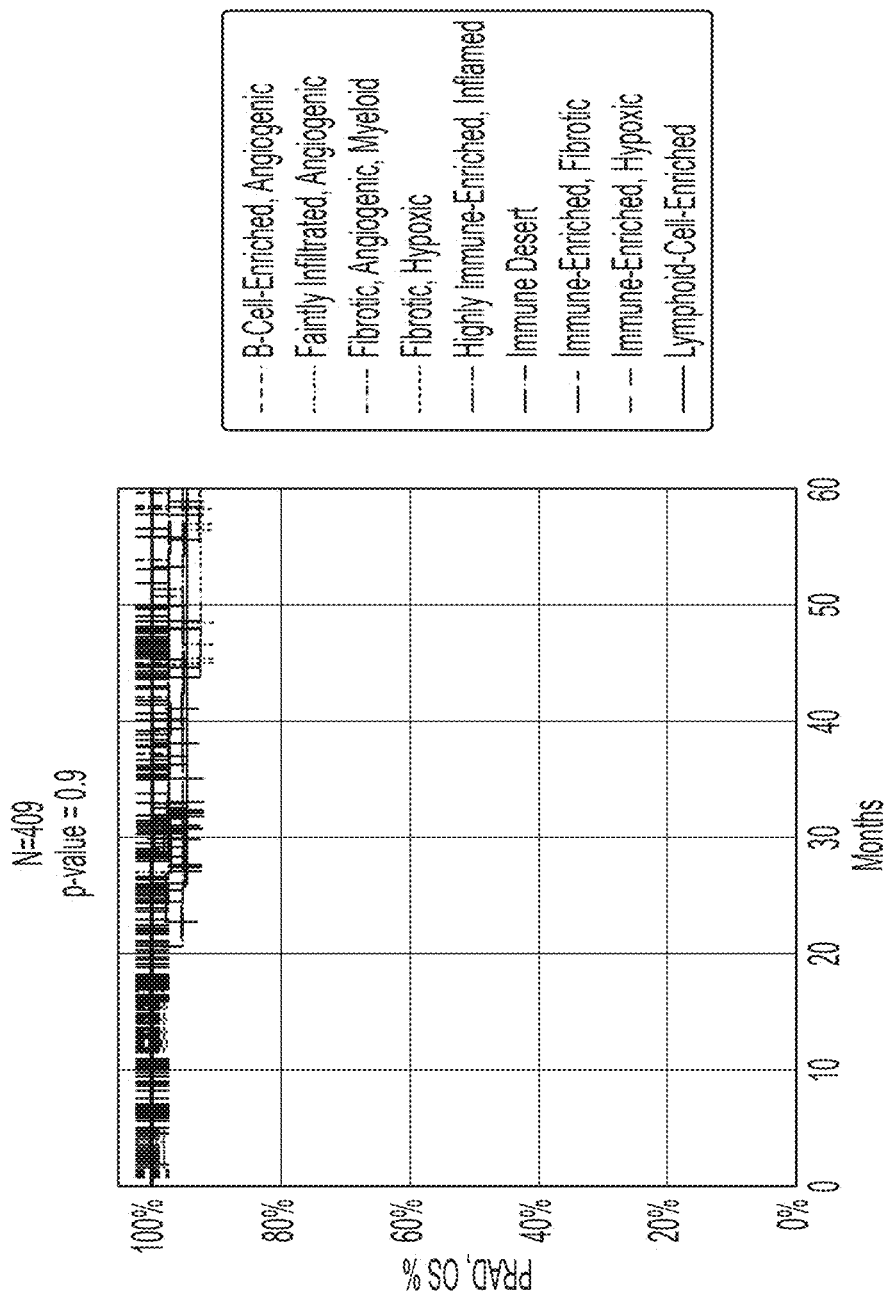
Figure 13U:
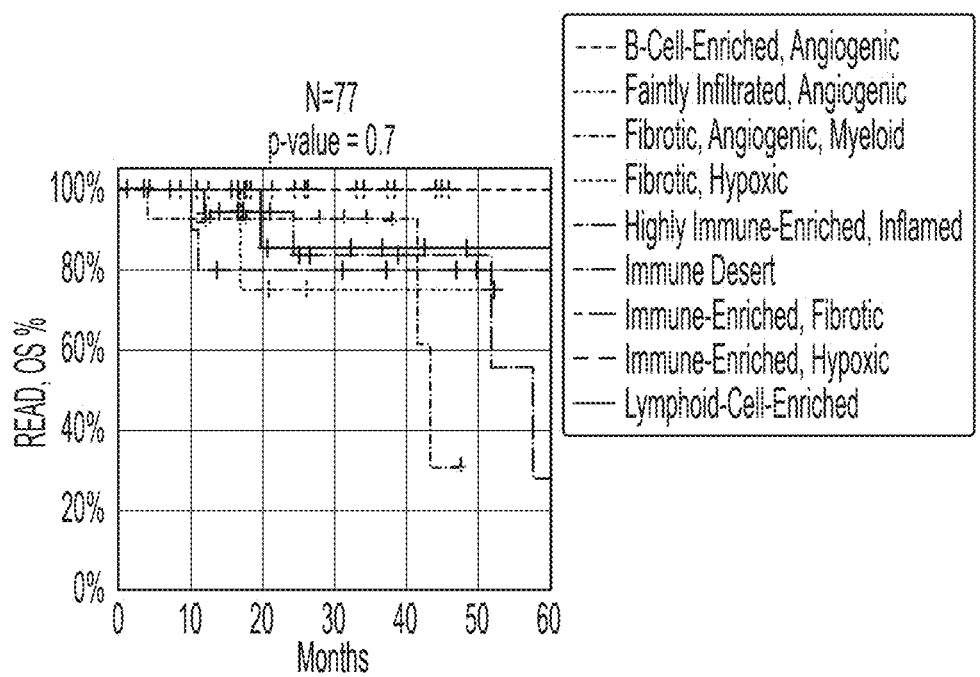
Figure 13V:
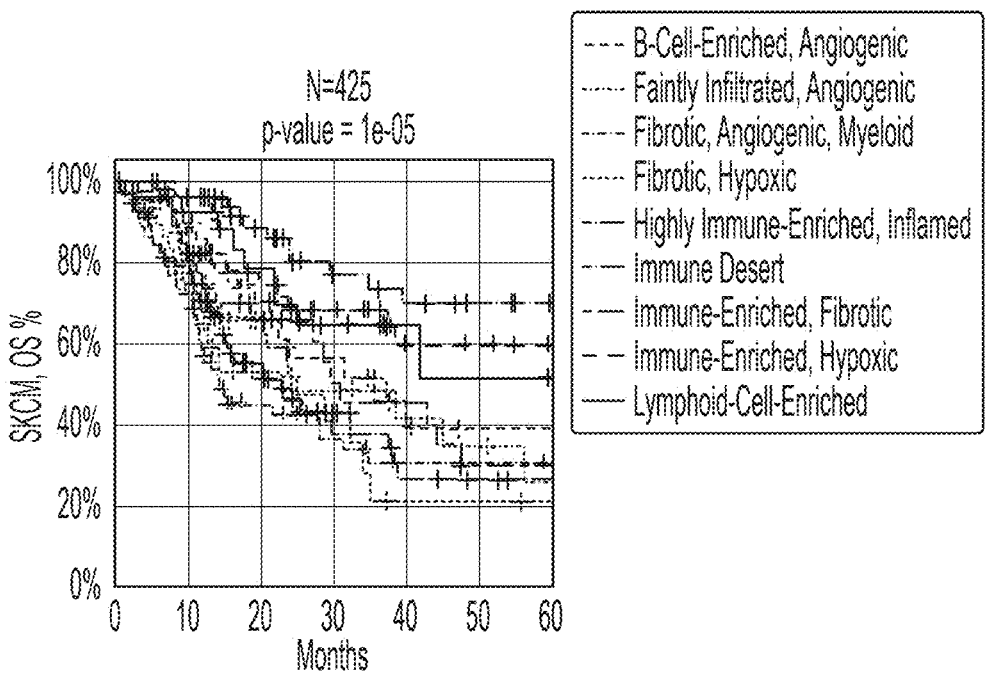
Figure 13W:
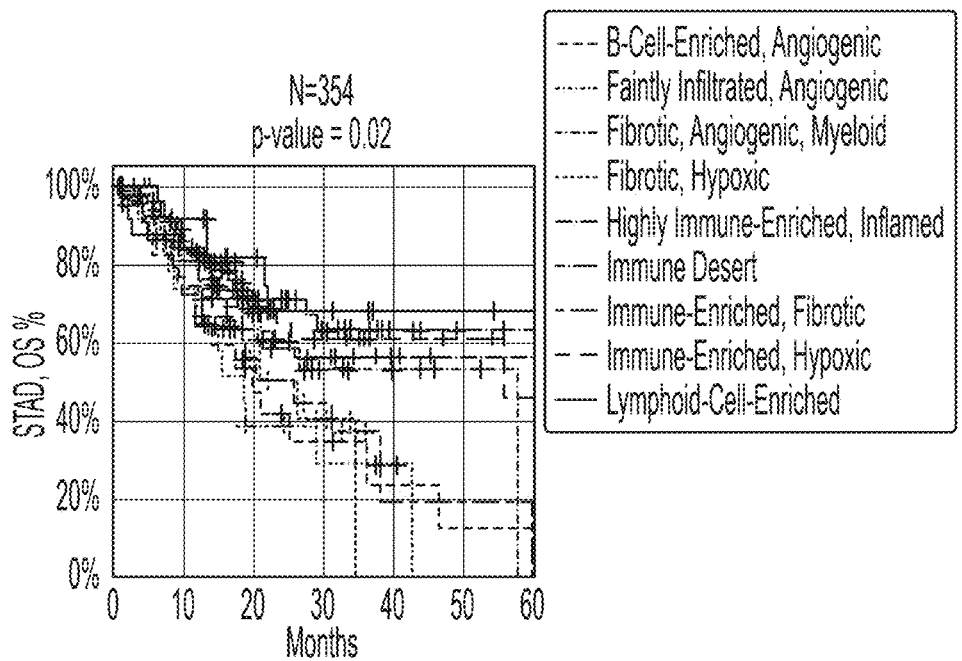
Figure 13X:
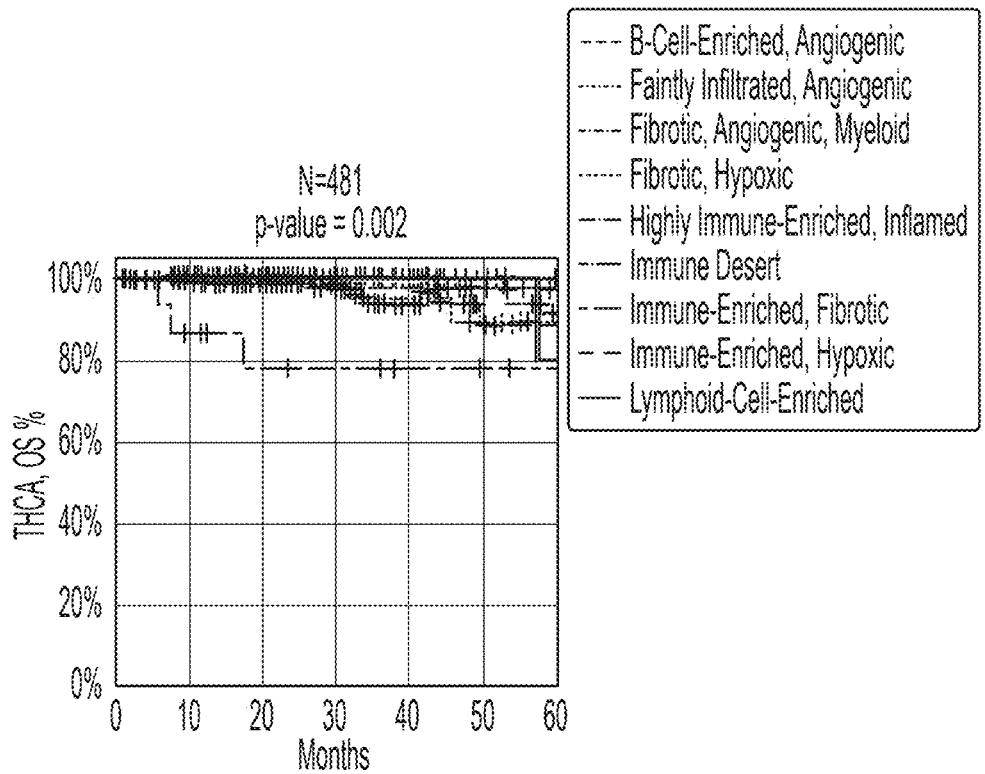
Figure 13Y:
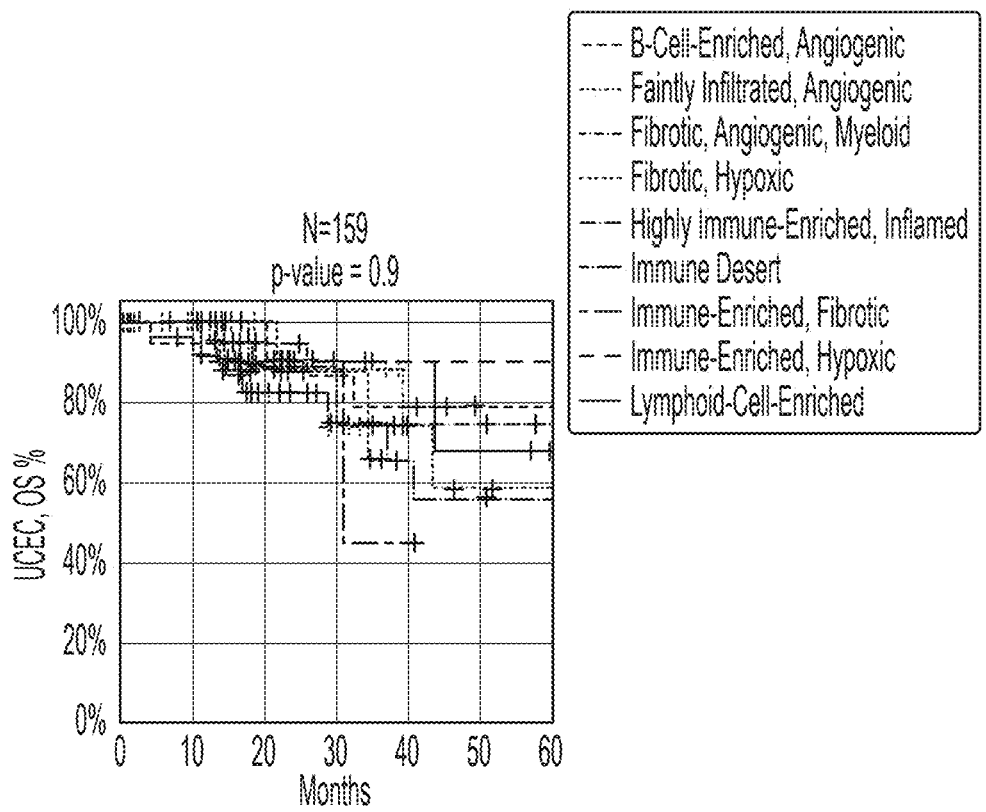
Figure 13Z:
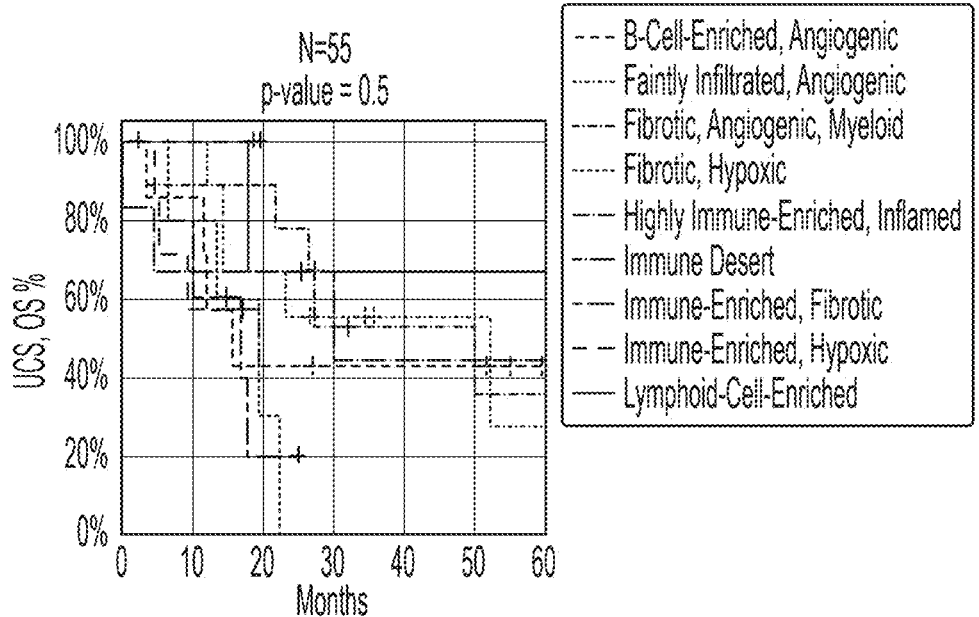
Figure 13A:
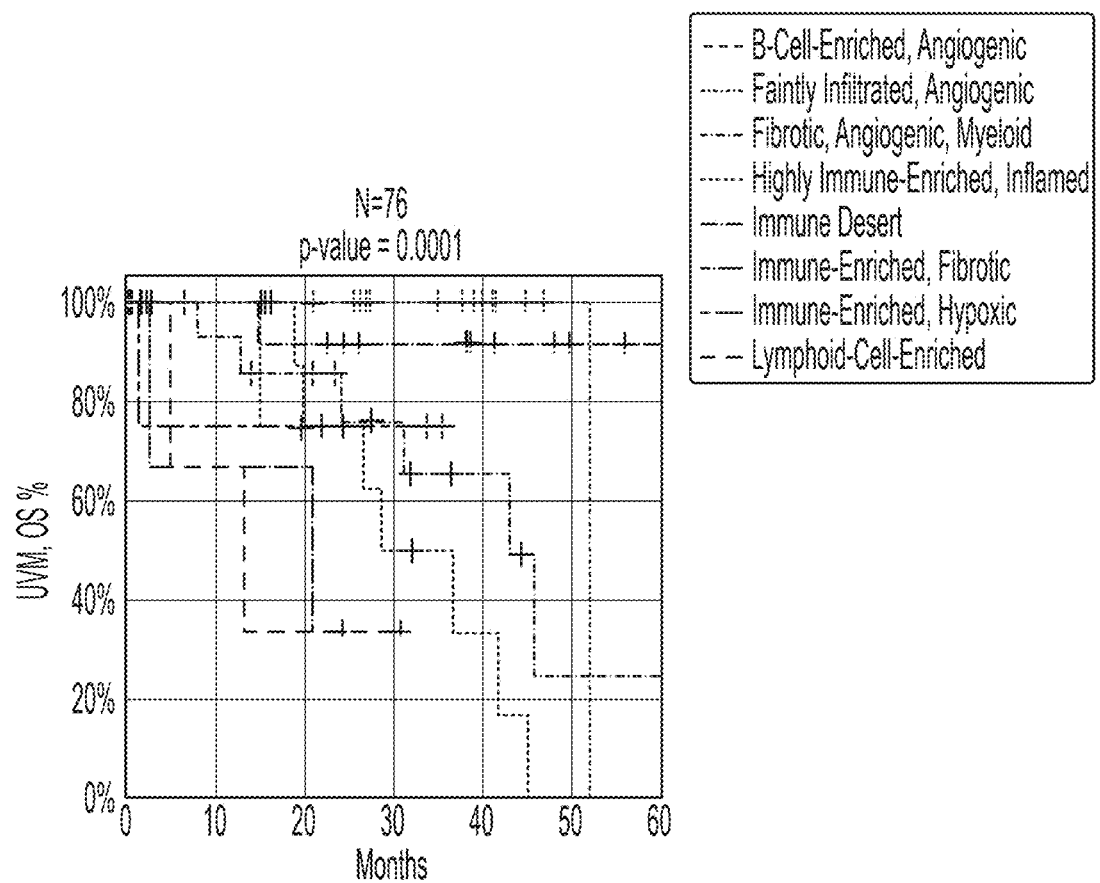
Figure 14:
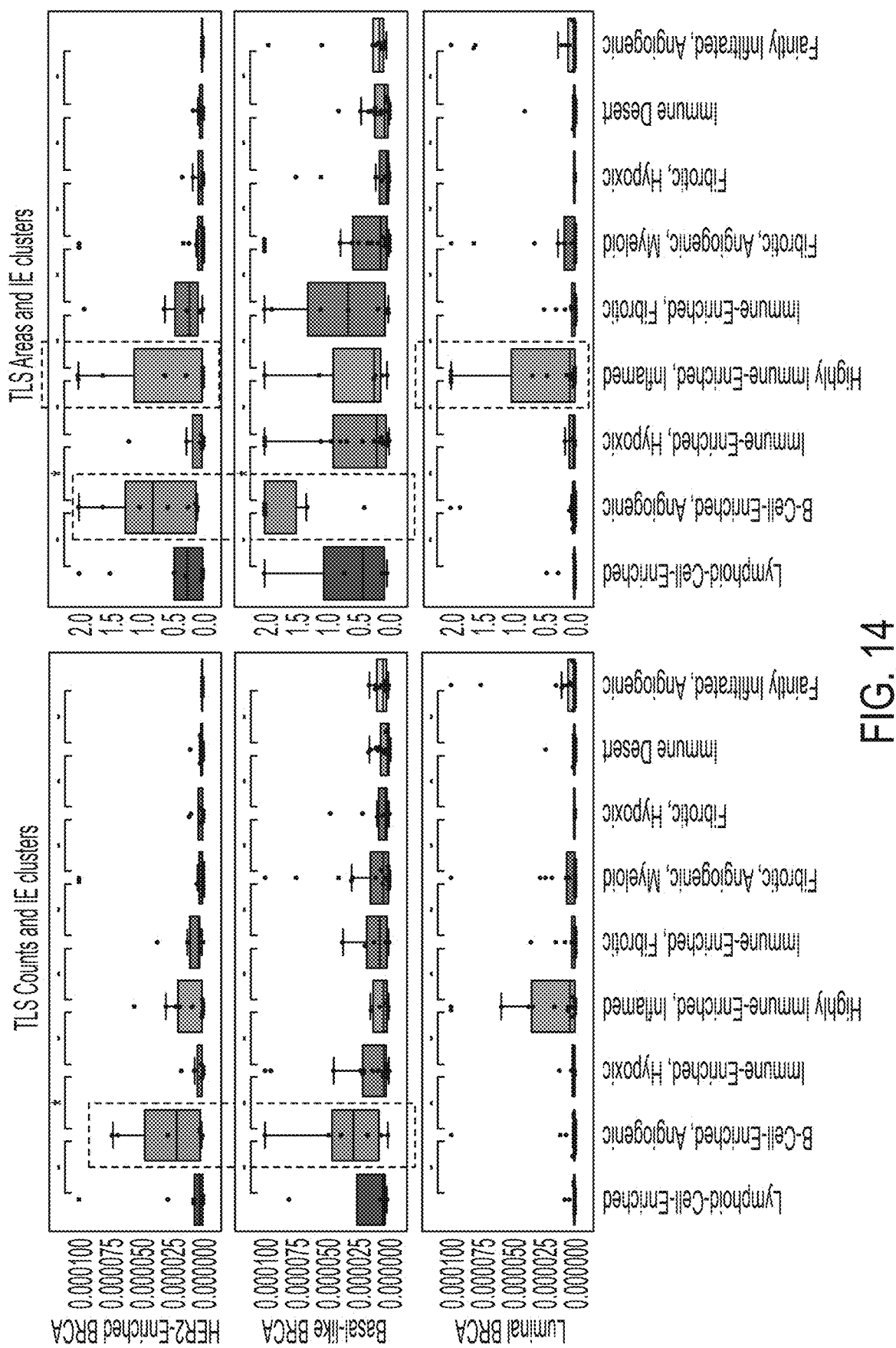
FIG. 14 shows TLS counts and areas, defined by convolutional neural network and normalized on tumor area, in the acquired IE-based TME subtypes in three breast cancer cohorts: HER2-enriched, Basal-like, and Luminal, in samples with the available histological slides, according to some embodiments of the technology described herein.

In separate diagnosis-specific cohorts, similar tendencies were observed: in most cases, the best survival was characteristic for "Highly Immune-Enriched, Inflamed," "Lymphoid-cell-enriched" or "B-cell-enriched" subtype, and the worst survival was observed for the "Fibrotic, Angiogenic, Myeloid" or "Fibrotic, Hypoxic" subtypes (FIGS. 13C-13AB). However, there are exceptions such as the KIRC cohort (FIG. 13L), where the worst survival was observed for the "Lymphoid-cell-enriched," "Typical Immune-Enriched, Fibrotic" and "Highly Immune-Enriched, Inflamed" subtypes. This corresponds to the peculiarities of kidney biology: high immune infiltration causes unfavorable tissue injury.

Tertiary lymphoid structure (TLS) analysis in TCGA breast cancer samples with available histological slides (FIG. 14) revealed that TLS structures were enriched in two clusters: "B-cell-enriched, Angiogenic" and "Highly Immune-Enriched, Inflamed". Both clusters showed high levels of B cells in deconvolution analysis (FIG. 11A), high TLS signature score (FIGS. 12A-12AB) and were associated with good survival (FIGS. 13A-13B). The TLS counts of FIG. 14 were determined using deep learning techniques and normalized on tumor area, in the acquired IE-based TME subtypes in three breast cancer cohorts: HER2-enriched, Basal-like, and Luminal. The deep learning computational model used is a combination of several convolutional neural network (CNN) models. The models included the DeepLabv3+ model (with HRNetv2-w32 encoder), trained on TCGA-LUAD H&E whole slide images (WSIs) for TLS predictions in TCGA-LUAD, and the same DeepLabv3+ model was additionally trained on TCGA-BRCA WSIs for TLS predictions in TCGA-BRCA. Additionally, a CNN that predicted tumor purity (UnetPlusPlus with EfficientNetV2-S encoder) was used. Additional aspects of the deep learning techniques used to determine the TLS counts are described in U.S. Provisional Patent Application No. 63/600,991, titled "Techniques for Tertiary Lymphoid Structure (TLS) Detection," filed on Nov. 20, 2023, which is incorporated herein by reference in its entirety.

IE Subtypes Association with Other TME Classifications

The discovered IE subtypes represent a deeper classification of the tumor microenvironment (TME) compared to the previously published Molecular Functional Portrait clusters (12) defined in BostonGene (FIGS. 16A and 16B-1 through 16B-3). Four distinct immune-enriched subtypes, two fibrotic, and two desert-like subtypes were differentiated compared to the previous classification, which vary in survival prognosis as discussed above.

The resulting IE-based TME classification was compared with the two main published TME classifications: C1-C6 immune subtypes based on different TME characteristics, defined by Thorsson et al., 2018 (8), and EcoTyper classes based on cell types and cell states, defined by Luca et al., 2021 (10). Both classifications were shown to predict prognosis and response to certain therapies. The relationship of the IE subtypes with these classifications was assessed.

Immune-infiltrated subtypes ("Lymphoid-cell-enriched," "B-cell-enriched, Angiogenic," "Immune-Enriched, Hypoxic," "Highly Immune-Enriched, Inflamed," 'Immune-Enriched, Fibrotic") had higher percentages of C2 (IFNg-dominant type) and C3 (Inflammatory type) samples. Fibrotic subtypes ("Fibrotic, Angiogenic, Myeloid," "Fibrotic, Hypoxic") had higher percentages of C1 (Wound-healing) and C3 samples. Poorly infiltrated subtypes ("Immune Desert" and "Faintly Infiltrated, Angiogenic") included mostly of C1, C3, and C4 (Lymphocyte-depleted) samples from Thorsson et al. (8), which mostly corresponds to C1-C4 type characteristics. C5 (Immunologically quiet) and C6 (TGF-β-dominant) types, the smallest types as seen in the original article (8) and FIGS. 16A and 16B-1 through 16B-3, were distributed uniformly between the IE-based clusters.

Figure 15:
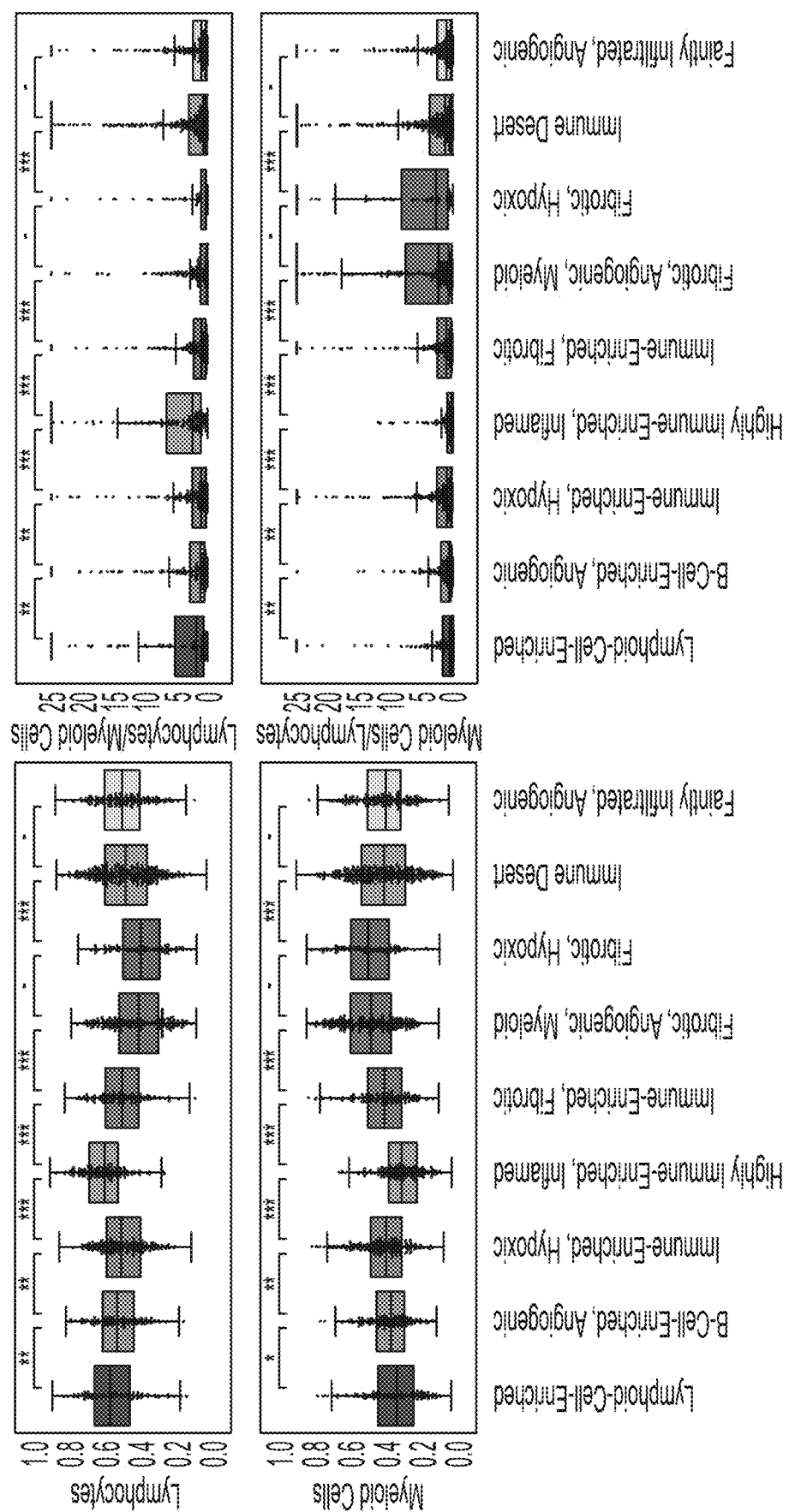
FIG. 15 shows lymphoid cell and myeloid cell counts, defined by convolutional neural network and normalized on tumor area, and ratios of the lymphoid cell to myeloid cell level, and myeloid cell to lymphoid cell level, defined in the acquired IE-based TME subtypes in TCGA samples with the available histological slides, according to some embodiments of the technology described herein.
Figure 16A:
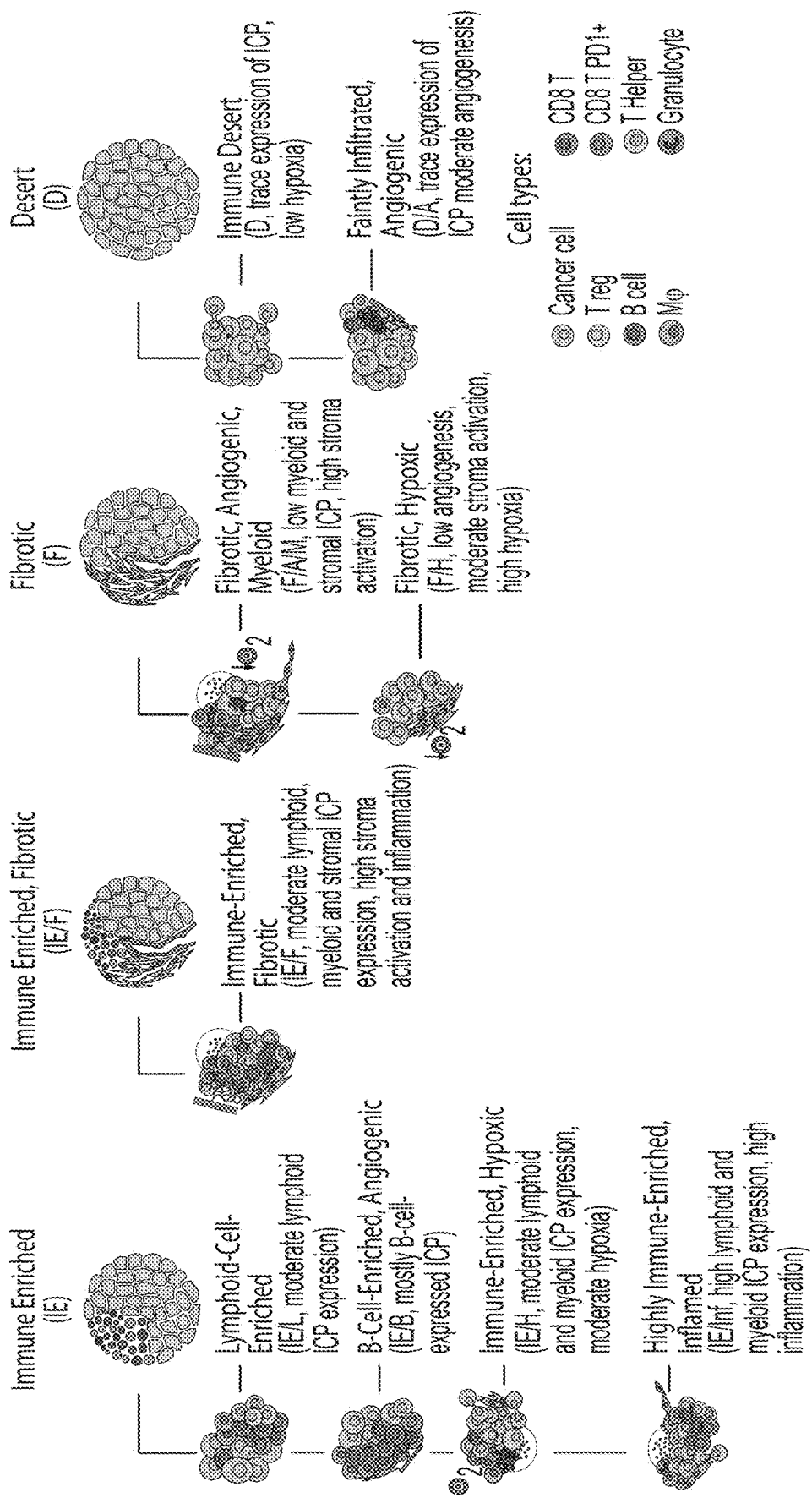
Figures 1, 16B:
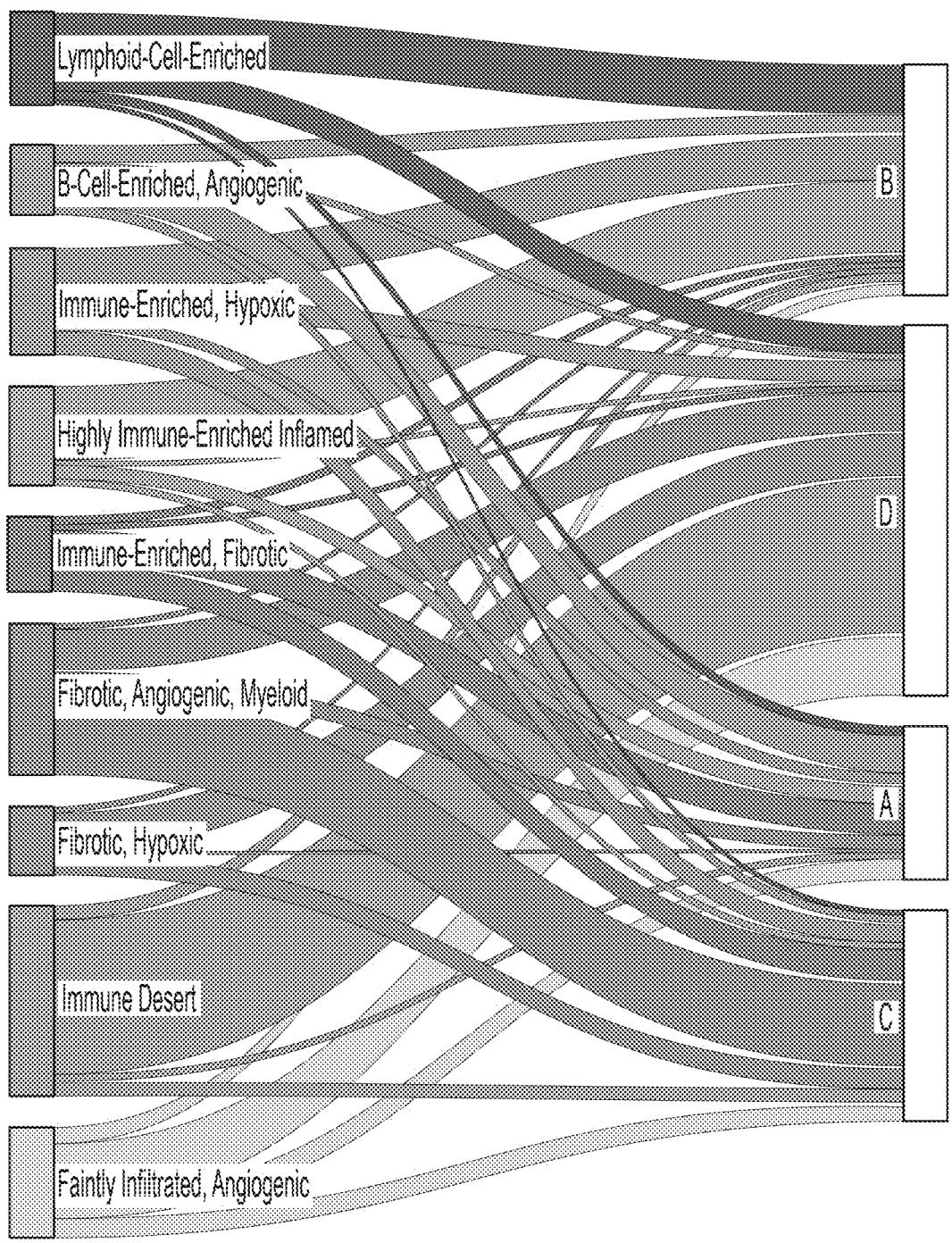
Figures 2, 16B:
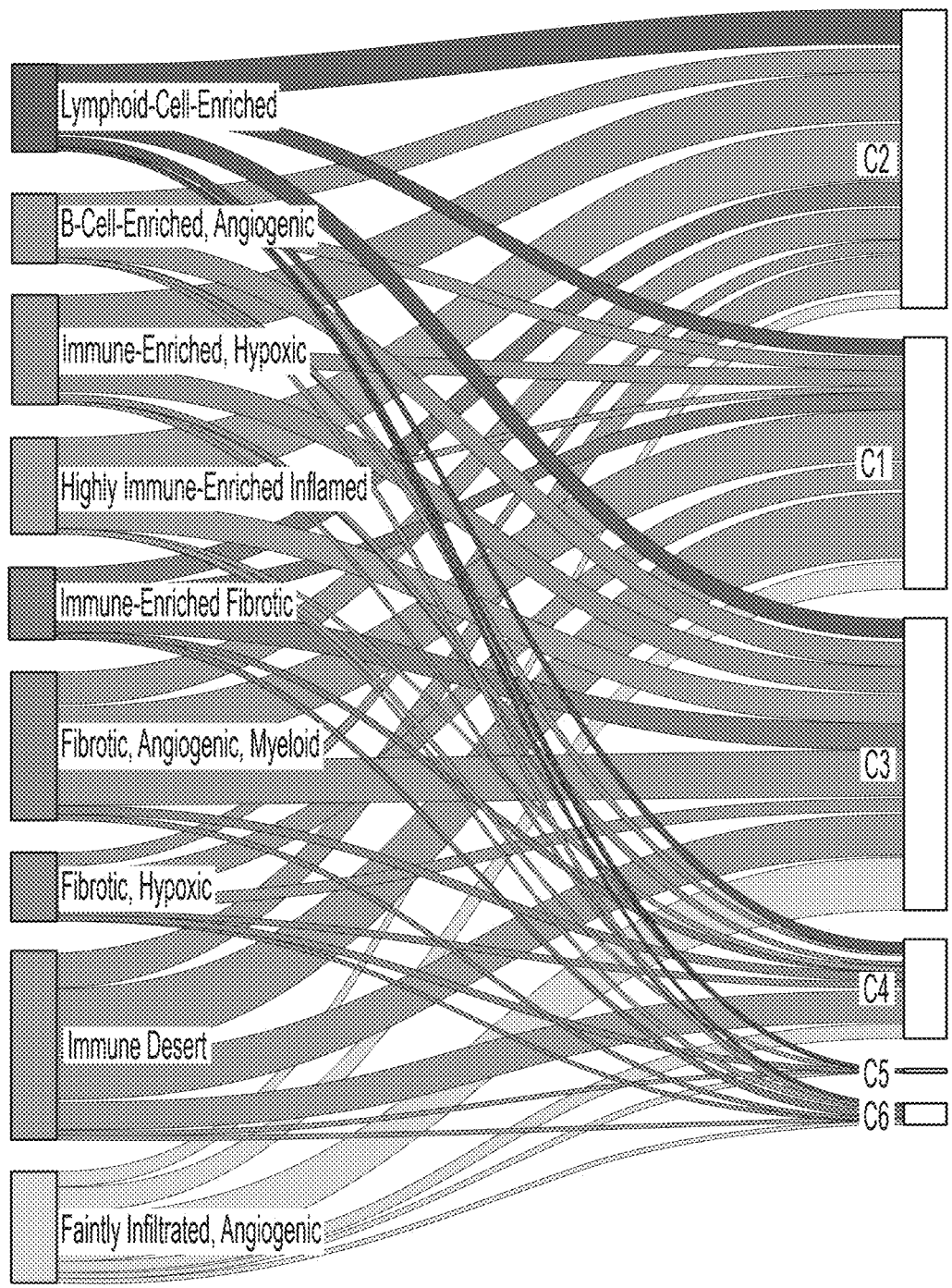
Figures 3, 16B:
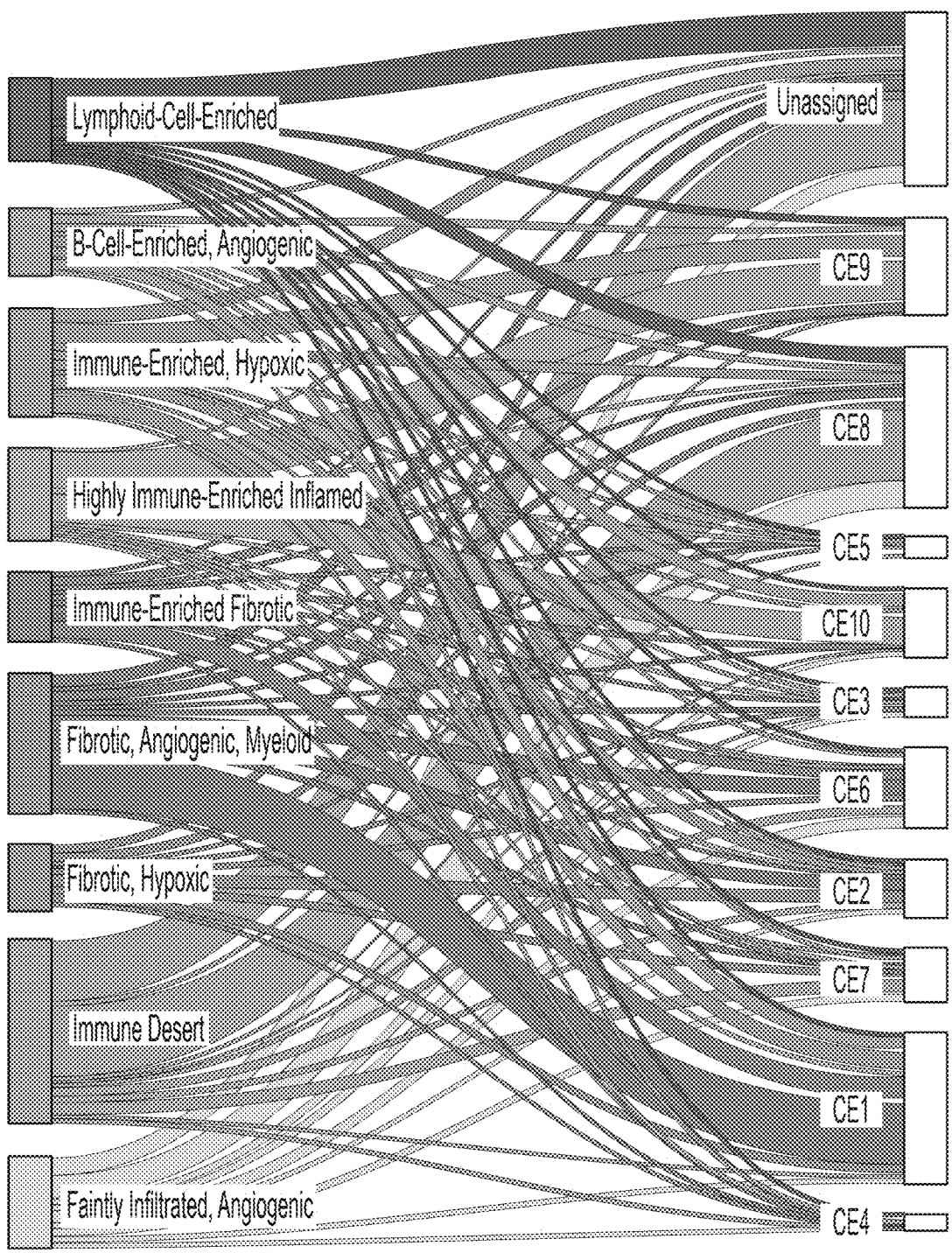

Concerning Luca et al. classification, most of the IE subtypes were more or less uniformly distributed between distinct carcinoma ecotypes (CE) (FIGS. 16A and 16B-1 through 16B-3), meaning that the proposed IE clustering and ecotypes are based on different tumor- and immune-associated features. However, certain relations between these two classifications were observed. "Highly Immune-Enriched, Inflamed" type had a high percentage of CE9 and CE10 samples—these ecotypes were described as proinflammatory and leukocyte-rich, with high IFNg signaling, B cell content and better survival (10). The "Highly Immune-Enriched, Inflamed" cluster was also characterized by the highest immune infiltration and the best survival (FIGS. 9A-9J, FIGS. 11A-11AM, FIGS. 13A-13B, and FIG. 15). "Immune-Enriched, Fibrotic" and "Fibrotic, Angiogenic, Myeloid" types had a high fraction of CE1 samples; this ecotype was described as lymphocyte deficient, with higher risk of death and elevated fibroblast content (10), which was also true for the mentioned IE subtypes (FIGS. 9A-9J, FIGS. 11A-11AM, and FIGS. 13A-13B). "Faintly Infiltrated, Angiogenic" type and, especially, "Immune Desert" type had high proportions of CE8 samples—this ecotype was characterized by high level of epithelial cells and immune depletion, with moderately favorable outcome, which also corresponds to the IE subtypes described in this example.

Associations of IE-Based TME Subtypes with Treatment Response

Figures 1, 17A:
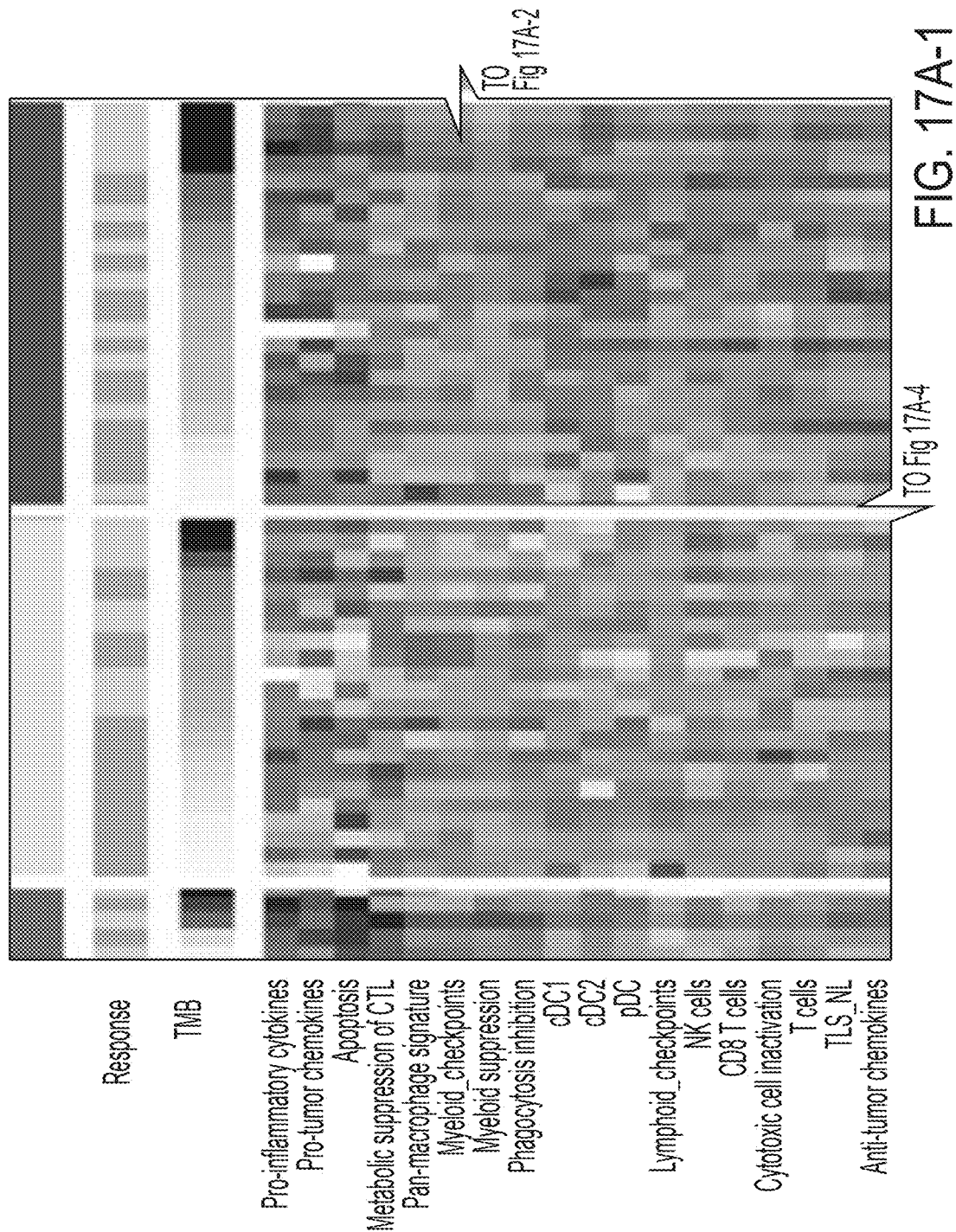
Figures 2, 17A:
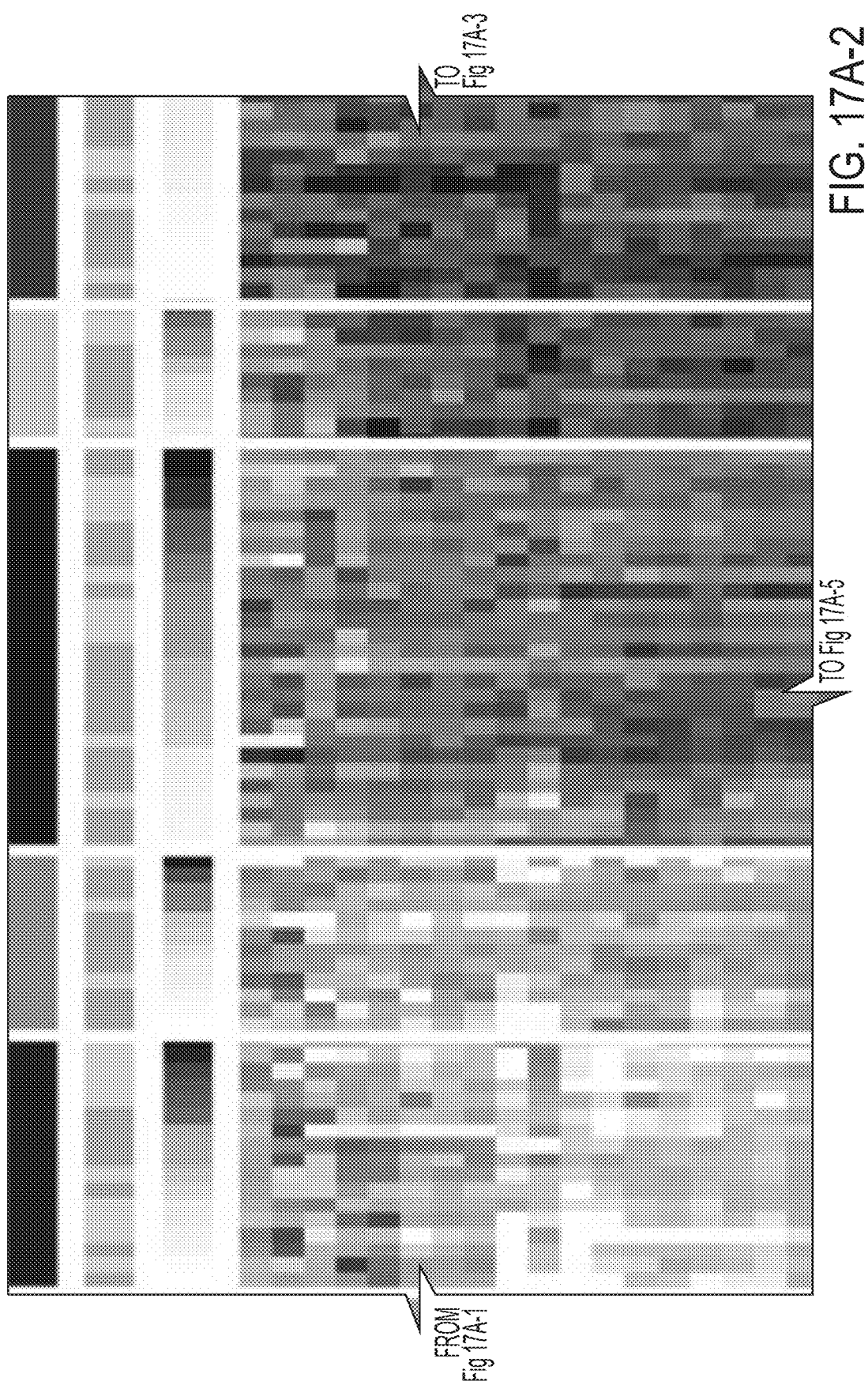
Figures 3, 17A:
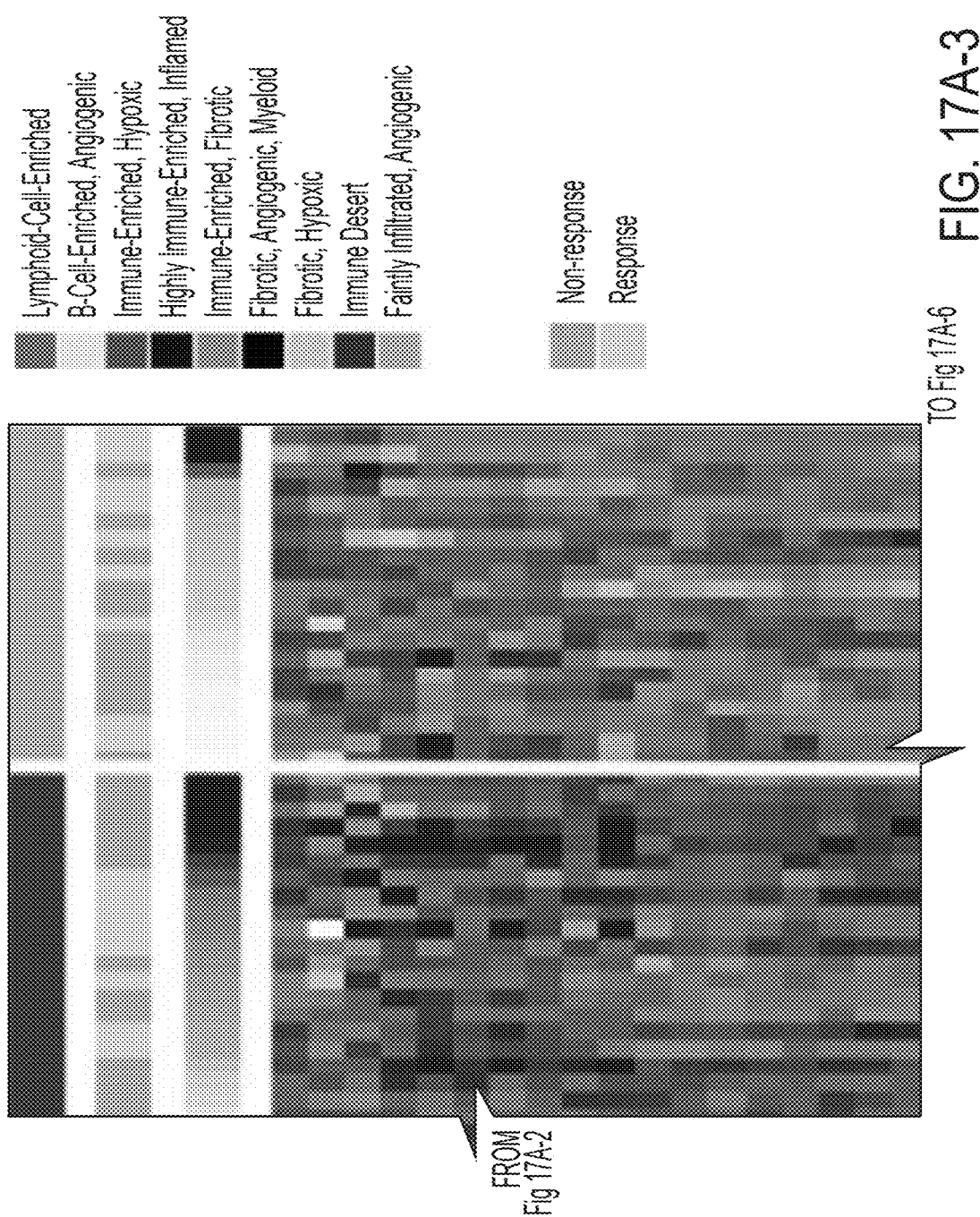
Figures 4, 17A:
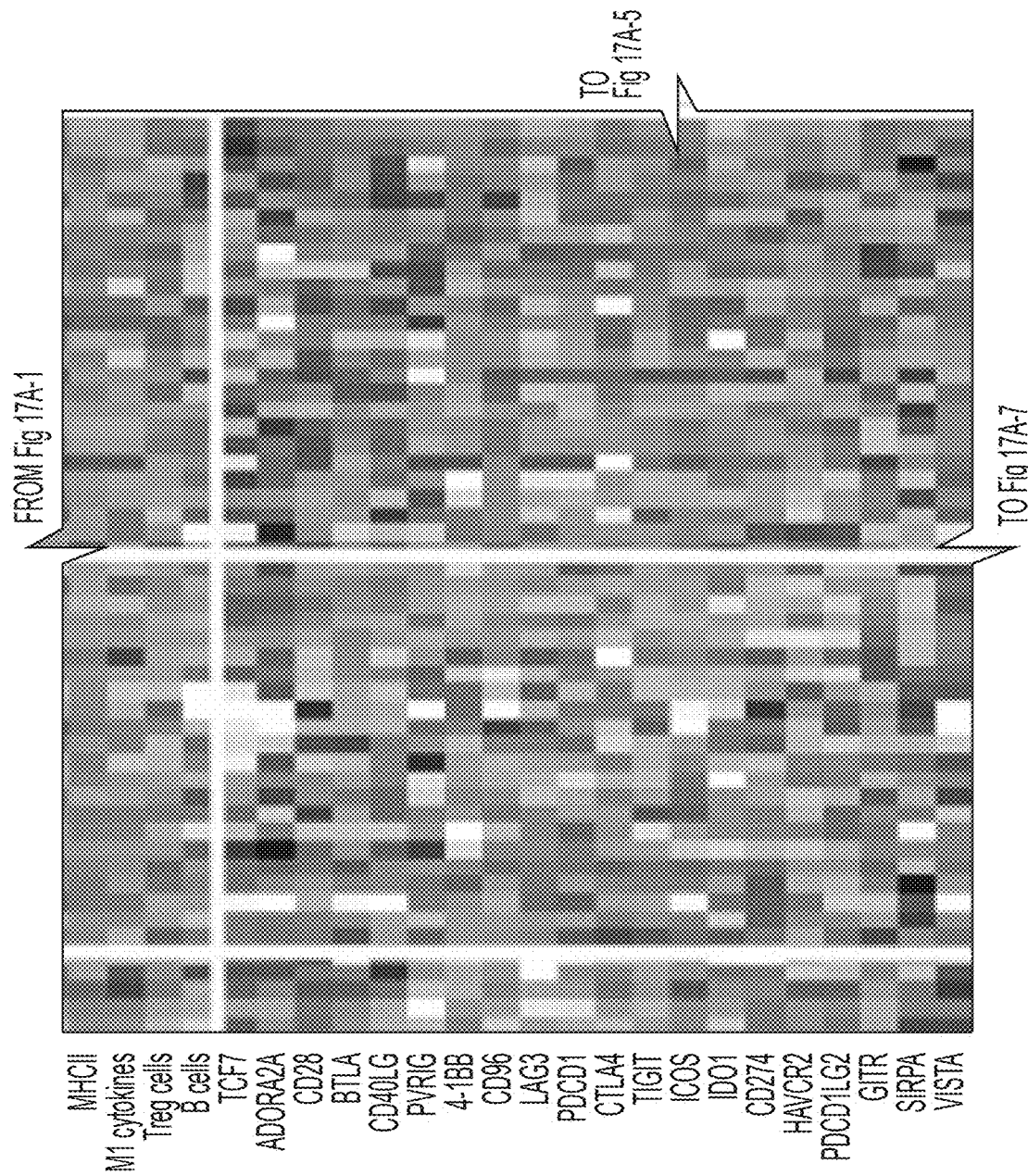
Figures 5, 17A:
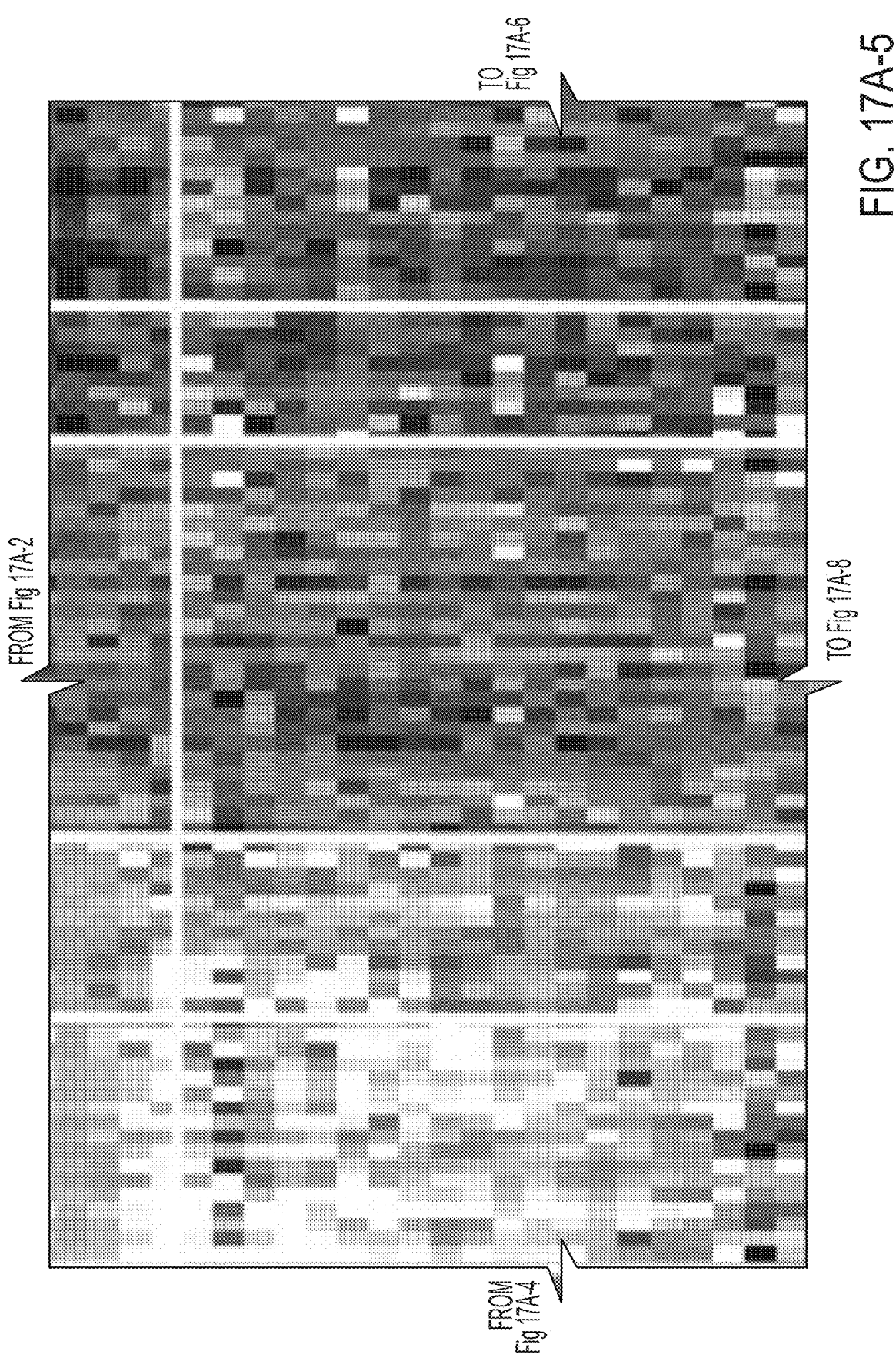
Figures 6, 17A:
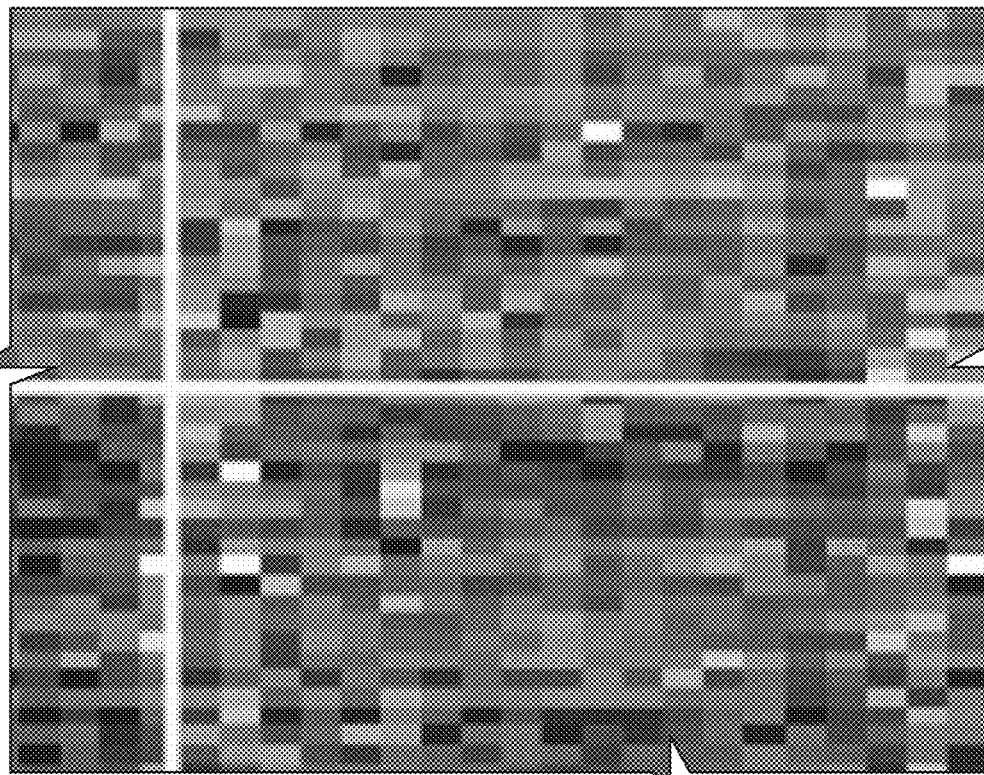
Figures 7, 17A:
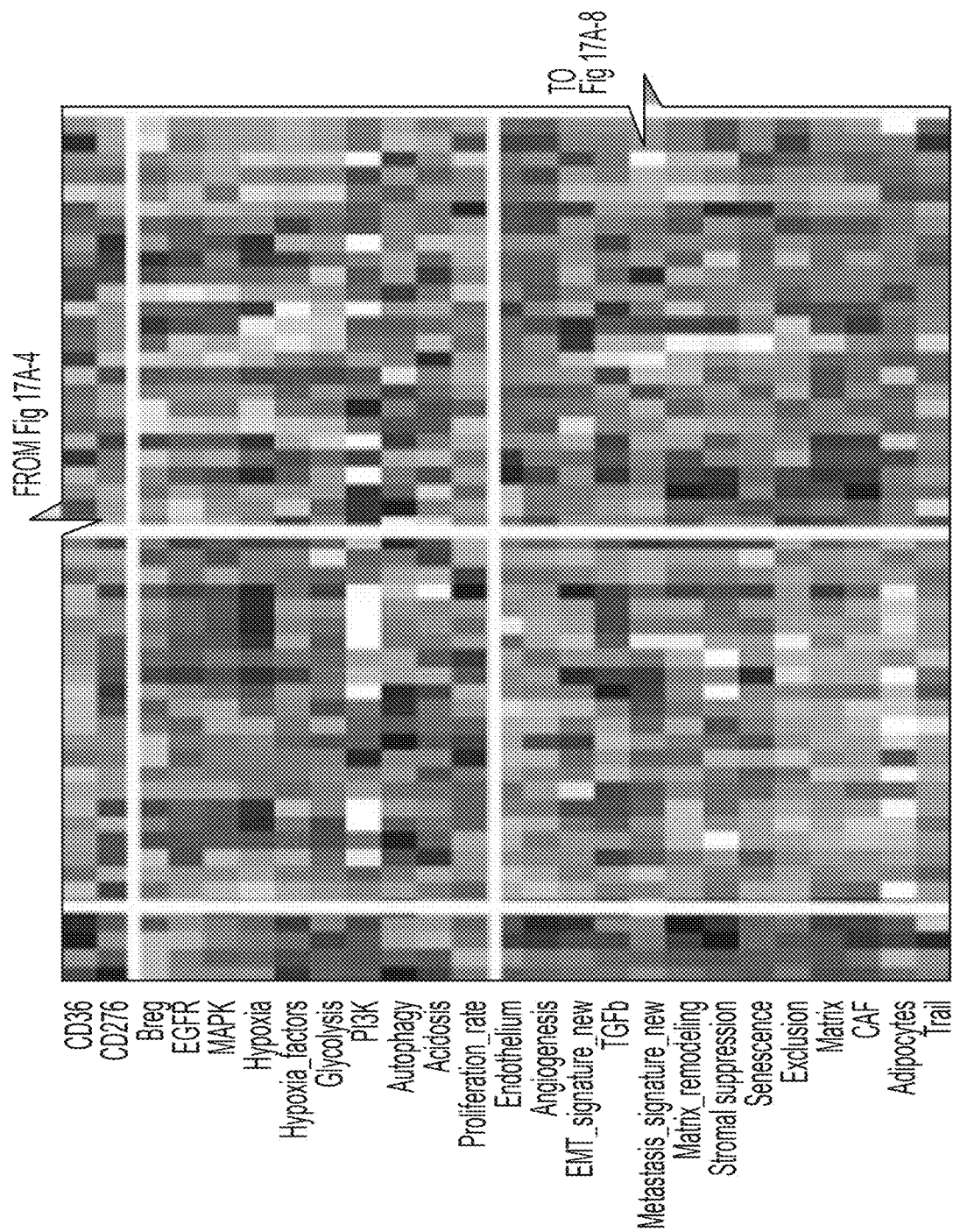
Figures 8, 17A:
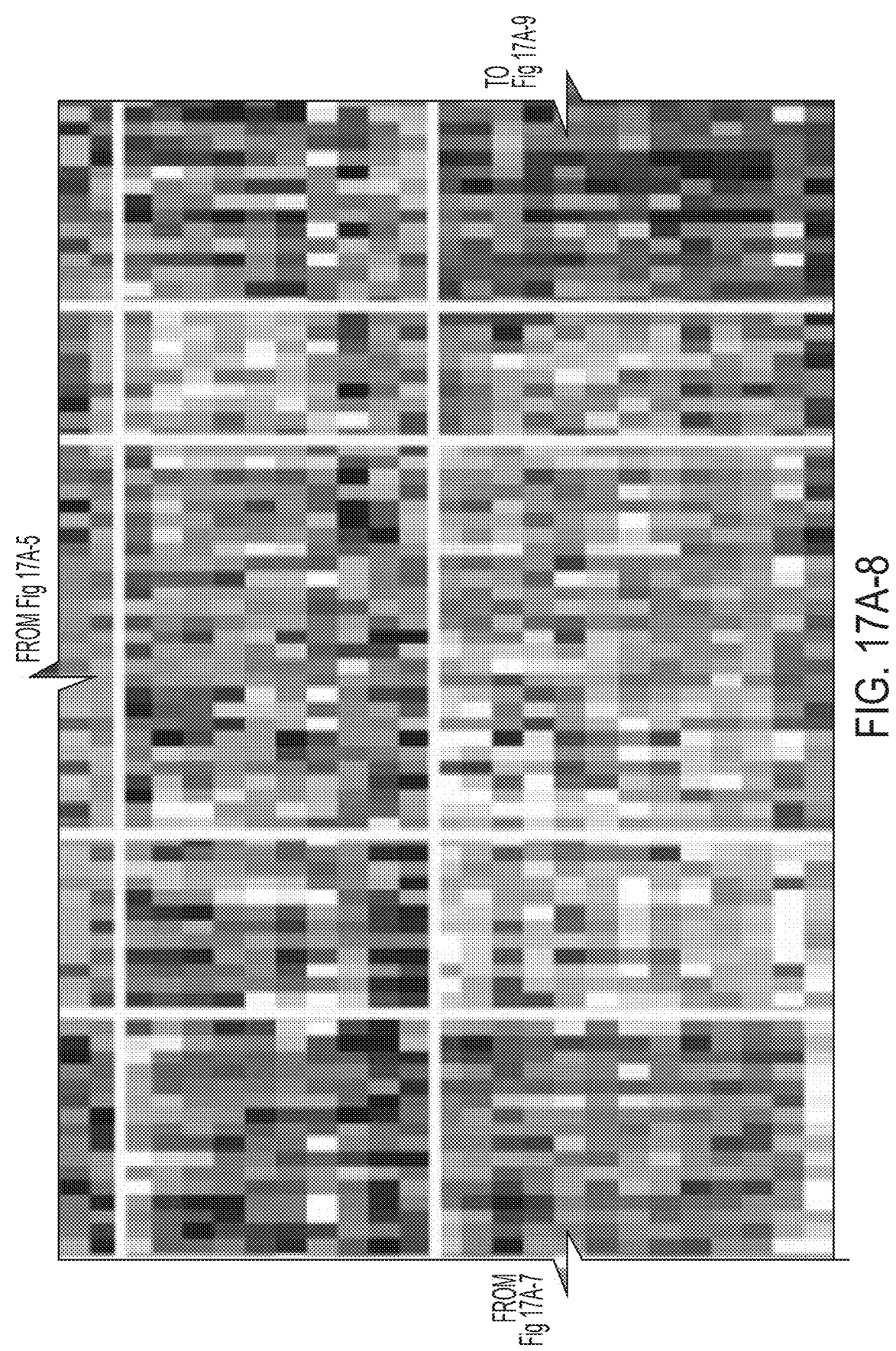
Figures 9, 17A:
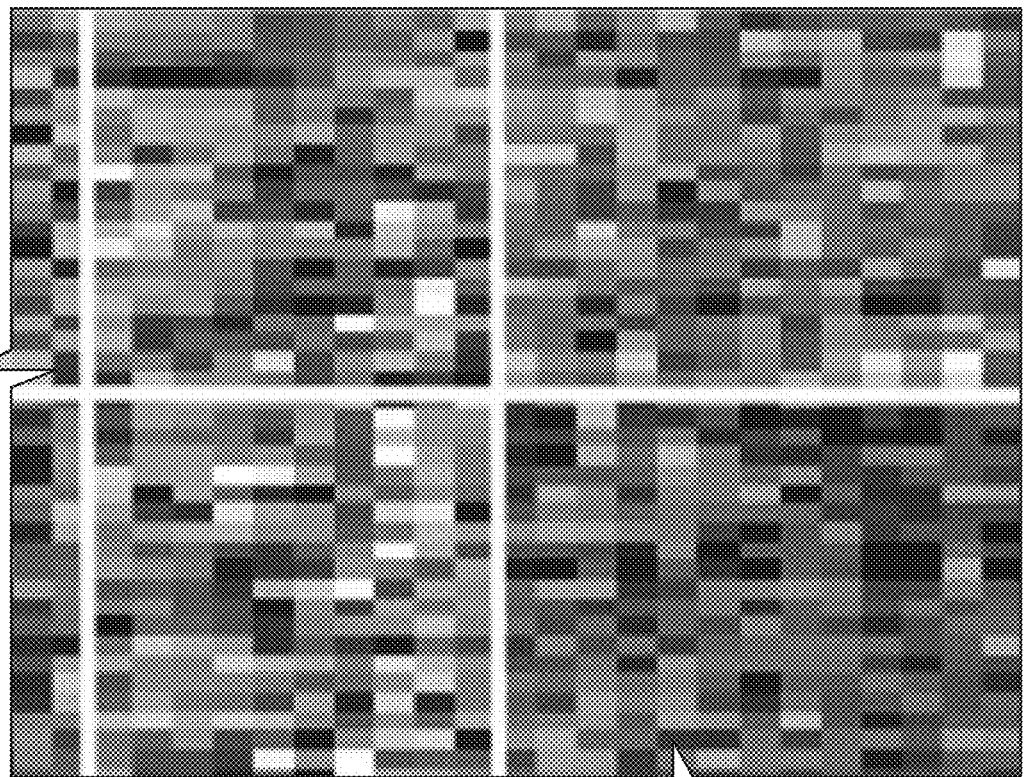
Figure 17B:
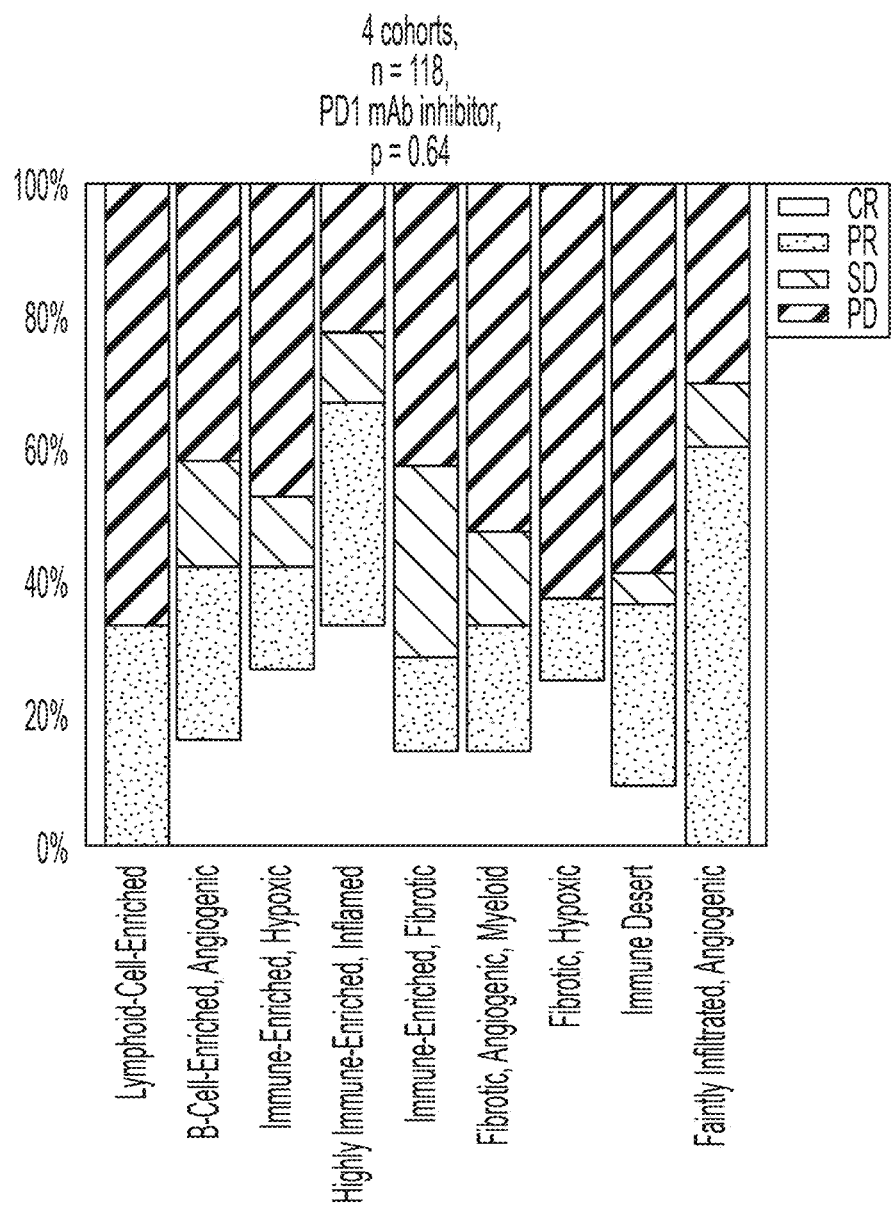
FIG. 17B shows the distribution of responders (complete response (CR) and partial response (PR)) and non-responders (stable disease (SD) and progressive disease (PD)) of the IE subtypes treated with a PD-1 inhibitor.
Figure 17C:
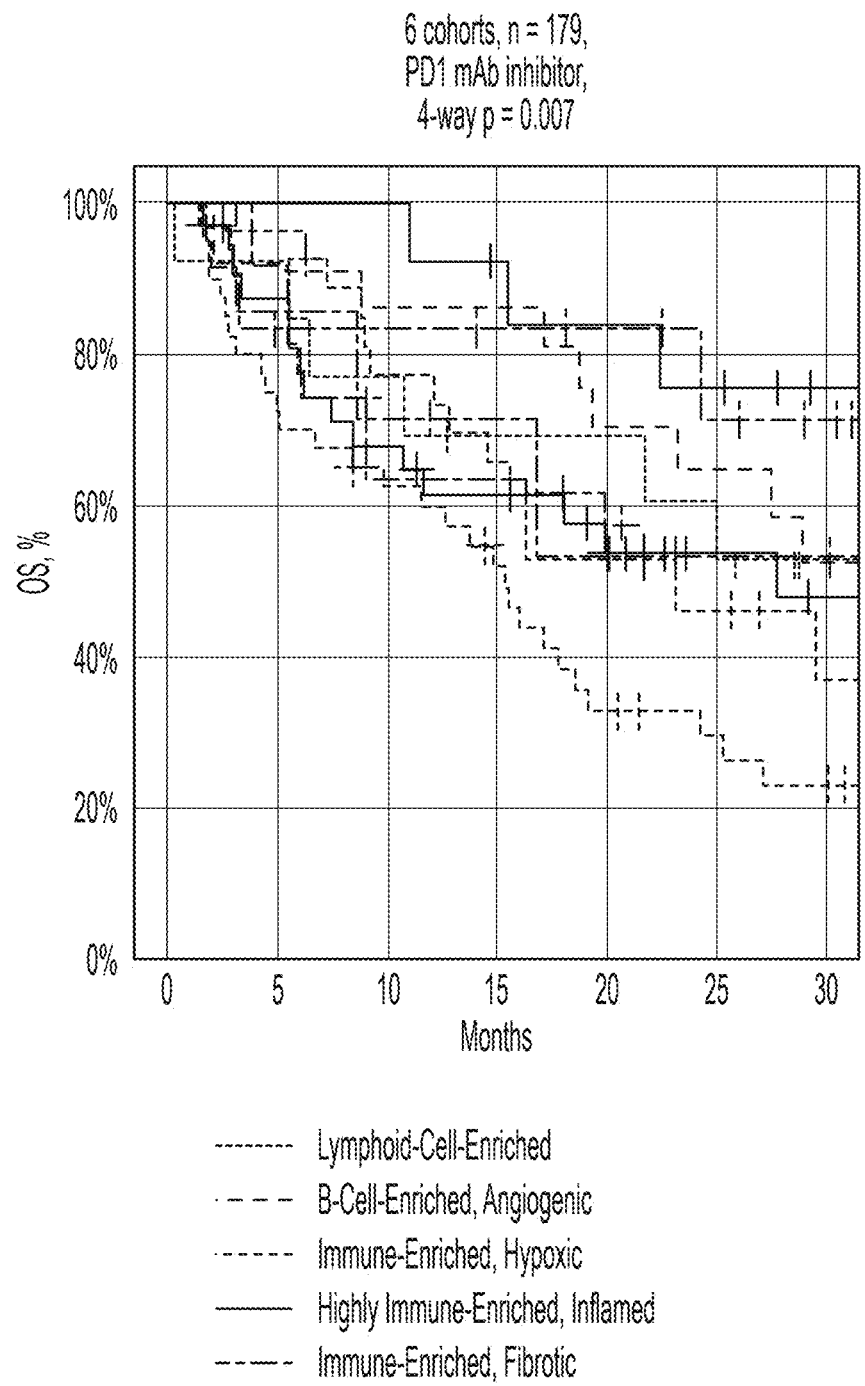
FIG. 17C shows overall survival (OS) of the IE subtypes treated with a PD-1 inhibitor.
Figure 17D:
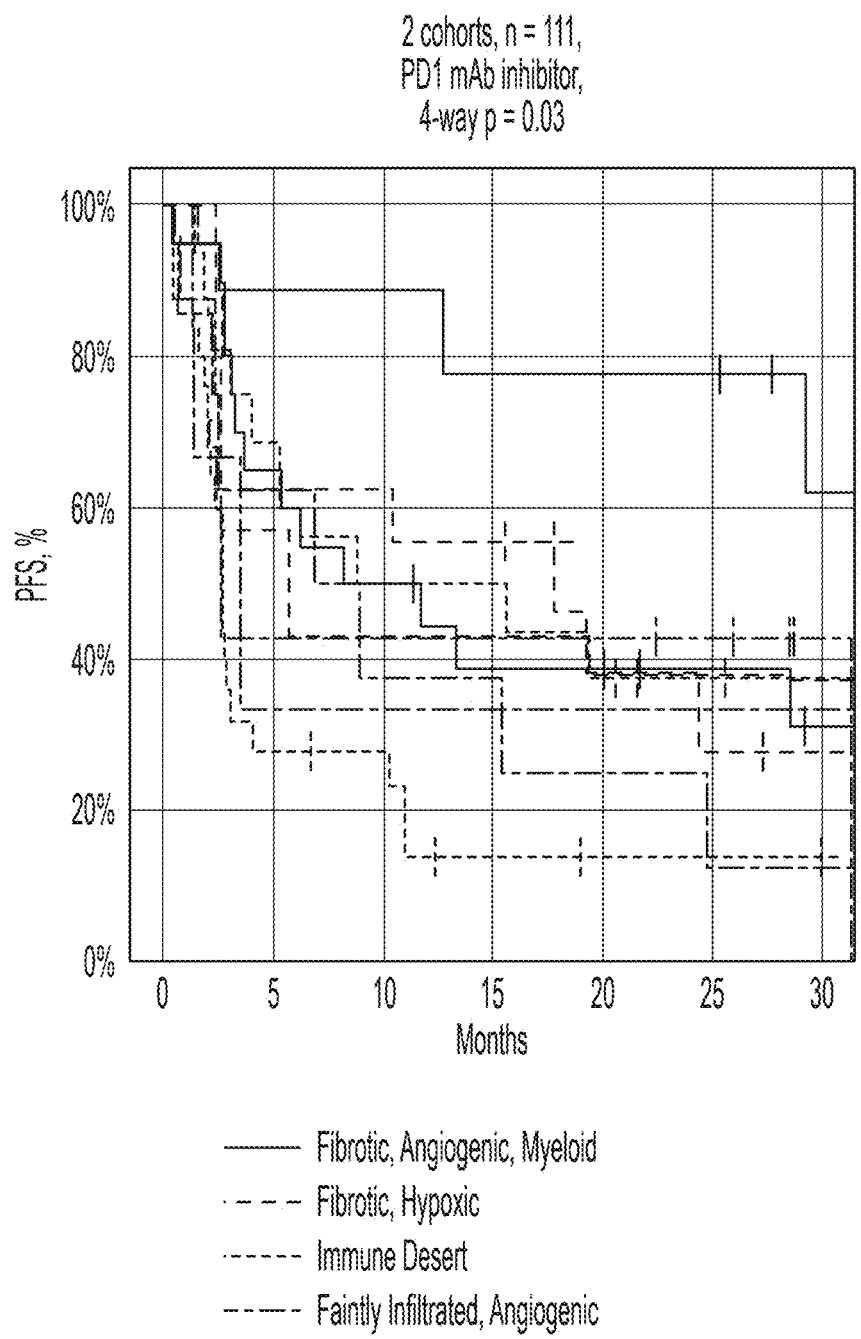
FIG. 17D shows progression-free survival (PFS) of the IE subtypes treated with a PD-1 inhibitor.
Figure 17E:
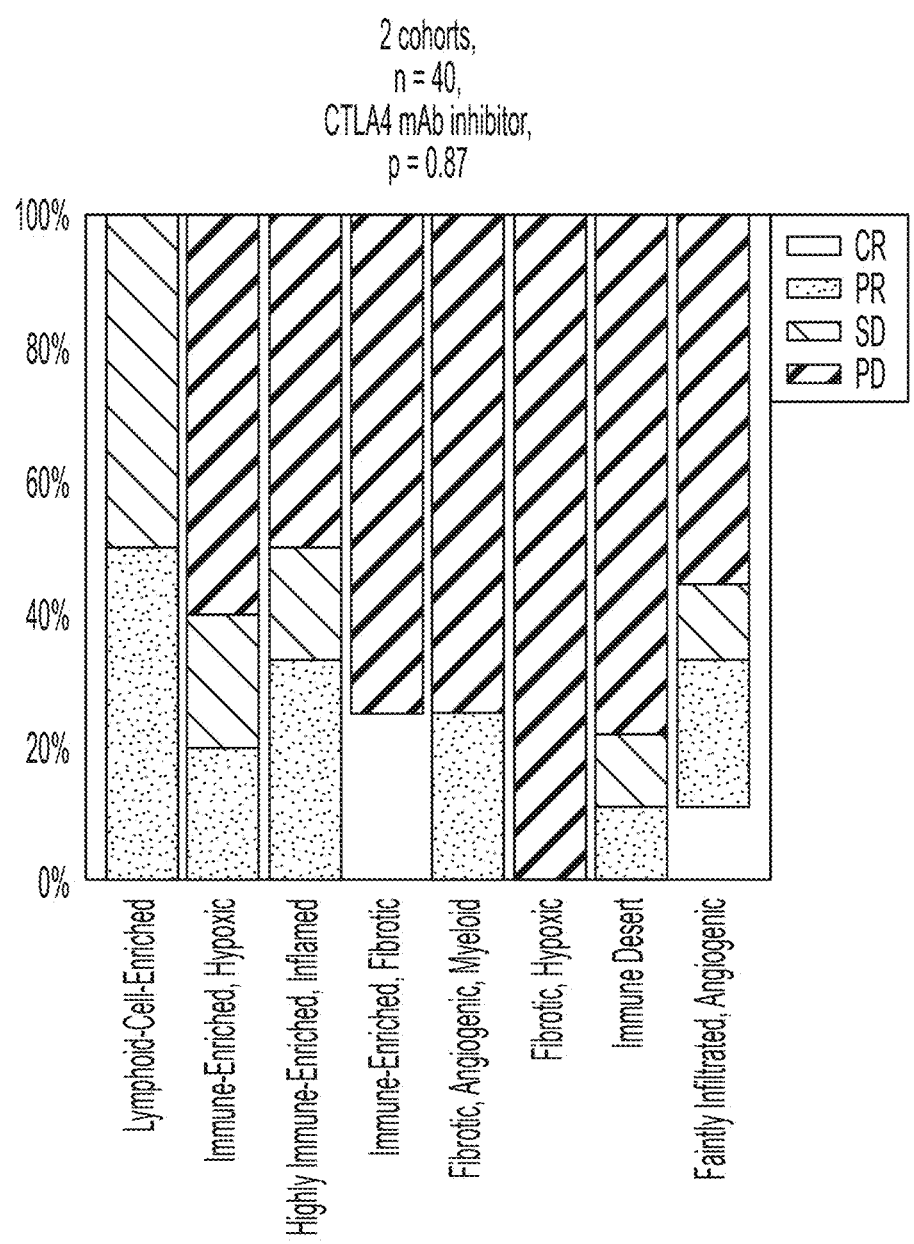
FIG. 17E shows the distribution of responders (CR and PR) and non-responders (SD and PD) of the IE subtypes treated with CTLA4 inhibitor.
Figure 17F:
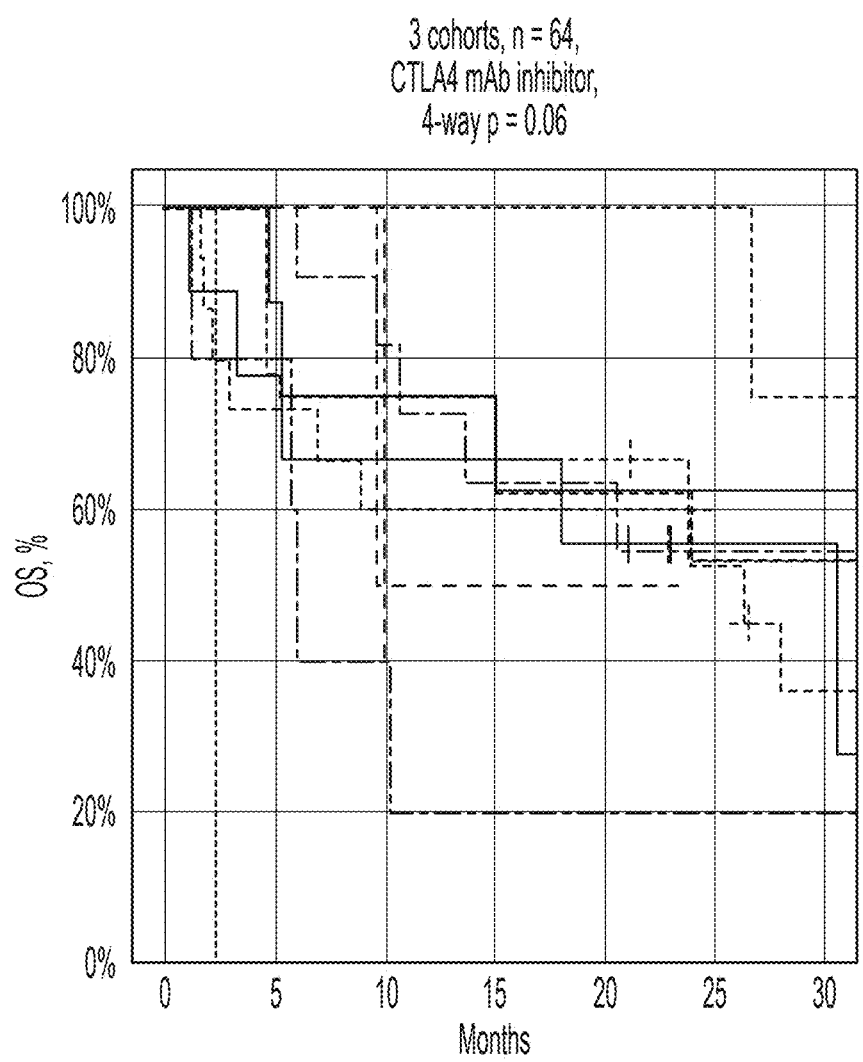
FIG. 17F shows OS of the IE subtypes treated with CTLA4 inhibitor.
Figure 17G:
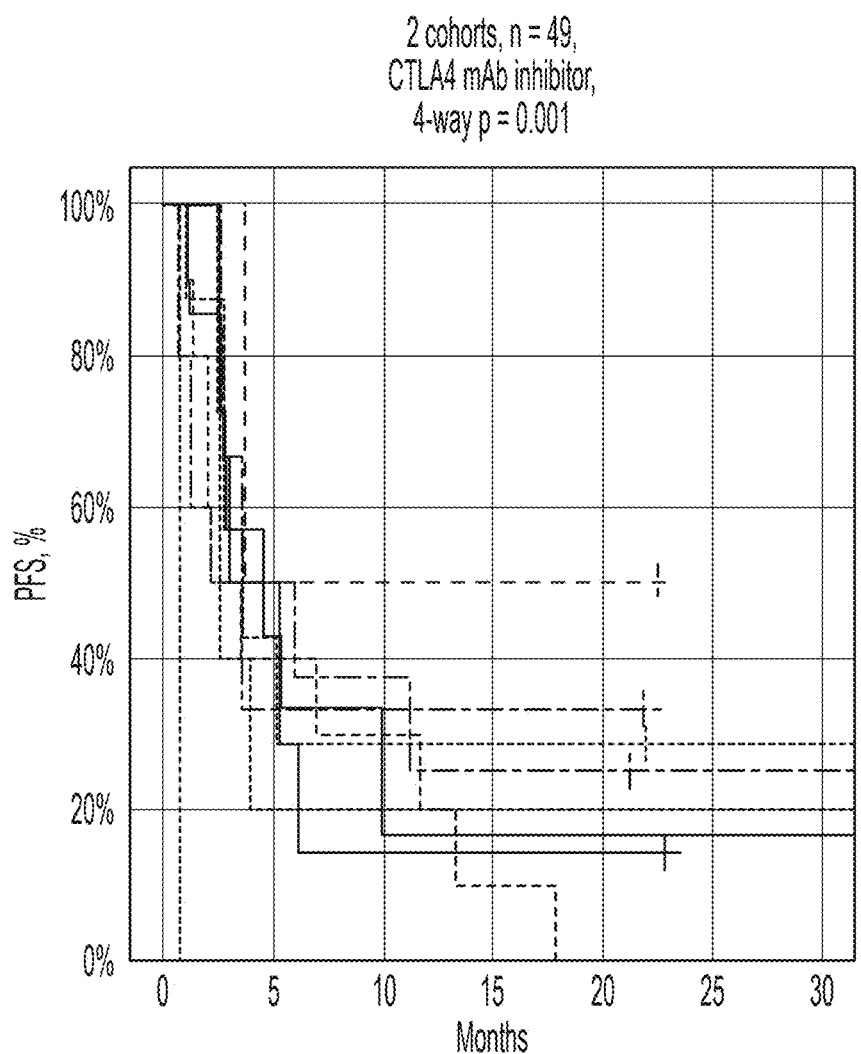
Figure 18A:
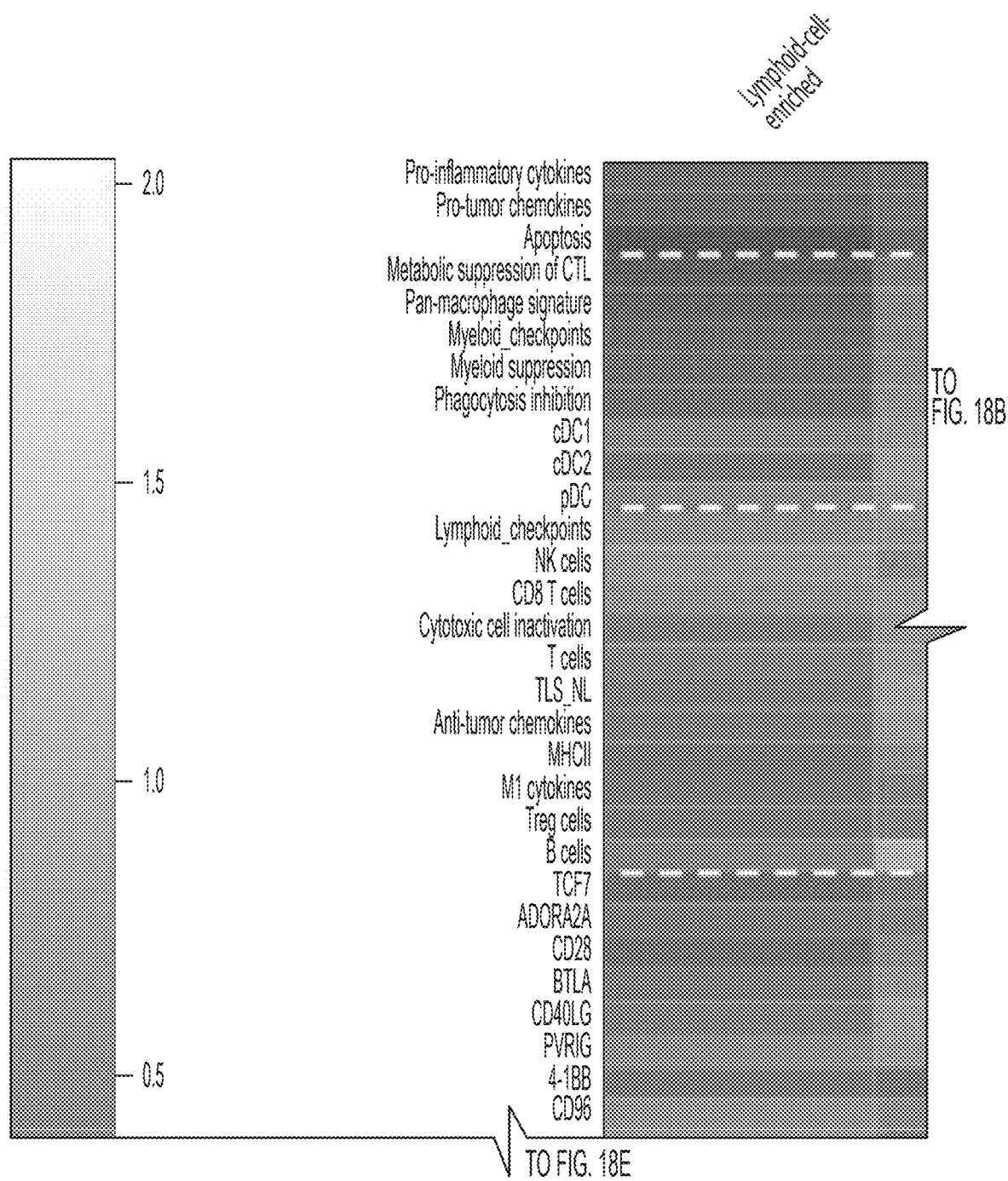
Figure 18B:
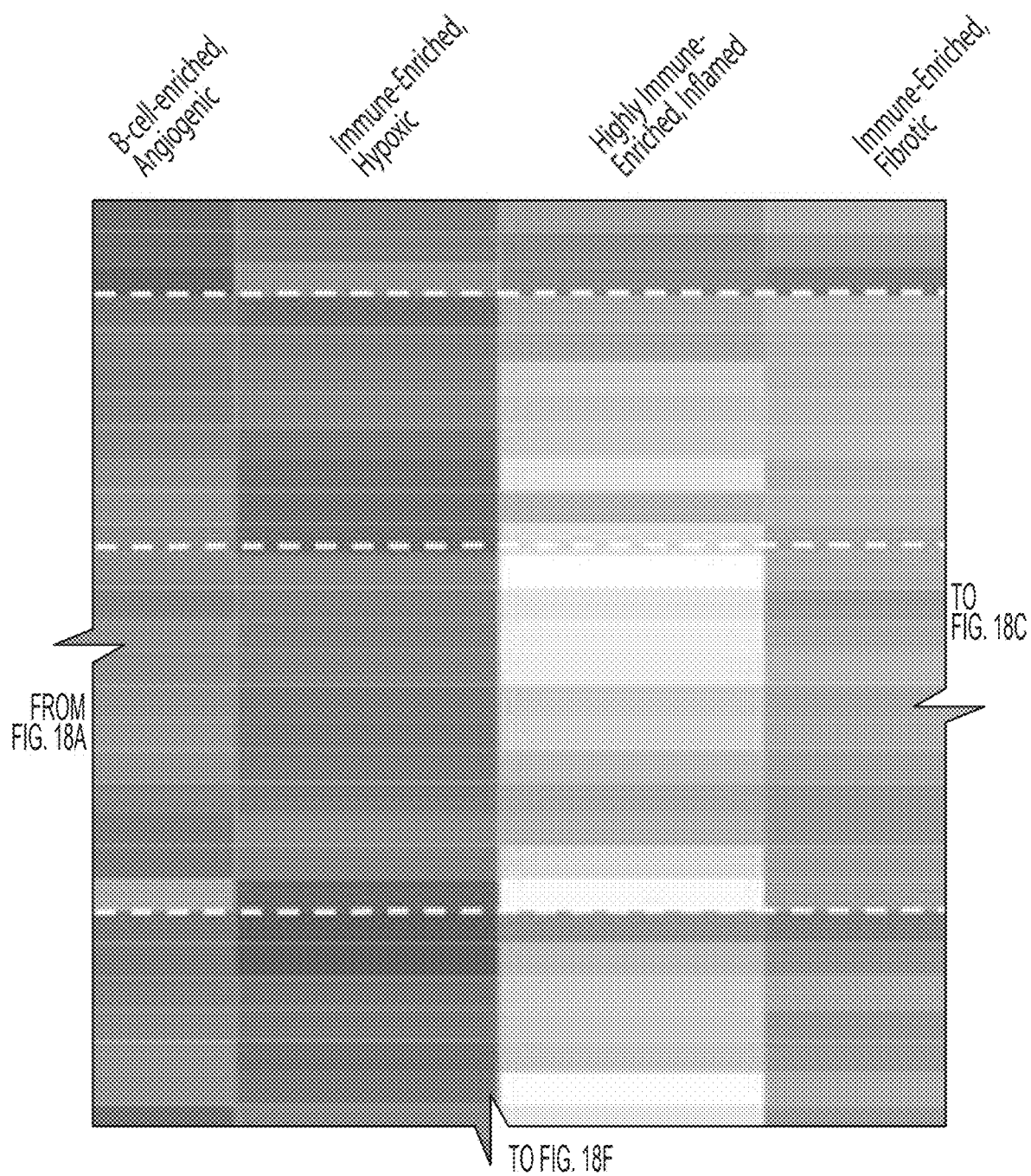
Figure 18C:
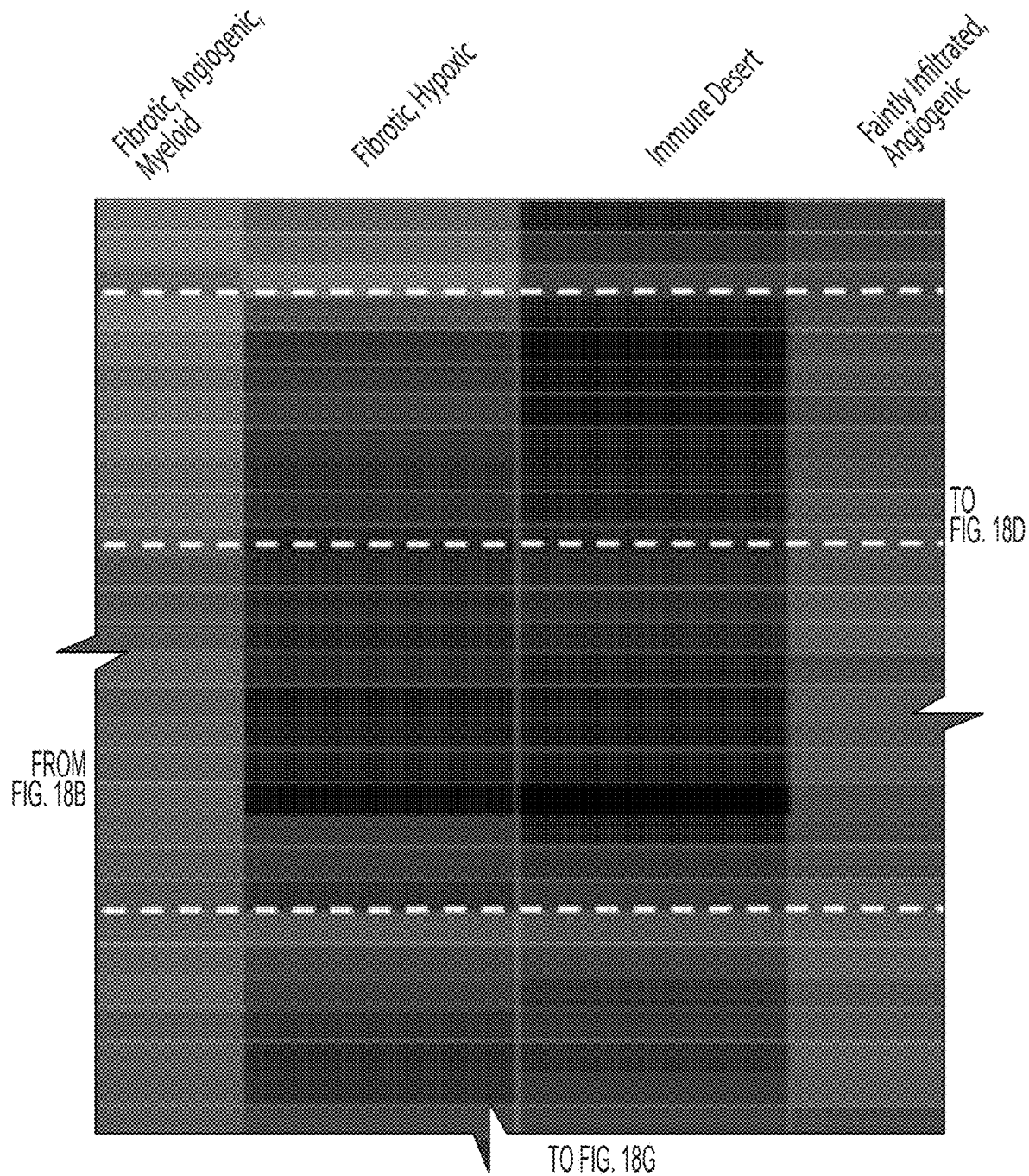
Figure 18E:
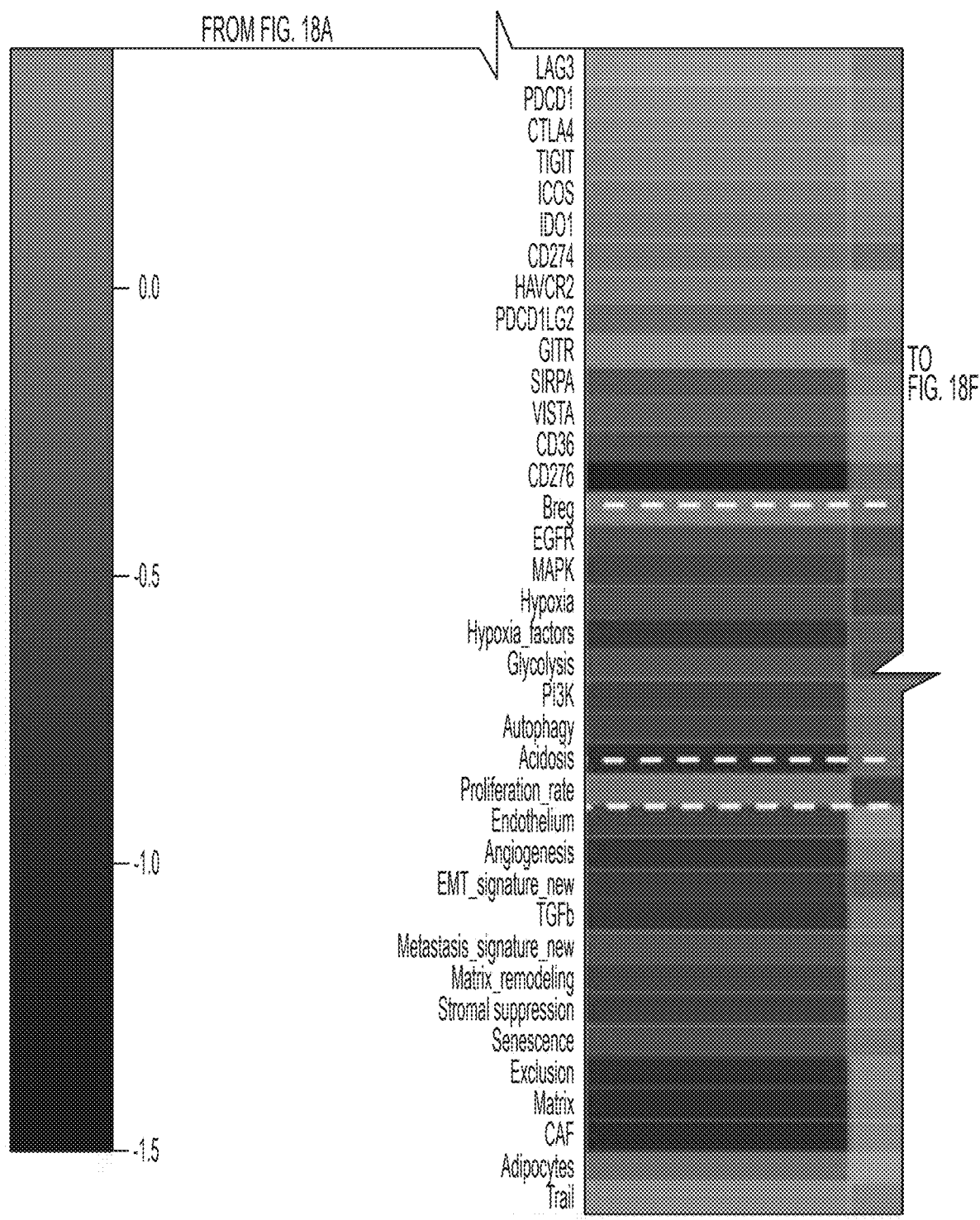
Figure 18F:
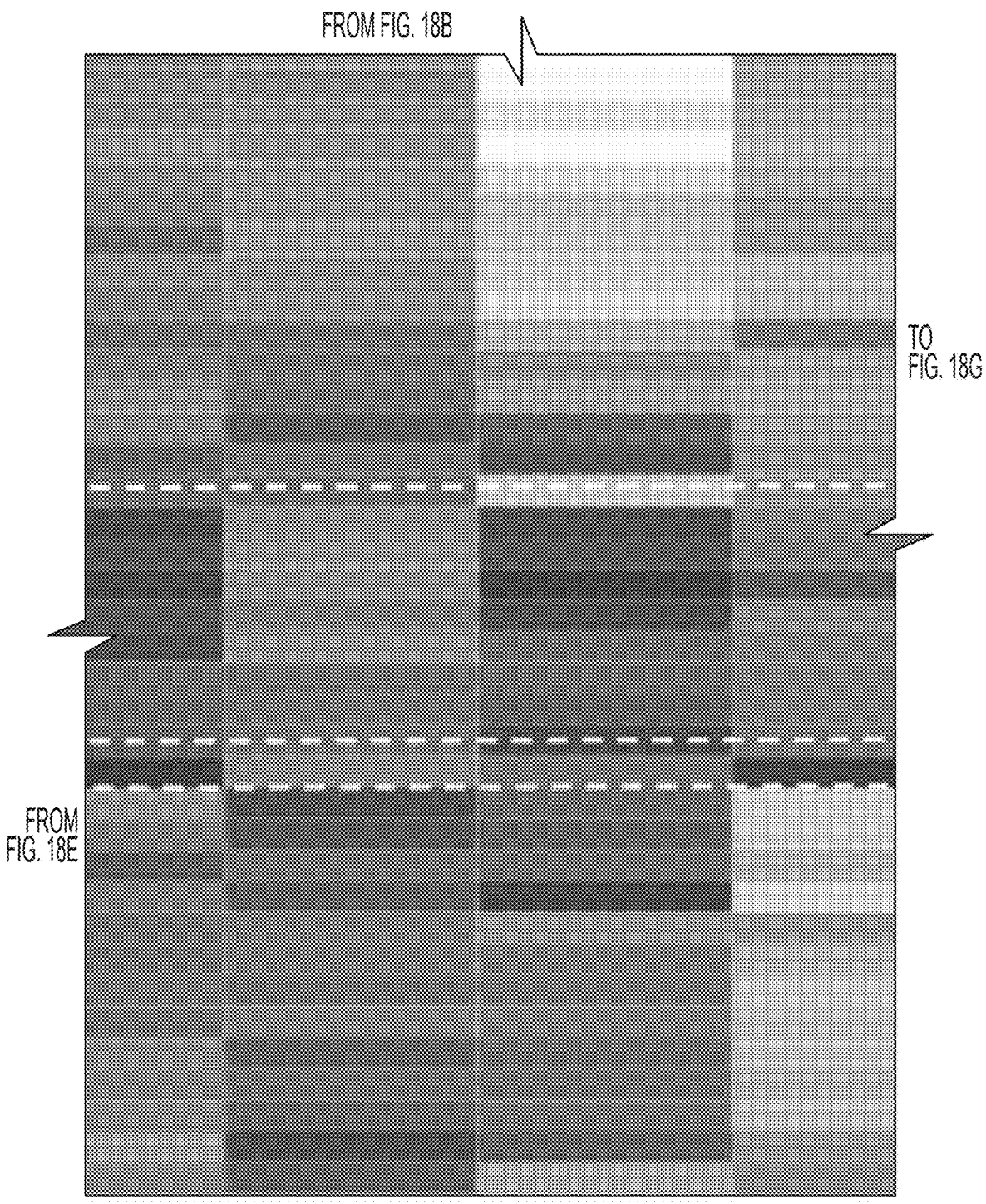
Figure 18G:
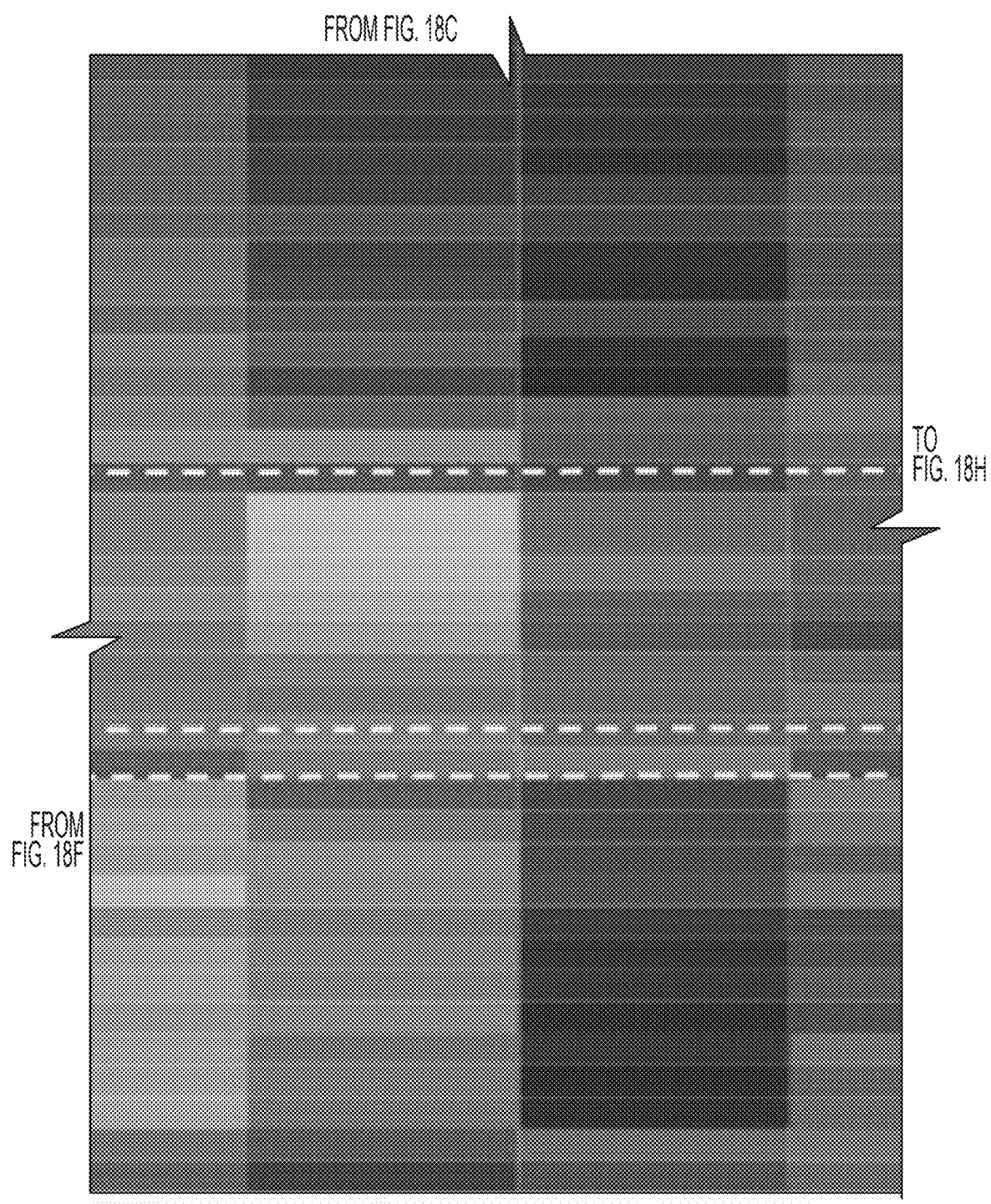

The acquired classification was applied to non-TCGA cohorts with melanoma and the association of the IE-based TME types with response to anti-PD1 and anti-CTLA4 therapy was analyzed. IE-based TME clusters, acquired on TCGA samples, were well reproduced in non-TCGA cohorts (FIGS. 17A-1 through 17A-9). The IE subtypes demonstrated a distinct distribution of responders (complete response CR and partial response PR) and non-responders (stable disease SD and progressive disease PD), and a significant difference in the overall and progression-free survival in the observed cohorts (FIGS. 17B-17C). "Highly Immune-Enriched, Inflamed," "Faintly Infiltrated, Angiogenic," and "Lymphoid-cell-enriched" subtypes had the best survival, while "Immune-Enriched, Fibrotic" and "Immune Desert" subtypes had the worst survival under anti-PD1 therapy. In the anti-CTLA4-treated cohort, "B-cell-enriched, Angiogenic" and "Lymphoid-cell-enriched" subtypes demonstrated significantly longer progression-free survival and "Fibrotic, Angiogenic, Myeloid" subtype demonstrated the worst progression-free survival. It should be appreciated that while the provided analysis was performed with respect to melanoma-type cancers, the correlations between TME types, treatment recommendations, and patient outcomes are applicable to cancers exhibiting solid tumors, as these correlations are related to common biological properties of TMEs in all solid tumors, not just melanomas.

Treatment Options and Combinations for the Defined IE-Based TME Subtypes

Based on the FGES scores, major checkpoint and other target expression levels, and therapy response associations discussed above, treatment options and therapy combination variants, which should be the most beneficiary for certain IE-based TME subtypes, are suggested.

Figure 19:
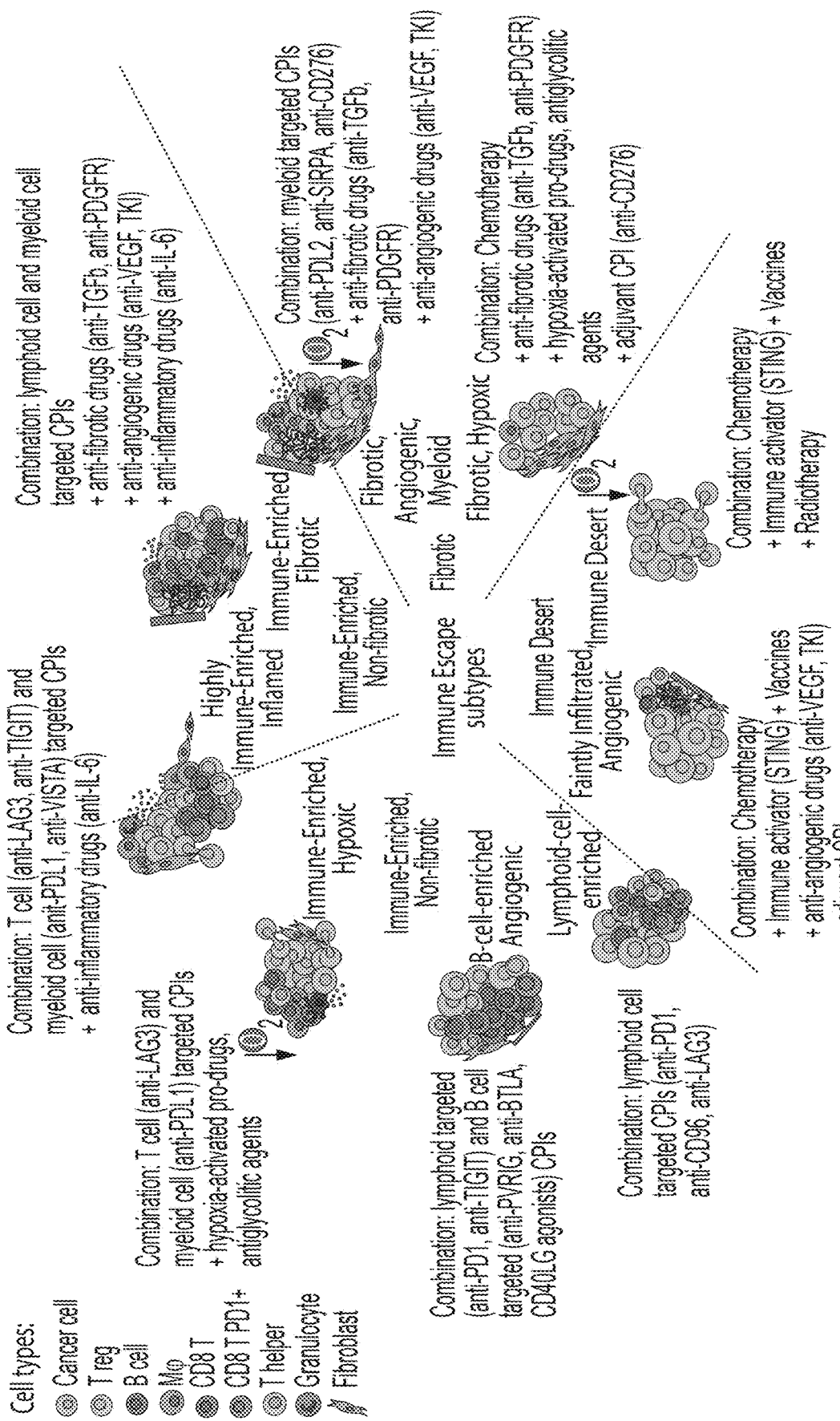
FIG. 19 shows therapy combinations for the acquired IE-based TME subtypes, according to some embodiments of the technology described herein.

Based on the table in FIGS. 18A-18H and associations with therapy response described in FIGS. 17A-1 through 17C, possible therapy combinations are presented for each of the defined IE-based TME subtypes, according to the combinations of the major immune escape functional groups present in each subtype (FIGS. 9A-9J and FIGS. 18A-18H). FIG. 19 shows a schematic illustrated round diagram summarizing the main features of each subtype and the proposed combination regimens.

Patients with "Lymphoid-cell-enriched" subtype are likely to be the most responsive to a combination of lymphoid-cell-targeted checkpoint inhibitors (CPI), as they have one of the highest lymphoid to myeloid cell ratios, a very low stroma level, and relatively high expression of such checkpoints as LAG3, PD1, CD96, PVRIG (FIG. 15 and FIGS. 18A-18H). This subtype had one of the best responses in PDL1- and CTLA4-treated SKCM cohorts (FIGS. 17A-1 through 17C). Additionally, it may be effective to combine CPI with chemotherapy due to the relatively high level of tumor proliferation rate (FIGS. 18A-18H).

"B-cell-enriched, Angiogenic" subtype was equally infiltrated with lymphoid and myeloid cells, and thus demonstrated high expression of both lymphoid- and myeloid-cell-associated checkpoints, but with predominance of PVRIG, CD40LG, BTLA, CD28, TIGIT, TIM3 (HAVCR2), VISTA (FIG. 15 and FIGS. 18A-18H). These molecules are often expressed on B cells, DC, T helpers, and macrophages. Also, endothelium level was high (FIG. 11 and FIGS. 18A-18H). Patients from this subtype are likely to benefit from combinations of the above-mentioned checkpoint inhibitors, possibly with the addition of anti-angiogenic therapy.

"Immune-Enriched, Hypoxic" subtype, characterized by high hypoxia and hypoxia-related processes, high infiltration with suppressive myeloid cells and Tregs (FIGS. 18A-18H) are likely to be responsive to treatment with a combination of T-cell targeted CPI (i.e., anti-LAG3, anti-CTLA4, anti-TIGIT) or, vice versa, checkpoint activators (CPA) (i.e., ICOS, 4-1BB agonists) with myeloid-cell-targeted inhibitors (i.e., anti-PDL1, anti-PDL2, anti-TIM3). Also, hypoxia-activated pro-drugs, HIF2A inhibitors or anti-glycolytic agents may be added to the treatment regimen. The combination of the above-mentioned treatments with chemotherapy may also be an option, due to the high level of tumor proliferation rate (FIGS. 18A-18H).

Patients with "Highly Immune-Enriched, Inflamed" TME subtype, characterized by very high infiltration with all immune cell types and the highest lymphoid to myeloid cell ratio, are promising candidates for standard CPIs as well as new experimental combinations, as they have high expression of a variance of checkpoint molecules and low stroma level (FIG. 15 and FIGS. 18A-18H). This subtype had one of the best responses in PDL1- and CTLA4-treated SKCM cohorts (FIGS. 17A-1 through 17C). CPI treatment can also be supplemented by anti-inflammatory drugs to downregulate overall inflammation registered in this subtype (FIGS. 18A-18H).

Patients with "Immune-Enriched, Fibrotic" subtype, although having a highly infiltrated TME like the previous group, were characterized by very high development and activation of stroma (FIGS. 18A-18H). Thus, therapy regimens should combine lymphoid and/or myeloid-cell-targeted CPI with anti-fibrotic, anti-angiogenic or anti-inflammatory drugs to overcome as many immune escape mechanisms as possible. This subtype demonstrated very poor response in melanoma cohorts treated with mono-target immunotherapy: anti-PDL1 or anti-CTLA4 (FIGS. 17A-1 through 17C).

"Fibrotic, Angiogenic, Myeloid" subtype, which is only slightly infiltrated, mostly with myeloid cells, and had high level of stromal elements (FIGS. 17A-1 through 17C), are likely to be the most responsive to a combination of myeloid-cell-targeted CPI (TIM3, SIRPA, VISTA) with anti-fibrotic (anti-CD276, anti-TGFb) and anti-angiogenic (TKI, anti-VEGF) drugs.

Patients with "Fibrotic, Hypoxic" subtype were characterized by almost absent immune infiltration, moderate stroma activation, very high hypoxia level, and relatively high proliferation rate (FIGS. 18A-18H). Thus, an effective therapy combination is likely to include chemotherapy and anti-fibrotic/anti-hypoxic drugs. CPI can be regarded as a variant of adjuvant or second-line therapy, after the main tumor has been removed or altered by previous regimens (chemotherapy/radiotherapy) and become more immunogenic.

For patients with "Immune Desert" subtype, with low levels of both immune infiltration and stroma and high tumor proliferation rate (FIGS. 18A-18H), the best option for treatment is likely to be therapies which can turn this TME type from cold into hot: chemotherapy/radiotherapy (to increase immunogenicity), immune activators (STING) and vaccines to attract immune cells. CPI should be regarded as an option only in combination with any of these regimens. The use of CPI (anti-PD1) in melanoma as a solo regimen resulted in a poor response for this subtype (FIGS. 17A-1 through 17C).

"Faintly Infiltrated, Angiogenic" subtype had low to moderate immune infiltration and moderate level of angiogenesis and TGFb activation, while other stromal components were low (FIGS. 17A-1 through 17C). This subtype is likely to be responsive to a combination of anti-angiogenic agents with standard CPI. In PDL1- and CTLA4-treated SKCM cohorts, this subtype had one of the highest survival levels (FIGS. 16A and 16B-1 through 16B-3), which can possibly be augmented by combination with anti-angiogenic drugs.

REFERENCES

1. Torre L A, Bray F. Siegel R L, Ferlay J, Lortet-Tieulent J, Jemal A. Global cancer statistics, 2012. CA Cancer J Clin. 2015 March; 65(2):87-108. doi: 10.3322/caac.21262. Epub 2015 Feb. 4. PMID: 25651787.
2. Ferlay J, Colombet M, Soerjomataram I, Parkin D M, Piñeros M, Znaor A, Bray F. Cancer statistics for the year 2020: An overview. Int J Cancer. 2021 Apr. 5. doi: 10.1002/ijc.33588. Epub ahead of print. PMID: 33818764.
3. Hanahan D. Hallmarks of Cancer: New Dimensions. Cancer Discov. 2022 January; 12(1):31-46. doi: 10.1158/2159-8290.CD-21-1059. PMID: 35022204.
4. Kim S K, Cho S W. The Evasion Mechanisms of Cancer Immunity and Drug Intervention in the Tumor Microenvironment. Front Pharmacol. 2022 May 24; 13:868695. doi: 10.3389/fphar.2022.868695. PMID: 35685630; PMCID: PMC9171538.
5. Ren X, Guo S, Guan X, Kang Y, Liu J, Yang X. Immunological Classification of Tumor Types and Advances in Precision Combination Immunotherapy. Front Immunol. 2022 Feb. 28; 13:790113. doi: 10.3389/fimmu.2022.790113. PMID: 35296094; PMCID: PMC8918549.
6. Bai R, Chen N, Li L, Du N, Bai L, Lv Z, Tian H, Cui J. Mechanisms of Cancer Resistance to Immunotherapy. Front Oncol. 2020 Aug. 6:10:1290. doi: 10.3389/fonc.2020.01290. PMID: 32850400; PMCID: PMC7425302.
7. Galon J, Bruni D. Approaches to treat immune hot, altered and cold tumors with combination immunotherapies. Nat Rev Drug Discov. 2019 March; 18(3):197-218. doi: 10.1038/s41573-018-0007-y. PMID: 30610226.
8. Thorsson V, Gibbs D L, Brown S D, Wolf D, Bortone D S, Ou Yang T H, Porta-Pardo E, Gao G F, Plaisier C L, Eddy J A, Ziv E, Culhane A C, Paull E O, Sivakumar IKA, Gentles A J, Malhotra R, Farshidfar F, Colaprico A, Parker J S, Mose L E, Vo N S, Liu J, Liu Y, Rader J, Dhankani V, Reynolds S M, Bowlby R, Califano A, Cherniack A D, Anastassiou D, Bedognetti D, Mokrab Y, Newman A M, Rao A, Chen K, Krasnitz A, Hu H, Malta™, Noushmehr H, Pedamallu C S, Bullman S, Ojesina Al, Lamb A, Zhou W, Shen H, Choueiri T K, Weinstein J N, Guinney J, Saltz J, Holt R A, Rabkin C S; Cancer Genome Atlas Research Network; Lazar A J, Serody J S, Demicco E G, Disis M L, Vincent B G, Shmulevich I. The Immune Landscape of Cancer, Immunity. 2018 Apr. 17; 48(4):812-830.e14. doi: 10.1016/j.immuni.2018.03.023. Epub 2018 Apr. 5. Erratum in: Immunity. 2019 Aug. 20; 51(2):411-412. PMID: 29628290; PMCID: PMC5982584.
9. Tamborero D, Rubio-Perez C, Muiños F, Sabarinathan R, Piulats J M, Muntasell A, Dienstmann R, Lopez-Bigas N, Gonzalez-Perez A. A Pan-cancer Landscape of Interactions between Solid Tumors and Infiltrating Immune Cell Populations. Clin Cancer Res. 2018 Aug. 1; 24(15):3717-3728. doi: 10.1158/1078-0432.CCR-17-3509. Epub 2018 Apr. 17. PMID: 29666300.
10. Luca B A, Steen C B, Matusiak M, Azizi A, Varma S, Zhu C, Przybyl J, Espín-Pérez A, Diehn M, Alizadeh A A, van de Rijn M, Gentles A J, Newman A M. Atlas of clinically distinct cell states and ecosystems across human solid tumors. Cell. 2021 Oct. 14; 184(21):5482-5496.e28. doi: 10.1016/j.cell.2021.09.014. Epub 2021 Sep. 30. PMID: 34597583; PMCID: PMC8526411.
11. Chen F, Chandrashekar D S, Varambally S, Creighton C J. Pan-cancer molecular subtypes revealed by mass-spectrometry-based proteomic characterization of more than 500 human cancers. Nat Commun. 2019 Dec. 12; 10(1): 5679. doi: 10.1038/s41467-019-13528-0. PMID: 31831737; PMCID: PMC6908580.
12. Bagaev A, Kotlov N, Nomie K, Svekolkin V, Gafurov A, Isaeva O, Osokin N, Kozlov I, Frenkel F, Gancharova O, Almog N, Tsiper M, Ataullakhanov R, Fowler N. Conserved pan-cancer microenvironment subtypes predict response to immunotherapy. Cancer Cell. 2021 Jun. 14; 39(6):845-865.e7. doi: 10.1016/j.ccell.2021.04.014. Epub 2021 May 20. PMID: 34019806.
13. Schubert M, Klinger B, Klünemann M, Sieber A, Uhlitz F, Sauer S, Garnett M J, Blüthgen N, Saez-Rodriguez J. Perturbation-response genes reveal signaling footprints in cancer gene expression. Nat Commun. 2018 Jan. 2; 9(1): 20. doi: 10.1038/s41467-017-02391-6. PMID: 29295995; PMCID: PMC5750219.
14. Zaitsev A, Chelushkin M, Dyikanov D, Cheremushkin I, Shpak. B, Nomie K, Zyrin V, Nuzhdina E, Lozinsky Y, Zotova A, Degryse S, Kotlov N, Baisangurov A, Shatsky V, Afenteva D, Kuznetsov A, Paul S R. Davies D L, Reeves P M, Lanuti M, Goldberg M F, Tazearslan C, Chasse M, Wang I, Abdou M, Aslanian S M, Andrewes S, Hsieh J J, Ramachandran A, Lyu Y, Galkin I, Svekolkin V, Cerchietti L, Poznansky M C, Ataullakhanov R, Fowler N, Bagaev A. Precise reconstruction of the TME using bulk RNA-seq and a machine learning algorithm trained on artificial transcriptomes. Cancer Cell. 2022 Aug. 8; 40(8):879-894.e16. doi: 10.1016/j.ccell.2022.07.006. PMID: 35944503.
15. Camus, M. et al. Coordination of intratumoral immune reaction and human colorectal cancer recurrence. Cancer Res. 69, 2685-2693 (2009). This paper presents the first description of the immune bot (optimal), altered-excluded, altered immunosuppressed and cold (absent) tumors.
16. Wang, D R., Wu, X L. & Sun, Y L. Therapeutic targets and biomarkers of tumor immunotherapy: response versus non-response. *Sig Transduct Target Ther* 7, 331 (2022). doi.org/10.1038/s41392-022-01136-2
17. Ward Joc H., Jr Hierarchical grouping to optimize an objective function. Journal of the American statistical association. 1963; 58(301):236-244.

EQUIVALENTS

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone, a tablet, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately," "substantially," and "about" may be used to mean within ±20% of a target value in some embodiments, within ±10% of a target value in some embodiments, within ±5% of a target value in some embodiments, within ±2% of a target value in some embodiments. The terms "approximately," "substantially," and "about" may include the target value.

What is claimed is:

1. A method for determining a tumor microenvironment (TME) type of a subject, the method comprising:
    using at least one computer hardware processor to perform:
        obtaining RNA expression data for the subject, the RNA expression data indicating RNA expression levels for at least three genes in each of at least two gene groups of a set of gene groups, the set of gene groups including:
        (a) Conventional dendritic cells type 1 (cDC1) group: XCR1, CLEC9A, C1orf54, BATF3, WDFY4, and HLA-DOB;
        (b) Conventional dendritic cells type 2 (cDC2) group: ITGAX, HLA-DRA, HLA-DRB1, CD1C, FCER1A, CLEC10A, and AMICA1;
        (c) Plasmacytoid dendritic cells (pDC) group: IL3RA, CLEC4C, CCR2, CXCR3, GZMB, DERL3, LILRA4, and SCT;
        (d) M1 cytokines group: CXCL10, IL23A, IL1B, IL12B, TNF, and CXCL9;
        (e) Panmacrophage signature group: C1QC, CSF1R, CD163, SIGLEC1, C1QA, VSIG4, MSR1, and CD68;
        (f) Tertiary Lymphoid Structure (TLS) group: CXCL10, SELL, LAMP3, FDCSP, CD86, CXCL13, PTPRCAP, CCR7, LTA, CXCR3, CCL21, CCL19, JCHAIN, CXCL9, and TNFRSF17;
        (g) Proinflammatory cytokines group: IL23A, IFNB1, IL1A, IL1B, TNF, CXCL2, IL6, IL26, CCL2, CCL4, LIF, and CCL3;
        (h) Anti-tumor chemokines group: CXCL10, CXCL9, CXCL13, XCL1, CCL5, CCL21, CCL19, and XCL2;
        (i) Pro-tumor chemokines group: CCL26, CXCL6, CCL20, CXCL8, CXCL1, CCL18, CCL17, and CCL22;
        (j) Myeloid checkpoints group: PDCD1LG2, HAVCR2, CD274, and C10orf54;
        (k) Lymphoid checkpoints group: BTLA, TIGIT, LAG3, PVRIG, PDCD1, and CTLA4;
        (l) Cytotoxic cell inactivation group: PIM2, SERPINB9, LGALS9, CD5, KLRB1, FASLG, KLRD1, LAIR1, LAIR2, and SIGLEC7;
        (m) Regulatory B (Breg) cells group: ZBTB32, NFKBID, SOX5, EBI3, and ZBTB20;
        (n) Myeloid suppression group: IL10, FGL2, EBI3, CYBB, IL4I1, TGFBI, IDO1, PTGS2, and MSR1;

(o) Phagocytosis inhibition group: LILRB3, LILRB1, FCGR2B, LILRB4, SIRPA, SIGLEC10, LILRB2, PECAM1, CD300A, CD300LF, and CD33;
(p) Stromal suppression group: IL11, TGFB2, TDO2, TSLP, IL6, TGFB3, and TGFBI;
(q) Exclusion of cytotoxic T lymphocytes (CTL) group: GAS6, VEGFA, PDGFC, FGF2, EDNRB, TNFAIP6, and CXCL12;
(r) Endothelium group: ECSCR, NOS3, MMRN1, VWF, CLEC14A, FLT1, KDR, ROBO4, ENG, CDH5, and MMRN2;
(s) Carcinogenic-associated fibroblast (CAF) group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
(t) Epithelial-mesenchymal transition (EMT) signature group: RUNX2, FOXM1, SNAI1, TWIST1, and SNAI2;
(u) Adipocytes group: GPD1, LBP, PTGER3, DLAT, FABP4, LEP, PLIN1, ADIPOQ, PPP1R1A, ADH1B, LIPE, and COL4A4;
(v) Metastasis signature group: MMP9, HPSE, PARP1, CDH2, RCC2, and SERPINH1;
(w) Metabolic suppression of CTL group: SPHK1, MSR1, ADORA2A, and ENTPD1;
(x) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(y) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(z) Acidosis group: SLC16A1, SLC16A4, MAPK14, and SLC9A1;
(aa) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(ab) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2; and
(ac) Glycolysis group: ALDOA, TPI1, GPD2, PGK1, LDHA, PFKP, BPGM, ENO1, GPI, and SLC16A3;
generating a TME signature for the subject by determining, using the RNA expression data, a gene group score for each gene group in the at least two gene groups;
determining a distance between the TME signature and predetermined TME clusters, the predetermined TME clusters each being associated with one of a plurality of TME types;
identifying, using the determined distance and from among the plurality of TME types, a TME type for the subject; and
identifying and administering to the subject at least one therapeutic agent using the TME type of the subject, wherein identifying and administering to the subject the at least one therapeutic agent based on the TME type of the subject comprises:
identifying and administering to the subject an immune checkpoint inhibitor comprising an anti-TGF-β antibody, an anti-PDGFR antibody, or an anti-VEGF antibody as the at least one therapeutic agent when the subject is identified as having an Immune-Enriched, Fibrotic (IE/F), Fibrotic, Angiogenic, Myeloid (F/A/M), or Fibrotic, Hypoxic (F/H) type TME type,
identifying and administering to the subject a TKI as the at least one therapeutic agent when the subject is identified as having an IE/F, F/A/M, or F/H type TME type,
identifying and administering to the subject an immune checkpoint inhibitor comprising an anti-IL-6 antibody as the at least one therapeutic agent when the subject is identified as having an IE/F or Highly Immune-Enriched, Inflamed (IE/Inf) type TME type,
identifying and administering to the subject an immune checkpoint inhibitor comprising an anti-CD276 antibody as the at least one therapeutic agent when the subject is identified as having an F/A/M or F/H type TME type,
identifying and administering to the subject an immune checkpoint inhibitor comprising an anti-PD-L2 antibody or anti-SIRPa antibody as the at least one therapeutic agent when the subject is identified as having an F/A/M or IE/F type TME type,
identifying and administering to the subject an immune checkpoint inhibitor comprising an anti-PD-1 antibody as the at least one therapeutic agent when the subject is identified as having a B-Cell Enriched, Angiogenic (IE/B/A) or a Lymphoid-Cell Enriched (IE/L) type TME type, and/or
identifying and administering to the subject an immune checkpoint inhibitor comprising an anti-PDL-1 antibody as the at least one therapeutic agent when the subject is identified as having an Immune-Enriched, Hypoxic (IE/H) or IE/Inf type TME type.

2. The method of claim 1, wherein obtaining the RNA expression data comprises obtaining RNA expression data indicating RNA expression levels for at least four genes in each of at least two gene groups of the set of gene groups, for between at least three genes and ten genes in each of at least two gene groups of the set of gene groups, or for each gene in each of at least two gene groups of the set of gene groups.

3. The method of claim 1, wherein obtaining the RNA expression data further comprises obtaining RNA expression data indicating RNA expression levels for at least three genes in each of at least two gene groups of additional gene groups, for at least four genes in each of at least two gene groups of the additional gene groups, for between at least three genes and ten genes in each of at least two gene groups of the additional gene groups, for each gene in each of at least two gene groups of the additional gene groups, or for each gene in the additional gene groups, the additional gene groups including:
(a) Major histocompatibility complex class II cells (MHC II) group: HLA-DRB1, HLA-DMA, HLA-DRA, HLA-DQB1, CIITA, HLA-DPB1, HLA-DMB, HLA-DQA1, and HLA-DPA1;

(b) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(c) B cells group: PAX5, MS4A1, CD19, CR2, TNFRSF13B, TNFRSF13C, TNFRSF17, CD79B, BLK, CD22, CD79A, STAP1, and FCRL5;
(d) CD8 T cells group: KLRK1, CD8B, CD8A, PRF1, EOMES, TRAT1, GZMB, GZMA, GZMK, ZAP70, NKG7, and TBX21;
(e) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(f) T cells group: ITK, CD3G, CD3D, TRBC1, CD3E, TRAT1, TRAC, TRBC2, CD28, CD5, and TBX21;
(g) Regulatory T (Treg) cells group: CCR8, TNFRSF18, FOXP3, IKZF2, CTLA4, IKZF4, and IL2RA;
(h) Matrix group: VTN, ELN, COL11A1, COL4A1, TNC, COL1A1, COL1A2, COL3A1, LAMA3, LGALS9, FN1, COL5A1, LAMB3, LGALS7, and LAMC2;
(i) Matrix remodeling group: LOX, MMP12, MMP9, PLOD2, ADAMTS5, MMP3, ADAMTS4, MMP11, MMP1, CA9, MMP2, and MMP7; and
(j) Angiogenesis group: VEGFA, TEK, PDGFC, VWF, CXCR2, ANGPT1, FLT1, KDR, ANGPT2, VEGFB, VEGFC, PGF, and CDH5.

4. The method of claim 1, wherein generating the TME signature further comprises generating, for at least a subset of signaling types, one or more signaling pathway activity scores using the RNA expression levels, the signaling types including:
(a) EGFR signaling;
(b) Hypoxia signaling;
(c) MAPK signaling;
(d) PI3K signaling;
(e) TGF-β signaling; and
(f) Trail signaling.

5. The method of claim 1, wherein determining the gene group score comprises:
(i) determining a respective gene group score for each of at least two of the following gene groups, using, for a particular gene group, RNA expression levels for at least three genes in the particular gene group to determine the gene group score for the particular gene group, or
(ii) determining a respective gene group score for each of the following gene groups, using, for a particular gene group, RNA expression levels for each gene in each gene group to determine the gene group score for each particular gene group,
the gene groups including:
(a) Major histocompatibility complex class II cells (MHC II) group: HLA-DRB1, HLA-DMA, HLA-DRA, HLA-DQB1, CIITA, HLA-DPB1, HLA-DMB, HLA-DQA1, and HLA-DPA1;
(b) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(c) B cells group: PAX5, MS4A1, CD19, CR2, TNFRSF13B, TNFRSF13C, TNFRSF17, CD79B, BLK, CD22, CD79A, STAP1, and FCRL5;
(d) CD8 T cells group: KLRK1, CD8B, CD8A, PRF1, EOMES, TRAT1, GZMB, GZMA, GZMK, ZAP70, NKG7, and TBX21;
(e) cDC1 group: XCR1, CLEC9A, C1orf54, BATF3, WDFY4, and HLA-DOB;
(f) cDC2 group: ITGAX, HLA-DRA, HLA-DRB1, CD1C, FCER1A, CLEC10A, and AMICA1;
(g) pDC group: IL3RA, CLEC4C, CCR2, CXCR3, GZMB, DERL3, LILRA4, and SCT;
(h) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(i) T cells group: ITK, CD3G, CD3D, TRBC1, CD3E, TRAT1, TRAC, TRBC2, CD28, CD5, and TBX21;
(j) M1 cytokines group: CXCL10, IL23A, IL1B, IL12B, TNF, and CXCL9;
(k) Panmacrophage signature group: C1QC, CSF1R, CD163, SIGLEC1, C1QA, VSIG4, MSR1, and CD68;
(l) TLS group: CXCL10, SELL, LAMP3, FDCSP, CD86, CXCL13, PTPRCAP, CCR7, LTA, CXCR3, CCL21, CCL19, JCHAIN, CXCL9, and TNFRSF17;
(m) Proinflammatory cytokines group: IL23A, IFNB1, IL1A, IL1B, TNF, CXCL2, IL6, IL26, CCL2, CCL4, LIF, and CCL3;
(n) Anti-tumor chemokines group: CXCL10, CXCL9, CXCL13, XCL1, CCL5, CCL21, CCL19, and XCL2;
(o) Pro-tumor chemokines group: CCL26, CXCL6, CCL20, CXCL8, CXCL1, CCL18, CCL17, and CCL22;
(p) Myeloid checkpoints group: PDCD1LG2, HAVCR2, CD274, and C10orf54;
(q) Lymphoid checkpoints group: BTLA, TIGIT, LAG3, PVRIG, PDCD1, and CTLA4;
(r) Cytotoxic cell inactivation group: PIM2, SERPINB9, LGALS9, CD5, KLRB1, FASLG, KLRD1, LAIR1, LAIR2, and SIGLEC7;
(s) Regulatory T (Treg) cells group: CCR8, TNFRSF18, FOXP3, IKZF2, CTLA4, IKZF4, and IL2RA;
(t) Breg group: ZBTB32, NFKBID, SOX5, EBI3, and ZBTB20;
(u) Myeloid suppression group: IL10, FGL2, EBI3, CYBB, IL4I1, TGFBI, IDO1, PTGS2, and MSR1;
(v) Phagocytosis inhibition group: LILRB3, LILRB1, FCGR2B, LILRB4, SIRPA, SIGLEC10, LILRB2, PECAM1, CD300A, CD300LF, and CD33;
(w) Stromal suppression group: IL11, TGFB2, TDO2, TSLP, IL6, TGFB3, and TGFBI;
(x) Exclusion group: GAS6, VEGFA, PDGFC, FGF2, EDNRB, TNFAIP6, and CXCL12;
(y) Matrix group: VTN, ELN, COL11A1, COL4A1, TNC, COL1A1, COL1A2, COL3A1, LAMA3, LGALS9, FN1, COL5A1, LAMB3, LGALS7, and LAMC2;
(z) Endothelium group: ECSCR, NOS3, MMRN1, VWF, CLEC14A, FLT1, KDR, ROBO4, ENG, CDH5, and MMRN2;
(aa) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
(ab) Matrix remodeling group: LOX, MMP12, MMP9, PLOD2, ADAMTS5, MMP3, ADAMTS4, MMP11, MMP1, CA9, MMP2, and MMP7;

(ac) Angiogenesis group: VEGFA, TEK, PDGFC, VWF, CXCR2, ANGPT1, FLT1, KDR, ANGPT2, VEGFB, VEGFC, PGF, and CDH5;
(ad) EMT signature group: RUNX2, FOXM1, SNAI1, TWIST1, and SNAI2;
(ae) Adipocytes group: GPD1, LBP, PTGER3, DLAT, FABP4, LEP, PLIN1, ADIPOQ, PPP1R1A, ADH1B, LIPE, and COL4A4;
(af) Metastasis signature group: MMP9, HPSE, PARP1, CDH2, RCC2, and SERPINH1;
(ag) Metabolic suppression of CTL group: SPHK1, MSR1, ADORA2A, and ENTPD1;
(ah) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ai) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(aj) Acidosis group: SLC16A1, SLC16A4, MAPK14, and SLC9A1;
(ak) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(al) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2; and
(am) Glycolysis group: ALDOA, TPI1, GPD2, PGK1, LDHA, PFKP, BPGM, ENO1, GPI, and SLC16A3.

6. The method of claim 1, wherein determining the gene group score comprises determining a first score of a first gene group using:
(i) a single-sample Gene Set Enrichment Analysis (ssGSEA) technique to determine the gene group score from RNA expression levels for at least some of the genes in one or the following gene groups, or
(ii) an ssGSEA technique to determine the gene group score from RNA expression levels for each of the genes in each of the following gene groups,
the gene groups comprising:
(a) Major histocompatibility complex class II cells (MHC II) group: HLA-DRB1, HLA-DMA, HLA-DRA, HLA-DQB1, CIITA, HLA-DPB1, HLA-DMB, HLA-DQA1, and HLA-DPA1;
(b) NK cells group: GNLY, KLRK1, KLRF1, GZMH, NCR3, EOMES, NCR1, SH2D1B, IFNG, CD226, FGFBP2, KLRC2, GZMB, KIR2DL4, NKG7, CD244, and CD160;
(c) B cells group: PAX5, MS4A1, CD19, CR2, TNFRSF13B, TNFRSF13C, TNFRSF17, CD79B, BLK, CD22, CD79A, STAP1, and FCRL5;
(d) CD8 T cells group: KLRK1, CD8B, CD8A, PRF1, EOMES, TRAT1, GZMB, GZMA, GZMK, ZAP70, NKG7, and TBX21;
(e) cDC1 group: XCR1, CLEC9A, C1orf54, BATF3, WDFY4, and HLA-DOB;
(f) cDC2 group: ITGAX, HLA-DRA, HLA-DRB1, CD1C, FCER1A, CLEC10A, and AMICA1;
(g) pDC group: IL3RA, CLEC4C, CCR2, CXCR3, GZMB, DERL3, LILRA4, and SCT;
(h) Proliferation rate group: CETN3, CCNB1, CCND1, CCNE1, MCM6, PLK1, CDK2, AURKB, ESCO2, AURKA, MCM2, MKI67, E2F1, BUB1, and MYBL2;
(i) T cells group: ITK, CD3G, CD3D, TRBC1, CD3E, TRAT1, TRAC, TRBC2, CD28, CD5, and TBX21;
(j) M1 cytokines group: CXCL10, IL23A, IL1B, IL12B, TNF, and CXCL9;
(k) Panmacrophage signature group: C1QC, CSF1R, CD163, SIGLEC1, C1QA, VSIG4, MSR1, and CD68;
(l) TLS group: CXCL10, SELL, LAMP3, FDCSP, CD86, CXCL13, PTPRCAP, CCR7, LTA, CXCR3, CCL21, CCL19, JCHAIN, CXCL9, and TNFRSF17;
(m) Proinflammatory cytokines group: IL23A, IFNB1, IL1A, IL1B, TNF, CXCL2, IL6, IL26, CCL2, CCL4, LIF, and CCL3;
(n) Anti-tumor chemokines group: CXCL10, CXCL9, CXCL13, XCL1, CCL5, CCL21, CCL19, and XCL2;
(o) Pro-tumor chemokines group: CCL26, CXCL6, CCL20, CXCL8, CXCL1, CCL18, CCL17, and CCL22;
(p) Myeloid checkpoints group: PDCD1LG2, HAVCR2, CD274, and C10orf54;
(q) Lymphoid checkpoints group: BTLA, TIGIT, LAG3, PVRIG, PDCD1, and CTLA4;
(r) Cytotoxic cell inactivation group: PIM2, SERPINB9, LGALS9, CD5, KLRB1, FASLG, KLRD1, LAIR1, LAIR2, and SIGLEC7;
(s) Regulatory T (Treg) cells group: CCR8, TNFRSF18, FOXP3, IKZF2, CTLA4, IKZF4, and IL2RA;
(t) Breg group: ZBTB32, NFKBID, SOX5, EBI3, and ZBTB20;
(u) Myeloid suppression group: IL10, FGL2, EBI3, CYBB, IL4I1, TGFBI, IDO1, PTGS2, and MSR1;
(v) Phagocytosis inhibition group: LILRB3, LILRB1, FCGR2B, LILRB4, SIRPA, SIGLEC10, LILRB2, PECAM1, CD300A, CD300LF, and CD33;
(w) Stromal suppression group: IL11, TGFB2, TDO2, TSLP, IL6, TGFB3, and TGFBI;
(x) Exclusion group: GAS6, VEGFA, PDGFC, FGF2, EDNRB, TNFAIP6, and CXCL12;
(y) Matrix group: VTN, ELN, COL11A1, COL4A1, TNC, COL1A1, COL1A2, COL3A1, LAMA3, LGALS9, FN1, COL5A1, LAMB3, LGALS7, and LAMC2;
(z) Endothelium group: ECSCR, NOS3, MMRN1, VWF, CLEC14A, FLT1, KDR, ROBO4, ENG, CDH5, and MMRN2;
(aa) CAF group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
(ab) Matrix remodeling group: LOX, MMP12, MMP9, PLOD2, ADAMTS5, MMP3, ADAMTS4, MMP11, MMP1, CA9, MMP2, and MMP7;
(ac) Angiogenesis group: VEGFA, TEK, PDGFC, VWF, CXCR2, ANGPT1, FLT1, KDR, ANGPT2, VEGFB, VEGFC, PGF, and CDH5;
(ad) EMT signature group: RUNX2, FOXM1, SNAI1, TWIST1, and SNAI2;
(ae) Adipocytes group: GPD1, LBP, PTGER3, DLAT, FABP4, LEP, PLIN1, ADIPOQ, PPP1R1A, ADH1B, LIPE, and COL4A4;

(af) Metastasis signature group: MMP9, HPSE, PARP1, CDH2, RCC2, and SERPINH1;
(ag) Metabolic suppression of CTL group: SPHK1, MSR1, ADORA2A, and ENTPD1;
(ah) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
(ai) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
(aj) Acidosis group: SLC16A1, SLC16A4, MAPK14, and SLC9A1;
(ak) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
(al) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2; and
(am) Glycolysis group: ALDOA, TPI1, GPD2, PGK1, LDHA, PFKP, BPGM, ENO1, GPI, and SLC16A3.

7. The method of claim 1, wherein generating the TME signature further comprises normalizing the gene group score, wherein the normalizing comprises applying median scaling to the gene group score.

8. The method of claim 1,
wherein the plurality of TME types is associated with a respective plurality of TME signature clusters,
wherein identifying, using the TME signature and from among a plurality of TME types, the TME type for the subject comprises:
associating the TME signature of the subject with a particular one of the plurality of TME signature clusters; and
identifying the TME type for the subject as the TME type corresponding to the particular one of the plurality of TME signature clusters to which the TME signature of the subject is associated.

9. The method of claim 8, further comprising generating the plurality of TME signature clusters, the generating comprising:
obtaining multiple sets of RNA expression data by sequencing biological samples from multiple respective subjects, each of the multiple sets of RNA expression data indicating RNA expression levels for at least some genes in each of the at least some of the plurality of the set of gene groups; and
generating multiple TME signatures from the multiple sets of RNA expression data, each of the multiple TME signatures comprising gene group expression scores for respective gene groups in the plurality of gene groups, the generating comprising, for each particular one of the multiple TME signatures:
determining the TME signature by determining the gene group expression scores using the RNA expression levels in the particular set of RNA expression data for which the particular one TME signature is being generated; and
clustering the multiple TME signatures to obtain the plurality of TME signature clusters.

10. The method of claim 8, further comprising:
updating the plurality of TME signature clusters using the TME signature of the subject, wherein the TME signature of the subject is one of a threshold number TME signatures for a threshold number of subjects, wherein when the threshold number of TME signatures is generated the TME signature clusters are updated,
wherein the threshold number of TME signatures is at least 50, at least 75, at least 100, at least 200, at least 500, at least 1000, or at least 5000 TME signatures.

11. The method of claim 10, wherein the updating is performed using a clustering algorithm selected from the group consisting of a dense clustering algorithm, spectral clustering algorithm, k-means clustering algorithm, hierarchical clustering algorithm, and an agglomerative clustering algorithm.

12. The method of claim 10, further comprising:
determining a TME type of a second subject, wherein the TME type of the second subject is identified using the updated TME signature clusters, wherein the identifying comprises:
determining a TME signature of the second subject from RNA expression data obtained by sequencing a biological sample obtained from the second subject;
associating the TME signature of the second subject with a particular one of the plurality of the updated TME signature clusters; and
identifying the TME type for the second subject as the TME type corresponding to the particular one of the plurality of updated TME signature clusters to which the TME signature of the second subject is associated.

13. The method of claim 1, wherein the plurality of TME types comprises: Lymphoid-Cell Enriched (IE/L) type; B-Cell Enriched, Angiogenic (IE/B/A) type; Immune-Enriched, Hypoxic (IE/H) type; Highly Immune-Enriched, Inflamed (IE/Inf) type; Immune-Enriched, Fibrotic (IE/F) type; Fibrotic, Angiogenic, Myeloid (F/A/M) type; Fibrotic, Hypoxic (F/H) type; Immune Desert (D) type; and/or Faintly Infiltrated, Angiogenic (D/A) type.

14. The method of claim 13, wherein:
the Lymphoid-Cell Enriched (IE/L) type is associated with lymphoid-cell-enriched, non-stroma-enriched, myeloid cell deficient, and moderate tumor proliferation rate biological samples,
the B-Cell Enriched, Angiogenic (IE/B/A) type is associated with lymphoid-cell-enriched, myeloid-cell-enriched, adipocyte-enriched, and low tumor proliferation rate biological samples,
the Immune-Enriched, Hypoxic (IE/H) type is associated with lymphoid-cell-enriched, myeloid-cell-enriched, hypoxic, glycolytic, EGFR and MAPK upregulated, and high tumor proliferation rate biological samples,
the Highly Immune-Enriched, Inflamed (IE/Inf) type is associated with lymphoid-cell-enriched, myeloid-cell-enriched, inflamed, non-stroma-enriched, and low tumor proliferation rate biological samples,
the Immune-Enriched, Fibrotic (IE/F) type is associated with myeloid-cell-enriched, stroma-enriched, angiogenetic, TGF-β upregulated, and low tumor proliferation rate biological samples, the Fibrotic, Angiogenic, Myeloid (F/A/M) type is associated with stroma-enriched, myeloid cell deficient, TGF-β, EGFR, and MAPK upregulated, and hypoxic biological samples,
the Fibrotic, Hypoxic (F/H) type is associated with hypoxic, tumor-cell-enriched, TGF-β, EGFR, MAPK, and PI3K upregulated, and high tumor proliferation rate biological samples, the Immune Desert (D) type is associated with tumor-cell-enriched, lymphoid cell deficient, mildly hypoxic, and high tumor proliferation rate biological samples, and/or the Faintly Infiltrated, Angiogenic (D/A) type is associated with tumor-cell-enriched, angiogenic, TGF-β upregulated, and low tumor proliferation rate biological samples.

15. The method of claim 1, wherein the plurality of TME types was generated by:
   determining a plurality of TME signatures for a respective plurality of subjects using RNA expression data from biological samples obtained from the plurality of subjects, each of the plurality of TME signatures containing a gene group expression level for at least some of the set of gene groups; and
   clustering the plurality of TME signatures to obtain the TME types.

16. The method of claim 1, wherein the at least one therapeutic agent comprises an immuno-oncology (IO) agent, optionally wherein the IO agent comprises an immune checkpoint inhibitor or a tyrosine kinase inhibitor (TKI).

17. The method of claim 16, wherein the immune checkpoint inhibitor comprises an anti-TGF-β antibody, an anti-PDGFR antibody, an anti-PD-1 antibody, an anti-LAG3 antibody, an anti-PD-L1 antibody, an anti-IL-6 antibody, an anti-CD276 antibody, an anti-PD-L2 antibody, an anti-SIRPa antibody, an anti-VISTA antibody, an anti-TIGIT antibody, an anti-CTLA4 antibody, or an anti-PVRIG antibody.

18. A method for determining a tumor microenvironment (TME) type of a subject, the method comprising:
   using at least one computer hardware processor to perform:
      obtaining RNA expression data for the subject, the RNA expression data indicating RNA expression levels for at least three genes in each of at least two gene groups of a set of gene groups, the set of gene groups including:
         (a) Conventional dendritic cells type 1 (cDC1) group: XCR1, CLEC9A, C1orf54, BATF3, WDFY4, and HLA-DOB;
         (b) Conventional dendritic cells type 2 (cDC2) group: ITGAX, HLA-DRA, HLA-DRB1, CD1C, FCER1A, CLEC10A, and AMICA1;
         (c) Plasmacytoid dendritic cells (pDC) group: IL3RA, CLEC4C, CCR2, CXCR3, GZMB, DERL3, LILRA4, and SCT;
         (d) M1 cytokines group: CXCL10, IL23A, IL1B, IL12B, TNF, and CXCL9;
         (e) Panmacrophage signature group: C1QC, CSF1R, CD163, SIGLEC1, C1QA, VSIG4, MSR1, and CD68;
         (f) Tertiary Lymphoid Structure (TLS) group: CXCL10, SELL, LAMP3, FDCSP, CD86, CXCL13, PTPRCAP, CCR7, LTA, CXCR3, CCL21, CCL19, JCHAIN, CXCL9, and TNFRSF17;
         (g) Proinflammatory cytokines group: IL23A, IFNB1, IL1A, IL1B, TNF, CXCL2, IL6, IL26, CCL2, CCL4, LIF, and CCL3;
         (h) Anti-tumor chemokines group: CXCL10, CXCL9, CXCL13, XCL1, CCL5, CCL21, CCL19, and XCL2;
         (i) Pro-tumor chemokines group: CCL26, CXCL6, CCL20, CXCL8, CXCL1, CCL18, CCL17, and CCL22;
         (j) Myeloid checkpoints group: PDCD1LG2, HAVCR2, CD274, and C10orf54;
         (k) Lymphoid checkpoints group: BTLA, TIGIT, LAG3, PVRIG, PDCD1, and CTLA4;
         (l) Cytotoxic cell inactivation group: PIM2, SERPINB9, LGALS9, CD5, KLRB1, FASLG, KLRD1, LAIR1, LAIR2, and SIGLEC7;
         (m) Regulatory B (Breg) cells group: ZBTB32, NFKBID, SOX5, EBI3, and ZBTB20;
         (n) Myeloid suppression group: IL10, FGL2, EBI3, CYBB, IL4I1, TGFBI, IDO1, PTGS2, and MSR1;
         (o) Phagocytosis inhibition group: LILRB3, LILRB1, FCGR2B, LILRB4, SIRPA, SIGLEC10, LILRB2, PECAM1, CD300A, CD300LF, and CD33;
         (p) Stromal suppression group: IL11, TGFB2, TDO2, TSLP, IL6, TGFB3, and TGFBI;
         (q) Exclusion of cytotoxic T lymphocytes (CTL) group: GAS6, VEGFA, PDGFC, FGF2, EDNRB, TNFAIP6, and CXCL12;
         (r) Endothelium group: ECSCR, NOS3, MMRN1, VWF, CLEC14A, FLT1, KDR, ROBO4, ENG, CDH5, and MMRN2;
         (s) Carcinogenic-associated fibroblast (CAF) group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
         (t) Epithelial-mesenchymal transition (EMT) signature group: RUNX2, FOXM1, SNAI1, TWIST1, and SNAI2;
         (u) Adipocytes group: GPD1, LBP, PTGER3, DLAT, FABP4, LEP, PLIN1, ADIPOQ, PPP1RA, ADH1B, LIPE, and COL4A4;
         (v) Metastasis signature group: MMP9, HPSE, PARP1, CDH2, RCC2, and SERPINH1;
         (w) Metabolic suppression of CTL group: SPHK1, MSR1, ADORA2A, and ENTPD1;
         (x) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
         (y) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
         (z) Acidosis group: SLC16A1, SLC16A4, MAPK14, and SLC9A1;
         (aa) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
         (ab) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2; and
         (ac) Glycolysis group: ALDOA, TPI1, GPD2, PGK1, LDHA, PFKP, BPGM, ENO1, GPI, and SLC16A3;

generating a TME signature for the subject by determining, using the RNA expression data, a gene group score for each gene group in the at least two gene groups;
determining a distance between the TME signature and predetermined TME clusters, the predetermined TME clusters each being associated with one of a plurality of TME types;
identifying, using the determined distance and from among the plurality of TME types, a TME type for the subject; and
identifying and administering to the subject at least one therapeutic agent using the TME type of the subject, wherein identifying and administering to the subject the at least one therapeutic agent based on the TME type of the subject comprises:
 identifying and administering to the subject an immune checkpoint inhibitor comprising an anti-PD-L2 antibody or anti-SIRPa antibody as the at least one therapeutic agent when the subject is identified as having a Fibrotic, Angiogenic, Myeloid (F/A/M) or Immune-Enriched, Fibrotic (IE/F) type TME type,
 identifying and administering to the subject an immune checkpoint inhibitor comprising an anti-PD-1 antibody as the at least one therapeutic agent when the subject is identified as having a B-Cell Enriched, Angiogenic (IE/B/A) or a Lymphoid-Cell Enriched (IE/L) type TME type, and/or
 identifying and administering to the subject an immune checkpoint inhibitor comprising an anti-PDL-1 antibody as the at least one therapeutic agent when the subject is identified as having an Immune-Enriched, Hypoxic (IE/H) or Highly Immune-Enriched, Inflamed (IE/Inf) type TME type.

19. A method for determining a tumor microenvironment (TME) type of a subject, the method comprising:
using at least one computer hardware processor to perform:
 obtaining RNA expression data for the subject, the RNA expression data indicating RNA expression levels for at least three genes in each of at least two gene groups of a set of gene groups, the set of gene groups including:
 (a) Conventional dendritic cells type 1 (cDC1) group: XCR1, CLEC9A, C1orf54, BATF3, WDFY4, and HLA-DOB;
 (b) Conventional dendritic cells type 2 (cDC2) group: ITGAX, HLA-DRA, HLA-DRB1, CD1C, FCER1A, CLEC10A, and AMICA1;
 (c) Plasmacytoid dendritic cells (pDC) group: IL3RA, CLEC4C, CCR2, CXCR3, GZMB, DERL3, LILRA4, and SCT;
 (d) M1 cytokines group: CXCL10, IL23A, IL1B, IL12B, TNF, and CXCL9;
 (e) Panmacrophage signature group: C1QC, CSF1R, CD163, SIGLEC1, C1QA, VSIG4, MSR1, and CD68;
 (f) Tertiary Lymphoid Structure (TLS) group: CXCL10, SELL, LAMP3, FDCSP, CD86, CXCL13, PTPRCAP, CCR7, LTA, CXCR3, CCL21, CCL19, JCHAIN, CXCL9, and TNFRSF17;
 (g) Proinflammatory cytokines group: IL23A, IFNB1, IL1A, IL1B, TNF, CXCL2, IL6, IL26, CCL2, CCL4, LIF, and CCL3;
 (h) Anti-tumor chemokines group: CXCL10, CXCL9, CXCL13, XCL1, CCL5, CCL21, CCL19, and XCL2;
 (i) Pro-tumor chemokines group: CCL26, CXCL6, CCL20, CXCL8, CXCL1, CCL18, CCL17, and CCL22;
 (j) Myeloid checkpoints group: PDCD1LG2, HAVCR2, CD274, and C10orf54;
 (k) Lymphoid checkpoints group: BTLA, TIGIT, LAG3, PVRIG, PDCD1, and CTLA4;
 (l) Cytotoxic cell inactivation group: PIM2, SERPINB9, LGALS9, CD5, KLRB1, FASLG, KLRD1, LAIR1, LAIR2, and SIGLEC7;
 (m) Regulatory B (Breg) cells group: ZBTB32, NFKBID, SOX5, EBI3, and ZBTB20;
 (n) Myeloid suppression group: IL10, FGL2, EBI3, CYBB, IL4I1, TGFBI, IDO1, PTGS2, and MSR1;
 (o) Phagocytosis inhibition group: LILRB3, LILRB1, FCGR2B, LILRB4, SIRPA, SIGLEC10, LILRB2, PECAM1, CD300A, CD300LF, and CD33;
 (p) Stromal suppression group: IL11, TGFB2, TDO2, TSLP, IL6, TGFB3, and TGFBI;
 (q) Exclusion of cytotoxic T lymphocytes (CTL) group: GAS6, VEGFA, PDGFC, FGF2, EDNRB, TNFAIP6, and CXCL12;
 (r) Endothelium group: ECSCR, NOS3, MMRN1, VWF, CLEC14A, FLT1, KDR, ROBO4, ENG, CDH5, and MMRN2;
 (s) Carcinogenic-associated fibroblast (CAF) group: FBLN1, COL1A1, PDGFRB, CXCL12, COL6A1, COL5A1, FGF2, FAP, PDGFRA, MMP2, MMP3, COL1A2, CD248, FN1, LUM, MFAP5, LRP1, COL11A1, COL6A3, COL6A2, LGALS1, and ACTA2;
 (t) Epithelial-mesenchymal transition (EMT) signature group: RUNX2, FOXM1, SNAI1, TWIST1, and SNAI2;
 (u) Adipocytes group: GPD1, LBP, PTGER3, DLAT, FABP4, LEP, PLIN1, ADIPOQ, PPP1RA, ADH1B, LIPE, and COL4A4;
 (v) Metastasis signature group: MMP9, HPSE, PARP1, CDH2, RCC2, and SERPINH1;
 (w) Metabolic suppression of CTL group: SPHK1, MSR1, ADORA2A, and ENTPD1;
 (x) Hypoxia factors group: LOX, FUT11, PGK1, CA12, TPI1, PDK1, EPAS1, LDHA, SLC2A1, PFKFB3, P4HA1, ALDOA, CA9, HK2, and NDRG1;
 (y) Autophagy group: ATG12, ATG9A, TFEB, RB1CC1, MAP1LC3B, GABARAPL2, ATG4B, ATG7, GABARAP, VMP1, ATG14, GABARAPL1, ATG13, and NBR1;
 (z) Acidosis group: SLC16A1, SLC16A4, MAPK14, and SLC9A1;
 (aa) Senescence group: CDKN2A, CDKN1A, CDKN2B, GLB1, SERPINE1, DPP4, CEBPB, BCL2L1, BCL2L2, TNFRSF10D, ITGB3, IGFBP3, MMP3, CCL2, IL6, CXCL8, CXCL1, IL1B, TGFB1, GDF15, IGFBP7, PLAU, STAT1, IGFBP2, and ATF3;
 (ab) Apoptosis group: BCL10, BIK, CASP6, TNFRSF12A, CASP2, CASP3, CASP7, CASP8, CYLD, FAS, IER3, PMAIP1, BCL2L11, TNFRSF10A, TNFRSF10B, APAF1, XAF1, and CASP8AP2; and (ac) Glycolysis group: ALDOA, TPI1, GPD2, PGK1, LDHA, PFKP, BPGM, ENO1, GPI, and SLC16A3;

generating a TME signature for the subject by determining, using the RNA expression data, a gene group score for each gene group in the at least two gene groups;

determining a distance between the TME signature and predetermined TME clusters, the predetermined TME clusters each being associated with one of a plurality of TME types;

identifying, using the determined distance and from among the plurality of TME types, a TME type for the subject; and identifying and administering to the subject at least one therapeutic agent using the TME type of the subject, wherein identifying and administering to the subject the at least one therapeutic agent based on the TME type of the subject comprises:

identifying and administering to the subject an immune checkpoint inhibitor comprising an anti-PD-1 antibody as the at least one therapeutic agent when the subject is identified as having a B-Cell Enriched, Angiogenic (IE/B/A) or a Lymphoid-Cell Enriched (IE/L) type TME type.

* * * * *